United States Patent Office

3,198,792
Patented Aug. 3, 1965

3,198,792
10α METHYL, 9β HORMONAL STEROIDS
Engbert Harmen Reerink, Pieter Westerhof, and Hendrik Frederik Louis Schöler, all of Weesp, Netherlands, assignors to North American Philips Company, Inc., New York, N.Y., a corporation of Delaware
No Drawing. Filed June 12, 1962, Ser. No. 201,824
21 Claims. (Cl. 260—239.55)

This invention relates to a novel class of steroids which exhibit important pharmacological properties and/or are useful as intermediates in the preparation of pharmacological active compounds.

This application is a continuation-in-part of our co-pending application Ser. No. 805,020, filed Apr. 8, 1959, now abandoned.

All the known pharmacologically active steroids of the normal series which have a methyl substituent at the carbon atom 10 of the nucleus have this substituent in the β-position. In general these compounds are characterized in having a substantially flat or planar molecular configuration of the nucleus, with the 10β methyl group projecting from the plane of the nucleus.

It is now well accepted that the pharmacological activity of the compounds of the normal series is attributable to the fact that the steroid molecule is capable of conforming to the configuration of the receptor. As a result, those skilled in the art believed heretofore that steroids of the normal series are highly stereospecific in their interaction with the receptors. Since, in general, the nuclei of the pharmacologically active compounds of the normal series are substantially flat, it would be expected that the pharmacological activity is connected with a substantially flat structure of the nucleus and therefore it would not be expected that steroids having a substantially non-planar configuration of the nucleus would possess useful pharmacological properties.

A principal object of our invention is to prepare a new and novel class of steroids. This and other objects of our invention will be apparent from the description that follows.

Quite unexpectedly, we have discovered a novel class of steroids which behaves contrary to the aforesaid expectations in the steroid art. In contrast to the normal steroids wherein the methyl at the carbon atom 10 is in the β position and the substituent at the carbon atom 9 is in the α position, in our novel class of steroids, the 10 methyl substituent is in the α position while the substituent at the carbon atom 9 is in the β position.

In addition to what has been mentioned above, with respect to the configuration of the 10 methyl group, and the substituent at the carbon atom 9, there is evidence to indicate that the structure of the nucleus of our novel compounds is non-planar. It is suggested that the nucleus of our novel steroids lies in two planes which intersect a a line drawn through the 8th and 9th carbon atoms of the nucleus. While this is a theory and we do not intend to be bound thereby, nevertheless, the indications are strong that the structure of the nucleus is non-planar. In view of the stereo specificity of the receptors, one would expect that such a deviation in the stereochemical structure of the steroid nucleus would render such steroids incapable of associating with the receptors. Consequently, it is surprising that our novel steroids possess any of the pharmacological properties of the steroids of the normal series.

The steroids of our invention even possess a specificity which manifests itself in a fewer number of pharmacological activities than those possessed by the known corresponding compounds of the normal series, and/or exhibit new properties which are not possessed by the corresponding steroid of the normal series. In some cases, our novel steroids are unexpectedly superior in activities which are possessed in common with the corresponding compound of the normal series. Coupling the novel stereo-chemical configuration of the steroid nucleus with unexpected properties of our novel steroids, it is clear that an entirely new class of steroids has been discovered.

It is believed from all the experimental work accomplished to date that the specific 10α methyl 9β configuration of our novel steroids is the common dominant characteristic which produces the tendency for the highly specific actions thereof. Further, in this respect, the 10α methyl, 9β configuration of the nucleus in cooperation with the other substituents creates the particular properties possessed by our novel steroids. Hence, the configuration of the nucleus in our novel steroids is dominant with respect to the manner in which they differentiate from the steroids of the normal series.

Those novel steroids of the present invention in which the substituents at the carbon atoms 8, 9, 10, 13 and 14 have the same stereo-configuration as those in dihydroisolumister one (lumista-4,22-dien-3-one) are designated hereinafter as "retrosteroids." Castells et al., Proc. of the Chemical Society, January 1958, page 7, has shown that dihydroisolumisterone has the configuration 8b, 9b, 10α methyl, 13b, 14a.

All the novel retrosteroids of the present invention exhibit highly specific pharmacological properties with respect to the following activities: parenteral progestational, oral progestational, pregnancy maintaining, deciduoma-inducing, fertility stimulating, fertility inhibiting, ovulation stimulating, ovulation inhibiting, anti-estrogenic, uterotrophic, anti-uterotrophic, anabolic, renotrophic, anti-androgenic, pituitary stimulating, pituitary inhibiting, glucocorticoidal, anti-inflammatory, diuretic, etc. In general our novel retrosteroids are non-androgenic and non-estrogenic and possess hormonal activity.

With respect to the highly specific pharmacological properties exhibited by the retrosteroids in comparison with the corresponding compounds of the normal series, it will be found that the retrosteroids have fewer or none of the properties in common with the corresponding compounds of the normal series and/or the retrosteroids may have one or more pharmacological properties which are not possessed by the corresponding compounds of the normal series. In addition the retrosteroids can be unexpectedly superior in one or more of the pharmacological properties which are common to the corresponding compounds of the normal series. One of the outstanding advantages of our novel retrosteroids is that they can be used to produce a desired pharmacological activity with a substantially reduced number of side effects in comparison with the steroids of the normal series.

To illustrate the differences between our novel retrosteroids and those of the normal series, reference will now be had to comparisons for that purpose.

As previously stated, the retrosteroids of our invention are so different in the scope and specificity of their pharmacological properties that they are not comparable with their corresponding steroids of the normal series. The following examples will make these differences readily apparent.

The compound Epi F of French Patent 1,091,734 has no glycogen storage activity and no anti-inflammatory activity while the corresponding retrosteroid of the invention has glycogen storage activity and is not anti-inflammatory.

The 17α-methylandrosta-1,4-diene-17-ol-3-one of British Patent 750,834 is anabolic, non-parenteral progestational, and not pituitary inhibiting. The corresponding retrosteroid is anabolic, parenterally progestationally active and pituitary inhibiting.

Androst-4-ene-3,17β-diol of United States Patent 2,911,403 is androgenic, anabolic, not pituitary inhibiting, non-thymolytic, non-glucocorticoidal and is not anti-inflammatory, whereas the corresponding retrosteroid is non-androgenic, non-anabolic, renotrophic, pituitary inhibiting, thymolytic, non-glucocorticoidal and is not anti-inflammatory.

The 7-dehydroprogesterone of United States Patent 2,876,237 is progestationally active and metabolizes androgenic, while the corresponding retrosteroid is anti-estrogenic, non-progestationally active, renotrophic and non-androgenic.

17α - ethynylandrosta - 4,6 - dien-17-ol-3-one of United States Patent 2,882,282 is parenterally progestationally active, not orally progestationally active, anabolic, androgenic and renotrophic, whereas the corresponding retrosteroid is not parenterally progestationally active, orally progestationally active, non-anabolic, non-renotrophic, non-androgenic and anti-estrogenic. 6-dehydro-progesterone of United States Patent 2,882,282 has a decreased parenteral progestational activity in comparison to progesterone, is non-orally progestationally active and is metabolized androgenic, whereas the corresponding retrosteroid has an increased parenteral progestational activity in relation to retro-progesterone which by itself is more progestationally active than progesterone is orally progestationally active and is non-androgenic even if incorrectly metabolized. 21-acetoxypregna-4,6-diene-3,20-dione of the same patent is weakly parenteral progestationally active, non-orally progestationally active, produces an increase in the Na/K ratio, has no glycogen storage activity, is not anti-inflammatory and is androgenic, whereas the corresponding retrosteroid is orally and parenterally progestationally active, diuretic with no increase in Na/K ratio, non-androgenic, and is anti-inflammatory. The pregna-1,4,6-triene-3,20-dione has no glycogen storage activity but is parenterally progestationally active but not orally progestationally active and is metabolized androgenic whereas the corresponding retrosteroid is not progestationally active but induces corpora lutea, is pituitary inhibiting and is non-androgenic even if metazolized incorrectly.

The 3,17β-diacetoxyandrosta-3,5-diene of United States Patent 2,885,397 is androgenic, anabolic and is not pituitary inhibiting, whereas the corresponding retrosteroid is non-androgenic, non-anabolic, renotrophic and pituitary inhibiting.

The activities which are mentioned above in connection with the compounds of the normal series are reported in the patents in which such compounds are disclosed.

Many additional comparisons based on our own experiments will be found in Table I following the examples.

In particular the novel steroids of our invention are in the 10α methyl, 9β steroids which contain at least 18 carbon atoms in the molecule and wherein any acyclic carbon chain when present and directly attached to the $C_{17}$ carbon atom, in the β position, contains at least one and not more than five successive carbon atoms.

An important class of these novel steroids of our invention are those in which there is a substituent having a carbon atom directly attached to the $C_{13}$ carbon atom which substituent is preferably in the β position. In addition it is preferred that the substituent at the carbon atom 14 be in the α position and that the substituent at the carbon atom 8 be in the β position.

More particularly the pharmacologically active steroids of our invention are those designated by the following general formula in which the substituents are designated as being in the α-position by means of a broken line (— — —) joining the substituent to the steroid nucleus, the substituents are designated as being in the β-position by means of a solid line (————) joining the substituent to the steroid nucleus and in those cases in which the substituent may be either in the α- or β-position the substituents are indicated as being joined to the steroid nucleus by a broken line and a solid line placed side to side $$\left(\begin{array}{c}---\\ ———\end{array}\right)$$

FORMULA I

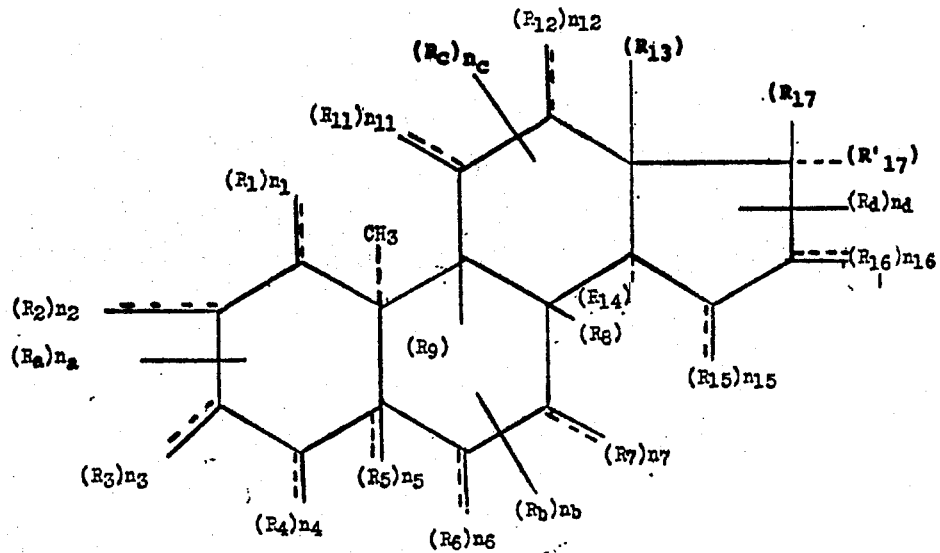

wherein $R_a$ is a member of the group consisting of carbon to carbon double bonds present at the positions 1, 2, 3 and 4 and $n_a$ is a whole number from 0 to 2;

$R_b$ is a member of the group consisting of carbon to carbon double bonds present at the positions 5 and 6 and $n_b$ is a whole number from 0 to 1.

$R_c$ is a carbon to carbon double bond present at the position 11 and $n_c$ is a whole number from 0 to 1;

$R_d$ is a member of the group consisting of carbon to carbon double bonds present at one of the positions 15, 16 and 17(20), and $n_d$ is a whole number from 0 to 2;

$R_1$ is a member of the group consisting of hydrogen, alkyl containing from 1–3 carbon atoms, hydroxy, acyloxy, aralkoxy, alkoxy and acylthio, and $n_1$ is a whole number from 1 to 2;

$R_2$ is a member of the group consisting of hydrogen, alkyl containing from 1 to 3 carbon atoms, methylene, hydroxymethylene, alkoxymethylene, the methylene group —CH$_2$—, joining $R_1$ and $R_2$, hydroxy, acyloxy, alkoxy, aralkoxy, oxo, F, Cl and Br and $n_2$ is a whole number from 1 to 2;

$R_3$ is a member of the group consisting of hydrogen, alkyl containing from 1 to 3 carbon atoms, alkyl containing from 1 to 2 carbon atoms substituted with hydroxy, oxo or both of the same, alkenyl containing from 2 to 3 carbon atoms, alkynyl containing from 2 to 3 carbon atoms, hydroxy, acyloxy, alkoxy and aralkoxy groups, the thio analogues of said hydroxy, acyloxy, alkoxy and aralkoxy groups, oxo, ketalized oxo, F, Cl, Br, —$NH_2$ $$-N\begin{matrix}\text{alkyl}\\ \text{H}\end{matrix} \quad \text{and} \quad -N\begin{matrix}\text{alkyl}\\ \text{alkyl}\end{matrix}$$

wherein each alkyl group contains from 1 to 3 carbon atoms and (2,3-d)-isoxazole, (3,2-c)-pyrazole, 2'-methyl-(3,2-d)-thiozole and 2'-amino-(3,2-d)-pyrimidine heterocyclic groups wherein each of said heterocyclics is formed by $R_2$ together with carbon atoms 2 and 3 of the steroid nucleus and $R_3$ and $n_3$ is a whole number from 1 to 2;

$R_4$ is a member of the group consisting of hydrogen, alkyl containing from 1 to 3 carbon atoms, hydroxy, acyloxy, aralkoxy, alkoxy, oxo, F, Cl and Br and $n_4$ is a whole number from 1 to 2;

$R_5$ is a member of the group consisting of hydrogen, alkyl containing from 1 to 3 carbon atoms, hydroxy, acyloxy, alkoxy, acylthio, aralkoxy, F, Cl and Br and $n_5$ is a whole number from 0 to 1;

$R_6$ is a member of the group consisting of hydrogen, alkyl containing from 1 to 3 carbon atoms, methylene, trifluoromethyl, trichloromethyl, tribromomethyl, alkenyl containing from 2 to 3 carbon atoms, alkynyl containing from 2 to 3 carbon atoms, hydroxy, acyloxy, alkoxy, aralkoxy, acylthio, oxo, nitro, amino, F, Cl and Br and $n_6$ is a whole number from 1 to 2;

$R_7$ is a member of the group consisting of hydrogen, alkyl containing 1 to 3 carbon atoms, hydroxy, acyloxy, acylthio, alkoxy, aralkoxy, oxo, amino, F, Cl and Br, and $n_7$ is a whole number from 1 to 2;

$R_8$ is a member of the group consisting of hydrogen, hydroxy, acyloxy, alkoxy and aralkoxy and $R_9$ is a member of the group consisting of hydrogen, alkyl containing from 1 to 3 carbon atoms, hydroxy, acyloxy, alkoxy, aralkoxy, F, Cl and Br and $R_{11}$ is a member of the group consisting of hydrogen, alkyl containing from 1 to 3 carbon atoms, methylene, alkenyl containing from 2 to 3 carbon atoms, alkynyl containing from 2 to 3 carbon atoms, hydroxy, acyloxy, alkoxy, aralkoxy, oxo, amino, F, Cl and Br and $n_{11}$ is a whole number from 1 to 2;

$R_{12}$ is a member of the group consisting of hydrogen, alkyl containing from 1 to 3 carbon atoms, hydroxy, acyloxy, alkoxy, aralkoxy, oxo, F, Cl and Br and $n_{12}$ is a whole number from 1 to 2;

$R_{13}$ is a member of the group consisting of hydrogen, methyl, hydromethyl, formyl and together with $R_{11}$ the radical $$-O\diagdown_{CH}\diagup^{OH}$$

wherein the carbon atom of said radical is connected to the carbon atom 13 and the oxygen atom is connected to carbon atom 11;

$R_{14}$ is a member of the group consisting of hydrogen, alkyl containing from 1 to 3 carbon atoms, hydroxy, acyloxy, alkoxy and aralkoxy and $R_{15}$ is a member of the group consisting of hydrogen, alkyl containing from 1 to 3 carbon atoms, hydroxy, acyloxy, alkoxy, aralkoxy, oxo, F, Cl and Br and $n_{15}$ is a whole number from 1 to 2;

$R_{16}$ is a member of the group consisting of hydrogen, alkyl containing from 1 to 3 carbon atoms, methylene, trifluormethyl, trichloromethyl, tribromomethyl, alkenyl containing from 2 to 3 carbon atoms, alkynyl containing from 2 to 3 carbon atoms, hydroxy-methylene, hydroxy, acyloxy, alkoxy, aralkoxy, oxo, amino, F, Cl and Br and $n_{16}$ is a whole number from 1 to 2;

$R_{17}$ is a member of the group consisting of hydrogen, hydroxy, acyloxy, alkoxy, aralkoxy, thio-analogues of said hydroxy, alkoxy and aralkoxy groups, alkyl containing from 1 to 6 carbon atoms, alkenyl containing from 2 to 6 carbon atoms, alkynyl containing from 2 to 6 carbon atoms, and said alkyl, alkenyl and alkynyl groups substituted with at least one member of the group consisting of hydroxy-, hydroxy esterified with inorganic acid, hydroxy esterified with inorganic acid of which one of the hydrogen atoms is replaced by an alkali metal atom, acyloxy-, alkoxy-, aralkoxy-, oxo-, amino-, F-, Cl-, Br- and the thio analogues of said hydroxy, alkoxy and aralkoxy groups and $R'_{17}$ is a member of the group consisting of hydrogen, hydroxy, acyloxy, alkoxy, aralkoxy, thio-analogues of said hydroxy, alkoxy and aralkoxy groups, F, Cl, Br, alkyl containing from 1–6 carbon atoms, alkenly containing from 2–6 carbon atoms, alkynyl containing from 2–6 carbon atoms, said alkyl, alkenyl, and alkynyl groups substituted with at least one member selected from the group consisting of hydroxy-, acyloxy-, alkoxy-, aralkoxy-, the thio-analogues of said hydroxy, alkoxy and aralkoxy groups, carboxy-, oxo-, amino-, F, Cl and Br, the oxo group joining $R_{17}$ and $R'_{17}$, the group —$CH_2$— joining $R_{16}$ and $R_{17}$ and a spirolactone containing from 3–6 carbon atoms joining $R_{17}$ and $R'_{17}$, a ketal group joining $R_{17}$ and $R_{16}$ and a ketal group joining $R'_{17}$ and $R_{16}$.

An interesting group of the hormonal retrosteroids of our invention are the 10α methyl steroids corresponding to the general structural formula:

FORMULA II $R_1$ is a substituent selected from the group consisting of hydrogen and the methyl radicals and
$n_1$ is a whole number from 1 to 2;

$R_2$ is a substituent selected from the group consisting of hydrogen, methyl, ethyl, hydroxy, etherified hydroxy and esterified hydroxy radicals and
$n_2$ is a whole number from 1 to 2

$R_3$ is a substituent selected from the group consisting of keto, hydroxy, esterified hydroxy and etherified hydroxy radicals and
$n_3$ is a whole number from 1 to 2;

$R_4$ is a substituent selected from the group consisting of hydrogen, chlorine and fluorine and
$n_4$ is a whole number from 1 to 2;

$R_6$ is a substituent selected from the group consisting of hydrogen, bromine, chlorine, fluorine, hydroxy, methyl, etherified hydroxy and esterified hydroxy radicals and
$n_6$ is a whole number from 1 to 2;

$R_9$ is a substituent selected from the group consisting of hydrogen, bromine and fluorine and $R_{11}$ is a substituent selected from the group consisting of hydrogen, the hydroxy radical and keto radicals and
$n_{11}$ is a whole number from 1 to 2;

$R_{16}$ is a substituent selected from the group consisting of hydrogen, hydroxy, etherified hydroxy, esterified hydroxy and ethyl and methyl radicals and
$n_{16}$ is a whole number from 1 to 12

$R_{17}$ and $R'_{17}$ are each selected from the group consisting of hydrogen, aliphatic hydrocarbon radicals containing from 1–6 carbon atoms, hydroxy derivatives of said aliphatic hydrocarbon radicals, etherified hydroxy derivatives of said aliphatic hydrocarbon radicals, esterified hydroxy derivatives of said aliphatic hydrocarbon radicals and keto derivatives of said aliphatic radicals, and jointly the keto radical with the proviso that at least one of the substituents defined by $R_{17}$ and $R'_{17}$ being a substituent other than hydrogen.

$R_a$ is a carbon to carbon double bond present at at least one of the positions 1, 2, 3, 4 and
$n_a$ is a whole number from 0–2;

$R_b$ is a member of the group consisting of carbon to carbon double bonds present at the positions 5, 6, 7 and 8 and $n_b$ is a whole number from 0 to 2;

$R_c$ is a member of the group consisting of carbon to carbon double bonds present at the positions 8(14) and 9(11) and $n_c$ is a whole number from 0 to 2;

$R_d$ is a member of the group consisting of carbon to carbon double bonds present at one of the positions 15 and 16 and $n_d$ is a whole number from 0 to 2.

A particular group of compounds of Formula II are those in which there is a conjugated carbon double bond system at the carbon atoms 5 and 7 of the steroid nucleus.

Referring to the general Formula I, three particular groups of retrosteroids having female hormonal activity are those in which all substituents are the same as defined therein except that:

Group A—$R_{17}$ is

and $R'_{17}$ is H.

Group B—$R_{17}$ is OR' wherein R' is hydrogen, alkyl or acyl and $R'_{17}$ is alkyl of 2–6 carbon atoms, alkenyl or alkynyl each of 2–6 carbon atoms.

Group C—$R_{17}$ is

and $R'_{17}$ is OR" wherein R" is acyl.

With respect to the retrosteroids of these formulae having female hormonal activity they have at least one of the following pharmacological activities namely, oral and/or parenteral progestational, anti-progestational, uterotrophic, anti-uterotrophic, anti-estrogenic, fertility stimulating, fertility inhibiting, anti-arteriosclerosis, corpora lutea induction, ovulation inhibiting and/or ovulation stimulating activities. In addition some of these compounds may have anti-tumor, pituitary stimulating and/or pituitary inhibiting activities.

As to the compounds falling within the groups A, B and C, the introduction of a double bond at the carbon atom number 1 has a tendency to decrease progestational activity and to enhance ovulation stimulating activity. The presence of a keto group at carbon atom number 3 and a double bond at carbon atom 4 has a tendency to enhance oral and parenteral progestational activity as compared with the same activity of the corresponding compound of the invention in which such a keto atom and such a double bond are absent.

The presence of a keto group at carbon atom number 3 and double bonds at carbon atom numbers 4 and 6 has a tendency to enhance oral and parenteral progestational activity and anti-uterotrophic activity as compared with the same activities of the corresponding compound of the invention in which such a keto group and such double bonds are absent. The presence of an alkoxy or acyloxy group at carbon atom number 3 and double bonds at carbon atom 3 and 5 have a tendency to decrease the intensity of progestational activity but prolong the same as compared with the same activities of the corresponding compound of the invention in which such alkoxy, acyloxy and double bonds are absent. A fluoro or chloro atom at carbon atom number 6 has a tendency to increase any female hormonal activity already possessed by the compound. A double bond at carbon atom number 7 has a tendency to decrease any female hormonal activity already possessed by the compound but to enhance anti-arteriosclerotic activity.

Referring to the Formula I three particular groups of retrosteroids having male hormonal activity are those in which all substituents are as defined therein except that Group D—$R_{17}$ is hydrogen, or OR, wherein R is hydrogen or acyl and $R'_{17}$ is hydrogen or OR, wherein R is hydrogen or acyl, provided that $R_{17}$ and $R'_{17}$ are neither both hydrogen nor both OR.

Group E—$R_{17}$ and $R'_{17}$ together form the oxo

group.

Group F—$R_{17}$ is OR' wherein R' is hydrogen, alkyl or acyl, and $R'_{17}$ is methyl.

The compounds falling within the above groups D, E and F possess at least one of the following pharmacological activities, namely, anti-androgenic, anabolic, renotrophic, anti-catabolic, catabolic, increase or decrease of spermatogenesis and/or anti-anemic activities.

In addition some of these compounds may have anti-tumor, pituitary stimulating and/or pituitary inhibiting activities.

With regard to the compounds falling within the groups D, E and F the combination of a keto group at the carbon atom number 3 with a double bond at carbon atom number 4, has a tendency to enhance anabolic and/or renotrophic activities. The combination of a keto group at carbon atom number 3 with double bonds at carbon atoms 4 and 6 in the compounds falling within the Groups D, E and F tends to impart anti-androgenic and/or pituitary inhibiting activities. A halogen atom especially a fluorine or chlorine atom at the carbon atom number 6 in compounds falling within the Groups D–F has a tendency to increase the anabolic activity.

Referring to Formula I, particular groups of retrosteroids having cortiocoidal activity are those in which all substituents are as defined therein except that
Group G—R₁₇ is

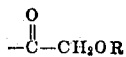

and R′₁₇ is hydrogen;
Group H—R₁₇ is

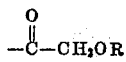

and R′₁₇ is OR;
Group I—one of the substituents at carbon atom 11 is hydroxy,

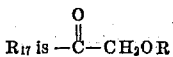

and R′₁₇ is OR;
Group J—The substituent at carbon atom 11 is oxo, R₁₇ is

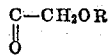

and R′₁₇ is OR and wherein in these groups G, H, I, J, R is hydrogen or acyl.

The compounds falling within the G, H, I and J Groups possess at least one of the following properties, namely, gluco-corticoid, anti-gluco-corticoid, anti-inflammatory, mineralo-corticoid, anti-mineralo-corticoid, diuretic, anti-diuretic, anti-allergic, and/or anti-diabetic activities.

In addition some of these compounds may have anti-tumor, pituitary stimulating and/or pituitary inhibiting activities.

The presence of a keto group at carbon atom number 3 and an olefinic double bond at carbon atom number 4 has a tendency to enhance one or more of the corticoidal activities of the retrosteroids falling within the Groups G, H, I and J as compared with the corresponding activities of the corresponding compounds of the invention in which such a keto group and such a double bond is absent. Introduction of another olefinic double bond at carbon atom number 6, in addition to the keto group at carbon atom number 3 and the double bond at carbon atom number 4, has a tendency to enhance the corticoidal activity still further as compared with the corresponding activities of the corresponding compound of the invention in which such a double bond is absent.

In general, the activity of the retrosteroids of the Groups A–J inclusive of the present invention show a tendency to be enhanced by the introduction of a double bond at carbon atom number 6, as compared with the corresponding activity of the corresponding compound of the invention in which such a double bond is absent.

The following structural formulae (K, L and M) represent compounds having at least progestational and anti-uterotrophic properties.

(K)

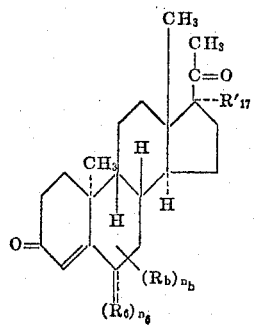

wherein R_b is an olefinic double bond at carbon atom 6, $n_b=0-1$, R₆ is hydrogen, F, Cl or Br, $n_6=1-2$, when $n_6$ is 2, R₆ comprises two hydrogen radicals or one hydrogen and one halogen radical, and R′₁₇ is hydrogen or acyloxy.

(L)

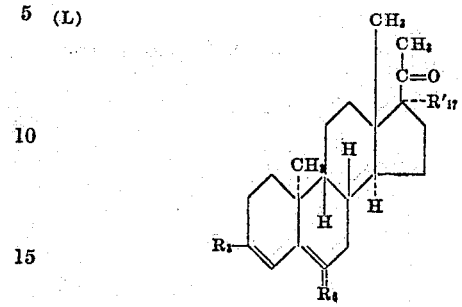

wherein R₃ is alkoxy or acyloxy, R₆ is hydrogen, F or Cl, and R′₁₇ is hydrogen or acyloxy.

(M)

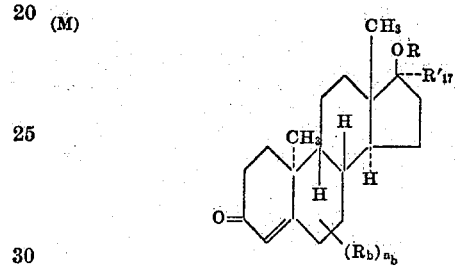

R is hydrogen or acyl, R_b is an olefinic double bond at the carbon atom 6 and $n_b=0-1$ and R′₁₇ is alkyl of 1–6 carbon atoms, alkenyl of 2–6 carbon atoms or alkynyl of 2–6 carbon atoms.

The following structural Formula M′ represents compounds having progestational, deciduomata inducing and fertility inhibiting activities:

(M′)

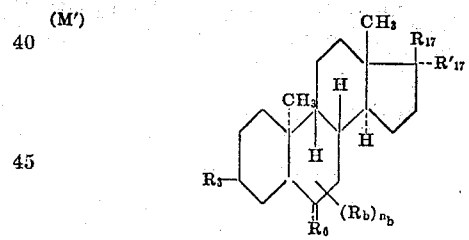

wherein:
R₃ is a 3-keto-Δ⁴ system, a Δ³,⁵-enolether system or a Δ³,⁵-enolester system;

R₆ is a hydrogen, fluoro or chloro atom; in α, β or planar position

R_b is a double bond between the carbon atoms 6 and 7, when R₃ is a 3-keto-Δ⁴-system, and $n_b$ is a whole number from 0 to 1;

R₁₇ is a hydroxy group, alkoxy, aralkoxy or an acycloxy group and

R′₁₇ is an alkenyl group containing from 3–6 carbon atoms.

In particular the group R′₁₇ may represent one of the following groups:

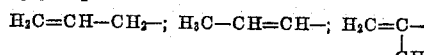
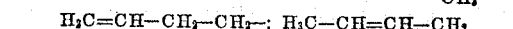
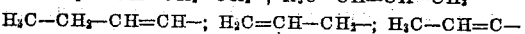
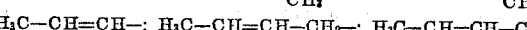
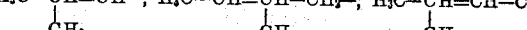
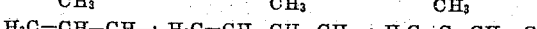
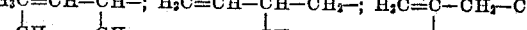
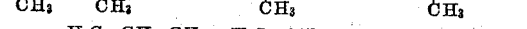
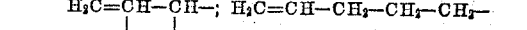

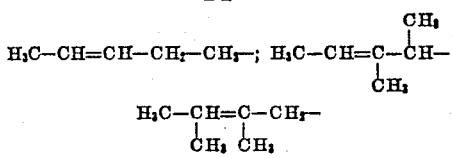

The following structural formula (N) represents compounds having at least anabolic activity.

(N) 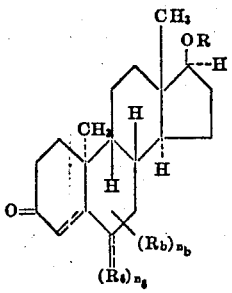

wherein R is hydrogen or acyl, $R_6$ is hydrogen, fluorine or chlorine, $n_6=1-2$, $R_b$ is an olefinic double bond at the carbon atom 6, $n_b=0-1$, and when $n_6=2$, $R_6$ comprises one hydrogen radical and one halogen radical.

The following structural formulae (O and P) represent compounds having at least anti-androgenic activity.

(O) 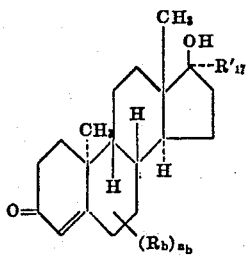

wherein $R_b$ is an olefinic double bond at the carbon atom 6 and $n_b=0-1$ and $R'_{17}$ is a member of the group consisting of alkenyl of 3–6 carbon atoms and alkynyl of 2–6 carbon atoms.

(P) 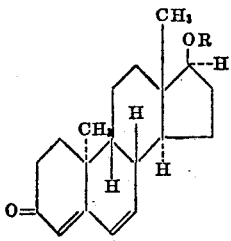

wherein R is a member of the group consisting of H, acyls of aliphatic monocarboxylic acids containing from 1–6 carbon atoms, acyls of aliphatic dicarboxylic acids of 3–6 carbon atoms and acyls of monoalkali metal salts of dicarboxylic acids.

Among the representative retro-steroids of our invention are the following:

1-dehydro-1-methyl-retro-progesterone
1,6-bisdehydro-1-methyl-retro-progesterone
1-dehydro-2-hydroxy-retro-progesterone
1-dehydro-2-acyloxy-retro-progesterone
1,6-bisdehydro-2-hydroxy-retro-progesterone
1,6-bisdehydro-2-acyloxy-retro-progesterone
3-enolether of retro-progesterone
4-hydroxy-retro-progesterone
4-hydroxy-6-dehydro-retro-progesterone
4-methyl-retro-progesterone
4-methyl-6-dehydro-retro-progesterone
1-dehydro-6β-chloro-retro-progesterone
6β-nitro-retro-progesterone
9,11α-dichoro-retro-progesterone
6-dehydro-9,11α-dichloro-retro-progesterone
9-chloro-11α-fluoro-retro-progesterone
6-dehydro-9-chloro-11α-fluoro-retro-progesterone
9-fluoro-11α-hydroxy-retro-progesterone
6-dehydro-9-fluoro-11α-hydroxy-retro-progesterone
1-dehydro-21-fluoro-retro-progesterone
21,21-difluoro-retro-progesterone
2β,21-difluoro-retro-progesterone
1-dehydro-2,21-difluoro-retro-progesterone
11-oxo-retro-progesterone
11β-hydroxy-retro-progesterone
1,6-bisdehydro-6-methoxy-retro-progesterone
6β-methoxy-retro-progesterone
1-dehydro-6β-methoxy-retro-progesterone
1-dehydro-6β-fluoro-21-acyloxy-retro-progesterone
6-dehydro-6-methoxy-21-acyloxy-retro-progesterone
6β-methoxy-21-acyloxy-retro-progesterone
1-dehydro-21-acyloxy-retro-progesterone
6β-fluoro-21-acyloxy-retro-progesterone
16α-hydroxy-21-acyloxy-retro-progesterone
3-enolether of 21-acyloxy-retro-progesterone
3-enolacylate of 21-acyloxy-retro-progesterone
3-desoxy-6-dehydro-retro-progesterone
Retro-pregna-4,6-dien-20-ono-(2,3-d)-isoxazole
Retro-pregna-4,6-dien-20-ono-(2,3-c)-isoxazole
6-dehydro-6-fluoro-retro-progesterone
1,6-bisdehydro-6-fluoro-retro-progesterone
1,6-bisdehydro-6-chloro-retro-progesterone
6-dehydro-21-fluoro-retro-progesterone
1,6-bisdehydro-21-fluoro-retro-progesterone
6-dehydro-21,21-difluoro-retro-progesterone
1,6-bisdehydro-2,21-difluoro-retro-progesterone
6-dehydro-16α,17α-dihydroxy-retro-progesterone 16,17-ketal
6-chloro-6-dehydro-16α,17α-dihydroxy-retro-progesterone 16,17-ketal
6-chloro-6-dehydro-16α,17α-dihydroxy-retro-progesterone
6-dehydro-16α,17α-dihydroxy-retro-progesterone
6-dehydro-6-fluoro-21-acyloxy-retro-progesterone
1,6-bisdehydro-21-acyloxy-retro-progesterone
6-dehydro-16α-hydroxy-21-acyloxy-retro-progesterone
2β,21-difluoro-6-dehydro-retro-progesterone
6α-chloro-retro-testosterone 17-acylate
1-dehydro-2-methyl-retro-testosterone (13)
1-dehydro-2-methyl-retro-testosterone 17-acylate (13)
4-methyl-retro-testosterone
3-enolacylate of 4-methyl-retro-testosterone 17-acylate
4-methyl-6-dehydro-retro-testosterone
4-methyl-6-dehydro-retro-testosterone 17-acylate
4-chloro-retro-testosterone
4-chloro-retro-testosterone 17-acylate
4-bromo-retro-testosterone
4-hydroxy-retro-testosterone
4-hydroxy-6-dehydro-retro-testosterone
2β-fluoro-retro-testosterone (16)
3-enolacylate of 2β-fluoro-retro-testosterone 17-acylate
1-dehydro-2-fluoro-retro-testosterone (16)
1-dehydro-2-fluoro-retro-testosterone 17-acylate
1,6-bisdehydro-2-fluoro-retro-testosterone (4,16)
1,6-bisdehydro-2-fluoro-retro-testosterone 17-acylate
2β-hydroxy-retro-testosterone
Retro-5β-androstan-17β-ol-2,3-dione
Enolacylate of retro15β-androstan-17β-ol-2,3-dione 17-acylate
6-dehydro-6-methoxy-retro-testosterone 17-acylate
4-fluoro-retro-testosterone
4-fluoro-retro-testosterone 17-acylate
4-fluoro-6-dehydro-retro-testosterone
4-fluoro-6-dehydro-retro-testosterone 17-acylate
9-fluoro-11α-hydroxy-retro-testosterone
Retro-5β-androstan-17β-olo-(3,2-c)-pyrazole
Retro-androst-4-en-17α-ol-3-one 17-acylate
3-enolacylate of retro-androst-4-en-17α-ol-3-one 17-acylate
1-methyl-retro-5β-androst-1-en-17β-ol-3-one
1-methyl-retro-5β-androst-1-en-17β-ol-3-one 17-acylate
1-dehydro-1-methyl-retro-testosterone 17-acylate 11α-hydroxy-retro-testosterone
11β-hydroxy-retro-testosterone
11-oxo-retro-testosterone
1-dehydro-2-hydroxy-retro-testosterone
1-dehydro-2-acyloxy-retro-testosterone 17-acylate
1,6-bisdehydro-2-acyloxy-retro-testosterone
1,6-bisdehydro-2-hydroxy-retro-testosterone 17-acylate
6β-methoxy-retro-testosterone 17-acylate
2'-amino-(3,2-d)-pyrimidino-retro-5β-androstan-17β-ol 17-acylate
Retro-androsta-3,5-diene-17β-ol 17-acylate
17α-ethynyl-retro-androsta-3,5-dien-17-ol
17α-allyl-retro-androsta-3,5-dien-17-ol
17α-(2'-methallyl)-retro-androsta-3,5-dien-17-ol
17α-ethyl-retro-androsta-3,5-dien-17-ol
17α-methyl-retro-androsta-3,5-dien-17-ol
Retro-5β-androst-2-en-17β-ol 17-acylate
3-enolether of retro-testosterone
1,6-bisdehydro-2-fluoro-retro-testosterone (3,16)
6-dehydro-6-fluoro-retro-testosterone
6-dehydro-6-fluoro-retro-testosterone 17-acylate
6-chloro-6-dehydro-retro-testosterone
6-chloro-6-dehydro-retro-testosterone 17-acylate
2β-methyl-6-dehydro-retro-testosterone
2β-methyl-6-dehydro-retro-testosterone 17-acylate
4-chloro-6-dehydro-retro-testosterone
4-chloro-6-dehydro-retro-testosterone 17-acylate
4-bromo-6-dehydro-retro-testosterone
2β-fluoro-6-dehydro-retro-testosterone 17-acylate
Retro-androsta-4,6-dien-17β-olo-(3,2-c)-pyrazole
1,6-bisdehydro-1-methyl-retro-testosterone
1,6-bisdehydro-1-methyl-retro-testosterone 17-acylate
1,6-bisdehydro-retro-testosterone
1,6-bisdehydro-retro-testosterone 17-acylate
2-hydroxymethylene-6-dehydro-retro-testosterone
Retro-androsta-4,6-dien-17β-olo-(2,3-d)-isoxazole
2'-amino-(3,2-d)-pyrimidino-retro-androsta-4,6-dien-17β-ol 17-acylate
Retro-androst-5-en-17β-ol 17-acylate
17α-methyl-retro-androst-5-en-17-ol
17α-ethyl-retro-androst-5-en-17-ol
17α-allyl-retro-androst-5-en-17-ol
Retro-androsta-4,6-dien-17α-ol-3-one
Retro-androsta-4,6-dien-17α-ol-3-one 17-acylate
3-enolether of 6-dehydro-retro-testosterone
6α-fluoro-17α-methyl-retro-testosterone 17-acylate
6β-fluoro-17α-methyl-retro-testosterone 17-acylate
6α-chloro-17α-methyl-retro-testosterone 17-acylate
6β-chloro-17α-methyl-retro-testosterone 17-acylate
1-dehydro-2,17α-dimethyl-retro-testosterone
4,17α-dimethyl-6-dehydro-retro-testosterone
4-chloro-17α-methyl-retro-testosterone
2β-fluoro-17α-methyl-retro-testosterone
1-dehydro-2-fluoro-17α-methyl-retro-testosterone
1,6-bisdehydro-2-fluoro-17α-methyl-retro-testosterone
1-dehydro-2-hydroxy-17α-methyl-retro-testosterone
1-dehydro-2-hydroxy-17α-methyl-retro-testosterone 2-acylate
17α-methyl-retro-5β-androstan-17-ol-2,3-dione
4-fluoro-17α-methyl-retro-testosterone
4-fluoro-6-dehydro-17α-methyl-retro-testosterone
9-fluoro-11α-hydroxy-17α-methyl-retro-testosterone
6-dehydro-9-fluoro-11α-hydroxy-17α-methyl-retro-testosterone
2-hydroxymethylene-17α-methyl-retro-5β-androstan-17-ol-3-one
17α-methyl-retro-5β-androstan-17-olo-(3,2-c)-pyrazole
2'-methyl-(3,2-d)-thiazolo-17α-methyl-retro-5β-androst-2-en-17-ol
2'-methyl-(3,2-d)-thiazolo-17α-methyl-retro-androsta-2,4-dien-17-ol
17β-hydroxy-17-methyl-retro-5β-androstano-(2,3-d)-isoxazole
17β-hydroxy-17-methyl-retro-androst-4-eno-(2,3-d)-isoxazole 17α-methyl-retro-5β-androstan-17-ol-3-one
17α-methyl-retro-5α-androstan-17-ol-3-one
1-dehydro-1,17α-dimethyl-retro-testosterone
17α-methyl-retro-androst-5-ene-3α,17-diol 17-acylate
3-enolacylate of 17α-methyl-retro-testosterone 17-acylate
2-hydroxymethylene-17α-methyl-retro-testosterone
11α-hydroxy-17α-methyl-retro-testosterone
6-dehydro-6-methoxy-17α-methyl-retro-testosterone
6β-methoxy-17α-methyl-retro-testosterone
6-dehydro-6-fluoro-17α-methyl-retro-testosterone
6-dehydro-6-fluoro-17α-methyl-retro-testosterone 17-acylate
6-chloro-6-dehydro-17α-methyl-retro-testosterone
6-chloro-6-dehydro-17α-methyl-retro-testosterone 17-acylate
2β,17α-dimethyl-6-dehydro-retro-testosterone
4-chloro-6-dehydro-17α-methyl-retro-testosterone
4-bromo-6-dehydro-17α-methyl-retro-testosterone
2β-fluoro-6-dehydro-17α-methyl-retro-testosterone
2-hydroxymethylene-6-dehydro-17α-methyl-retro-testosterone
17β-hydroxy-17-methyl-retro-androsta-4,6-dieno-(2,3-d)-isoxazole
1,6-bisdehydro-2-hydroxy-17α-methyl-retro-testosterone
17β-hydroxy-17-methyl-retro-androsta-4,6-dieno-(3,2-c)-pyrazole
1,6-bisdehydro-17α-methyl-retro-testosterone
3-desoxy-17α-ethyl-retro-testosterone
6α-fluoro-17α-ethyl-retro-testosterone 17-acylate
6β-fluoro-17α-ethyl-retro-testosterone 17-acylate
6α-chloro-17α-ethyl-retro-testosterone 17-acylate
4-chloro-17α-ethyl-retro-testosterone 17-acylate
1-dehydro-2-fluoro-17α-ethyl-retro-testosterone
17α-(2'-methallyl)-17-hydroxy-retro-androst-4-en-(2,3-d)-isoxazole
17α-(prop-1'-ynyl)-retro-testosterone
1-dehydro-17α-allyl-retro-testosterone
1-dehydro-17α-(2'-methallyl)-retro-testosterone
1-dehydro-17α-(prop-1'-ynyl)-retro-testosterone
1-dehydro-17α-ethynyl-retro-testosterone
17α-ethynyl-retro-testosterone 17-ether
3-enolether of 17α-ethynyl-retro-testosterone
17α-ethyl-retro-testosterone
2β-fluoro-17α-ethyl-retro-testosterone
17α-(1'-methallyl)-retro-testosterone
6-dehydro-6-methoxy-17α-(1'-methallyl)-retro-testosterone
6-dehydro-6-methoxy-17α-(prop-1'-ynyl)-retro-testosterone
6-dehydro-6-methoxy-17α-(2'-methallyl)-retro-testosterone
6-dehydro-6-methoxy-17α-allyl-retro-testosterone
17α-allyl-retro-testosterone 17-acylate
17α-(2'-methallyl)-retro-testosterone 17-acylate
3-(3-oxo-17β-hydroxy-retro-androst-4-en-17-yl)-propanoic acid lactone
3-oxo-17-hydroxy-retro-17α-pregn-4-ene-21-carboxylic acid (Na-salt)
3-(3-oxo-6-methoxy-17β-hydroxy-retro-androsta-4,6-dien-17-yl)-proapanoic acid lactone
3-desoxy-6-dehydro-17α-methyl-retro-testosterone
3-desoxy-6-dehydro-17α-ethyl-retro-testosterone
4-chloro-6-dehydro-17α-ethyl-retro-testosterone
3-desoxy-6-dehydro-17α-allyl-retro-testosterone
3-enolether of 6-dehydro-17α-ethynyl-retro-testosterone
6-dehydro-17α-ethynyl-retro-testosterone 17-acylate
6-dehydro-17α-ethynyl-retro-testoterone 17-ether
6-chloro-6-dehydro-17α-allyl-retro-testosterone
6-dehydro-6-fluoro-17α-allyl-retro-testosterone
6-choloro-6-dehydro-17α(2'methallyl)-retro-testosterone
6-chloro-6-dehydro-17α(2'methally)-retro-terone
6-dehydro-17α-allyl-retro-testosterone
6-dehydro-17α-allyl-retro-testosterone 17-acylate 6-dehydro-17α-(2'-methallyl)-retro-testosterone
6-dehydro-17α-(22'-methallyl)-retro-testosterone 17-acylate
6-dehydro-17α-(prop-1'-ynyl)-retro-testosterone
6-chloro-6-dehydro-17α-ethyl-retro-testosterone
6-dehydro-6-fluoro-17α-ethyl-retro-testosterone
6-dehydro-17α-(1'-methallyl)-retro-testosterone
6-dehydro-17α-ethyl-retro-testosterone
3-(3-oxy-17β-hydroxy-retro-androsta-4,6-dien-17-yl)-propanoic acid lactone
3-(3-oxo-7α-acylthio-17β-hydroxy-retro-androst-4-en-17-yl)propanoic acid lactone
17α-acyloxy-retro-5β-pregn-1-ene-1-3,20-dione
1,6-bisdehydro-2-hydroxy-17α-acyloxy-retro-progesterone
3-enolether of 17α-acyloxy-retro-progesterone
4-hydroxy-6-dehydro-17α-acyloxy-retro-progesterone
4-methyl-6-dehydro-17α-acyloxy-retro-progesterone
6β-chloro-17α-acyloxy-retro-progesterone
6α-chloro-17α-acyloxy-retro-progesterone
1-dehydro-6β-fluoro-17α-acyloxy-retro-progesterone
1-dehydro-6β-chloro-17α-acyloxy-retro-progesterone
6β-nitro-17α-acyloxy-retro-progesterone
6-dehydro-9,11α-dichloro-17α-acyloxy-retro-progesterone
9,11α-dichloro-17α-acyloxy-retro-progesterone
9-fluoro-11α-hydroxy-17α-acyloxy-retro-progesterone
3-enolacylate of 6-fluoro-17α-acyloxy-retro-progesterone
17α-acyloxy-21-fluro-retro-progesterone
1-dehydro-17α-acyloxy-21-fluoro-retro-progesterone
2β,21-difluoro-17α-acyloxy-retro-progesterone
4-hydroxy-17α-acyloxy-retro-progesterone
4-methyl-17α-acyloxy-retro-progesterone
1,6-bisdehydro-6-methoxy-17α-acyloxy-retro-progesterone
6β-methoxy-17α-acyloxy-retro-progesterone
1-dehydro-6β-methoxy-17α-acyloxy-retro-progesterone
17α-acyloxy-retro-pregna-3,5-dien-20-one
11α,17α-dihydroxy-retro-progesterone
11β,17α-dihydroxy-retro-progesterone
11-oxo-17α-hydroxy-retro-progesterone
17α,21-diacyloxy-retro-progesterone
3-enolacylate of 17α,21-diacyloxy-retro-progesterone
6β-fluoro-17α,21-diacyloxy-retro-progesterone
6-dehydro-6-methoxy-17α,21-diacyloxy-retro-progesterone
1,6-bisdehydro-17α-acyloxy-retro-progesterone
1,6-bisdehydro-1-methyl-17α-acyloxy-retro-progesterone
3-desoxy-6-dehydro-17α-acyloxy-retro-progesterone
3-enolether of 6-dehydro-17α-acyloxy-retro-progesterone
6-chloro-6-dehydro-17α-acyloxy-retro-progesterone
6-dehydro-6-fluoro-17α-acyloxy-retro-progesterone
1,6-bisdehydro-6-fluoro-17α-acyloxy-retro-progesterone
1,6-bisdehydro-6-chloro-17α-acyloxy-retro-progesterone
6-dehydro-17α,21-diacyloxy-retro-progesterone
6-dehydro-6fluoro-17α,21-diacyloxy-retro-progesterone
6-chloro-6-dehydro-17α,21-diacyloxy-retro-progesterone
16α-methyl-retro-progesterone
16β-methyl-retro-progesterone
6-dehydro-16α-methyl-retro-progesterone
6-dehydro-16α-methyl-17α-acyloxy-retro-progesterone
16-methylene-17α-acyloxy-retro-progesterone
3-enolacylate of 16α-methyl-17α-acyloxy-retro-progesterone
16α-methyl-17α-acyloxy-retro-progesterone
16β-methyl-17α-acyloxy-retro-progesterone
6-dehydro-16-methylene-17α-acyloxy-retro-progesterone
16α,17α-dihydroxy-retro-progesterone 16,17-ketal
16α-methyl-21-acyloxy-retro-progesterone 16α,17α-dihydroxy-21-acyloxy-retro-progesterone 16,17-ketal
6β,16α-dimethyl-17α-acyloxy-retro-progesterone
6-dehydro-6,16α-dimethyl-17α-acyloxy-retro-progesterone
6-dehydro-6,16α-dimethyl-retro-progesterone
16α-methyl-retro-progesterone
3-enolacylate of 17α-methyl-retro-progesterone
6-dehydro-17α-methyl-retro-progesterone
17α-bromo-retro-progesterone
1-dehydro-17α-bromo-retro-progesterone
6-dehydro-17α-bromo-retro-progesterone
1,6-bisdehydro-17α-bromo-retro-progesterone
6β-chloro-17α-bromo-retro-progesterone
6β-fluoro-17α-bromo-retro-progesterone
6β,16α-dimethyl-retro-progesterone
1-dehydro-2-methyl-retro-progesterone
1,6-bisdehydro-2-methyl-retro-progesterone
1,6-bisdehydro-2-methyl-17α-acyloxy-retro-progesterone
1-dehydro-2-methyl-17α-acyloxy-retro-progesterone
2β-methyl-21-acyloxy-retro-progesterone
2β-methyl-6-dehydro-21-acyloxy-retro-progesterone
6β,17α-dimethyl-retro-testosterone
6-dehydro-6,17α-dimethyl-retro-testosterone
6β-methyl-retro-progesterone
6β-methyl-17α-acyloxy-retro-progesterone
3-enolacylate of 6-methyl-17α-acyloxy-retro-progesterone
6-dehydro-6-methyl-retro-progesterone
6-dehydro-6-methyl-17α-acyloxy-retro-progesterone
1-dehydro-6β-methyl-retro-progesterone
1-dehydro-6β-methyl-17α-acyloxy-retro-progesterone
1,6-bisdehydro-6-methyl-retro-progesterone
1,6-bisdehydro-6-methyl-17α-acyloxy-retro-progesterone
6-dehydro-6-methyl-16α,17α-dihydroxy-retro-progesterone 16,17-ketal
6β-methyl-16α,17α-dihydroxy-retro-progesterone 16,17-ketal
6β-methyl-16α,17α-dihydroxy-retro-progesterone
6-dehydro-6-methyl-17α-ethynyl-retro-testosterone
6-dehydro-6-methyl-17α-allyl-retro-testosterone
6-dehydro-6-methyl-17α-(2'-methally)-retro-testosterone
6-dehydro-6-methyl-17α-vinyl-retro-testosterone
6-dehydro-6-methyl-17α-(prop-1'-ynyl)-retro-testosterone
6β-methyl-17α-(prop-1'-ynyl)-retro-testosterone
6β-methyl-17α-(2'-methally)-retro-testosterone
6-dehydro-6-methyl-17α-ethyl-retro-testosterone
6β-methyl-16α-hydroxy-retro-progesterone
6β-methyl-16-dehydro-retro-progesterone
6-dehydro-6-methyl-16α-hydroxy-retro-progesterone
6,16-bisdehydro-6-methyl-retro-progesterone
6-dehydro-7-methyl-retro-progesterone
6-dehydro-7-methyl-17α-acyloxy-retro-progesterone
2β-fluoro-7β-methyl-retro-androst-4-ene-3α,17β-diol
7-methyl-retro-androsta-4,6-diene-3α,17β-diol
7β-methyl-17α-ethynyl-retro-androst-4-ene-3α,17-diol
7β-methyl-17α-acyloxy-retro-progesterone
7β-methyl-17α-ethynyl-retro-testosterone
6-dehydro-7-methyl-retro-testosterone
2β-fluoro-7β-methyl-retro-testosterone
1-dehydro-2-fluoro-7β-methyl-retro-testosterone
1-dehydro-2-fluoro-retro-progesterone
1-dehydro-2-fluoro-17α-acyloxy-retro-progesterone
1,6-bisdehydro-2-fluoro-17α-acyloxy-retro-progesterone
2β-fluoro-6-dehydro-21-acyloxy-retro-progesterone
11β,17α,21-trihydroxy-retro-progesterone 21-acylate
1-dehydro-11α,17α,21-trihydroxy-retro-progesterone 21-acylate
1-dehydro-11β,17α,21-trihydroxy-retro-progesterone 21-acylate
1-dehydro-11-oxo-17α,21-dihydroxy-retro-progesterone 21-acylate
6-dehydro-11α,17α,21-trihydroxy-retro-progesterone 21-acylate 6-dehydro-11β,17α,21-trihydroxy-retro-progesterone 21-acylate
1,6-bisdehydro-11α,17α,21-trihydroxy-retro-progesterone 21-acylate
1,6-bisdehydro-11β,17α,21-trihydroxy-retro-progesterone 21-acylate
9-fluoro-11α,17α,21-trihydroxy-retro-progesterone 21-acylate
9-fluoro-11β,17α,21-trihydroxy-retro-progesterone 21-acylate
1-dehydro-9-fluoro-11α,17α21-trihydroxy-retro-progesterone 21-acylate
1-dehydro-9-fluoro-11β,17α-21-trihydroxy-retro-progesterone 21-acylate
6β-fluoro-11α,17α,21-trihydroxy-retro-progesterone 21-acylate
6β-fluoro-11β,17α,21-trihydroxy-retro-progesterone 21 acylate
6-dehydro-6-fluoro-11α,17α,21-trihydroxy-retro-progesterone 21-acylate
6-dehydro-6-fluoro-11β,17α,21-trihydroxy-retro-progesterone 21-acylate
6β-methyl-11α,17α,21-trihydroxy-retro-progesterone 21-acylate
6β-methyl-11β,17α,21-trihydroxy-retro-progesterone 21-acylate
6-dehydro-6-methoxy-11α,17α,21-trihydroxy-retro-progesterone 21-acylate
6-dehydro-6-methoxy-11β,17α,21-trihydroxy-retro-progesterone 21-acylate
11α,16α,17α,21-tetrahydroxy-retro-progesterone 21-acylate
11β,16α,17α,21-tetrahydroxy-retro-progesterone 21-acylate
11α,16α,17α,21-tetrahydroxy-retro-progesterone 16,17-ketal 21-acylate
11β,16α,17α,21-tetrahydroxy-retro-progesterone 16,17-ketal 21-acylate
1-dehydro-11α,16α,17α,21-tetrahydroxy-retro-progesterone 21-acylate
1-dehydro-11β,16α,17α,21-tetrahydroxy-retro-progesterone 21-acylate
1-dehydro-11α,16α,17α,21-tetrahydroxy-retro-progesterone 21-acylate
1-dehydro-11α,16α,17α,21-tetrahydroxy-retro-progesterone 16,17-ketal 21-acylate
1-dehydro-11β,16α,17α,21-tetrahydroxy-retro-progesterone 16,17-ketal 21-acylate
11α,17α,21-trihydroxy-16α-methyl-retro-progesterone 21-acylate
11β,17α,21-trihydroxy-16α-methyl-retro-progesterone 21-acylate
6β,9-difluoro-11α,17α,21-trihydroxy-retro-progesterone 21-acylate
6β,9-difluoro-11β,17α,21-trihydroxy-retro-progesterone 21-acylate
11α,21-dihydroxy-retro-progesterone 21-acylate
11β,21-dihydroxy-retro-progesterone 21-acylate
6-dehydro-11α,21-dihydroxy-retro-progesterone 21-acylate
6-dehydro-11β,21-dihydroxy-retro-progesterone 21-acylate
1-dehydro-11α,21-dihydroxy-retro-progesterone 21-acylate
1-dehydro-11β,21-dihydroxy-retro-progesterone 21-acylate Examples of other pharmacological retro steroids of our invention are the following:

2,6,9-trifluoro-6-dehydro-11-hydroxy-16-methyl-retro-progesterone
2,9-difluoro-6-dehydro-11-hydroxy-16-methyl-retro-progesterone
2-fluoro-1,6-bisdehydro-11-hydroxy-retro-progesterone
6-fluoro-6-dehydro-11-hydroxy-retro-progesterone
2,6,9,-trifluoro-6-dehydro-11-hydroxy-17α-acetoxy-16-methyl-retro-progesterone
2,9-difluoro-6-dehydro-11-hydroxy-17α-propionoxy-16-methyl-retro-progesterone
2-fluoro-1,6-bisdehydro-11,17-dihydroxy-retro-progesterone
6-fluoro-6-dehydro-11-hydroxy-17α-acetoxy-retro-progesterone
2,6,9-trifluoro-6-dehydro-11,17,21-trihydroxy-16-methyl-retro-progesterone 21-acetate
2,9-difluoro-6-dehydro-11,17,21-trihydroxy-16-methyl-retro-progesterone 21-acetate
2-fluoro-1,6-bisdehydro-11,17,21-trihydroxy-retro-progesterone
6-fluoro-6-dehydro-11,17,21-trihydroxy-retro-progesterone
16-methyl-17,21-dihydroxy-retro-progesterone
2,9,21-trifluoro-6-dehydro-11-hydroxy-16-methyl-retro-progesterone
2,21-difluoro-6-dehydro-11-hydroxy-16-methyl-retro-progesterone
2,21-difluoro-1,6-bisdehydro-11-hydroxy-retro-progesterone
6,21-difluoro-6-dehyoro-11-hydroxy-retro-progesterone
16-methyl-21-fluoro-retro-progesterone
2,6,9-trifluoro-6-dehydro-11,21-dihydroxy-16-methyl-retro-progesterone 21-acetate
2,9-difluoro-6-dehydro-11,21-dihydroxy-16-methyl-retro-progesterone 21-acetate
2-fluoro-1,6-bisdehydro-11,21-dihydroxy-retro-progesterone
6-fluoro-6-dehydro-11,21-dihydroxy-retro-progesterone
16-methyl-21-hydroxy-retro-progesterone
6-fluoro-6-dehydro-11-hydroxy-16-bethyl-17α-allyl-retro-testosterone
2-fluoro-1,6-bisdehydro-11-hydroxy-17α-(2-methallyl)-retro-testosterone
2,6-difluoro-11-oxo-17α-ethyl-retro-testosterone
6-fluoro-6-dehydro-17-ethynyl-retro-testosterone
2-methyl-16-hydroxy-retro-progesterone
2-methyl-6-dehydro-11,16-dihydroxy-progesterone
2-methyl-6-hydroxy-retro-progesterone
1-dehydro-2-methyl-11-hydroxy-retro-progesterone
11,16-dihydroxy-retro-progesterone
2-methyl-9-fluoro-11-hydroxy-retro-progesterone
1-dehydro-2-methyl 17α-acetoxy-retro-progesterone
6,11,16,17-tetrahydroxy-retro-progesterone
2-methyl-6,17-dihydroxy-retro-progesterone dipropionate
2-methyl-9-fluoro-11,17-dihydroxy-retro-progesterone
2-methyl-9-fluoro-retro-hydrocortisone
2-methyl-16-hydroxy-retro-hydrocortisone 21-acetate
2-methyl-6-hydroxy-retro-prednisolone
6-hydroxy-retro-prednisolone
2-methyl-21-fluoro-retro-progesterone
21-fluoro-16-hydroxy-retro-progesterone
6-hydroxy-11-oxo-21-fluoro-retro-progesterone
6-dehydro-11-hydroxy-21-fluoro-retro-progesterone
9,21-difluoro-11-hydroxy-retro-progesterone
2-methyl-9-fluoro-11-hydroxy-21-acetoxy-retro-progesterone
1-dehydro-6-hydroxy-21-acetoxy-retro-progesterone
2-methyl-16-hydroxy-21-acetoxy-retro-progesterone
1-dehydro-2-methyl-21-acetoxy-retro-progesterone
2-methyl-11-hydroxy-17α-ethynyl-retro-testosterone
6,16-dihydroxy-17α-allyl-retro-testosterone
6,11-dihydroxy-9-fluoro-17α-(2'-methallyl)-retro-testosterone
1-dehydro-2-methyl-17α-prop-1'-ynyl-retro-testosterone
2,11-dihydroxy-6-methyl-16-fluoro-retro-progesterone
6-methyl-6-dehydro-9-fluoro-11-hydroxy-retro-progesterone
2-hydroxy-6-methyl-6-dehydro-retro-progesterone
6-dehydro-16-fluoro-retro-progesterone
2,17-diacetoxy-6-methyl-6-dehydro-retro-progesterone
6-methyl-6-dehydro-17α-acetoxy-retro-progesterone 9-fluoro-11-hydroxy-17α-acetoxy-retro-progesterone
6-methyl-6-dehydro-16-fluoro-17α-acetoxy-retro-progesterone
2,17,21-trihydroxy-6-dehydro-16-fluoro-retro-progesterone 21-acetate
6-methyl-9,16-difluoro-retro-hydrocortisone 21-acetate
6-methyl-6-dehydro-retro-hydrocortisone
16-fluoro-retro-prednisolone
6-methyl-6-dehydro-21-fluoro-retro-progesterone
16,21-difluoro-retro-progesterone
6-dehydro-9,21-difluoro-11-hydroxy-retro-progesterone
2-hydroxy-6-dehydro-21-fluoro-retro-progesterone
2,11,21-trihydroxy-9-fluoro-retro-progesterone
6-methyl-16-fluoro-21-acetoxy-retro-progesterone
6-methyl-6-dehydro-21-acetoxy-retro-progesterone
2,21-dihydroxy-6-methyl-retro-progesterone
6-methyl-6-dehydro-17α-ethynyl-retro-testosterone
2-hydroxy-16-fluoro-17α-propyl-retro-testosterone
6-methyl-9,16-difluoro-11-hydroxy-17α-pentyl-retro-testosterone
2-methyl-6-dehydro-16-fluoro-17α(2'-methallyl)-retro-testosterone
1-dehydro-6-methoxy-retro-progesterone
1-dehydro-6,11-dihydroxy-retro-progesterone
2-ethyl-11-hydroxy-retro-progesterone
2-methyl-6-hydroxy-retro-progesterone
1,6-bisdehydro-6,11,17-trihydroxy-retro-progesterone
2-methyl-17-acetoxy-retro-progesterone
2-methyl-6,11,17-trihydroxy-retro-progesterone
1-dehydro-2-methyl-11,17-dihydroxy-retro-progesterone
1-dehydro-2-methyl-6,11,17,21-tetrahydroxy-retro-progesterone 17,21-diacetate
1,6-bisdehydro-17,21-dipropionoxy-retro-progesterone
2-methyl-6,17,21-trihydroxy-retro-progesterone 17,21-diacetate
2-methyl-21-fluoro-retro-progesterone
21-chloro-retro-progesterone
2-methyl-6-dehydro-11-hydroxy-21-fluoro-retro-progesterone
1,6-bisdehydro-21-fluoro-retro-progesterone
6-hydroxy-21-fluoro-retro-progesterone
2-ethyl-6,21-dihydroxy-retro-progesterone
1-dehydro-11,21-dihydroxy-retro-progesterone
2-propyl-6-methoxy-11-oxo-21-hydroxy-retro-progesterone
6-dehydro-11,21-dihydroxy-retro-progesterone 21-propionate
17α-vinyl-retro-testosterone
6-dehydro-17α-propyl-retro-testosterone 17-acetate
2-propyl-6-dehydro-17α-ethyl-retro-testosterone
1,6-bisdehydro-11-hydroxy-17α-ethynyl-retro-testosterone
6-dehydro-6-chloro-retro-progesterone
1,6-bisdehydro-6-chloro-retro-progesterone
6-fluoro-11-hydroxy-retro-progesterone
2-chloro-17α-hydroxy-retro-progesterone
2,6-difluoro-11,17α-dihydroxy-retro-progesterone
1-dehydro-6-chloro-17α-acetoxy-retro-progesterone
6-dehydro-6-chloro-11,17α-dihydroxy-retro-progesterone
6-chloro-17α,21-dihydroxy-retro-progesterone
1,6-bisdehydro-17α,21-dihydroxy-retro-progesterone 17,21-diacetate
2-fluoro-11,17α,21-trihydroxy-retro-progesterone
2,6-difluoro-11,17α,21-trihydroxy-retro-progesterone
2,6,21-trifluoro-retro-progesterone
11-hydroxy-21-fluoro-retro-progesterone
21-chloro-retro-progesterone
1,6-bisdehydro-11-hydroxy-21-fluoro-retro-progesterone
1-dehydro-6,21-dichloro-retro-progesterone
1-dehydro-6,21-difluoro-11,hydroxy-retro-progesterone
6,21-difluoro-retro-progesterone
1-dehydro-6-chloro-11,21-dihydroxy-retro-progesterone
2,6-difluoro-11-oxo-21-hydroxy-retro-progesterone
2-fluoro-21-hydroxy-retro-progesterone
2-chloro-6-dehydro-21-hydroxy-retro-progesterone
2-fluoro-17α-ethynyl-retro-testosterone 17β-acetate
2,6-difluoro-17α-propyl-retro-testosterone
6-fluoro-11-hydroxy-17α-prop-1'-ynyl-retro-testosterone
1,6-bisdehydro-17α-butyl-retro-testosterone 17-acetate
2-chloro-6-dehydro-17α-ethyl-retro-testosterone
1,6-bisdehydro-6-hydroxy-retro-progesterone
1-dehydro-2,11-dihydroxy-6-ethyl-retro-progesterone
1,6-bisdehydro-2-acetoxy-11-oxo-6-methyl-retro-progesterone
6-dehydro-17-acetoxy-retro-progesterone
1,6-bisdehydro-2,17-diacetoxy-6-methyl-retro-progesterone
1,6-bisdehydro-11,17,21-trihydroxy-retro-progesterone
2,17,21-trihydroxy-6-methyl-11-oxo-retro-progesterone
1-dehydro-2-acetoxy-21-fluoro-retro-progesterone
6-dehydro-2-hydroxy-11-oxo-21-chloro-retro-progesterone
1,6-bisdehydro-6-methyl-21-fluoro-retro-progesterone
1,6-bisdehydro-2,21-diacetoxy-6-methyl-retro-progesterone
1-dehydro-11,21-dihydroxy-retro-progesterone
2,11,21-trihydroxy-6-isopropyl-retro-progesterone
1,6-bisdehydro-2,11-dihydroxy-6-methyl-17-ethyl-retro-testosterone
1,6-bisdehydro-11-oxo-6-ethyl-17-ethynyl-retro-testosterone
2-chloro-16-methyl-retro-androsta-4,6-dien-3,11,17-trione
2-fluoro-16-methyl-11-hydroxy-retro-androsta-1,4-diene-3,17-dione
2-chloro-16-methyl-retro-androsta-1,4,6-triene-3,17-dione
6-dehydro-9-fluoro-11-hydroxy-16-methyl-retro-testosterone
2-fluoro-11-hydroxy-16-methyl-retro-testosterone 17-acetate
1,6-bisdehydro-2-chloro-11-oxo-16-methyl-retro-testosterone
2-fluoro-11-hydroxy-16-methyl-retro-testosterone 17-methylether
1,6-bisdehydro-2-chloro-11-oxo-16-methyl-retro-testosterone 17-butylether
2-fluoro-6-dehydro-16 methyl-retro-testosterone 17-propylether
2-methyl-11,16-dihydroxy-retro-androsta-1,4-diene-3,17-dione
2-methyl-9-fluoro-11-hydroxy-retro-androsta-4,6-diene-3,17-dione
9-fluoro-11,16-dihydroxy-retro-androsta-4,6-diene-3,17-dione
6,16-dihydroxy-retro-androsta-1,4-diene-3,17-dione
1-dehydro-2-methyl-11,16-dihydroxy-retro-testosterone 17-propionate
2-methyl-6-dehydro-9-fluoro-4-hydroxy-retro-testosterone
6-dehydro-9-fluoro-11,16-dihydroxy-retro-testosterone 17-phenylpropionate
1-dehydro-6,16-dihydroxy-retro-testosterone
1-dehydro-2-methyl-11-hydroxy-retro-testosterone 17-methylether
2-methyl-6-dehydro-9-fluoro-11-hydroxy-retro-testosterone 17-butylether
6-dehydro-9-fluoro-11,16-dihydroxy-retro-testosterone 16,17-dimethylether
1-dehydro-6,16-dihydroxy-retro-testosterone 17-cyclopentylether
2-hydroxy-16-fluoro-retro-androsta-4,6-diene-3,11,17-trione
9-fluoro-11-hydroxy-16-chloro-retro-androsta-1,4-diene-3,17-dione
6-methyl-16-fluoro-retro-androsta-4,6-diene-3,17-dione
2,11-dihydroxy-16-fluoro-retro-androsta-4,6-diene-3,17-dione
2-hydroxy-6-dehydro-11-oxo-16-fluoro-retro-testosterone
1-dehydro-9-fluoro-11-hydroxy-16-chloro-retro-testosterone 17-acetate
6-methyl-6-dehydro-16-fluoro-retro-testosterone 17-propionate
6-dehydro-2,11-dihydroxy-16-fluoro-retro-testosterone 2-acetoxy-6-dehydro-11-oxo-16-fluoro-retro-testosterone 17-methylether
1-dehydro-9-fluoro-11-hydroxy-16-chloro-retro-testosterone 17-cyclopentylether
6-methyl-6-dehydro-16-fluoro-retro-testosterone 17-butylether
6-dehydro-2,11-dihydroxy-16-fluoro-retro-testosterone 17-benzylether
2-fluoro-retro-androsta-1,4-diene-3,11,17-trione
2-chloro-11-hydroxy-retro-androsta-1,4,6-triene-3,17-dione
2-fluoro-11-hydroxy-retro-androsta-4,6-diene-3,17-dione
2-fluoro-11-hydroxy-retro-androst-4-ene-3,17-dione
1-dehydro-2-fluoro-11-oxo-retro-testosterone 17-acetate
1,6-bisdehydro-2-chloro-11-hydroxy-retro-testosterone
2-fluoro-6-dehydro-11-hydroxy-retro-testosterone 17-propionate
2-fluoro-11-hydroxy-retro-testosterone
1-dehydro-2-fluoro-11-oxo-retro-testosterone 17-methylether
1,6-bisdehydro-2-chloro-11-hydroxy-retro-testosterone 17-butylether
2-fluoro-6-dehydro-11-hydroxy-retro-testosterone 17-cyclohexylether
2-fluoro-11-hydroxy-retro-testosterone 17-cyclopentylether
2-methyl-6-hydroxy-retro-androsta-1,4-diene-3,11,17-trione
2-methyl-6,11-dihydroxy-retro-androsta-1,4-diene-3,17-dione
2-methyl-6,11-dihydroxy-retro-androst-4-ene-3,17-dione
2-methyl-11-hydroxy-retro-androst-4,6-diene-3,17-dione
2-methyl-6-hydroxy-retro-androst-1,4-diene-3,17-dione
1-dehydro-2-methyl-6-hydroxy-11-oxo-retro-testosterone
1-dehydro-2-methyl-6,11-dihydroxy-retro-testosterone 6,17-diacetate
2-methyl-6,11-dihydroxy-retro-testosterone
2-methyl-6-dehydro-11-hydroxy-retro-testosterone
1-dehydro-2-methyl-6-hydroxy-retro-testosterone
11-hydroxy-retro-testosterone
6-dehydro-11-hydroxy-retro-testosterone
2-methyl-11-hydroxy-retro-testosterone
6,11-dihydroxy-retro-testosterone
1-dehydro-2-methyl-6-hydroxy-11-oxo-retro-testosterone 17-methylether
1-dehydro-2-methyl-6-acetoxy-11-hydroxy-retro-testosterone 17-butylether
2-methyl-6-acetoxy-11-hydroxy-retro-testosterone 17-cyclopentylether
2-methyl-6-dehydro-11-hydroxy-retro-testosterone 17-cyclohexylether
1-dehydro-2-methyl-6-propionoxy-retro-testosterone 17-butylether
11-hydroxy-retro-testosterone 17-cyclopentylether
6-dehydro-11-hydroxy-retro-testosterone 17-cyclopentylether
2-methyl-11-hydroxy-retro-testosterone 17-cyclopentylether
6-acetoxy-11-hydroxy-retro-testosterone 17-cyclopentylether
2,11-dihydroxy-6-methyl-retro-androsta-4,6-diene-3,17-dione
2-acetoxy-6-methyl-retro-androst-4-ene-3,11,17-trione
6-methyl-retro-androsta-4,6-diene-3,17-dione 11-hydroxy
2-hydroxy-6-methyl-6-dehydro-retro-testosterone
2,11-dihydroxy-6-methyl-6-dehydro-retro-testosterone
6-methyl-6-dehydro-11-hydroxy-retro-testosterone
2-hydroxy-6-methyl-11-oxo-retro-testosterone 2,17-diacetate
2-hydroxy-6-methyl-6-dehydro-retro-testosterone 17-methylether
2,11-dihydroxy-6-methyl-6-dehydro-retro-testosterone 17-ethylether
6-methyl-6-dehydro-11-hydroxy-retro-testosterone 17-cyclopentylether
2-hydroxy-6-methyl-11-oxo-retro-testosterone 17-cyclohexylether
17 α-(2'-methallyl)-retro-testosterone
17 α-(2'-methallyl)-retro-testosterone 17-acetate
17 α-(2'-methallyl)-retro-testosterone 17-methylether
3-cyclopentylenolether of 17 α-(2'-methallyl)-retro-testosterone
3-enolacetate of 17 α-(2'-methallyl)-retro-testosterone 17 acetate
6 α-chloro-17 α-(2'-methallyl)-retro-testosterone 17-acetate
6 β-chloro-17 α-(2'-methallyl)-retro-testosterone 17-acetate
6 α-fluoro-17 α-(2'-methallyl)-retro-testosterone 17-acetate
6 β-fluoro-17 α-(2'-methallyl)-retro-testosterone 17-acetate
6-dehydro-17 α-(2'-methallyl)-retro-testosterone
6-dehydro-17 α-(2'-methallyl)-retro-testosterone 17-acetate
6 α-chloro-17 α-(2'-methallyl)-retro-testosterone
6 β-chloro-17 α-(2'-methallyl)-retro-testosterone
6 α-fluoro-17 α-(-2'-methallyl)-retro-testosterone
6 β-fluoro-17 α-(2'-methallyl)-retro-testosterone
6-chloro-6-dehydro-17 α-(2'-methallyl)-retro-testosterone
6-chloro-6-dehydro-17 α-(2'-methallyl)-retro-testosterone 17-acetate
6-dehydro-6-fluoro-17 α-(2'-methallyl)-retro-testosterone
6-dehydro-6-fluoro-17 α-(2'-methallyl)-retro-testosterone 17-acetate
3-ethylenolether of 17 α-(2'-methallyl)-retro-testosterone
17 α-(1'-methallyl)-retro-testosterone
17 α-(1'-methallyl)-retro-testosterone 17-acetate
17 α-(1'-methallyl)-retro-testosterone 17-methylether
3-cyclopentylenolether of 17 α-(1'-methallyl)-retro-testosterone
3-enolacetate of 17 α-(1'-methallyl)-retro-testosterone 17-acetate
6 α-chloro-17 α-(1'-methallyl)-retro-testosterone 17-acetate
6 β-chloro-17 α-(1'-methallyl)-retro-testosterone 17-acetate
6 α-fluoro-17 α-(1'-methallyl)-retro-testosterone 17-acetate
6 β-fluoro-17 α-(1'-methallyl)-retro-testosterone 17-acetate
6-dehydro-17 α-(1'-methallyl)-retro-testosterone
6-dehydro-17 α-(1'-methallyl)-retro-testosterone 17-acetate
6 α-chloro-17 α-(1'-methallyl)-retro-testosterone
6 β-chloro-17 α-(1'-methallyl)-retro-testosterone
6 α-fluoro-17 α-(1'-methallyl)-retro-testosterone
6 β-fluoro-17 α-(1'-methallyl)-retro-testosterone
6-chloro-6-dehydro-17 α-(1'-methallyl)-retro-testosterone
6-chloro-6-dehydro-17 α-(1'-methallyl)-retro-testosterone 17-acetate
6-dehydro-6-fluoro-17 α-(1'-methallyl)-retro-testosterone
6-dehydro-6-fluoro-17 α-(1'-methallyl)-retro-testosterone 17-acetate
3-ethylenolether of 17 α-(1'-methallyl)-retro-testosterone
17 α-allyl-retro-testosterone
17 α-allyl-retro-testosterone 17-acetate
17 α-allyl-retro-testosterone 17-methylether
3-cyclopentylenolether of 17 α-allyl-retro-testosterone
3-enolacetate of 17 α-allyl-retro-testosterone 17-acetate
6 α-chloro-17 α-allyl-retro-testosterone 17-acetate
6 β-chloro-17 α-allyl-retro-testosterone 17-acetate
6 α-chloro-17 α-allyl-retro-testosterone 17-acetate
6 β-chloro-17 α-allyl-retro-testosterone 17-acetate
6-dehydro-17 α-allyl-retro-testosterone
6-dehydro-17 α-allyl-retro-testosterone 17-acetate
6 α-chloro-17 α-allyl-retro-testosterone
6 β-chloro-17 α-allyl-retro-testosterone
6 α-fluoro-17 α-allyl-retro-testosterone
6 β-fluoro-17 α-allyl-retro-testosterone
6-chloro-6-dehydro-17 α-allyl-retro-testosterone
6-chloro-6-dehydro-17 α-allyl-retro-testosterone 17-acetate 6-dehydro-6-fluoro-17 α-allyl-retro-testosterone
6-dehydro-6-fluoro-17 α-allyl-retro-testosterone 17-acetate
3-ethylenolether of 17 α-allyl-retro-testosterone An important class of the novel steroids of our invention are those that serve as intermediates for the preparation of our novel hormonally active retro-steroids.

One group of these intermediates is those having the same structure as Formula I in respect to all the substituents except that $n_b$ is a whole number from 0 to 2, $R'_{17}$ is hydrogen and $R_{17}$ is the group

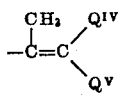

wherein $Q^{IV}$ is an alkyl of 1–3 carbon atoms, phenyl, the group

wherein R and R' are both alkyl or the cyclic group

wherein R'' and R''' form together a bivalent hydrocarbon radical and $Q^V$ is phenyl, hydrogen or alkyl of 1–3 carbon atoms with the proviso that $Q^V$ is hydrogen when $Q^{IV}$ contains nitrogen and $Q^V$ is an alkyl group of 1–3 carbon atoms but not more than three carbon atoms together with $Q^{IV}$, when $Q^{IV}$ is alkyl.

Another group of these novel intermediates are those which also have the same structure as Formula I in respect to all the substituents except that $n_b$ is a whole number from 0 to 2 and $R_{17}$ together with $R'_{17}$ is the group

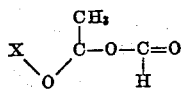

wherein X is the carbon atom 17 of the nucleus.

Other novel intermediates are those similar to the above two groups and Formula I but in which there are present a double bond at 8 (9) or 9 (11) and/or one or more epoxy groups joining the following pairs of nuclear carbon atoms: 1,2; 4,5; 5,6; 6,7; 9,11; 11,12; 14,15 and 16,17.

The use of these novel steroids of our invention in the preparation of our novel hormonally active retro-steroids will be apparent from the description of the methods of preparing these retro-steroids which follows:

We may start with steroids already containing the 10α methyl 9β configuration such as lumisterol 2 or lumisterol 3.

Also the 10α-methyl, 9β configuration of the retro-steroids of our invention may be prepared by irradiation with ultraviolet light of certain normal steroids having a $\Delta^{5,7}$ configuration in the same manner that ergosterol and 7-dehydrocholesterol are converted into lumisterol 2 and lumisterol 3, respectively.

Thus, irradiation (preferably with ultraviolet light) of 5,7-bisdehydro-normal steroids, having the 10-methyl group in β position, a hydrogen atom at carbon atom 9 in α position, a substituent at carbon atom 13 in β position and a substituent at carbon atom 14 in α position, followed by eliminations of the double bond between carbon atoms 7 and 8 produces steroids having a nucleus of which the configuration at the carbon atoms 10, 9, 8, 13 and 14 is that of the nucleus of our novel retro-steroids (10α methyl, 9β, 13β, 14α).

In this manner, the 10α methyl, 9β configuration in the novel steroids of our invention, can be introduced as set out in the foregoing paragraph. The starting materials used in the irradiation process may already contain the substituents as set out in Formula I. However, sometimes the presence of certain light absorbing chemical systems other than the 5,7-bisdehydro system may disturb the conversion into our novel 10α methyl, 9β steroids.

In principle this method of introducing the 10α methyl, 9β configuration by irradiation with ultraviolet light may be applied to all normal steroids (those containing a 10β methyl, 9α configuration) with two limitations. One of these limitations is that there be no substituent present providing steric hindrance of the 10-methyl group. It is particularly important that the substituents present on the 1, 9 or 11 positions of the steroid molecule do not sterically hinder the 10-methyl group. Also there must be no substituents which have a natural absorption between 220 and 330 mμ or materially influence the absorption of the $\Delta^{5,7}$ system. Thus no non-ketalized keto group or one or more double bonds in conjugation with the $\Delta^{5,7}$ system may be present.

Starting products for the preparation of the retro-steroids according to the invention may be, for example, those natural sterols which have a saturated or unsaturated aliphatic carbon chain, such for example ergosterol. Alternatively, the starting products may be found in the classes of the sapogenines, which have a heterocyclic group in the side chain, for example diosgenine. In both cases the $\Delta^{5,7}$-system should be provided for the radiation if it is not already present in the molecule.

The introduction of the 10α methyl, 9β configuration may be the first step to be carried out as in the following general method:

(a) Introduction of the retro-structure into steroids of the normal series by irradiation of suitable $\Delta^{5,7}$ steroids;

(b) Introduction of substituents into retro-steroids;

(c) A series of reactions to obtain a desired grouping at carbon atom 17, starting from retro-steroids with an aliphatic side chain of 6–10 carbon atoms at carbon atom 17.

The sequence of the processes as described may be varied. For example, starting from a retro-steroid which has been prepared beforehand, for example dihydroisolumisterone, the side chain degradation and introduction of the desired substituents may be carried out entirely or partially in the inverted sequence. 2-fluoro-retro-progesterone may be prepared for example by introducing a fluorine atom in the 2-position in retro-progesterone or by side chain degradation of 2-fluoro-dihydroisolumisterone.

It is also possible to carry out the irradiation with steroids of the normal series, in which all of the desired substituents have been introduced, or after entire or partial side chain degradation for example with 16-methyl-pregna-5,7-diene-3β-ol-20-one.

The sequence of the processes which is chosen can be decided separately for the product and starting materials employed.

Changes in the nuclear structure other than the introduction of the 10α methyl, 9β configuration may be carried out as follows:

14β-steroids may be prepared by hydrogenation of 14(15) unsaturated steroids, for instance with hydrogen and using palladium as a catalyst. Thus pregna-5,14,16-trien-3β-ol-20-one when hydrogenated yields 14β, 17β-pregna-5-en-3β-ol-20-one. (Fieser and Fieser, "Steroids" 1959, page 567.)

13α-steroids may be prepared by irradiation of 17-keto steroids with ultra violet light according to Fieser and Fieser, "Steroids," 1959, page 520. Thus irradiation of 3α-hydroxy-5α-androstan-17-one yields 3α-hydroxy-5α, 13α-androstan-17-one.

8α steroids may be prepared by hydrogenation of 11-keto-Δ8(9) steriods in the presence of a catalyst. (Tetrahedron 1, 22 (1957).) Thus 3β-hydroxy-11-oxo-androst-β(9)-ene may be hydrogenated in the presence of palladium to produce 3β-hydroxy-11-oxo-8α-androstane.

18-nor steroids may be prepared by reacting 18-hydroxy-17-keto steroids with sodium hydroxide (Fieser and Fieser "Steroids," 1959, page 470). Thus by reacting 3β, 18-dihydroxy-androst-5-en-17-one with sodium hydroxide will be produced 3β-hydroxy-18-nor-androst-5-en-17-one.

The expressions: inorganic acid, acyl, acyloxy, alkoxy, aralkoxy, acylthio, ketol and ketalized oxo, whenever used in this application, have the following meanings.

Inorganic acid is one of the following inorganic acids: phosphoric acid, sulphuric acid, nitric acid, nitrous acid, boric acid.

Acyl or acyloxy are the acyl or the acyloxy groups respectively of the following acids:

(a) Saturated or unsaturated, branched or unbranched, cyclic or non-cyclic aliphatic mono- or dicarboxylic acids having 1–20 carbon atoms wherein the aliphatic part of the molecule may be substituted by one or more halogen atoms, amino groups, sulphonic acid groups.

(b) Phenylalkyl mono- or dicarboxylic acids of which the phenyl part of the molecule may be substituted with alkyl groups containing 1–3 carbon atoms, sulphonic acid groups, alkoxy groups of which the alkyl group is branched or unbranched and contains 1–10 carbon atoms and acids of which the alkyl part of the phenyl alkyl mono- or dicarboxylic acid contains from 0–6 carbon atoms and is branched or unbranched, saturated or unsaturated, of these acids the following specific examples may be given: formic acid, acetic acid, acroleic acid, isobutyric acid, palmitic acid, cyclohexane-mono-carboxylic acid, trichloroacetic acid, aminoacetic acid, oxalic acid, malonic acid, maleic acid, benzoic acid, terephthalic acid, p-ethyl benzoic acid, benzene sulphonic acid, m-ethoxy benzoic acid, phenyl acetic acid, and cinnamic acid.

Alkoxy is the alkoxy group of mono or di-aliphatic alcohol of which the alkyl group contains from 1–20 carbon atoms and which may be branched or unbranched, cyclic or non cyclic, saturated or non saturated and which alkyl group may be substituted with halogen or alkoxy, whereby this latter alkoxy substituent may be attached to the same carbon atom of the steroid nucleus as the main alkoxy group. Of these alcohols the following examples may be given: methanol, ethanol, propanol-2, 2-chloro ethanol-1, 2-ethoxy ethanol-1 and glycol.

Aralkoxy is the aralkoxy group of a mixed aromatic aliphatic alcohol in which the hydroxyl group is attached to the aliphatic part of the molecule and of which the alkyl(ene) group contains from 0–6 carbon atoms which may be branched or unbranched. Of these alcohols the following examples may be given: benzyl alcohol and phenol.

Acylthio is the acylthio group of acyl thiols. In acylthio the expression "acyl" has the meaning as given hereabove.

A ketal is the dihydroxy steroid ketal of an aliphatic aldehyde, aliphatic ketone, mixed aliphatic aromatic aldehyde, mixed aliphatic aromatic ketone, or a diaromatic ketone.

Ketalized oxo is the ketalized oxo group resulting from the reaction between two molecules of a monohydroxy aliphatic alcohol containing from 1 to 6 carbon atoms and one molecule of an oxo group containing 10α, 9β methyl steroid, or resulting from the reaction between one molecule of a dihydroxy aliphatic alcohol containing from 1 to 6 carbon atoms and one molecule of an oxo group containing 10α, methyl, 9β steroid.

The introduction of alkyl substituents may be carried out as follows:

(1) By the reaction of keto-, conjugate keto- and doubly conjugate keto-steroids with alkylation agents, such as, for example, Grignard reagents, alkyl-alkali-metal compounds or an alkyl halide, in the presence of an alkali metal alkoxide.

For example, according to the method described by Zderic et al. (J. Am. Chem. Soc., 82, 3404 (1960)) 11-keto-retro steroids lithium give the corresponding 11-methyl-11-hydroxy steroids. In this manner, 11-keto-retro-progesterone 3,20-bisethylene ketal may be converted to the corresponding 11-methyl-11-hydroxy compound. After acid hydrolysis, this provides 11-methyl-11-hydroxy compound. After acid hydroylsis, this provides 11-methyl-11-hydroxy-retro-progesterone.

Further, 11-keto-retro-testosterone 3-ethylene ketal may be converted into the corresponding 11-methyl-11-hydroxy compound. After acid hydrolysis, this yields the 11-methyl-11-hydroxy-retro-testosterone.

The reaction of 6-keto-retro-steroids with methyl magnesium halides gives the 6-methyl-6-hydroxy steroids, for example by the method described by Fieser et al. (J. Am. Chem. Soc. 73, 4660 (1951)). In this manner, 6-keto-retro-pregnane-3-ol-20-one 20-ethylene ketal may be converted into 6-methyl-3,6-dihydroxy-retro-pregnane-20-one 20-ethylene ketal.

Further, 6-keto-retro-androstane-3,17-diol may be converted into 3,6,17-trihydroxy-6-methyl-retro-androstane. The reaction of 3-keto-retro steroids with methyliodide in the presence of potassium-t-butoxide by the procedure of Ringold et al.: (J. Am. Chem. Soc., 81, 427 (1959)) provides the corresponding 2,2-dimethyl steroids. In this manner, 2,2-dimethyl-retro-pregnane-3,20-dione 20-ethylene ketal may be produced from retropregnane-3,20-dione 20-ethylene ketal.

Further, 2,2-dimethyl-retro-androstane - 17β-ol-3-one may be produced from retro-androstane-17β-ol-3-one may be produced from retro-androstane-17β-ol-3-one.

Addition of methyl Grignard reagents to Δ¹⁶-20-keto-retro-pregnanes according to the method described by Bernstein et al. (J. Org. Chem., 26, 269 (1961)) provides 16-methyl compounds. Thus 3β-hydroxy-16-methyl-retro-pregn-5-ene-20-one may be produced from 3β-acetoxy-retro-pregna-5,16-diene-20-one.

Conversion of 3-keto-Δ⁴-retro-steroids with methyl halides in the presence of potassium-t-butoxide by the procedure of Woodward et al. (J. Am. Chem. Soc. 76, 2852 (1954)) gives 3-keto-4,4-dimethyl-Δ⁵-steroids. For example, such a reaction with bismethylene-dioxy-retro-hydrocortisone gives the 4,4-dimethyl-17(20),20-bismethylenedioxy-retro-pregn-5-ene-3,20-dione.

Further, with retro-testosterone, such a reaction gives the 4,4-dimethyl-retro-androst-5-ene-17β-ol-3-one.

(2) By the addition of diazomethane to double bonds, succeeded by pyrolysis or cleavage under acid conditions of the pyrazolines, if required with subsequent hydrogenation of the compounds obtained. According to the procedure of Weichert and Kaspar (Chem. Ber., 93, 1710 (1960)) Δ¹,⁴,⁶-3-keto-retro-steroids react with diazomethane with the formation of pyrazolines, from which the 1,2-methylene-Δ⁴,⁶-3-keto-steroids are produced by pyrolysis. Under the action of, for example, acid alumina, however, the pyrazolines are converted into the Δ¹-1-methyl steroids. For example, 17α-acetoxy-1,2-methylene-retro-pregna-4,6-diene-3,20-dione and 17α-acetoxy-1-methyl-retro-pregna-1,4,6-triene-3,20-dione may be produced from 17α-acetoxy-retro-pregna - 1,4,6-triene-3,20-dione.

Further, 1,2-methylene-retro-androsta-4,6-diene-17β-ol-3-one 17-acetate and 1-methyl-retro-androsta-1,4,6-triene-17β-ol-3-one 17-acetate may be produced from retro-androsta-1,4,6-triene-17β-ol-3-one 17-acetate.

(3) By the reaction of a methylene group

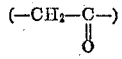

activated by a keto-group, with a mono- or dicarboxylic acid ester

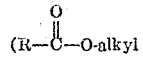

where R may be H or

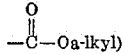

succeeded by a reaction with an alkyl halide with subsequent splitting off of the carboxylic acid group.

For example, 3-keto-Δ⁴-retro-steroids when reacted with diethyloxalate in the presence of sodium hydride according to the method described by Ringold et al. (J. Am. Chem. Soc. 81, 427 (1959)), after reaction with a methyl halide followed by a reaction with an alkali-alkoxide give the 2-methyl-3-keto-Δ⁴-retro-steroids. Thus, from retro-pregn-4-ene-20-ol-3-one 20 acetate the 2-methyl-retro-pregn-4-ene-20-ol-3-one 20-acetate may be produced.

Further, in this manner 2-methyl-retro-testosterone may be produced from retro-testosterone.

(4) By the reaction of retro-steroid epoxides with, for example, alkyl Grignard reagents. For example, 3-cycloethylenedioxy-5(6)-epoxy-retro-steroids after reaction with methyl magnesium halides according to the method described by Babcock et al. (J. Am. Chem. Soc., 80, 2904 (1958)) give the 6-methyl-5-hydroxy compounds, from which after hydrolysis and dehydration the 6-methyl-3-keto-Δ⁴-retro-steroids can be produced. Such a reaction with, for example, 5,6-epoxy-17α-hydroxy-retro-pregnane-3,20-dione bisethylene acetal gives the corresponding 5-hydroxy-6-methyl compound which, after hydrolysis and subsequent dehydration, provides the 6-methyl-17α-hydroxy-retro-progesterone.

Further, from 5,6-epoxy-retro-androstane-3,17-diol may be obtained in this manner 5-hydroxy-6-methyl-retro-androstane-3,17-diol.

The introduction of double bonds in retro-steroids may be effected by the following methods:

(1) By microbiological dehydrogenation, as described, for example, for the production of 1-dehydro-steroids by Sih et al. (J. Am. Chem. Soc., 82, 2653 (1960)). In this manner, retro-progesterone may be converted into 1-dehydro-retro-progesterone, or, retro-testosterone may be converted into 1-dehydro-retro-testosterone.

(2) By the direct dehydrogenation of saturated or non-saturated steroid ketones and of unsaturated steroids with, for example, mercury acetate, iodine pentoxide, selenium dioxide, manganese dioxide, substituted quinones such as chloranil and dichlorodicyanobenzoquinone, for example by the methods of Heilbron et al. (J. Chef. Soc., 1935, 1221), Burn et al. (Proc. Chem. Soc. 1960, 14), Agnello et al. (J. Am. Chem. Soc., 82, 4293 (1960)) and Sondheimer et al. (J. Am. Chem. Soc., 75, 5932 (1953)). In this manner, 6-dehydro-retro-progesterone may be produced from retro-progesterone and 1,6-bisdehydro-17α-acetoxy-retro-progesterone may be produced from 6-dehydro-17α-acetoxy-retro-progesterone. 3,17-diacetoxy-retro-androsta-5,7,9(11)-triene may be obtained from 3,17-diacetoxy-retro-androsta-5,7-diene, and 1-dehydro-retro-testosterone may be obtained from retro-testosterone.

(3) By the splitting off of substituents, for example dehydrohalogenation of halogenated retro-steroids, for example with an organic base, as has been described by Djerassi et al. (J. Am. Chem. Soc., 72, 4534 (1950)) for the production of 6-dehydro- from 6-halo steroids. In this manner, 6-dehydro-retro-progesterone may be produced from 6-bromo-retro-progesterone. Further, 6-dehydro-retro-testosterone 17-acetate may be produced from 6-bromo-retro-testosterone 17-acetate.

Another example of splitting off is the dehydration of hydroxylated retro-steroids, for example under the influence of phosphorus-oxychloride and an organic base, from methane sulphonyl chloride or from methyl chlorosulphite, for example by the methods described by Chamberlin et al. (J. Org. Chem. 25, 295 (1960)). In this manner, retro-hydrocortisone acetate may be converted into 17α,21 - dihydroxy-retro-pregna-4,9(11)-diene-3,20-dione 21-acetate. Further, 11-hydroxy-retro-androst-4-ene-3,20-dione may be converted into retro-androsta-4,9(11)-diene-3,20-dione.

The introduction of hydroxy groups into retro-steroids may be effected as follows:

(1) By microbiological hydroxylation, for example as described by Peterson et al. (J. Am. Chem. Soc., 74, 1871 (1952)). In this manner, 11,17α,21-trihydroxy-retro-pregn-4-ene-3,20-dione may be produced by microbiological hydroxylation of 17α,21-dihydroxy-retro-pregn-4-ene-3,20-dione. Further, 11-hydroxy-retro-testosterone may be produced by microbiological hydroxylation of retro-testosterone according to the same method.

(2) By cleavage of epoxy-retro-steroids. This may be effected by means of reducing agents, such as, for example, alkali-barium- and alkali-aluminum-hydride, chromium salts, and by catalytic hydration. According to the method described by Cole et al. (J. Org. Chem., 19, 131 (1954)), the 16 hydroxy compounds may be produced from 16,17-epoxy-retro-steroids. Thus, 16,17-epoxy-retro-pregn-4-ene-21-ol-3,20-dione yields the retro-pregn-4-ene-16,21-diol-3,20-dione. Further 3,17-dihydroxy-5(6)-epoxy-retro-androstane may be converted into 3,6,17-trihydroxy-retro-androstane.

Cleavage of epoxy-retro-steroids may also be performed by means of hydro halogenic acids, for example as described by Ringold et al. (J. Am. Chem. Soc., 78, 816 (1956)) for the production of 17α-hydroxy-pregnanes from 16,17-epoxy-pregnanes. According to this method, 16,17-epoxy-retro-progesterone, after reaction with hydrogen bromide succeeded by reductive debromination, yields the 17α-hydroxy - retro - progesterone. Further, 9(11)-epoxy-retro-androst-4-ene-17β-ol-3-one with hydrogen fluoride yields 11-hydroxy-9-fluoro-retro-testosterone.

(3) By hydroxylation of double bonds, for example with osmium tetroxide. For example, osmate esters, produced by oxidation of alkenes with osmium tetroxide, are split up into the diols, employing the procedure of Baran (J. Org. Chem., 25, 257 (1960)). In this manner, 3-hydroxy-retro-pregn-5-ene-20-one may be converted into 3,5,6-trihydroxy-retro-pregnane-20-one. Further, 3β-hydroxy-retro-androst-5-ene-17-one may be converted into 3β,5,6-trihydroxy-retro-androstane-17-one.

(4) By the reaction of enol ethers or enol esters with organic peracids. If, for example, Δ³,⁵-3-enol acylates are reacted with per-acids, employing the methods of Romo et al. (J. Org. Chem., 19, 1509 (1954)), the 3-keto-Δ⁴-6-hydroxy steroids are produced. Thus, 3-acetoxy-retro-pregna-3,5-diene-20-one with monoperphthalic acid yields the 6-hydroxy-retro-progesterone. Further, 3,17β-diacetoxy-retro-androsta-3,5-diene with monoperphthalic acid yields the 6-dehydro-retro-testosterone 17-acetate.

(5) By the hydrolysis or acyloysis of halo-steroids, for example with an alkali salt of a carboxylic acid by the method of Ruschig (Ber., 88, 878 (1955)), 21-iodo-steroids being converted with potassium acetate into the 21-acetoxy compounds. Hydrolysis of these compounds, for example according to Robinson (J. Am. Chem. Soc., 82, 4611 (1960)) with perchloric acid yields the free 21-hydroxy compounds. The hydrolyses may suitably be performed with a solution of potassium bicarbonate in aqueous methanol. Thus, 21-iodo-retro-progesterone may be converted into 21-acetoxy-retro-progesterone, which again may be converted by hydrolysis into 21-hydroxy-retro-progesterone. Further, in this reaction 6-bromo-retro-testosterone 17-acetate gives 2-acetoxy-retro-testosterone 17-acetate, from which, after hydrolysis, 2-hydroxy-retro-testosterone is obtained.

(6) By reduction of keto-steroids, for example with lithium aluminum hydride by the method described by Sondheimer et al. (J. Am. Chem. Soc., 75, 5930, 5932 (1953)). In this manner, retro-progesterone may be reduced to retro-pregn-4-ene-diol. Further, for example, retro-androst-4-ene-3,17-dione may be reduced to retro-androst-4-ene-3,17-diol.

(7) By hydrolysis of esters or ethers, for example by the method of Dory et al. (C.A., 53, 17181 (1955)) with sodium methylate in methanol. The saponification may also be performed with dilute inorganic acids, dilute inorganic bases, sodium carbonate and sodium bicarbonate. Thus, hydrolysis of 17α,21-dihydroxy-retro-progesterone 21-acetate with sodium bicarbonate in dilute dioxane gives the 17α,21-dihydroxy-retro-progesterone. Further, the hydrolysis of retro-testosterone 17-acetate gives retro-testosterone.

The introduction of acyloxy groups into the retro-steroid series may be carried out as follows:

(1) By acyloysis of halo-retro-steroids as described hereinbefore.

(2) By the reaction of hydroxy- and keto-retro-steroids with acids, acid anhydrides or acid chlorides in the presence of, for example, a catalyst (for example, p-toluene sulphonic acid, pyridine-HCl) or acid binding reagents (for example organic bases) or water-binding reagents (such as, for example, trifluoro acetic acid anhydride). For example, 17α-ethyl-retro-testosterone may be esterified with the acid chloride of β-phenyl-propionate in pyridine by the method of Gould et al. (J. Am. Chem. Soc., 79, 4472 (1957)) to form 17-(β-phenyl-propionate) ester of 17α-ethyl-retro-testosterone. Further, retro-androst-4-ene-17β-ol-3-one 17-(β-phenyl propionate) may be obtained by esterification of retro-testosterone with the acid chloride of β-phenyl propionic acid in pyridine.

The introduction of alkoxy and aralkoxy groups into the 10α methyl 9β steroid series may be carried out as follows:

(1) By the reaction of keto-retro-steroids with a suitable hydroxy compound (mono or poly), for example, in the presence of a catalyst, such as, for example, hydrochloric acid, pyridine-hydrochloric acid and p-toluene sulphonic acid, employing the method described by Ercoli et al. (J. Am. Chem. Soc., 82, 746 (1960)). In this manner, the cyclopentyl enolether of 17α-acetoxy-retro-progesterone may be produced. Another example is the production of the 3-enol benzyl ether of 6-dehydro-retro-progesterone by the action of benzyl alcohol and hydrochloric acid on 6-dehydro-retro-progesterone. Further, the cyclopentyl enol ether of retro-testosterone may be produced in this manner from retro-testosterone and cyclopentanol.

(2) By an acid-catalysed interchange reaction between the chosen hydroxy compound and preformed enol ether, for example by the method of Ercoli et al. (J. Am. Chem. Soc. 82, 746 (1960)). In this manner, 3-enol ethyl ether of retro-progesterone may be converted into 3-enol benzyl ether, or, 3-enol ethyl ether of retrotestosterone may be converted into 3-enol benzyl ether.

(3) By the reaction of keto-retro-steroids with trialkyl orthoformates with the use of an acid catalyst, for example, an ethanolic hydrogen chloride solution, for example by the method of Ruyle et al. (J. Org. Chem., 25, 1260 (1960)). In this manner, 17α-[2'-methallyl]-retro-testosterone may be converted into 3-ethoxy-17α-[2'-methallyl]-retro-androsta-3,5-diene-17β-ol, or retro-testosterone may be converted into 3-ethoxy-retro-androsta-3,5-diene-17β-ol.

(4) By the reaction of a hydroxy-retro-steroid with an alcohol in the presence of a catalyst, such as, for example, an inorganic acid or p-toluene sulphonic acid, for example by the method of Sondheimer et al. (Tetrahedron, 5, 15 (1959)). In this manner, 3-methoxy-retro-pregn-4-ene-20-one may be produced from 3-hydroxy-retro-pregn-4-ene-20-one, 3-methoxy-retro-androst-4-ene-17β-ol from 3,17β-dihydroxy-retro-androst-4-ene, 3-methoxy-retro-pregn-4-ene-20-one from 3-hydroxy-retro-pregn-4-ene-20-one, and 3-methoxy-retro-androst-4-ene-17β-ol from 3,17β-dihydroxy-retro-androst-4-ene.

(5) By the reaction of a hydroxy-retro-steroid with diazomethane in the presence of a catalytic amount of fluoboric acid by the method of Neeman et al. (Tetrahedron, 6, 36 (1959)). Thus, 3-methoxy-retro-pregn-4-ene-20-one is obtained from retro-pregn-4-ene-3-ol-20-one. Further, 3-hydroxy-retro-androst-4-ene-17-one may be converted into 3-methoxy-retro-androst-4-ene-17-one.

The production of halo-retro-steroids may be carried out as follows:

(1) By the addition of halogen to double bonds in retro-steroids, for example by addition of chlorine to 3-hydroxy-Δ⁵-retro-steroids or addition of mixed halogens, such as BrF and IF, to Δ⁹⁽¹¹⁾-retrosteroids according to Bowers et al. (J. Am. Chem. Soc., 82, 4001 (1960)). By this method, 17α,21-dihydroxy-retro-pregna-4,9(11)-diene-3,20-dione al-acetate may be converted into the 9,11-dihalo compounds. Thus, for example, 9(11)-dehydro-retro-testosterone may be converted into 9,11-dihalo-retro-testosterone.

(2) By the substitution-halogenation at an allyl position adjacent to a double bond or of a methylene group adjacent to a keto group in retro-steroids, for example with bromine, N-bromo-succinimide, dibromo-dimethylhydantoin etc., for example by the method of Djerassi et al. (J. Am. Chem. Soc., 72, 4534 (1950)) for the production of 6-halo-3-keto-Δ⁴-steroids from 3-keto-Δ⁴-steroids. Thus, retro-progesterone 20-cyclo-ethylene ketal may be brominated to form the 6-bromo compound and retro-testosterone 17-acetate may be converted into 6-bromo - retro - testosterone 17 - acetate. Furthermore, retro-pregn-5-ene-3β-ol-20-one 3-acetate may be converted into 17α-bromo-retro-pregn-5-ene-3β-ol-20-one 3-acetate, the double bond being protected during the reaction by conversion of the dibromide by the method of Engel et al. (Can. J. Biochem. Physiol., 35, 1047 (1957) and Can. J. Chem., 38, 452 (1960)).

(3) By the reaction of enol esters, enol ethers and enamines with halogenating agents, such as, for example, halogen, N-halo-imides, perchloryl-fluoride, BrF. In this manner, 3-enol esters of 3-keto-Δ⁴-retro-steroids may be converted with perchlorylfluoride according to the method of Bloom et al. (Chem. a. Ind., 1959, 1317) into the 3-keto-Δ⁴-6-fluoro-retro-steroids. By this method, the 3-enol acetate of retro-progesterone may be converted into 6α- and 6β-fluoro-retro-progesterone, and, 3-enol acetate of retro-testosterone 17-acetate may be converted into 6α- and 6β-fluoro-retro-testosterone 17-acetate.

Furthermore, the 3-enol ethers of 3-keto-Δ⁴-retro-steroids may be converted with N-halo-imides by the method of Ringold et al. (J. Am. Chem. Soc., 81, 3485 (1959)) into the 6-halo-3-keto-Δ⁴-retro-steroids. Thus, reaction of 3-ethyl enol ether of 17α-acetoxy-retro-progesterone with N-chlorosuccinimide gives 6-chloro-17α-acetoxy-retro-progesterone. Further, reaction of 3-enol ethyl ether of retro-androst-4-ene-3,17-dione with N-chlorosuccinimide yields 6-chloro-retro-androst-4-ene-3,17-dione.

Furthermore, the enamines of 3-keto-Δ⁴-retro steroids may be converted by a reaction with perchlorylfluoride followed by isomerisation with, for example, hydrochloric acid by the method of Joly et al. (Bull., 1961, 569) into 3-keto-4-fluoro-Δ⁴-retro-steroids. Thus, the 3-pyrrolidyl-Δ³,⁵-enamine of 17α-acetoxy-retro-progesterone yields the 4-fluoro-17α-acetoxy-retro-progesterone, and 3-pyrrolidyl-Δ³,⁵-enamine of retro-testosterone yields 4-fluoro-retro-testosterone.

(4) By the reaction of retro-steroids of the following type: retro-steroid

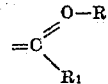

where R is an alkyl group and R₁ may be H or

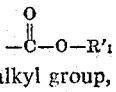

where R'₁ may be an alkyl group, which may be obtained by condensation of a methylene group

activated by a keto-group with a mono- or dicarboxylic acid ester (for example ethylformate, diethyloxalate), with halogenating agents, such as halogen and perchloryl-fluoride, with subsequent splitting off of the carboxylic acid group. Thus, according to the method of Kissman et al. (J. Am. Chem. Soc., 82, 2316 (1960)), the sodium salt of 21-ethoxallyl-retro-progesterone may be converted with perchloryl-fluoride and subsequent treatment with potassium acetate into 21-fluoro-retro-progesterone. Substitution of bromine for the perchlorylfluoride gives 21-bromo-retro-progesterone. Further, according to the method of Edwards et al. (J. Am. Chem. Soc., 81, 5262 (1960)) 2-fluoro-retro-testosterone may be produced from the sodium salt of 2-hydroxymethylene-retro-testosterone by reaction with perchlorylfluoride and subsequent treatment with potassium acetate.

(5) By cleavage of epoxides, for example with hydrohalogenic acids or $BF_3$, for example by the method of Romo et al. (J. Org. Chem., 21, 902 (1956)), according to which 16(17)-epoxides are treated with HBr. Thus, 16(17)-epoxy-retro-progesterone may be converted into 16-bromo-17α-hydroxy-retro-progesterone. According to the method of Bowers et al. (Tetrahedron, 3, 14 (1958)), 6-fluoro-3,17-diacetoxy-retro-androstane-5-ol may be produced from 3,17-diacetoxy-5(6)-epoxy-retro-androstane.

The introduction of oxo-groups in retro-steroids may be carried out as follows:

(1) By oxidation of hydroxy-retro-steroids, for example according to Oppenauer as described for the normal series by Shepherd et al. (J. Am. Chem. Soc., 77, 1212 (1955)). By this method, retro-pregn-5-ene-3-ol-20-one may be converted into retro-progesterone, or retro-androst-5-ene-3-ol-17-one may be converted into retro-androst-4-ene-3,17-dione. The oxidation may also be performed with chromic acid, for example, in pyridine, by the method of Sondheimer et al. (Tetrahedron, 5, 15 1959)). Thus, 20-hydroxy-retro-pregn-4-ene-3-one may be converted into retro-progesterone. Further, from retro-testosterone will be obtained androst-4-ene-3,17-dione. The oxidation of hydroxy-groups occupying an allyl position with respect to a double bond, may suitably be performed with manganese dioxide, for example by the method of Sondheimer et al. (J. Am. Chem. Soc., 75, 5930 (1953)) and with quinones, such as, for example, dichloro-dicyanobenzoquinone as described by Burn et al. (Tetrahedron Letters, 9, 14 (1960)). Thus, retro-pregn-4-ene-3,20-diol may be converted into 20-hydroxy-retro-pregn-4-ene-3-one, and according to these two manners, retro-androst-4-ene-3,17β-diol may be converted into retro-testosterone.

(2) By oxidation of $\Delta^{17(20)}$ double bonds for example by ozonisation with the formation of 17-ketones, employing the method of Pederson et al. (J. Am. Chem. Soc., 79, 115 (1957)). Thus, ozonisation of the 22-cyanohydrin of retro-bisnorchola-4,17(20)-diene-3-one-22-al gives the retro-androst-4-ene-3,17-dione.

(3) By hydrolysis of enol esters or enol ethers of retro-steroids, for example, by acid hydrolysis as described by Serini et al. (Ber., 71, 1766 (1938)). Thus, 3-ethoxy-retro-pregn-3,5-diene-20-one may be hydrolysed to retro-progesterone. Further, 3-ethoxy-retro-androsta-3,5-diene-17-one may be hydrolysed to retro-androst-4-ene-3,17-dione.

(4) By the microbiological oxidation of hydroxy-retro-steroids, for example as described by Perlman (Science, 115, 529 (1952)). Thus, retro-pregn-4-ene-3-ol-20-one may be converted into retro-progesterone, or 17-acetoxy-retro-androst-5-ene-3-ol may be converted into retro-testosterone 17-acetate. The production of acylthio-retro-steroids may be effected by the method of Dodson et al. (J. Am. Chem. Soc., 81, 1224 (1959)), for example, for the introduction of 1- and 7-acylthio groups. Thus, 6-dehydro-retro-progesterone after reaction with ethanethiolic acid gives 7-acetylthio-retro-progesterone. Further, 6-dehydro-retro-testosterone after reaction with ethanethiolic acid yields the 7-acetylthio-retro-testosterone.

The production of amino-retro-steroids may be effected by reduction of retro-steroid-oximes, for example, with $LiAlH_4$, as described by Shoppee et al. (J. Chem. Soc., 1956, 1649). Thus, the dioxime of 6-dehydro-retro-progesterone yields 3,20-diamino-retro-pregna-4,6-diene. Further, the oxime of retro-testosterone with $LiAlH_4$ in ether yields the 3-amino-retro-androst-4-ene-17β-ol.

The production of monoalkyl- and dialkyl substituted amino 10α-methyl, 9β-steroids may be effected by reacting amino- or monoalkyl substituted amino 10α-methyl, 9β-steroids with alkyl halides, for example with an alkyl bromide. Thus 3-amino-retro-androstan-17β-ol when reacted with methyl bromide yields 3-(N-methylamino)-retro-androstan-17β-ol.

The production of retro-steroid [2,3-d] isoxazoles may be performed by the method of Clinton et al. (J. Org. Chem., 26, 279 (1961)), by reacting 3-keto-2-hydroxymethylene retro-steroids with hydroxylamine hydrochloride. Thus, 2-hydroxymethylene-17α-allyl-retro-testosterone may be converted into 17-hydroxy-17α-allyl-retro-androst-4-eno [2,3-d] isoxazole. Further, 2-hydroxymethylene-retro-testosterone may be converted into 17β-hydroxy-retro-androst-4-eno [2,3-d] isoxazole.

The production of retro-steroid [3,2-c] pyrazoles may be performed by the method of Clinton et al. (J. Am. Chem. Soc., 81, 1513 (1959)) by reacting 3-keto-2-hydroxymethylene retro-steroids with hydrazine. Thus, 2-hydroxymethylene-retro-pregn-4-ene-20-ol-3-one by reaction with hydrazine yields 20-hydroxy-retro-pregn-4-eno [3,2-c] pyrazole. Further, reaction of 2-hydroxymethylene-6-dehydro-retro-testosterone with hydrazine gives 17β-hydroxy-retro-androsta-4,6-dieno [3,2-c] pyrazole.

The preparation of oxido 10α-methyl-9β steroids can be performed by reacting a double bond between the carbon atoms under consideration with an oxidizing agent such as hydrogen peroxide in the presence of an alkali or with an organic peracid such as monoperphthalic acid. Thus 6-dehydro-retro-progesterone when reacted with monoperphthalic acid yields 6,7-oxido-retro-progesterone.

The introduction of methylene groups into 10α-methyl 9β steroids may be effected by the addition of diazomethane to the double bond present in such a steroid and cleavage of the thus obtained pyrazolines according to the procedure of Wiechert and Kaspar (Chem. Ber., 93, 1810 (1960)). Thus 16-dehydro-retro-progesterone may be converted into 16-methylene-retro-progesterone.

The introduction of thiol groups (—SH) into 10α methyl 9β steroids may be effected as follows: The reaction of a steroidtosylate with thiourea and splitting of the thus formed isothiouronium compound with alkali hydroxide affords the desired thiol 10α methyl 9β steroid. Thus 3-thiolo-androst-4-en-17β-ol 17-acetate can be prepared from 3-tosyloxy-androst-4-en-17β-ol 17-acetate.

The introduction of the thio analogues of alkoxy and aralkoxy groups into 10α methyl 9β steroids can be effected by reacting an oxo-10α methyl, 9β-steroid with an alkyl thiol or an aralkyl thiol respectively in the presence of a catalyst such as p-toluene sulphonic acid. Thus retro-testosterone when reacted with ethyl mercaptane yields 3-enol ethyl thio ether and when reacted with benzylmercaptane yields 3-enol benzylthioether of retro-testosterone.

The preparation of 2'-methyl-(3,2-d)-thiazoles may be carried out according to the process described by Doorenbos et al. (J. Pharm. Sc., 50, 271 (1961)) by reacting 2-bromo-3-keto retro-steroids with thiacetamide. Thus 2-bromo-17α-methyl-retro-testosterone may be converted into 2'-methyl-(3,2-d)-thiazolo-17α-methyl-retro-androsta-2,4-dien-17-ol.

The synthesis of 2'-amino-(3,2-d)-pyrimidino retro-steroids may conveniently be performed by the reaction of 2-hydroxy methylene-3-keto-retro-steroids with guanidine according to the process described in Bull. Off. de la Trop. Ind., 1, 344 (1961). Thus 2'-amino-(3,2-d)-pyrimidino-retro-androsta-4,6-dien-17β-ol 17-acetate can be prepared from 2-hydroxyymethylene-6-dehydro-retro-testosterone 17-acetate.

The production of 6-nitro retro-steroids may be effected by nitration of 3,5-dienylacylates of retro-steroids as described by Bowers et al. (J. Am. Chem. Soc., 81, 3707 (1959)). Thus, 3,17α-diacetoxy-retro-pregna-3,5-dien-20-one can be converted into 6-nitro-17α-acetoxy-retro-progesterone.

The introduction of an oxygen atom in the 18-methyl group in retro-steroids can for instance be carried out by the irradiation of a 11-nitrite of 11-hydroxy-retro-steroids according to the process described by Barton et al. (J. Am. Chem. Soc., 82, 2641 (1960)). Thus retro-corticosterone 21-acetate can be esterified into the corresponding 11-nitrite. Irradiation of this compound in toluene yields the retro-aldosterone 21-acetate oxime, which can be transformed by the action of sodium nitrite in acetic acid into retro-aldosterone 21-acetate.

Retro-17-spirolactones may be prepared by reaction of a 17α-acetylenic substituted retro-steroid with an alkyl gregnard halide, decomposing the complex thus formed with carbon dioxide and after hydrogenation lactonizing the thus formed hydroxy-acid, as described by Cella et al. (J. Org. Chem., 24, 743 (1959)). Thus 17α-ethinyl-3,17-dihydroxy-retro-androst-5-ene is converted into 3,17-dihydroxy-retro-androst-5-en-17α ylpropynoic acid, after which catalytic hydrogenation yield 3-(3,17-dihydroxy-retro-androst-5-en-17α-yl) propenoic acid lactone. Repeated hydrogenation gives the corresponding 17-propanoic lactone, which by means of an Oppenauer-oxidation can be converted into the 3-keto-$\Delta^4$-retro spirolactone.

Trihalo methyl-retro-steroids can be prepared by the reaction of enol ethers of unsaturated ketones with tetrahalo methanes as described by Lusberg et al. (Tetrahedron, 9, 149 (1960)). Thus the reaction of the $\Delta^{3,5}$-enolethyl ether of retro-progesterone with tetrabromomethane yields 6-tribromomethyl-retro-progesterone. In the same manner the trifluoro- and trichloro compounds may be prepared. The latter compound can by splitting off HBr and/or reduction be converted in 6-methyl-retro-progesterone.

The methods of preparing the novel retro steroids of our invention will now be explained in greater detail in the examples which follow.

Example 1

(a) By very vigorous stirring, 125 g. of $\Delta$4,7,22-lumistatrien-3-one were dissolved at 10° C. in 2.2 litres of dry propanol-2, which had previously been saturated with dry hydrochloric acid gas. The hydrochloric acid gas was slowly passed through the liquid for an additional half hour. The liquid was then decanted as rapidly as possible, while stirring, into a mixture of solid sodium bicarbonate and a saturated bicarbonate solution, obtained by stirring 4 kg. of sodium bicarbonate with 8 litres of water. After a short period of time the yellowish propanol-2 layer was separated out and the salt layer extracted twice with one litre of petroleum ether. The combined layers were then washed three times with a sodium bicarbonate solution and water, then dried on sodium sulphate and evaporated to dryness after filtering. The ultraviolet absorption spectrum exhibited a maximum at 287 mμ, of which the $$E^{1\%}_{1\ cm.}$$

is 562 (content of pure substance about 85%).

The residue obtained was dissolved in 250 ml. of boiling petroleum ether (40 to 60° C.) and crystallized at −5° C. for a few hours and finally overnight at −25° C. Filtering yielded 80.5 g. of lumista-4,6,22-trien-3-one with a melting point of 99 to 100.5° C. (yield 64%). A portion of the last substance was recrystallized a few times with petroleum ether for analysis, the melting point rising to 101–102° C. The further analytical values were: $[\alpha]_D^{25} = -632°$ (CHCl₃). $\epsilon(\lambda = 287\ m\mu) = 26,200$.

Found: C, 85.67%, 85.68%; H, 10.65%, 10.77%. Calculated for $C_{28}H_{42}O$: C, 85.22%; H, 10.73%. In the infrared spectrum there were found apart from the 964 cm.⁻¹ band for the side chain trans-ethylene bond three characteristic bands at 1586, 1622 and 1661 cm.⁻¹.

(b) While stirring vigorously, a solution of 3.0 g. of lumista-4,6,22-trien-3-one in 300 ml. of dry diethylether was added to 450 ml. of liquid ammonia. During the addition of the first portion of the solution crystallization occurred but the solid dissolved after a larger portion had been added. Then, while stirring vigorously, a solution of 420 mg. of lithium in 100 ml. of ammonia was carefully added in drops, until no spontaneous decoloring occurred any more. 90 ml. of dry ethanol were then added dropwise, stirring was continued for 30 minutes, the mixture was diluted with water and the reduction product was dissolved in diethyl ether. The ethereal extracts were then extensively washed with water, dried on Na₂SO₄, filtered and evaporated to dryness yielding a light-yellow resin.

$$(E^{1\%}_{1\ cm.}\ (\lambda\ max.\ 242\ m\mu) = 196)$$

The resin was dissolved in 100 ml. of boiling ethanol and after the addition of 6 ml. of 2 N NaOH the solution was boiled for five minutes. The solution was then rapidly cooled. By diluting with water, absorbing in diethyl ether, washing of the ethereal layers with water, drying, filtering and evaporating to dryness, a light-brown residue was finally obtained with $$E^{1\%}_{1\ cm.}\ (\lambda\ max.\ 242\ m\mu) = 420$$

This substance was chromatographed in 25 ml. of pure benzene on 30 g. of Al₂O₃(III) and eluated with the same solvent (total 75 ml.), a dark brown ring remaining at the upper end of the column. The dry eluate was recrystallized with 45 ml. of methanol at 5° C., after which the filtered product was washed with 20 ml. of methanol of −25° C. The yield were long light-brown needles (1.5 to 2 cms. in length), weight 2.43 g. and melting point 122 to 124° C.

500 mg. of this substance were recrystallized twice with 3 ml. of acetone at −5° C., after which finally 313 mg. of colorless crystals of lumista-4, 22-dien-3-one were obtained.

The analytic values found for this pure substance were:

$$\epsilon(\lambda 242\ m\mu) = 16,800$$

melting point 122–124° C.

$$[\alpha]_D^{20} = -125°\ (CHCl_3)$$

Found: C, 84.98%, 84.89%; H, 10.96%, 11.03%. Calculated for $C_{28}H_{44}O$: C, 84.79%; H, 11.17%.

In the infrared spectrum an intense band was found at 1665 cm.⁻¹, a slightly weaker band at 1620 cm.⁻¹, a weak band at 962 cm.⁻¹, and a slightly more intense band at 978 cm.⁻¹.

20 g. of lumista-4, 22-dien-3-one was dissolved in a mixture of 750 ml. of freshly distilled methylene chloride and 5.75 ml. of dry pyridine. The mixture, while being stirred magnetically at −80° C. (carbon dioxide ice and acetone) for 4 and ½ hours was ozonised (0.205 mol ozone per min.), speed of passing oxygen $(V_{O_2}) = 9$ to 10 l./hour. The ozonide formed was then decomposed at 0° C. for one hour by stirring it with a suspension of 20 g. of zinc powder, after the addition of 105 ml. of glacial acetic acid. The reaction mixture was then warmed for 5 minutes at 35° C., and then the resultant solid substance was separated out by filtering. After the addition of ice the filtrate was washed successively with 75 ml. and 50 ml. of ice cold 10% Na₂CO₃-solution, three times with 50 ml. of 10% NaOH solution at 0° C. and four times with 300 ml. of ice water.

The methylene chloride layer was then dried on Na₂SO₄, filtered and the filtrate was distilled to dryness, the last part of which was carried out in vacuo. The colorless, practically completely crystalline residue was recrystallized with 50 ml. of diethylether at −25° C., the first crystallate being 10.1 g. of 3-keto-retro-bisnorchol-4-en-22-al with a melting point of 119 to 121° C. This material was further purified by a few recrystallizations with petroleum ether (boiling region 40 to 60° C.) to which a few drops of ethyl alcohol had been added, and with diethylether.

The analytic values of this pure substance were:
M.P. 122–130° C.
$\epsilon(\lambda max\ 242.5\ m\mu) = 16,700$, $[\alpha]_D^{23} = -144°$ C. (CHCl$_3$).
Found: C, 79.87%, 80.06%; H, 9.73%, 9.81%. Calculated for C$_{22}$H$_{32}$O$_2$: C, 80.42%; H, 9.82%.

The infrared spectrum showed characteristic bands at 1712, 1642 and 1610 cm.$^{-1}$.

(c) A solution of 450 mg. of 3-keto-retro-bisnorchol-4-en-22-al obtained as described in Example 1b in 15 ml. of chloroform and 25 ml. of acetic acid, in which 200 mg. of chromic acid and 0.2 ml. of water had been dissolved was oxidized at about 30° C. for 16 hours.

After the excess quantity of chromic acid had been decomposed by stirring for 30 minutes with 1.5 ml. of methanol, the mixture was diluted with water and the substance was dissolved in benzene. The benzene extract was washed with water to neutral reaction, dried on Na$_2$SO$_4$ and filtered. After evaporation to dryness a crystalline residue was obtained, which by crystallization with diethylether, yielded 340 mg. of 3-keto-retro-bisnor-chol-4-enic acid, melting point 194 to 198° C. A few crystallizations raised the melting point of this substance to 202 to 204° C.

The further analytic values found for this pure substance were:
$\epsilon(\lambda max = 242\ m\mu) = 16,800$.
Calculated for C$_{22}$H$_{32}$O$_3$: C, 76.70%; H, 9.36%. Found: C, 76.93%, 76.92%; H, 9.45%, 9.48%.

(d) A solution of 450 mg. of an ozonide in 25 ml. of methylenechloride obtained in the manner described in Example 1b, by ozonizing lumista-4,22-dien-3-one, was oxidized with a solution of 200 mg. of chromic acid in 25 ml. of acetic acid overnight at 30° C. The excess quantity of chromic acid was then decomposed by stirring with 2 ml. of methanol for 30 minutes.

After dilution with water, the mixture was dissolved in diethyl ether and the ether methylene chloride extract was washed three times with 50 ml. of 2% NaOH. These layers were combined, extracted again with diethylether to remove residues of neutral constituents. The organic acid was freed by acidifying with concentrated hydrochloric acid and dissolving in diethylether. After neutral washing with water, the mixture was dried on Na$_2$SO$_4$, filtered and finally evaporated to dryness; the yield was 240 mg. of crystalline residue. A crystallization with methanol at −5° C. yielded 150 mg. of 3-keto-retro-bisnorchol-4-enic acid with a melting point of 200 to 203° C. When this acid was mixed with 3-keto-retro-bisnorchol-4-enic acid as obtained by the method described in Example 1c no drop in the melting point occurred.

(e) 0.11 ml of dry, freshly distilled piperidine and 1 to 5 mg. of p-toluene sulfonic acid were added to a solution of 300 mg. of 3-keto-retro-bisnorchol-4-en-22-al as obtained by ozonization of lumista-4,22-dien-3-one. This solution was then refluxed in 5 ml. of dry benzene for 3 hours under N$_2$. The refluxing benzene was dried by being passed through powdered BaO in an extraction column.

After cooling, the reaction mixture was poured out into water, dissolved in diethylether and then washed adequately four times with water. The ether-benzene layer, dried on Na$_2$SO$_4$ and filtered, was dried to complete dryness in vacuo. The resinous residue was stirred with 3 ml. of methanol at −15° C., cooled to −25° C. and kept at that temperature for 2 hours and crystallized. Filtering of this solution yielded 185 mg. of needles with a melting point of 88 to 93° C. of 22-(N-piperidyl)-retro-bisnorchola-4,20(22)-dien-3-one.

Two recrystallizations with methanol raised the melting point of this substance to 94–96° C.

The analytical values of this pure substance were:
$\epsilon(\lambda\ max\ 241.5\ m\mu) = 21,800$, $[\alpha]_D^{20} = -139°$ (CHCl$_3$).
Found: C, 81.72%, 81.78%; H, 10.64%, 10.67%; N, 3.60%, 3.66%. Calculated for C$_{27}$H$_{41}$NO: C, 81.97%; H, 10.45%; N, 3.54%.

The infrared spectrum exhibited an intensive band at 1660 cm.$^{-1}$, which overlapped distinctly a band with lower extinction at 1650 cm.$^{-1}$. Apart from a band at 1610 cm.$^{-1}$ a weaker band was found at 874 cm.$^{-1}$.

After a few small charges of the above-mentioned piperidino compound were produced in a similar manner, in which the final substance had a melting point of 94 to 96° C., production of several more larger charges of this compound in a different manner was carried out. The resultant compound which had a different melting point (114 to 115° C.) was then obtained in large yields. Probably this effect is due to cis-trans isomerism.

This alternate method of preparing this compound were carried out as follows:

A solution of 10 g. of 3-keto-retro-bisnorchol-4-en-22-al was refluxed in 180 ml. of dry benzene with 3.8 mls. of piperidine and 30 mg. of p-toluenesulphonic acid for 3 hours under nitrogen. The refluxing benzene was dried by passing through powdered barium oxide.

The reaction mixture was evaporated to complete dryness in vacuo, a crystalline residue of 12.3 g. being obtained. Recrystallization with 10 ml. of methanol, yielded 9.3 g. of 22-(N-piperidyl) retro-bisnorchola-4,20(22)-dien-3-one, melting point 98 to 107–111° C. A portion of this substance, which was sufficiently pure for further processing, was recrystallized a few times with acetone for analysis until a constant melting point of 114–115° C. was attained.

The analytical values of this substance were:
$\epsilon(\lambda\ max\ 241.5\ m\mu) = 22,000$, $[\alpha]_D^{23} = -123°$ (CHCl$_3$).
C, 81.87%, 81.98%; H, 10.49%, 10.47%; N, 3.42%, 3.63%.

The infrared spectrum of this substance differed only on details from that of the compound having a melting point of 94 to 96° C. The characteristic bands found for said substance were also found in this case.

(f) 0.5 g. of freshly melted sodium acetate was added to a solution of 1 g. of 3-keto-retro-bisnorchola-4-en-22-al, obtained as described in Example 1b, in 50 ml. of freshly distilled acetic acid anhydride. This mixture was then refluxed in a nitrogen atmosphere.

The solvent was then distilled off as far as possible under reduced pressure (about 10 minutes) and the residue obtained was dissolved in 25 ml. of chloroform. Undissolved sodium acetate was filtered off, the filter was washed with a small quantity of chloroform and the filtrate was diluted with the same solvent to 125 ml., a solution of 22-acetoxy-retro-bisnorchola-4,20(22)-dien-3-one being obtained.

(g) A solution of 300 mg. of 22-(N-piperidyl)-retro-bisnorchola-4,20(22)-dien-3-one in 4.5 ml. of dry thiophene-free benzene, was added dropwise at a temperature of −5° C. to +5° C., in 45 minutes, while stirring, to a solution of 453 mg. of sodium bichromate dihydrate in 4.5 ml. of acetic acid and 3 ml. of benzene. After additional stirring for 2 hours at 0° C., 0.75 ml. of methanol was added to the dark-colored solution and stirring was continued for 30 minutes also at 0° C.

This reaction mixture was then processed by pouring it out into 25 ml. of water and by extraction twice with benzene. The combined benzene extracts were then washed successively with water, 3 ml. of cold 10% NaOH solution, twice with water, 3 ml. of cold 10% hydrochloric acid solution and four times with water. The solution was then dried on Na$_2$SO$_4$, filtered and evaporated to dryness producing a completely crystalline residue.

This residue was dissolved in 1 ml. of methylene chloride and 4 ml. of petroleum ether was added at boiling temperature. The crystallization which was completed at −25° C. yielded 150 mg. of light-yellow, hard crystal blocks of retro-progesterone with a melting point of 161 to 163° C.

A repeated recrystallization of this substance yielded 130 mg. with a melting point of 163–164° C.

The analytical values of this pure substance were:
$\epsilon(\lambda$ max 241.5 m$\mu) = 16,800$, $[\alpha]_D^{20} = -62°$ (CHCl$_3$)
Found: C, 79.90%, 79.89%; H, 9.75%, 9.75%. Calculated for $C_{21}H_{30}O_2$: C, 80.20%; H, 9.62%.

The infrared spectrum exhibited strong bands at 1690 cm.$^{-1}$ and 1662 cm.$^{-1}$, and a weaker band at 1615 cm.$^{-1}$.

(h) 0.5 g. of freshly melted sodium acetate was added to a solution of 1 g. of 3-keto-retro-bisnorchol-4-en-22-al, obtained as described in Example 1b, in 50 ml. of freshly distilled acetic acid anhydride and the mixture was refluxed for 16 hours in a nitrogen atmosphere.

Then the solvent was distilled off as far as possible under reduced pressure (about 10 mm. Hg) and the residue obtained was dissolved in 25 ml. of chloroform. The undissolved sodium-acetate was filtered off, the filter was washed again with a small quantity of chloroform and the filtrate was increased with the same solvent to 150 mls. A solution of 22-acetoxy-retro-bisnorchola-4,20(22)-dien-3-one was obtained.

While cooling with ice water this solution was ozonized for 14 minutes, 10.: mg. of ozone being absorbed per minute. Then, after the addition of 15 ml. of acetic acid and 2 g. of zinc substance for 10 minutes, the mixture was shaken and after filtering the solution was washed with 10% NaOH solution and water to neutral reaction. The solution was dried on Na$_2$SO$_4$, filtered and evaporated to dryness, and then refluxed to hydrolyse any 3-enolacetate present for 45 minutes in 45 ml. of methanol and 25 ml. of 2 N H$_2$SO$_4$. After concentration in vacuo down to half the volume the solution was dissolved in diethylether. The ethereal extract was washed with 10% NaOH solution and water to neutral reaction dried on Na$_2$SO$_4$, evaporated to dryness and finally crystallized with 3 ml. of diethyl ether. The crystallate obtained was recrystallized with a mixture of methylene chloride and n-hexane, the yield being 113 mg. of substance with a melting point of 160–163° C. The substance did not exhibit a reduction in melting point with the retro-progesterone obtained as described in Example 1g.

$[\alpha]_D^{20} = -61.5°$ (CHCl$_3$) (mean value of −62.1° and −60.9°).

The following compounds listed with their starting materials are prepared according to the methods of Example 1:

7-dehydro-retro-progesterone from lumista-4,7,22-trien-3-one;
6-dehydro-retro-progesterone from lumista-4,6,22-trien-3-one;
1-dehydro-retro-progesterone from lumista-1,4,22-trien-3-one;
retro-pregna-1,4,6-triene-3,20-dione from lumista-1,4,6,22-tetraen-3-one;
retro-pregnane-3,20-dione from lumist-22-en-3-one;
2-methyl-retro-progesterone from 2-methyl-lumista-4,6,22-trien-3-one;
6-methyl-retro-progesterone from 6-methyl-lumista-4,22-dien-3-one;
6-fluoro-retro-progesterone from 6-fluoro-lumista-4,22-dien-3-one;
6-chloro-retro-progesterone from 6-chloro-lumista-4,22-dien-3-one;
6-hydroxy-retro-progesterone from 6-hydroxy-lumista-4,22-dien-3-one;
4-chloro-retro-progesterone from 4-chloro-lumista-4,22-dien-3-one;
1-methyl-retro-progesterone from 1-methyl-lumista-r,22-dien-3-one;
2-hydroxy-retro-progesterone from 2-hydroxy-lumista-4,22-dien-3-one;
retro-pregn-5-ene-3,20-dione from lumista-5,22-dien-3-one;
9-fluoro-11-hydroxy-retro-progesterone from 9-fluoro-11-hydroxy-lumista-4,22-dien-3-one;
16-hydroxy-retro-progesterone from 16-hydroxy-lumista-4,22-dien-3-one;
16-methyl-retro-progesterone from 16-methyl-lumista-4,22-dien-3-one;
3-hydroxy-retro-pregn-5-en-20-one from 3-hydroxy-lumista-5,22-diene and
3-hydroxy-retro-pregnan-20-one from 3-hydroxy-lumist-22-ene.

*Example 2*

(a) To 3.2 ml. of anhydrous ethanol there was added a mixture of 70 ml. of dry benzene and 12 ml. of 2.86 sodium methoxide in dry methanol. This mixture was then concentrated by evaporation under N$_2$ about 30 ml. After cooling, while stirring, the resultant paste had added to it, 8.6 ml. of freshly distilled diethyloxalate, so that the reaction mixture became quite clear. Then, a solution of 10 g. of retro-progesterone, prepared as described in Example 1g, in 79 mls. of dry benzene was quickly added and stirring was continued for about 90 minutes. By the rapid dropwise addition of 400 ml. of dry diethylether, the precipitation of the sodium enolate was completed. After stirring for an additional 45 minutes the resultant substance was filtered and washed adequately with 100 ml. of dry diethylether. After drying, for 15 hours, on concentrated H$_2$SO$_4$, 10.8 g. of yellow sodium enolate of 21-ethoxy-oxalyl-retro-progesterone was obtained.

(b) The sodium enolate derivative thus obtained was dissolved at −20° C., while stirring in a nitrogen atmosphere, in 150 ml. of dry methanol. At the same temperature a solution of 5.9 g. of iodine in 210 ml. of dry methanol was added within 40 minutes to the reaction mixture while stirring and stirring was continued for 90 minutes. The decomposition of the iodine compound was carried out by adding 6.6 ml. of 3.56 N sodium-methoxide solution stirring was continued at 0° C. for one hour in dry methanol. From the solution obtained the reaction product was precipitated by adding dropwise, while stirring for 45 minutes 90 ml. of water and by then adding 120 g. of sodium chloride.

The filtered precipitate, after being washed adequately with water, was dried overnight, the yield being 5.55 g. of 21-iodo-retro-progesterone. From the filtrate, after one night, another 2.35 g. of this compound was obtained.

(c) The first fraction of 21-iodo-retro-progesterone (weight 5.55 g.) obtained this way, was refluxed in 200 ml. of purified dry acetone (purified with KMnO$_4$ and K$_2$CO$_3$) for 18 hours with 12 g. of freshly prepared potassium acetate purified by remelting. After evaporation of the acetone, 300 ml. of water were added and the oil separated was dissolved in methylene chloride. The extract, after drying on Na$_2$SO$_4$, was evaporated to dryness (weight 1.4 g.) and chromatographed in benzene on 10 g. of neutralized Al$_2$O$_3$. Eluation with benzene yielded 700 mg. of residue, from which after recrystallization with acetone, 150 mg. of a substance with a melting point of 159 to 164° C. was obtained.

Corresponding acetylation of the post-fraction thus obtained of 21-iodo-retro-progesterone (2.35 g.) yielded 2.6 g. of crude acetoxy-compound, from which 90 mg. of solid substance with a melting point of 160–161° C. could be crystallized. Chromatography of the mother liquor as described above, after recrystallization with a mixture of acetone, and petroleum ether (40–60° C.) yielded 400 mg. with a melting point of 160–163° C.

Recrystallization of the combined crystallates with acetone yielded 425 mg. with a melting point of 164–167° C., from which, by recrystallization with ethanol, finally 335 mg. of pure retro-desoxycorticosterone acetate with a melting point of 165–168° C. were obtained.

The analytical values of this pure substance were:

$\epsilon E_{1\,cm.}^{1\%}(\lambda\,max.=242\,m\mu)=457$ and $462$, $\epsilon 242\,m\mu=17,000$ Calculated for $C_{23}H_{32}O_4$ (372.49): C, 74.15%; H, 8.66% Found: C, 74.03%; 74.27%; H, 8.55%; 8.77%.
The infrared spectrum exhibited bands at 1226, 1609, 1663, 1724 and 1751 cm.$^{-1}$.

The following compounds, listed with their starting materials are prepared according to the methods used in Example 2:

21-acetoxy-6-dehydro-retro-progesterone from 6-dehydro-retro-progesterone;
21-propionoxy-1,6-bisdehydro-retro-progesterone from 1,6-bisdehydro-retro-progesterone;
21-butyroxy-retro-pregnane-3,30-dione from retro-pregnane-3,20-dione;
the hemi-succinate of 21-hydroxy-6-methyl-retro-progesterone from 6-methyl-retro-progesterone;
21-acetoxy-9-fluoro-11-hydroxy-retro-progesterone from 9-fluoro-11-hydroxy-retro-progesterone;
21-formate of 21-hydroxy-2-methyl-retro-progesterone from 2-methyl-retro-progesterone;
21-acetoxy-17-hydroxy-retro-progesterone from 17-hydroxy-retro-progesterone;
9-fluoro-retro-hydrocortisone 21-acetate from 9-fluoro-11,17-dihydroxy-retro-progesterone;
21-acetoxy-16-methyl-9-fluoro-11,17-dihydroxy-retro-progesterone from 16-methyl-9-fluoro-11,17-dihydroxy-retro-progesterone and
21-acetoxy-9-fluoro-11,16,17-trihydroxy-retroprogesterone from 9-fluoro-11,16,17-trihydroxy-retro-progesterone.

From all the above named compounds there can be prepared the unesterified corresponding 21-hydroxy derivatives by mild hydrolysis methods described in literature, for instance by reacting the esters with dilute alkali as potassium hydroxide or potassium bicarbonate.

*Example 3*

(a) A solution of 4.08 g. of bromine in 50 ml. of methylene dichloride was added in drops while stirring at —55° C., in a nitrogen atmosphere to 9.6 g. of 22-(N-piperidyl)-retro-bisnorchola-4,20(22)-dien-3-one obtained as described in Example 1e and dissolved in 475 ml. of methylene dichloride. After the addition of 47 ml. of the bromine solution the mixture assumed a light-brown color, at which point the addition was stopped. Thus 22-(N-piperidyl)-20,22-dibromo retro-bisnorchol-4-3n-3-one was obtained. After the reaction mixture had been warmed up to 0° C., 60 ml. of water were added and stirring was carried out vigorously at 20° C. for 2 hours. The methylene dichloride layer then was separated and washed twice with 100 mls. of water and dried on $Na_2SO_4$. The residue contained 20-bromo-retro-bisnorchol-4-en-3-one-22-al. To the filtered methylene dichloride solution 70 mls. of dry pyridine were added and the methylene dichloride was distilled off in vacuo. Then dehydrobromination was carried out by heating the solution under $N_2$, for 60 minutes, at 70° C. and then for 30 minutes at 100° C. Distilling off the pyridine in vacuo then yielded a residue, which was dissolved in methylene dichloride and then washed successively with 2 N HCl three times with water and three times with 5% $Na_2CO_3$ solution in water. After this, the resultant mixture was dried on $Na_2SO_4$, filtered and evaporated to dryness. The yield was a light-brown crystalline residue with a melting point of 150 (s)—153–155° and $E_{1\,cm.}^{1\%}$ ($\lambda$ max.$=248\,m\mu$)$=865$ Recrystalliaztion from 30 mls. of acetone at —5° C. yielded 6 g. of 3-keto-retro-bisnorchol-4,17(20)-dien-22-al with a melting point of 154 (s)—155–158° C. A small quantity of this substance was crystallized, in order to obtain a pure preparation for analysis, three times with acetone and once with ethanol. The analytical values of this purified product were as follows:

Melting point 151 (s)—155–159° C. $[\alpha]_D^{23}=-138°$ ($CHCl_3$).

$E_{1\,cm.}^{1\%}$ ($\lambda$ max. $248\,m\mu$)$=944$

Calculated for $C_{22}H_{30}O_2$: C, 80.98%; H, 9.20%. Found: C, 80.95%, 80.82%; H, 9.10%, 9.14%.

The infrared spectrum exhibited a strong band at 1665 cm.$^{-1}$, a shoulder at 1710 cm.$^{-1}$ and a weak band at 1620 cm.$^{-1}$. It is not possible, in view of the lack of sharpness of the melting point, that a mixture of cis-trans isomers is obtained.

(b) 48 ml. of a bromine solution in $CCl_4$ (0.515 mol per ml.) was added while stirring vigorously in a nitrogen atmosphere to a solution of 7.7 g. of 3-keto-reto-bisnorchol-4-en-22-al (obtained as described in Example 1b) in 100 ml. of dry carbon tetrachloride, in which 3 g. of powdered calcium carbonate had been suspended. By this reaction 20-bromo-retro-bisnorchol-4-en-3-one-22-al was formed. During the dropwise addition of the bromine solution, which took 75 minutes, a brown deposit was formed in the reaction mixture. The resultant mixture was then filtered and washed with methylene dichloride, the organic portion of the deposit being thus dissolved. The filtrate was then washed in succession twice with $NaHCO_3$ solution and twice with water, dried on $Na_2SO_4$ and then 25 ml. of dry pyridine were added. The solution was then filtered to remove the inorganic salt and evaporated to dryness in vacuo until the final volume was about 20–30 ml. Pyridine was then added again and dehydrobromification was carried out by heating under nitrogen at 70° C., for 60 minutes and for another 30 minutes at 100 C.

The pyridine was distilled off, as far as possible, in vacuo from the dark-colored solution. Crystallization of pyridine HBr occurred. The organic constituent of this solution was dissolved in methylene dichloride and the solution obtained was successively washed twice with 2 N $H_2SO_4$, once with water, once with 5% $NaHCO_3$ solution and once with water. This solution was then dried on $Na_2SO_4$ and filtered by means of a small quantity of carbon, and finally evaporated to dryness, 7.15 g. of crystalline residue being thus obtained.

$E_{1\,cm.}^{1\%}$ ($\lambda$ max. 246.5 $m\mu$)$=630$

By recrystallization of this residue pure 3-keto-retro-bisnorchol-4,17(20)-dien-22-al was obtained.

(c) 5 g. of powdered 3-keto-retro-bisnor-chol-4, 17 (20)-dien-22-al was suspended with stirring in a solution of 8 g. of NaCN in 50 ml. of absolute methonal cooled to —20° C. To this suspension there were added by dropwise addition within about 45 minutes 7.1 mls. of glacial acetic acid while the suspension was held at—20° C. Within about 2 hours, the reaction temperature was raised from —20° C. to 5° C. The white paste obtained was kept at 5° C. to 40 hours, after which it was processed by pouring it out into 150 ml. of methylene dichloride at 0° C. and washing in succession with 75 mls. and then four times with 25 ml. of ice water and drying on $Na_2SO_4$ at —5° C. for overnight.

A small portion of the filtered solution was evaporated to dryness. The nitrogen content of the practically colorless residue found was 4.20% (theoretical value 3.96%) and $E_{1\,cm.}^{1\%}$ ($\lambda$ max. 244 $m\mu$) $+535$ (methanol)

$E_{1\,cm.}^{1\%}$ ($\lambda$ max. 233 $m\mu$) $=516$ (diethylether)

The compound thus obtained was the 22-HCN-addition product of 3-keto-reto-bisnorchol-4,17 (20)-dien-22-al. The remainder of the filtrate was ozonized at —80° C. while stirring, after 1.5 ml. of dry pyridine had been added. The duration of the ozonization was 75 minutes (per 10 min. 2.16 mol $O_3$), the speed of the gas being about 10½ hour.

The reaction mixture was then decomposed by stirring it 2 hours with 5 g. of zinc powder and 15 ml. of glacial acetic acid, the temperature rising slowly to 20° C. The filtered solution was then washed with water (150 ml. and twice with 100 ml.), twice with 50 ml. of 10% NaOH solution twice with water, 50 ml. of 10% HCl, solution and three times with water dried on $Na_2SO_4$ and after filtering, evaporated to dryness. A few recrystallizations with ethanol yielded 1.48 g. of retroandrost-4-en-3, 17-dione, melting point 153-155° C. A portion of this crystallate was recrystallized for analytical purposes with 90% and 96% ethanol and yielded a pure product having the following analytical values:

Melting point 154-156° C.

Calculated for $C_{19}H_{26}O_2$: C, 79.68%; H, 9.15%. Found: C, 78.93%, 79.20%; H, 9.24%, 9.22%.

$E_{1\,cm.}^{1\%}$ ($\lambda$ max. 240.5 m$\mu$) = 16,200

The infrared spectrum exhibited strong bands at 1735 and 1665 cm.$^{-1}$.

50 ml. of ammonia was liquified at 80° C. in a three-necked round-bottom flask of 250 ml. capacity. The ammonia gas had previously been dried by passing it through three drying towers containing solid KOH, soda lime and KOH respectively. In the liquid ammonia there was then dissolved 1.61 g. of potassium, after which in the resultant deep-blue solution acetylene gas was introduced until a complete decoloring had taken place. This gas had been dried and purified by means of solid KOH, soda lime, KAH, concentrated $H_2SO_4$ and solid KOH in succession.

To the acetylide thereby produced there was then rapidly added, while stirring and cooling, at $-80°$ C. 1.06 ml. of dry acetone, after which a solution of 3.03 g. of retroandrost-4-en-3, 17-dione in a mixture of 25 ml. of dry thiophene-free benzene and 25 ml. of dry peroxide-free diethylether was immediately added.

The reaction mixture was then allowed to remain in a slow stream of dry nitrogen without external cooling for 16 hours. The reaction mixture was decomposed with 175 ml. of water. The clear benzene layer thus separated out and was processed by washing it with water, drying on $Na_2SO_4$, filtering and evaporating to dryness. The 3.25 g. of residue ($E_{1\,cm.}^{1\%}$ ($\lambda$ max. 242 m$\mu$) = 288)

was chromatographed in benzene on 50 g. of $Al_2O_3$ (strength according to Brockmann II).

Eluation with benzene (800 ml.) and diethylether (200 ml.) yielded crystalline fractions, which were combined and recrystallized with n-hexane from which 1.95 g. of needles of 17 $\alpha$-ethynyl-retro-testosterone with a melting point of 194-196° C. was obtained.

A small portion of this substance was recrystallized for analysis a few times from n-hexane to produce a pure product having a constant melting point of 195-196° C. and in which the other analytical values were:

$[\alpha]_D^{20} = -219°$ ($CHCl_3$), $E_{1\,cm.}^{1\%}$ ($\lambda$ max. 242 m$\mu$) = 524

Found: C, 80.88%, 80.83%; H, 8.98%, 9.11%. Calculated for $C_{21}H_{28}O_2$: C, 80.73%; H, 9.03%.

The infrared spectrum of the substance exhibited, inter alia, more or less strong bands at 877, 1063, 1128, 1222, 1604 and 1648 cm.$^{-1}$.

According to the method described in this example the following compounds are prepared:

17-prop-1-ynyl-retro-testosterone;
17 but-1-ynyl-retro-testerone;
21, 21-dimethyl-retro-ethisterone from retro-androst-4-ene-3, 17-dione;
6-dehydro-17-prop-1-ynyl-retro-testosterone from retro-androst-4, 6-diene-3, 17-dione and
17-ethynyl-16-methyl-retro-testosterone from 16-methyl-retro-androst-4-ene-3, 17-dione.

The following bands in the infrared spectrum were found: 1410 cm.$^{-1}$ (weak), 1654 cm.$^{-1}$ (strong), 1717 cm.$^{-1}$ (strong), 1584 cm.$^{-1}$ (strong), 1621 cm.$^{-1}$ (fairly strong).

(c) 3.5 g. of 3-keto-retro-bisnorchola-4,6-dien-22-al obtained as described in Example 5b (crude crystalline form, melting point 146-151° C.) were dissolved in 50 ml. of absolute benzene. To this solution there was then added 1.27 ml. of piperidine and 20 mg. of p-toluenesulphonic acid. This reaction mixture was refluxed for two and a half hours and the refluxing benzene dried with BaO. Then the solvent was distilled off in vacuo and 4.4 g. of residue was left (105%). This residue was crystallized from 30 ml. of methanol at $-25°$ C. Yield: 2.1 g. of 22 - (N - piperidyl)-retro-bisnorchola-4,6,20(22)-trien-3-one with a melting point of 127-135° C. After two recrystallizations with acetone this substance was pure. The analytical values of this material were as follows:

Melting point (in vacuo) 135-136° C.

Ultraviolet absorption spectrum had a maximum at 287 m$\mu$.

$E_{1\,cm.}^{1\%}$ = 661 and 657; $\epsilon$ = 26,000 and 25,800

Calculated for $C_{27}H_{39}NO$ (393.62): C, 82.39%; H, 9.99%; O, 4.06%; N, 3.56%. Found: C, 82.40%; H, 9.86%; O, 4.35%; N, 4.13%.

There were found bands in the infrared spectrum at 870 cm.$^{-1}$ (strong), 1656 cm.$^{-1}$ (strong), 1622 cm.$^{-1}$ (strong) and 1410 cm.$^{-1}$ (weak).

(d) 16.7 g. of 22-(N-piperidyl)-retro-bisnorchlola-4,6, 20(22)-trien-3-one obtained as described in Example 5c and dissolved in 250 ml. of dry thiophen-free benzene, were added in drops, in 45 minutes, to an adequately stirred solution of 25.2 g. of sodium bichromate in 250 ml. of acetic acid+170 mls. of benzene cooled to 0° C. After two hours of stirring at 0° C., 42.0 ml. of methanol were added and stirring was continued for half an hour at 0° C. The reaction mixture was then poured out in water and extracted with ether. The extract was washed with water, diluted sodium hydroxide solution and water. After drying on $Na_2SO_4$ the solvent was distilled off. Yield: 12.24 g. (92%) of residue. This residue was crystallized with acetone-hexane (6.6 g.) and then by two crystallizations with acetone the substance obtained was pure. The melting point of the 6-dehydro-retro-progesterone thus obtained was 168-169° C.

(e) 3.95 g. of lumisterone were dissolved in 150 ml. of dry methylene dichloride and to this solution there was added 0.81 ml. of pyridine. This solution was then cooled to $-70°$ C. and within 26 minutes, 14 mmol of ozone was passed through. Then 15 g. of paraformaldehyde were added and, while stirring, the temperature was slowly raised to $+5°$ C. The paraformaldehyde was filtered off, and washed with methylene dichloride. The filtrate was washed with water, 1 N NaOH solution and water. After drying on $Na_2SO_4$ the organic solvent was distilled off, after which 3.11 g. of crystalline residue was left. This residue was recrystallized with a mixture of methylene dichloride and acetone. After three recrystallizations pure 3-keto-retro-bisnorchlola-4,7-dien-22-al was obtained with a melting point of 196-200° C. and the following analytical values:

The ultraviolet absorption spectrum had a maximum at 241 m$\mu$.

$E_{1\,cm.}^{1\%}$ = 433 and 436; $\epsilon$ = 14,150 and 14,200

Calculated for $C_{22}H_{30}O_2$ (326.48): C, 80.94%; H, 9.26%; O, 9.80%. Found: C, 80.15%, 80.28%; 9.1%, 9.09%; O, 10.10%, 10.04%.

The infrared absorption spectrum had bands, inter alia, at 1410 cm.$^{-1}$ (weak), 1660 cm.$^{-1}$ (strong), 1610 cm.$^{-1}$ (strong) and 1714 cm.$^{-1}$ (strong).

When the aldehyde thus obtained was converted in the manner described in Example 1e or 5c into 22-(N-piperidyl)-retro-bisnorchola-4,7,20(22)-trien-3-one, and this compound was oxidized with sodium bichromate in benzene and acetic acid in the manner described in Example 1g or 5d, 7-dehydro-retro-progesterone was obtained. By isomerisation of the 3-keto-4,7-dehydro-system of this latter compound into the 3-keto-4,6-dehydro-system with dry HCl-gas in anhydrous isopropanol, in the manner described in Example 1a, the 6-dehydro-retro-progesterone is obtained.

*Example 5*

(a) A solution of 7.5 g. of retro-progesterone in 500 ml. of freshly distilled tertiary butly alcohol was refluxed with 12.75 g. of finely powdered chloranil, while stirring, for 5 hours in a nitrogen atmosphere. After cooling, 2 litres of water were added and extraction was performed three times with 200 ml. of methylene dichloride. The combined extracts were then diluted with 1 litre of petroleum ether (40–60° C.) washed successively with 100 ml. of diluted $Na_2SO_4$ (100 ml.) four times with 75 ml. of 1 N NaOH and water to neutral reaction.

By drying this solution on $Na_2SO_4$ and evaporating to dryness ( last part in vacuo) 3.7 g. of crystalline residue was obtained.

This residue was then dissolved in benzene .

Filtration in benzene filtered through via 35 g. of alumina (according to Brockmann, strength II) and then the alumina was eluated with benzene. Evaporation of the benzene yielded 3.11 g. of crystalline residue. By crystallization with 15 ml. of acetone at room temperature (at lower temperatures a by-product crystallized out) 900 mg. of crystallate with a metling point of 165–170° C. were obtained. Transfer of the acetone mother liquor into a mixture of ethanol and hexane yielded 1.7 g. of a solid substance with a melting point of 130 to 145° C. This solid was then recrystallized with acetone at room temperature, yielding 600 mg. of a solid with a melting point of 166 to 171° C. The two fairly pure fractions (600 mg. and 900 mg.) yielded, after crystallization with a mixture of acetone and hexane, finally 1.0 g. of 6-dehydro-retro-progesterone, melting point 169 to 170° C. From the mother liquors an additional fraction of 0.44 g. with a melting point of 168 to 169° C. was obtained.

A small portion of the 6-dehydro-retro-progesterone was recrystallized with acetone for analysis and had the following analytical values:

Melting point 169–170° C.

$E_{1\,cm.}^{1\%}$ ($\lambda$ max.=286.5 m$\mu$)=842 and 848, $\epsilon$($\lambda$286.5 m$\mu$)=26,400

Calculated for $C_{21}H_{28}O_2$ (311.43): C, 80.73%; H, 9.03 %. Found: C, 81.11%, 81.25%; H, 9.20%, 9.07%.

The infrared spectrum exhibited inter alia bands at 1695 cm.$^{-1}$ (strong, non-conjugated keto-group), 1656 cm.$^{-1}$ (strong, conjugated keto-group), 1617 cm.$^{-1}$ (strong, double bond in conjugation), 1574 cm.$^{-1}$ (moderately strong, double bond) and 888 cm.$^{-1}$ (strong).

According to the method described in this example (5a) the following compounds listed with their starting materials are prepared:

1,6-bisdehydro-retro-progesterone from 1 dehydro-retro-progesterone;

2-methyl-6-dehydro - retro-progesterone from 2-methyl-retro-progesterone;

1,6 - bisdehydro-17 $\alpha$-hydroxy-retro-progesterone 17 - acetate from 1-dehydro-17 $\alpha$-hydroxy-retro-progesterone 17-acetate;

6-hydro-9-fluoro-retro-hydrocortisone from 9-fluoro-retro-hydrocortisone;

6 - dehydro-16-hydroxy-9-fluoro-retro-prednisolone from 16-hydroxy-9-fluoro-retro-prednisolone;

6-dehydro-16-methyl-9-fluoro-retro-prednisolone from 16-methyl-9-fluoro-retro-prednisolone and 6-dehydro-retro-desoxycorticosterone 21- acetate from retro-desoxycorticosterone 21-acetate.

(b) 3.95 g. of the isolumisterone obtained as described in Example 1a were dissolved in 150 ml. of dry methylenedichloride. To this solution there was then added 81 ml. of dry pyridine. The solution thus obtained was cooled to −80° C. and then, within 26 minutes, 15 mmol of ozone (i.e., 140% of the theoretical volume) was passed through. The reaction mixture was then vigorously stirred, after which 15 g. of para-formaldehyde was added. Under constant stirring the temperature rose within 4 hours to about room temperature. After standing overnight the solid substance was filtered off, washed with petroleum ether and diethyl ether. The ether solution was then extracted with water, cold 1 N NaOH and water. After drying on $Na_2SO_4$ this solution was evaporated and 3.08 g. of residue were obtained.

$E_{1\,cm.}^{1\%}$ ($\lambda$ max. 286 m$\mu$)=770

This residue was crystallized from acetone and then recrystallized twice from acetone. The resultant pure 3-keto-retro-bisnorchola-4,6-dien-22-al had a melting point of 153–155° C. The other analytical values of this substance were as follows:

The ultraviolet absorption spectrum had a maximum at 286 m$\mu$.

$E_{1\,cm.}^{1\%}$=780; $\epsilon$=25,400

Calculated for $C_{22}H_{30}O_2$ (326.48): C, 80.94%; H, 9.26%; O, 9.80%. Found: C, 81.07%, 80.87%; H, 9.16%, 9.05%; O, 9.94%, 10.00%.

*Example 6*

(a) A solution of 1.2 g. of monoperphthalic acid (6.6 mol) in 25.5 ml. of ethylacetate at 0° C. was added to an ice water cooled solution of 0.978 g. (3 mol) of 3-keto-retro-bisnorchol-4,20 (22)-dien-22-al obtained as described in Example 3a or 3b in 10 ml. of dry thiophene-free benzene. After standing for 4 hours at 0° C. the reaction mixture was gently heated to 20° C. and kept at this temperature for 12 hours. Samples were taken from the reaction mixture. It appeared by iodometric titration that 1.90 m. at. oxygen per mol. compound was consumed.

From the remaining quantity of reaction mixture the precipitated phthalic acid was filtered off and the filtrate obtained was washed successively with a 10% solution of sodium bicarbonate and water, dried on $Na_2SO_4$ and after filtering evaporated to dryness 0.88 g. of a substantially colorless resin of 17(20) epoxy-20-formoxy-retro-pregn-4-en-3-one was thus obtained, which could not be caused to crystallize.

The hydrolysis of the latter compound was carried out by preparing a solution of the substance in 150 ml. of ethanol (95%) at 30° C. with 35 ml. of aqueous 2.0 N sodium hydroxide solution at room temperature, the reaction mixture assuming a clear yellow color. After standing two hours, without cooling or heating, at room temperature, neutralisation of this reaction mixture with 6 ml. of acetic acid was carried out. The light-yellow solution thus obtained was concentrated at the lowest possible temperature in a water-jet pump vacuum, to about 60 ml. after which 100 ml. of water was added. The oil which separated out was dissolved in two extractions in ether and the ether solution, after having been washed with a diluted bicarbonate solution and water and dried on $Na_2SO_4$ was filtered. By evaporating the filtrate to dryness 580 mgs. of crystalline residue was obtained, $E_{1\,cm.}^{1\%}$ ($\lambda$ max. 242.5 m$\mu$) =504

After three recrystallizations from ethanol at −5° C. 118 mg. of hard crystals of 17$\alpha$-hydroxy-retro-progestrone were obtained with a melting point of 222–225° C. and the following additional analytical values:

$E_{1\,cm.}^{1\%}$ ($\lambda$ max. 242 m$\mu$) =500, 242 m$\mu$=16,500

Calculated for $C_{21}H_{30}O_3$ (330.45): C, 76.32%; H, 9.15%. Found: C, 76.07%, 75.84%; H, 9.14%, 9.10%.

The infrared spectrum exhibited bands inter alia at 3369 cm.$^{-1}$ (strong, hydroxyl band), 1697 cm.$^{-1}$ (strong)

unconjugated keto group), 1643 cm.$^{-1}$ (strong, conjugated keto group), 1610 cm.$^{-1}$ (fairly strong, double bond, 1354 cm.$^{-1}$, 1232 cm.$^{-1}$, 928 cm.$^{-1}$ and 858 cm.$^{-1}$.

(b) A solution of 2.77 g. of bromine in 34 ml. of methylene chloride was added dropwise to a well stirred solution of 6.5 g. of 22-(N-piperidyl)-retro-bisnorchola-4,6,20(22)-trien-3-one in 320 ml. of methylene chloride at —55° C. The temperature was then raised to about 0° C. and 40 ml. of water was added. This reaction mixture was stirred intensively at 20° C. for two hours. Subsequently the methylene chloride solution was separated off and washed with two 110 ml. portions of water. After drying, 13.5 ml. of dry pyridine were added to this solution and the methylene chloride was distilled off in vacuo. The residue was heated—after the addition of 33.5 ml. of pyridine—at 70° C. for one hour and then at 100° C. for half an hour. Pyridine was distilled off in vacuo and the residue dissolved in methylene chloride. After washing with 2 N hydrochloric acid solution, water, a solution of sodium carbonate and with water the solution was dried and the solvent evaporated. The residue—4.86 g. was crystallized from acetone, to give 2.41 g. of a sufficiently pure retro-bis-norchola-4,6,17(20)-trien-3-one-22-al. Repeated recrystallization from acetone furnished an analytically pure sample, having the following analytical values:

Melting Point 217–219° C. λ max.=281 mμ, ε=30,000.
Calculated for $C_{22}H_{28}O_2$ (324.56): C, 81.44%; H, 8.69%. Found: C, 81.6%, 81.5%; H, 8.5%, 8.6%.

The infrared absorption spectrum showed bands inter alia at 1655, 1616 and 1574 cm.$^{-1}$.

(c) A solution of 15.0 g. of retro-bisnorchola-4,6,17-(20)-trien-3-on-22-al in 150 ml. of ethyl acetate and 150 ml. of benzene was mixed with a solution of 20.2 g. of mono-perphthalic acid in 450 ml. of ethyl acetate. The resultant solution was stored at room temperature for several hours together with a similar solution containing no aldehyde. The reaction progress was followed by an iodomethical estimation of the active oxygen in both solutions. After 16 hours about 1.7 atoms of oxygen per mol. of aldehyde had been taken up. The reaction mixture was then filtered and washed with a solution of sodium bicarbonate and with water. After drying the solvents were evaporated and 16.4 g. of a resin were obtained (17-(20)epoxy-20-formoxy-retro-pregna-4,6-dien-3-one. This resin was dissolved in three litres of ethanol and 700 ml. of a 2 N sodium hydroxide solution were added. This mixture was kept at 30° C. for 1½ hours and then neutralised by addition of 110 mls. of acetic acid. The solution was concentrated in vacuo to a volume of about 700 mls. and, after addition of 1.4-1. of water, extracted with methylene chloride. The extract was washed with sodium bicarbonate solution, with water and dried. After removal of the solvent in vacuo 11.8 g of a resinous residue were obtained. Crystallization from ethanol furnished 5.69 g. of 6-dehydro-17α-hydroxy-retro-progesterone. After two recrystallizations this substance was obtained in a pure state. (λ max.=286 mμ, ε=25,100).

According to the method described in the Examples 6a and 6c the following compounds are prepared:

2-methyl-17α-hydroxy-retro-progesterone from
  2-methyl-retro-bisnorchola-4,17(20)-dien-3-on-22-al;
1-dehydro-17α-hydroxy-retro-progesterone from
  retro-bisnorchola-1,4,17(20)-trien-3-on-22-al;
6-fluoro-17α-hydroxy-retro-progesterone from
  6-fluoro-retro-bisnorchola-4,17(20)-dien-3-on-22-al;
4-chloro-17α-hydroxy-retro-progesterone from
  4-chloro-retro-bisnorchola-4,17(20)-dien-3-on-22-al;
6-methyl-17α-hydroxy-retro-progesterone from
  6-methyl-retro-bisnorchola-4,17(20)-dien-3-on-22-al;
6,17α-dihydroxy-retro-progesterone from
  6-hydroxy-retro-bisnorchola-4,17(20)-dien-3-on-22-al;
6-methyl-9-fluoro-11,17α-dihydroxy-retro-progesterone
  from 6-methyl-9-fluoro-11-hydroxy-retro-bisnorchola-4,17(20)-dien-3-on-22-al;
17α-hydroxy-retro-pregnane-3,20-dione from
  retro-bisnorchol-17(20)-3n-3-on-22-al;
1-dehydro-16-methyl-17α-hydroxy-retro-progesterone
  from 16-methyl-retro-bisnorchola-1,4,17(20)-trien-3-on-22-al;
17α-hydroxy-retro-pregn-1-ene-3,20-dione from
  3-keto-retro-bisnorchola-1,17(20)-dien-3-on-22-al;
3,17α-dihydroxy-retro-pregnan-20-one from
  3-hydroxy-retro-bisnorchol-17(20)-en-22-al.

(d) A mixture of 3.70 g. of retro-bisnorchola-4,6,17(20)-trien-3-one-22-al, 5.9 g. of sodium cyanide and 37 mls. of dry methanol was treated at —20° C., while stirring with a mixture of 5.3 ml. of acetic acid and 37 ml. of methanol which was added dropwise in about 30 minutes. The reaction mixture was stirred for another two hours, the temperature being gradually raised to +5° C. Subsequently this mixture was kept at +5° C. for 40 hours, then 110 ml. of cold methylene chloride was added. After several washings with cold water, the solution was dried, 1.5 ml. of pyridine was added and the solution was treated at —80° C. with 1.3 mol. of ozone/mol. of aldehyde. At —80° C. there were added to the stirred ozonisation mixture 12 g. of trioxymethylene and then the temperature was raised to room temperature. After filtration from trioxymethylene the next day, the solution was washed with dilute sodium hydroxide solution, dilute hydrochloric acid solution and water. After drying, the solvent was evaporated and 2.93 g. of a crystalline residue was obtained. Recrystallization from acetone gave 1.20 g. of retro-androsta-4,6-diene-3,17-dione. By recrystallization from acetone an analytically pure sample was obtained. The analytical values of this material were:

Melting point 189–190° C.
λ max.=285 mμ; ε=25,400.
Calculated for $C_{19}H_{24}O_2$ (284.40): C, 80.24%; H, 8.51%. Found: C, 80.2%, 80.4%; H, 8.4%, 8.7%.

In the infrared absorption spectrum strong bands are found at 1735, 1652 and 1623 cm.$^{-1}$.

According to this process there are prepared 6-methyl-retro-androsta-4,6-diene-3,17-dione from
  6-methyl-retro-bisnorchola-4,6,17(20)-trien-3-on-22-al,
2-fluoro-retro-androsta-4,6-diene-3,17-dione from
  2-fluoro-retro-bisnorchola-4,6,17(20)-trien-3-on-22-al,
2-fluoro-retro-androsta-1,4,6-triene-3,17-dione from
  2-fluoro-retro-bisnorchola-1,4,6,17(20)-tetraen-3-on-22-al, and
16-methyl-retro-androsta-4,6-diene-3,17-dione from
  16-methyl-retro-bisnorchola-4,6,17(20)-trien-3-on-22-al.

Example 7

A solution of 220 mg. of 17α-hydroxy-retro-progesterone, produced as described in Example 6c and 220 mg. of p-toluene sulphonic acid in 15 mls. of distilled acetic anhydride was kept at room temperature for 18 hours. A small number of fine needles crystallized out from the very dark reaction mixture. By pouring this mixture out in ice water and adding a small quantity of pyridine, and stirring for some time, the excess acetic acid anhydride was decomposed. The mixture was then filtered and the solid was washed three times with 30 ml. of diethyl ether and once with 30 ml. of methylene chloride. The combined extracts were then washed successively with water 2 N sulphuric acid (to pyridine free), water, 5% bicarbonate solution and water, dried on sodium sulphate and after filtering evaporated to dryness, a complete crystalline residue thus being obtained. Crystallization with a mixture of methylene dichloride and methanol at —5° C. yielded 130 mg. of crystals of the 3,17-diacetate of 17α-hydroxy-retro-progesterone, melting point 207 (sintering)—213–216° C. Two recrystallizations from the same mixture yielded a melting point of 207 (sintering)—

213–216° C. In high vacuo the melting point was 217–218° C. and the following additional analytical values:

$E_{1\,cm.}^{1\%}$ ($\lambda$ max. = 236.5 m$\mu$) = 445 and 439; $\epsilon$ 236.5 m$\mu$ = 18,300.

Calculated for $C_{25}H_{34}O_5$: C, 72.43%; H, 8.27%. Found: C, 71.71%, 71.78%; H, 8.21%, 8.12%.

The infrared spectrum exhibited bands inter alia at 1744 cm.$^{-1}$ (broad and strong, acetate group (twice)), 1707 cm.$^{-1}$ strong, unconjugated keto group), 1661 cm.$^{-1}$ (weak), 1624 cm.$^{-1}$ (very weak), 1248 cm.$^{-1}$ (strong) and 900 cm.$^{-1}$ (strong).

According to the method of this example the 3,17-diacetates of the 17α-hydroxy compounds listed in Examples 6a, b and c, are prepared.

*Example 8*

A solution of 500 mg. of 17α-hydroxy-retro-progesterone (prepared as described in Example 6) and 500 mg. of p-toluene sulphonic acid in a mixture of 5 ml. of freshly distilled acetic anhydride and 25 ml. of acetic acid was kept at room temperature for 15 hours. The acetic acid had previously been made free of water by refluxing with acetic anhydride, followed by fractionated distillation.

The dark-colored reaction mixture was poured into 200 ml. of water and the solid reaction product was then dissolved in methylene dichloride. This solution was, after the addition of ether, washed successively with water, 5% bicarbonate solution (three times) and water. By drying on sodium sulphate and evaporating to dryness a crystalline residue was obtained, which was dissolved in methanol. Seeding of this solution with crystals of the diacetate obtained as described in Example 7 caused a small quantity of this ester to crystallize at room temperature. Filtering after three hours yielded 75 mg. of this diacetate with a melting point of 205 (sintering)—211–214° C. The filtrate was concentrated slightly and crystallized at —5° C. Yield 260 mg. of 17α-acetoxy-retro-progesterone with a melting point of 162 (sintering)—167–172° C. Two further recrystallizations caused the melting point of this compound to be constant at 169 (sintering)—171–173° C. and to have the following analytical values:

$E_{1\,cm.}^{1\%}$ ($\lambda$ max. 241.5 m$\mu$) = 444 and 452; $\epsilon$ 241.5 m$\mu$ = 16,700

Calculated for $C_{23}H_{32}O_4$: C, 74.16%; H, 8.66%. Found: C, 73.81%, 73.88%; H, 8.69%, 8.68%.

The infrared spectrum exhibited bands inter alia at 1724 cm.$^{-1}$ (strong, acetate keto group), 1707 cm.$^{-1}$ (fairly strong, unconjugated keto group), 1657 cm.$^{-1}$ (strong, conjugated keto group), 1611 cm.$^{-1}$ (fairly strong, double bond), 1256 cm.$^{-1}$ and 871 cm.$^{-1}$.

According to the method of this example the 17α-acetates of the 17α-hydroxy compounds listed in Examples 6a, b and c are prepared.

*Example 9*

900 mg. of 17α-hydroxy-retro-progesterone, obtained as described in Example 6a was shaken for 15 hours in a nitrogen atmosphere in 20 ml. of capronic acid anhydride under nitrogen with 1.1 g. of p-toluene sulphonic acid. The dark-colored reaction mixture after the addition of 20 ml. of ethanol and 0.3 ml. of concentrated hydrochloric acid was then refluxed for one hour, after which 40 mls. of pyridine were added. Then, in vacuo evaporation to dryness was carried out and the residue was dissolved in methylene chloride. The solution obtained, after having been washed with water, was dried to neutral reaction on $Na_2SO_4$ and finally evaporated to dryness, after which 1.25 g. of a resinous product were obtained. This substance could not be caused to crystallize, not even after filtering through 18 gs. of neutral alumina into benzene. [The neutral alumina was produced by suspending the commercial product (Merck) for 6 hours in boiling ethyl acetate and after filtering, drying at 100° C.] After eluation of the alumina with benzene and evaporation of the eluate 1.1 g. of a resin with $E_{1\,cm.}^{1\%}$ ($\lambda$ max. 241 m$\mu$) = 310 were obtained.

The residue was chromatographed, after careful drying (for two hours at 60° C. at a pressure of 0.1 mm. Hg) in petroleum ether, which contained 5% of diethylether alumina and eluated with the same mixture through 25 g. of neutral alumina.

The eluates were recrystallized from n-hexane yielding the following results:

| No. | Eluate, ml. | Weight, mg. | Crystallization with n-hexane |
|---|---|---|---|
| 1 | 50 | 68 | |
| 2 | 30 | 438 | 354 mg., melted after filtering. |
| 3 | 30 | 117 | 83 mg., M.P. (50)–51–54° C. |
| 4 | 30 | 121 | 61 mg., M.P. 44–52° C. |
| 5 | 30 | 27 | Crystalline. |
| 6 | 30 | 16 | Do. |
| 7 | 50 | 11 | Do. |
| 8 | 50 | 6 | Do. |

The crystallized fractions 3 and 4 (67 mg.) which were 17-caproate of 17α-hydroxy-retro-progesterone after two recrystallizations, had a melting point of 50–53° C. and had these other analytical values:

$E_{1\,cm.}^{1\%}$ ($\lambda$ max. 242 m$\mu$) of 388

Calculated for $C_{27}H_{43}O_4$: C, 75.66%; H, 9.41%. Found: C, 75.15%, 75.40%; H, 9.22%, 9.30%.

The infrared spectrum had bands, inter alia, at 1721 cm.$^{-1}$ (strong, unconjugated keto group), 1664 cm.$^{-1}$ (strong, conjugated keto group) and 1613 cm.$^{-1}$ (fairly strong, double bond). According to the method of this example the 17-mono caproate esters of the compounds listed in Example 6 are prepared.

*Example 10*

In the manner as described in Examples 7, 8 and 9 the 17-hydroxy group may be esterified with another ester radical for example of a saturated or unsaturated, momo di or tri carboxylic aliphatic acid, alicyclic acid or aromatic acid or mixed aromatic aliphatic acid or with an amino aliphatic carboxylic acid or with phosphoric acid or with o, m, or p-toluene sulphonic acid.

Suitable ester radicals are those of formic acid, acetic acid, propionic acid, butyric acid, α-methyl propionic acid, valeric acid, α-methyl butyric acid, β-methyl butyric acid, caproic acid, t-butyl acetic acid, trimethyl acetic acid, palmitic acid, stearic acid, diglycolic acid, glycolic acid, β-methyl glutaric acid, succinic acid, adipic acid, acrylic acid, crotonic acid, undecylenic acid, oleic acid, cyclopentyl carboxylic acid, cyclohexane carboxylic acid, benzoic acid, o, m, or p-methyl benzoic acid, phenyl acetic acid, phenyl propionic acid, phenyl butyric acid, amino acetic acid, α-amino propionic acid, N-dimethyl amino acetic acid.

The esters are prepared by reacting an acid halide, preferably the acid chloride of one of the hereabove-mentioned acids with a 17-hydroxy-retro-steroid as mentioned in Example 6, in the presence of an acid binder for example pyridine or collidine, and a solvent, for example benzene or petroleum ether. The reaction temperature is preferably chosen between 0° and 100° C., in particular between 15° and 35° C. At a reaction temperature of 70° C. to 100° C. the reaction period lasts normally from 30 minutes to 2 hours. At a reaction temperature of 15–35° C. the reaction period lasts normally from 10 to 25 hours.

Thus are prepared 2-methyl-17α-hydroxy-retro-progesterone 17-formate,
1-dehydro-17α-hydroxy-retro-progesterone 17-propionate,
6-fluoro-17α-hydroxy-retro-progesterone 17-butyrate, 4-chloro-17α-hydroxy-retro-progesterone 17-(α-methyl propionate),
6-methyl-17α-hydroxy-retro-progesterone 17 valerate,
6,17α-dihydroxy-retro-progesterone 17-(α-methyl-butyrate),
6-methyl-9-fluoro-11,17α-dihydroxy-retro-progesterone 17-(β-methyl butyrate),
17α-hydroxy-retro-pregnane-3,20-dione 17-caproate,
1-dehydro-16-methyl-17α-hydroxy-retro-progesterone 17-t. butylacetate,
17α-hydroxy-retro-pregn-1-ene-3,20-dione 17-trimethylacetate,
3,17α-dihydroxy-retro-pregnan-20-one 17-mono- (or 3,17-di) palmitate,
2-ethyl-17α-hydroxy-retro-progesterone 17-stearate,
1,6-bis dehydro-17α-hydroxy-retro-progesterone 17-hemi-glycolate,
4-fluoro-17α-hydroxy-retro-progestererone 17-hemi-(β-methyl-glutarate),
1-dehydro-6-methyl-17α-hydroxy-retro-progesterone 17-hemi-succinate,
6-methyl-9-fluoro-11,17α-dihydroxy-retro-progesterone 17-hemi-adipate,
17α-hydroxy-retro-pregnane-3,20-dione 17-acrylate,
1-dehydro-16-methyl-17α-hydroxy-retro-progesterone 17-crotonate,
17α-hydroxy-retro-pregn-1-ene-3,20-dione 17-undecylenate,
3,17α-dihydroxy-retro-pregnan-20-one 17-oleate,
2-methyl-17α-hydroxy-retro-progesterone 17-cyclopentyl carboxylate,
1-dehydro-17α-hydroxy-retro-progesterone 17-cyclohexane carboxylate,
6,17α-dihydroxy-retro-progesterone 6,17-dibenzoate,
17α-hydroxy-retro-pregnane-3,20-dione 17-phenylacetate,
6-methyl-9-fluoro-11,17α-dihydroxy-retro-progesterone 17-phenylpropionate,
1-dehydro-16-methyl-17α-hydroxy-retro-progesterone 17-aminoacetate,
17α-hydroxy-retro-pregn-1-ene-3,20-dione 17-(α-amino propionate),
4-chloro-17α-hydroxy-retro-progesterone 17-N-mono- or dimethylaminoacetate,
6-methyl-17α-hydroxy-retro-progesterone 17-phosphate.

Example 11

A solution of 0.495 g. of 1.5 mmol 17α-hydroxy-retro-progesterone, produced as described in Example 6c, in 60 ml. of tertiary butanol, was refluxed under nitrogen with 0.74 g. (3 mmol) of chloranil. After 2 and 4 hours, samples were taken and processed by pouring out into water, dissolving in a mixture of methylene dichloride and diethyl ether and washed twice with caustic soda 2 N and water. The residues obtained by drying on $Na_2SO_4$ and after filtering and evaporation to dryness, exhibited an absorption maximum at $\lambda = 286$ mμ with an $E_{1\,cm.}^{1\%}$ of 203 and 462 respectively.

After a reflux time of in total 7 hours the reaction mixture was processed as stated above and filtered in benzene with neutral alumina. 180 mg. of a crude substance was obtained. Crystallization with a mixture of ethanol and hexane at —5° C. yielded 97 mg. with a melting point of 229 (sintering)—239–244° C. Two recrystallizations yielded finally 50 mg. of 6-dehydro-17α-hydroxy-retro-progesterone with a melting point of 242–245° C. (high vacuum 243–245° C.) and the following additional analytical values:

$E_{1\,cm.}^{1\%}$ ($\lambda$ max. 286 mμ)=776 and 756; $\epsilon$286 mμ=25,100.

Calculated for $C_{21}H_{28}O_3$ (328.45): C, 76.79%; H, 8.59%. Found: C, 76.38%, 76.64%; H, 8.61%, 8.50%.

The infrared spectrum had bands, inter alia, at 3344 cm.$^{-1}$ (strong, hydroxyl group), 1697 cm.$^{-1}$ (strong, unconjugated group), 1641 cm.$^{-1}$ (strong, conjugated keto group), 1612 cm.$^{-1}$ (strong, double bond), 1576 cm$^{-1}$ (fairly strong, double bond), 873 cm.$^{-1}$ (fairly strong, conjugated keto group).

Example 12

A solution of 372 mg. (1 mmol) of 17α-acetoxy-retro-progesterone, obtained as described in Example 8, was refluxed under nitrogen, in 40 ml. of tertiary butanol and 490 mg. (2 mmol) of chloranil. After different reaction times samples were taken and processed as described in Example 11. The ultraviolet spectra were determined of the crude dehydrogenation products obtained. It was found that after 11 hours of refluxing the $E_{1\,cm.}^{1\%}$ at 286 mμ had risen to 585. Processing of the reaction mixture in total, after the said time, yielded 152 mg. of a residue, which was crystallized with acetone and then recrystallized with a mixture of acetone and hexane at —5° C. Finally 32 mg. of crystals of 6-dehydro-17α-acetoxy-retro-progesterone were obtained with a melting point of 181–182° C. and the following additional analytical values:

$E_{1\,cm.}^{1\%}$ ($\lambda$ max. 286 mμ)=622 and 633; $\epsilon$286 mμ=23,200.

Calculated for $C_{23}H_{30}O_4$ (370.49): C, 74.54%; H, 8.16%. Found: C, 73.85%, 73.75%; H, 8.13%, 8.16%.

The infrared spectrum had bands, inter alia, at 1724 cm.$^{-1}$ (strong, keto acetate group), 1704 cm.$^{-1}$ (strong, unconjugated keto group), 1653 cm.$^{-1}$ (strong, conjugated keto group), 1625 cm.$^{-1}$ (fairly strong, double bond), 1585 cm.$^{-1}$ (fairly weak, double bond), 1258 cm.$^{-1}$ (strong, acetate group) and 878 cm.$^{-1}$ (strong, conjugated keto group).

This compound was also obtained by esterifying 6-dehydro-17α-hydroxy-retro-progesterone with acetic acid anhydride in the manner described in Example 8.

Example 13

A solution of 2.77 g. of bromine in 34 ml. of methylene chloride was added dropwise to a well stirred solution of 6.5 g. of 22-(N-piperidyl) - retro - bisnorchola - 4,6,20(22)-trien-3-one in 320 ml. of methylene chloride held at —55° C. The temperature was then raised to ca. 0° and 40 ml. of water was added. This reaction mixture was stirred intensively at 20° for two hours. Subsequently the methylene chloride solution was separated off and washed wth two 110 ml. portions of water. After drying 13.5 ml. of dry pyridine was added to this solution and the methylene chloride was distilled off in vacuo. The residue was heated, after the addition of 33.5 ml. of pyridine, to 70° C. for one hour and then at 100° C. for half an hour. Pyridine was distilled off in vacuo and the residue dissolved in methylene chloride. After washing with 2 N hydrochloric acid solution, water, a solution of sodium carbonate and with water the solution was dried and the solvent evaporated. The residue —4.86 g.— was crystallized from acetone, to give 2.41 g. of a sufficiently pure retro-bisnorchola-4,6,17(20)-trien-3-on-22-al. Repeated recrystallization from acetone furnished an analytically pure sample, with melting point 217–219° C. $\lambda$ max=281mμ; $\epsilon$=30,000, and the following additional analytical values:

Calculated for CHO (324.56): C, 81.44; H, 8.69. Found: C, 81.6, 81.5; H, 8.5, 8.6.

The infrared absorption spectrum shows strong bands at 1655, 1616 and 1574 cm.$^{-1}$. When, in the manner described in Example 16, the latter compound is epoxidized with monoperphthalic acid, 17(20)-epoxy-20-formoxy-retro-pregna-4,6-dien-3-one is obtained. Hydrolysis of this compound in the manner described in Example 6 with ethanolic aqueous NaOH solution at room temperature yields 6-dehydro-17α-hydroxy-retro-progesterone.

Example 14

According to the methods described in the Journal American Chemical Society, 75, 5369 (1953), 74, 5933 (1952), and 74, 3962 (1952), retro-progesterone was microbiologically hydroxylated with the microorganism *Rhisopus nigricans*. The resultant hydroxy-retroprogesterone had the following analytical values:

Melting point 214 (s)—217–218° C.

$E_{1\,cm.}^{1\%}$ ($\lambda$ max.=242 m$\mu$)=477

Found: C, 76.08, 76.21; H, 9.01, 9.10; O, 14.28, 14.61. Calculated for $C_{21}H_{30}O_3$: C, 76.32; H, 9.15; O, 14.53.

The infrared spectrum exhibited bands among others 3420, 1699, 1653, 1615, 1423, 1008 and 869 cm.$^{-1}$.

(b) Microbiological hydroxylation of 17α,21-dihydroxy-retro-progesterone with *Aspergillus orchraceus* yielded retrohydrocortisone with a melting point of ~269° (dec.).

$E_{1\,cm.}^{1\%}$ ($\lambda$ max.=242 m$\mu$)=476

The infrared absorption spectrum showed bands inter alia at 3310, 1693, 1642, 1611, 1417, 1275, 1238, 1213, 1117, 1077, 1037, 1000, 949 and 870 cm.$^{-1}$.

According to this process the following compounds are prepared: 11,17α-dihydroxy-retro-progesterone from 17α-hydroxy-retro-progesterone, 1-dehydro-11,17α,21-trihydroxy-retro-progesterone from 1-dehydro-17α,21-dihydroxy-retro-progesterone and 6-methyl-11,17α,21-trihydroxy-retro-progesterone from 6-methyl-17α,21-dihydroxy-retro-progesterone.

Example 15

The compounds prepared according to Examples 6a and 6b are dehydrogenated according to Example 12 to produce the corresponding 6-dehydro compounds. These latter compounds are converted into the corresponding 17-hydroxy esters by reaction with an acid anhydride or an acid chloride as described in Example 10.

Example 16

6.5 g. of 6-dehydro-17α-hydroxy-progesterone were added to a mixture of 65 ml. of acetic anhydride and 325 ml. of acetic acid containing 6.5 g. of paratoluenesulphonic acid. This reaction mixture was kept at room temperature overnight and subsequently poured into 2.5 ls. of water. After extraction with methylene chloride and with ether, the combined extracts were washed with a 1 N sodium hydroxide solution and with water. After drying, the solvents were evaporated to obtain 7.4 g. of a resinous residue. Crystallization of this residue from methanol furnished 1.12 g. of a diacetate having a melting point of (145° C.)—172–177° C. and after concentration of the mother liquor and addition of hexane 2.5 g. of 6-dehydro-17α-acetoxy-retro-progesterone were obtained. Recrystallization of the latter from acetone-hexane and from methanol gave an analytically pure product with melting point (178)—180–182° C.; $\lambda$ max=285.5 m$\mu$, $\epsilon$=26,000.

The first crystallate from methanol with the melting point of (145)—172–177° C.—was recrystallized from acetone and from methanol. By this means the melting point of the final product was raised to (174)—195.5–198° C. and the other analytical values of this substance, 3,17α-diacetoxy-retro-pregna-3,5,7-triene-20-one were: $\lambda$ max=315 m$\mu$; $\epsilon$=19,800.

Found: C, 72.6, 72.3; H, 7.8, 7.9. Calc. for $C_{25}H_{32}O_5$ (412.54): C, 72.79; H, 7.82.

In the infrared absorption spectrum strong bands were found at 1756, 1739, 1713, 1658 and 1250 cm.$^{-1}$.

According to this process the 3,17α-diacetoxy derivatives of the following compounds are produced:

6-dehydro-16-methyl-17α-hydroxy-retro-progesterone;
6-dehydro-2-methyl-17α-hydroxy-retro-progesterone;
6-dehydro-11-oxo-17α-hydroxy-retro-progesterone, and
6-dehydro-11-oxo-9-fluoro-17α-hydroxy-retro-progesterone.

Example 17

2 g. of palladium on calcium carbonate (produced according to Vogel, page 891) was shaken with 40 ml. of pyridine dried on potassium-hydroxide and subsequently distilled in a hydrogen atmosphere until the gas absorption ceased. To the catalyst suspension thus produced a solution of 1.88 g. of 17α-ethinyl-retro-testosterone in 50 ml. of pyridine was then added, further 10 ml. of solvent being subsequently used for rinsing. Hydrogen was passed into the solution while under a small excess pressure and with shaking. Within about 10 minutes 110% of the theoretical quantity of hydrogen was absorbed and the hydrogenation was stopped.

The catalyst was filtered off and the filter was washed with methylene chloride. After dilution with petroleum ether, the pyridine was washed away with 2 N sulphuric acid, the organic layer becoming colorless. Subsequently the solution was thoroughly washed with water to a neutral reaction, dried on sodium sulphate, filtered and the solvent was evaporated. The residue (1.82 g.) was crystallized from a mixture of acetone and hexane at room temperature. The crystallizate had a melting point of 141–142–144.5° C. Recrystallization from the same mixture yielded finally 1.17 g. of 17α-vinyl-retro-testosterone with a melting point of 142.5–144–145.5° C.

A small quantity of this compound was recrystallized to obtain a constant melting point and the following analytical values:

Melting point: 143.5—144.5–146° C.

The infrared absorption spectrum, measured in KBr, exhibits maxima, inter alia, at 1658, 1620, 1413, 1068, 923 and 876 cm.$^{-1}$. Since no band for an OH-group was found at 3300 to 3400 cm.$^{-1}$, the spectrum was also determined in $CS_2$ (compensated). The following bands were found: 3570 (weak), 1676 (strong), 1617, 1006, 993, 920 and 863 cm.$^{-1}$.

$E_{1\,cm.}^{1\%}$ ($\lambda$ max.=242 m$\mu$)=555 and 557 (methanol); $\epsilon$(242 m$\mu$) 17,500.

Found: C, 79.59, 79.99—80.07, 80.14; H, 9.79, 9.58—9.78, 9.74. Calculated for $C_{21}H_{30}O_2$ (314.47): C, 80.21; H, 9.62.

By this process the fololwing compounds, listed with their starting materials are prepared: 17α-allyl-retro-testosterone from 17α-propinyl-retro-testosterone, 6-fluoro-17α-vinyl-retro-testosterone from 6-fluoro-17α-ethinyl-retro-testosterone; 2-fluoro-17α-vinyl-retro-testosterone from 2-fluoro-17α-ethinyl-retro-testosterone; 6-methyl-17α-allyl-retro-testosterone from 6-methyl-17α-propinyl-retro-testosterone and 3-desoxy-17α-allyl-retro-testosterone from 3-desoxy-17α-propinyl-retro-testosterone.

Example 18

A solution of 5.0 g. of retro-progesterone and 4.0 g. of dichloro-dicyano-benzoquinone in 250 ml. of dry, thiophene-free benzene was refluxed for 7 hours, in a nitrogen atmosphere. The resultant mixture was then cooled to room temperature, filtered and, after dilution with benzene, poured out on ice. The benzene layer was washed successively 4 times with 300 ml. of N caustic soda lye and 6 times with 300 ml. of water to neutral reaction. After drying on sodium sulphate and filtering, the solvent was distilled off, the last part being carried out in vacuo. The residue (3.49 g.) was crystallized from acetone hexane at −5° C. to yield 2.807 g. of a solid substance with a melting point of 150.5–153° C. This substance was dissolved in 100 ml. of benzene. 1 g. of silica gel was added to this solution after filtration, the solution was stirred and it was again evaporated to dryness. The residue (2.73 g.) was crystallized from acetone-hexane at −5° C. The melting point of the 1-dehydro-retro-progesterone (2.14 g.) thus obtained was 153.5–154.5° C. A small quantity was recrystallized to obtain a constant melting point and had the following analytical values:

Melting point 154–155.5° C.

The infrared absorption spectrum exhibits, inter alia, maxima at 1694, 1661, 1625, 1606, 1423, 1366, 1166, 889 and 814 cm.$^{-1}$.

$E_{1\ cm.}^{1\%}$ ($\lambda$ max.=242.5 m$\mu$)=496 and 502;
$\epsilon$ (242.5 m$\mu$) =15,600 (CH$_3$OH).

Found: C, 80.12, 80.54; H, 8.99, 9.22. Calculated for C$_{21}$H$_{28}$O$_2$ (312.45): C, 80.73; H, 9.03.

By this process there are prepared 1-dehydro-6-fluoro-retro-progesterone from 6-fluoro-retro-progesterone; 1-dehydro-6-methyl-retro-progesterone from 6-methyl-retro-progesterone; 1 - dehydro - 6 - chloro - 17$\alpha$ - acetoxy-retro-progesterone from 6 - chloro - 17$\alpha$ - acetoxy-retro-progesterone; 1 - dehydro - 2,21 - difluoro - 17$\alpha$-acetoxy-retro-progesterone from 2,21-difluoro-17$\alpha$-acetoxy-retro-progesterone; 1 - dehydro - 16 - methyl - 17$\alpha$ - acetoxy-retro - progesterone from 16 - methyl - 17$\alpha$ - acetoxy-retro - progesterone; 1 - dehydro - 17$\alpha$ - bromo - retro-progesterone from 17$\alpha$-bromo-retro-progesterone and retro-prednisolone from retro-hydrocortisone.

Example 19

A solution of 2.5 g. of hydroxylamine HCl in 100 ml. of boiling ethanol was added to a solution of 2.5 g. of sodium acetate in 100 ml. of boiling ethanol. After 10 minutes of boiling the resultant precipitate was filtered off by means of a glass filter and to the boiling filtrate there was added a boiling solution of 2.5 g. of 6-dehydro-retro-progesterone in 100 ml. of ethanol (in total rinsed subsequently with 50 mls. of ethanol). Subsequently, the resultant mixture was refluxed under nitrogen gas for one hour and then 250 ml. of solvent was distilled off in the course of one hour. To the warm solution there were then added 300 ml. of water. While stirring occasionally the solution was cooled for ten minutes at room temperature and for 15 minutes in ice water. The resultant dioxime was filtered off, washed with water and dried at 100° C. in high vacuo. 2.85 g. of a substance with a melting point of 279–281° C. was produced.

A quantity (1 g.) of this substance was boiled with 30 ml. of ethanol and the residue (0.67 g.) was dissolved in boiling tetrahydrofurane. The resultant solution was filtered and to the filtrate there was added an equal quantity of petroleum-ether. The crystallization was achieved at —5° C. Yield 208 mg. of dioxime of 6-dehydro-retro-progesterone with a melting point of 279–282° C. (0.0) was produced. This compound had the following analytical values:

The infrared absorption spectrum exhibits maxima at 1642, 1624, 1604, 1370, 980, 960, 889 and 878 cm.$^{-1}$.

$E_{1\ cm.}^{1\%}$ ($\lambda$ max.=278 m$\mu$)=1080 and 1071 (methanol); $\epsilon$ =36,800.

The ultraviolet spectrum exhibits shoulders at ~267 and 288 m$\mu$. Found: C, 73.88, 74.25; H, 8.79, 8.89; N, 7.68, 7.88. Calc. for C$_{21}$H$_{30}$O$_2$N$_2$ (343.49): C, 73.64; H, 8.83; N, 8.18.

By this process the dioximes of 6-dehydro-retro-hydro-cortisone; of 6-dehydro-16-hydroxy-9-fluoro-retro-prednisolone; of 6 - dehydro - 6 - fluoro - 17$\alpha$ - acetoxy-retro-progesterone and of 6-dehydro-21-fluoro-retro-progesterone are produced.

Example 20

To a solution of 75 g. of lumista-4,6,22-trien-3-one and 55 ml. of freshly distilled ethyl formate in 1200 ml. of benzene were then added 16.5 g. of sodium hydride. The mixture was then kept at room temperature in a nitrogen atmosphere for three days. After two hours a greenish jelly was formed, which gradually became paste-like.

After the three days, the resultant sodium salt of 2-hydroxymethylene-lumista-4,6,22-triene-3-one was filtered off and the solid substance was dried in vacuo.

After the free hydroxymethylene compound was obtained from the sodium salt, crystallization from methanol was carried out and the yield of 2-hydroxymethylene-lumista-4,6,22-trien-3-one was~70%. The substance thus obtained was found to be a hydrated form of the expected substance, since by drying in vacuo at 60° C. the substance assumed a dehydrated form.

The hydrate had the following analytical values:

Melting point (60 to 100)—119–122° C. (vacuo). During melting the substance gives off water.

Found: C, 79.11, 79.24; H, 10.10, 10.21. Calc. for C$_{29}$H$_{42}$O$_2$.H$_2$O: C, 79.04; H, 10.07.

The infrared spectrum shows, inter alia, bands at 3360, 1674, 1625, 1594, 1225, 1200, 1107, 984, 967 and 882 cm.$^{-1}$.

$\lambda$ ($E_{1\ cm.}^{1\%}$):

Weak acid—
 296 m$\mu$, 454
 322 m$\mu$, 354
Weak alkaline—
 255 m$\mu$, 308
 290 m$\mu$, 422
 263 m$\mu$, 310
 390 m$\mu$, 224

The anhydrous substance had the following analytical values:

Melting point, 121—122–123.5° C. (vacuo).

Found: C, 82.29, 82.26; H, 10.02, 10.12; O, 7.80, 7.71. Calc. for C$_{22}$H$_{42}$O$_2$: C, 82.41; H, 10.02; O, 7.57.

The infrared spectrum shows inter alia bands at 1641, 1621, 1560, 1196, 986 and 874 cm.$^{-1}$.

$\lambda$ ($E_{1\ cm.}^{1\%}$):

Weak acid—
 296 m$\mu$, 463
 323 m$\mu$, 362
Weak alkaline—
 255 m$\mu$, 319
 263 m$\mu$, 320
 290 m$\mu$, 428
 390 m$\mu$, 233

In the same manner as described above the lumista-4,22-diene-3-one is converted into the 2-hydroxymethylene compound. This 2-hydroxymethylene-lumista-4, 22-diene-3-one had the following analytical values:

Melting point, 131 (s)—134–135° C.

Found: C, 81.72, 81.60; H, 10.42, 10.46; O, 7.94, 7.93. Calc. for C$_{29}$H$_{44}$O$_2$: C, 82.02; H, 10.44; O, 7.54.

The infrared spectrum shows inter alia bands at 1641, 1566, 1199, 974 and 883 cm.$^{-1}$.

$\lambda$ ($E_{1\ cm.}^{1\%}$):

Weak acid—
 256 m$\mu$, 296
 300 m$\mu$, 202
Weak alkaline—
 243 m$\mu$, 373
 358 m$\mu$, 258

(b) 108 g. of the sodium salt of 2-hydroxymethylene-lumista-4,6,22-trien-3-one was dissolved, while heating, in heated 3.2 l. of anhydrous ethanol. The mixture was then cooled and dry nitrogen was slowly introduced. When the temperature of 10° C. was reached, perchlorylfluoride was allowed to flow into the solution at a moderate rate. This operation was carried out with stirring in a nitrogen atmosphere; the temperature of the mixture being maintained between 10° C. and 15° C. In about 3.5 to 4.5 hours the pH of the mixture reached about 6; the flow of perchlorylfluoride was stopped and nitrogen was passed through the solution for a further 15 minutes. The solution was filtered and then evaporated in a dry atmosphere and under reduced pressure. The resultant residue was dissolved in 1.4 l. of anhydrous methanol containing 108 g. of potassium acetate. The mixture was then boiled for one hour. After cooling, the resultant solution was concentrated to half of its original volume under reduced pressure. To the concentrate obtained there were added 2.5 l. of water while stirring. After stirring for 15 minutes, the aqueous suspension was further diluted with water, with stirring, until a final volume of about 7 l. was obtained.

After this mixture was allowed to stand for one night at 4° C., the crystals of the resultant 2-fluoro-lumista-4,6,22-trien-3-one were filtered, washed with water and then dried in vacuo. Crystallization from anhydrous methanol yielded a purer product having a melting point of 150–153° C.

Weight 71 g. $[\alpha]_D^{27} = -635°$ (ethanol).

A sample was recrystallized until a constant melting point was found. This sample had the following analytical values:

Melting point 156 (s)—158–160° C.

$\epsilon(\lambda \max=290 \ m\mu)=25,800$.

The infrared absorption spectrum showed bands at 1695, 1636, 1597, 1228, 965 and 872 cm.$^{-1}$, inter alia.

In the same manner as described above the 2-hydroxymethylenelumista-4,22-dien-3-one is converted to the 2-fluoro-lumista-4,22-dien-3-one.

(c) Into a solution of 30.5 g. of 2-fluoro-lumista-4,6,22-trien-3-one in a mixture of 910 ml. of methylene chloride and 10 ml. of pyridine there was introduced at —80° C., with stirring, within 2.20 hours a mixture of oxygen and ozone, 103 mmol of ozone being thus absorbed. Then 100 g. of paraformaldehyde was added and the temperature of the reaction mixture was raised to room temperature in the course of 4 hours. The mixture was then kept overnight at this temperature. After filtering 28.5 g. of a residue was obtained, which was crystallized from a mixture of methylene chloride and ether. 16.6 g. of 2-fluoro-retro-bisnorchola-4,6-dien-3-on-22-al having a melting point of 172 (s)—176–182° C. were produced. A small quantity of this substance was recrystallized to obtain a constant melting point. This sample had the following analytical values:

Melting point, 179 (s)—183–185° C.

$\epsilon(\lambda \max=280 \ m\mu)=25,200$.

Found: C, 76,40, 76.67; H, 8.31, 8.08; F, 5.98, 5.96. Calc. for $C_{22}H_{29}FO_2$ (344.47); C, 76.70; H, 8.49; F. 5.52.

The infrared spectrum showed inter alia bands at 1720, 1676, 1624, 1580, 1233, 1037, 1023, and 901 cm.$^{-1}$.

In the manner described above 2-fluoro-retro-bisnorchol-4-ene-3-one-22-al is obtained from 2-fluoro-lumista-4,22-diene-3-one.

(d) A solution of 2.08 g. of 2-fluoro-retro-bisnorchola-4,6-dien-3-on-22-al, 11.4 mg. of p-toluenesulphonic acid and 0.72 ml. of piperidine was refluxed in a nitrogen atmosphere for five hours, powdery barium oxide being used to dry the refluxing benzene.

The cooled solution of the 2-fluoro-22-(N-piperidyl)-retro-bisnorchola-4,6,20(22)-trien-3 - on thus produced was then added dropwise at 0° C. within 30 minutes, while stirring, into a solution of 4 g. of sodium bichromate in 40 ml. of acetic acid and 28 ml. of benzene. After stirring for an additional 2 hours at 0° C., 105 ml. of methanol was added, after which the whole solution was stirred for half an hour. After filtering the residue was recrystallized a few times from ethanol. This purified sample had the following analytical values:

Melting point, 153–154° C.

$\epsilon(\lambda \max=287.5 \ m\mu)=25,250$.

The infrared spectrum showed inter alia bands at 1700, 1679, 1629, 1581, 1230, 1060, 1030, and 874 cm.$^{-1}$.

In the same manner as described above 2-fluoro-retro-progesterone can be produced from 2-fluoro-retro-bisnorchol-4-en-3-on-22-al.

Example 21

To a solution of 300 mg. of retro-pregnane-3,20-dione in 20 ml. of anhydrous ethanol there were added 36.6 mg. of calcium chloride, $2H_2O$ and 16.3 mg. of sodium borohydride at a temperature of —20° C. The reaction mixture was then kept at this temperature for 3 hours and then neutralised with 8 ml. of 2% acetic acid. After filtration the resultant retro-pregnane-3-ol-20-one was crystallized from ethanol+ether, a melting point of 167–171° C. being obtained and had the following additional analytical values:

The infrared absorption spectrum showed inter alia bands at 3480, 1700, 1363, 1177, and 1073 cm.$^{-1}$.

By this process the following compounds, shown with their starting materials are produced: 17α-acetoxy-retro-pregnan-3-ol-20-one from 17α-acetoxy-retro-pregnane-3, 20-dione, 21-acetoxy-retro-pregnan-3-ol-20-one from 21-acetoxy-retro-pregnane-3,20-dione; 3,11,17α,21 - tetrahydroxy-retro-pregnane-3-one from 11,17α,21 - trihydroxy-retro-pregnane-3,20-dione and 3,17α,21-trihydroxy-retropregnan-3-one from 17α,21-dihydroxy-retro-pregnane - 3, 20-dione.

Example 22

A solution of 0.6 g. of potassium hydroxide in 9 ml. of methanol was added to a solution of 2.826 g. of retro-progesterone in 150 ml. of sodium-distilled dioxide. This mixture was shaken at a slight excess pressure with hydrogen in the presence of 0.3 g. of 10% palladium on carbon as a catalyst. After the absorption of 1 mol. of hydrogen per molecule of the substance the mixture was filtered, the reduction product obtained being crystallized from a mixture of ether and hexane. Recrystallization yielded finally retro-pregnane-3,20-dione with a melting point of 108.5 (s)—115–116° C. and the following additional analytical values:

Found: C, 79.76, 79.66; H, 9.87, 10.17. Calc. for $C_{21}H_{32}O_2$ (316.49): C, 79.70; H, 10.19.

The substance did not show absorption in the ultraviolet range.

Thus is produced 17α - acetoxy - retro - pregnane - 3,20-dione from 17α-acetoxy-retro-progesterone; 21-acetoxy-retro-pregnane-3,20-dione from 21-acetoxy-rotro-progesterone; 11,17α-21-trihydroxy - retro - pregnane-3,20-dione from retro-hydrocortisone or 17α-acetoxy-retro-pregnane-1-ene-3,20-dione from 17α-acetoxy-1-dehydro-retro-progesterone and 17α,21-dihydroxy-retro-pregnane-3,20-dione from 17α,21-dihydroxy-retro-progesterone.

Example 23

(a) 5 g. of 6-dehydro-retro-progesterone, 7.5 g. of chloranil and 25 g. of powdered calcium carbonate were introduced into 170 ml. of isoamyl alcohol and the mixture was refluxed in a nitrogen atmosphere, while stirring thoroughly, for 3 hours. After cooling, the precipitate was filtered off and washed with methylene chloride. Water was added dropwise to the very dark filtrate and the solvent was azeotropically distilled off in vacuo at a temperature of less than 75° C. The resultant residue was absorbed in methylene-chloride and the solution was intensely washed with a sodium dithionite solution, then with water and with an N aqueous solution of sodium hydroxide. During the last-mentioned washing process emulsifying occurred, which could be counteracted for the major part by using a greater quantity of methylene chloride and by adding a saturated sodium chloride solution. The washing with the sodium hydroxide solution was continued until the washing layer no longer absorbed any color. After washing with water to neutral reaction, drying on sodium sulphate and filtering, the solvent was evaporated and 4.4 g. of a dark green, semi-solid substance was obtained. Crystallization from 25 mls. of diethyl-ether at —5° C. yielded 0.9 g. of a gray substance with a melting point of 145–148° C. Recrystallization of a part of this substance from methanol raised the melting point to 150–155° C. From the ultraviolet spectra of the crystallizates and the initial mother liquor it was found that the former consisted for the major part of 6-dehydroretro-progesterone, the latter, however, for 50% of the 1,6-bisdehydro compound.

The mother liquor was evaporated to dryness and introduced into 100 ml. of a mixture of petroleum ether and methylene chloride (4:1), arranged on a column of 70 g. of silica gel and eluated as follows:

| Fraction | Solvent | Volume, l. | Weight, mg. |
|---|---|---|---|
| FA | p.e.+CH$_2$Cl$_2$(4+1) | 1.20 | 50 |
| FB | id. (3+2) | 1.00 | 150 |
| FC | id. (3+2) | 0.90 | 75 |
| FD | CH$_2$Cl$_2$ | 0.30 | 75 |
| FE | id | 1.00 | 900 |
| FF | id | 1.40 | 450 |
| FG | CH$_2$Cl$_2$+ether (4+1) | 0.65 | 440 |
| FH | id. (1+1) | 0.50 | |
| | Ether | 1.00 | 50 |
| FK | Methanol | 0.40 | 200 |

Fraction FE with $$E^{1\%}_{1\,cm.}\,(286\,m\mu)=694$$

is substantially pure 6-dehydro-retro-progesterone. For fraction FF was found:

$E^{1\%}_{1\,cm.}$ (226 m$\mu$)=370, $E^{1\%}_{1\,cm.}$ (254 m$\mu$)=308 and $E^{1\%}_{1\,cm.}$ (299 m$\mu$)=383.

For fraction FG 380, 308 and 372 respectively. Crystallization of the fraction FF from acetone+n-hexane at −5° C. yielded crystals (150 mg.) with a melting point of 137–139° C. A mixed melting-point determination with the 1,6-bisdehydro-retro-progesterone produced in a different manner did not show a reduction.

(b) A solution of 5 g. of 6-dehydro-retro-progesterone and 5.1 g. of dihydro-quinone in 250 ml. of dry, thiophene-free benzene was refluxed under a slow flow of nitrogen for 6 hours. The initially orange-red-colored solution turned to green-red after about 1.5 hours and to green after about 2.5 hours. During the last-mentioned period crystals of the dihydro-quinone began to separate out.

After cooling to room temperature the reaction mixture was diluted with 250 ml. of benzene and then washed four times with 250 ml. of N sodium lye and 7 times with 250 ml. of water to a neutral reaction. Owing to the washing with sodium lye the reaction product had a light yellow color. The wash liquids were shaken with 250 ml. of benzene. The combined benzene layers were dried on sodium sulphate, filtered and the solvent was evaporated, the last part in the water-jet-pump vacuo. After removal of the benzene traces, with the aid of an oil pump, 3.16 g. of the crystalline residue was obtained, which had $$E^{1\%}_{1\,cm.}\,(300\,m\mu)=404\,\text{and}\,E^{1\%}_{1\,cm.}\,(254\,m\mu)=299$$

This residue was recrystallized from acetone-hexane at −5° C. Filtering and washing with acetone-hexane (1+8) at −5° C. yielded a melting point of 139.5–141.5° C. Stirring twice with 1 g. of silica gel each discolored the light green solution of this crystallizate in 100 ml. of benzene. The residue obtained after the evaporation of the benzene was crystallized from acetone-hexane at −5° C., which yielded 1.52 g. of 1,6-bisdehydro-retro-progesterone with a melting point of 141.5—142–143.5° C.

Further processing of the mother liquors yielded a subsequent fraction of 410 mg., having a melting point of 138–140° C.

A small quantity was recrystallized to obtain a constant melting point. The analytical values of the pure substance were as follows: A melting point of 142.5—143–143.5° C. was found. The infrared absorption spectrum showed inter alia maxima at 1704, 1655, 1608 1582, 1463, 1410 (week and broad), 887 and 768 cm.$^{-1}$. The band at 1655 cm.$^{-1}$ exhibits a distinct shoulder on the long-wave side.

$E^{1\%}_{1\,cm.}$ ($\lambda$ max.=254 m$\mu$)=305; $\epsilon$(254 m$\mu$)=9,450 (CH$_3$OH).

$E^{1\%}_{1\,cm.}$ ($\lambda$ max.=301 m$\mu$)=403; $\epsilon$(301 m$\mu$)=12,500 (CH$_3$OH).

Found: C, 81.02, 81.16; H, 8.54, 8.61. Calc. for C$_{21}$H$_{26}$O$_2$ (310.44): C, 81.25; H, 8.44.

By these processes there are produced 6-dehydro-retro-prednisolone from 6-dehydro-hydrocortisone; 6-dehydro-16-methyl-9-fluoro-prednisolone from 6-dehydro-16-methyl-9-fluoro-hydrocortisone; 2-fluoro-6-methyl - 6-dehydro-retro-prednisolone from 2-fluoro-6-methyl-6-dehydro-retro-hydrocortisone; 2,6-dimethyl - 1,6 - bisdehydro-retro-progesterone from 2,6-dimethyl-6-dehydro-retro-progesterone; 6-fluoro-1,6-bisdehydro-retro-progesterone from 6-fluoro-6-dehydro-retro-progesterone; 1,6-bisdehydro-17$\alpha$-acetoxy-retro-progesterone from 6-dehydro-17$\alpha$-acetoxy-retro-progesterone; 1,6-bisdehydro-21-fluoro-retro-progesterone from 6-dehydro-21-fluoro-retro-progesterone and 1,6-bisdehydro-6-chloro-17$\alpha$-acetoxy - retro-progesterone from 6-dehydro-6-chloro-17$\alpha$-acetoxy-retro-progesterone.

*Example 24*

A rapid flow of perchlorylfluoride was introduced into a solution of 7.5 g. of 3-enolacetate of retro-progesterone in 450 mls. of distilled peroxide-free dioxane at room temperature, in a nitrogen atmosphere, while stirring very vigorously for 30 seconds. After this 250 ml. of water was added. After another 5 minutes of rapid introduction of the fluoride gas, the fluoride was allowed to flow into the solution slowly for 30 minutes. The excess quantity of reagent was expelled from the solution by passing nitrogen through it, after which 1 liter of water was added. Extractions were then carried out twice with 200 ml. of methylene chloride and with 500 ml. of petroleum ether. The combined extracts were washed twice with water, twice with an aqueous sodium bicarbonate solution and twice with water. By drying on sodium sulfate, filtering and evaporating to dryness 7.33 g. of the crystalline residue was obtained, which contained 5.52% of fluorine $$(E^{1\%}_{1\,cm.}\,(235\,m\mu)=362)$$

The substance was dissolved in 300 ml. of a mixture of petroleum ether and benzene (1+1) and chromatographed on 240 g. of neutral alumina.

| Fraction | Eluant | Vol. (l.) | Weight (g.) | $\lambda$ m$\mu$ | $E^{1\%}_{1\,cm.}$ | Crystallization at ~20° C. from acetone-hexane | Cryst. |
|---|---|---|---|---|---|---|---|
| 1 | p.e. benzene | 0.5 | | | | | |
| 2 | id. (1+1) | 0.5 | 0.825 | 234 | 376 | →0.57 g., M.P. 139–146° | 2-K$_1$ |
| 3 | id | 0.5 | 1.875 | 234 | 384 | →1.1 g. M.P. 131–135° | |
| 4 | id | 0.5 | 0.96 | 234.5 | 408 | →0.71 g. M.P. 133–137° | } 34-K$_1$ |
| 5 | id | 0.5 | 0.40 | 235 | 420 | | |
| 6 | id | 1.5 | 0.57 | 235.5 | 438 | →1.2 g., M.P. 158–162° | 58-K$_1$ |
| 7 | Benzene | 0.5 | 0.34 | 235.5 | 451 | | |
| 8 | id | 1.5 | 0.40 | 235.5 | 456 | | |
| 9 | Benzene-ether (3+1). | 2 | 0.26 | 239 | 205 | Resin | |
| 10 | Ether | 3 | 0.39 | 240 | 269 | Yellow crystalline residue | |
| 11 | Ethanol | 1 | 0.86 | 240 | 358 | →0.4 g., M.P. 206(s)—211–215° (ethanol-hexane). | 11-K$_1$ |

Recrystallization of 34-K₁ from methanol yielded a mixture of blocks and scales, which were separated as far as possible (fraction 34-BK₂ and 34-SK₂ respectively). The fraction 34-BK₂, together with 2-K₁, was recrystallized in order of succession from acetone-hexane, ethanol-hexane and further twice from acetone-hexane. 185 mg. of 6α-fluoro-retro-progesterone having a melting point of 148 (s)—150–151° C. were then obtained. This sample had the following analytical values:

The infrared absorption spectrum showed inter alia maxima at 1705, 1683, 1428, 1354 and 974 cm.⁻¹.

$E^{1\%}_{1cm.}$ ($\lambda$ max.=235 m$\mu$)=384 and 390 (methanol); $\epsilon$ (235 m$\mu$)=12,800.

Found: C, 76.20, 75.82; H, 8.95, 8.83. Calc. for $C_{21}H_{29}FO_2$ (332.46): C, 75.86; H, 8.79.

The fraction 58-K₁ was recrystallized from acetone-hexane at 5° C., 0.87 g. of 6-β-fluoro-retro-progesterone with a melting point of 161 (s)—163–165° C. being thus obtained.

$E^{1\%}_{1cm.}$ (237 m$\mu$)=465 and 472.

All the filtrates were collected and evaporated to dryness. The residue was dissolved with the fraction 34-SK₂ (3.4 g.) in 200 ml. of chloroform and to the solution was added 2.5% of ethanol. For two hours dry hydrochloric acid gas was passed through the solution at room temperature. The acid was then expelled for the major part with the aid of nitrogen from the solution, which was then washed with a bicarbonate solution and water. Drying on sodium sulphate, filtering and evaporating to dryness yielded a residue which was crystallized from methanol. Yield 1.235 g. having a melting point of 159 (s)—161–163° C. (FK₂). Recrystallization from methanol (subsequent to a color treatment with silica gel in benzene at —5° C.) yielded finally 1.16 g. of 6β-fluoro-retro-progesterone having a melting point of 161 (s)—163–165° C. (FK₃). The analytical values of the recrystallized substance having a constant melting point were:

Melting point, 164–166° C. (decomposition at ~190° C.).

The infrared absorption spectrum showed inter alia maxima at 1700, 1678, 1622, 1416, 1364, 1232, 1187, 1040, 945 and 875 cm.⁻¹.

$E^{1\%}_{1cm.}$ ($\lambda$ max.=237.5 m$\mu$)=459 and 642 (methanol); $\epsilon$ (237.5 m$\mu$)=15,300.

Found: C, 75.38; H, 8.85. Calc. for $C_{21}H_{29}FO_2$ (332.46): C, 75.86; H, 8.79.

Three crystallizations of the fraction 11-K₁ from acetone yielded finally 77 mg. of a compound having a melting point of 219 (s)—220–222° C. The infrared spectrum showed inter alia bands at 3470, 1682, 1666, 1616, 1420, 1364, 1230, 1183, 1065, 948 and 882 cm.⁻¹. The infrared spectrum is identical to that of 6-hydroxy-retro-progesterone obtained by the reaction of the 3-enolacetate of retro-progesterone with monoperphthalic acid. The infrared spectra of the two preparations were also identical in measuring in a cholorform solution.

$E^{1\%}_{1cm.}$ ($\lambda$ max.=242 m$\mu$)=467 and 468 (methanol); $\epsilon$ (242 m$\mu$)=15,600.

Found: C, 76.39, 76.39; H, 8.97, 9.04; O, 14.85, 14.78. Calc. for $C_{21}H_{30}O_3$ (330.45): C, 76.32; H, 9.15; O, 14.53.

(b) In 10 ml. of chloroform, containing 1% of ethanol there were dissolved 50 mg. of 6α-fluoro-retro-progesterone. Then, for one hour, dry hydrochloric acid gas was passed through the solution at room temperature. After the acid had been expelled with the aid of nitrogen, the reaction mixture was dissolved, the residue showed a value of $E^{1\%}_{1cm.}$ (236 m$\mu$) of 450

Crystallization from acetone-hexane yielded crystals having a melting point of 165–166° C. After mixing with 6-β-fluoro-retro-progesterone no drop in melting point occurred.

By this process thus are prepared the 6α and 6β isomers of 6-fluoro-retro-hydrocortisone from the 3-enolacetate of retro-hydrocortisone; 6-hydroxy-17α-acetoxy-retro-progesterone from the 3-enolacetate of 17α-acetoxy-retro-progesterone; 6-fluoro-17,21-dihydroxy-retro-progesterone, or 21-acetate from the 3-enolacetate of 17,21-dihydroxy-retro-progesterone 21-acetate; 6,21-difluoro-17α-acetoxy-retro-progesterone from the 3-enolacetate of 21-fluoro-17α-acetoxy-retro-progesterone, or 6-fluoro-17α-bromo-retro-progesterone from the 3-enolacetate of 17α-bromo-retro-progesterone and 6-fluoro-17α(2¹-methallyl)-retro-testosterone from the 3-enolacetate of 17α-(2¹-methallyl)-retro-testosterone.

*Example 25*

1.5 g. of powdered iodine were added in one batch to a solution of 1.0 g. of 17α-hydroxy-retro-progesterone in 15 ml. of tetrahydrofurane and 2.5 ml. of methanol was added, while stirring at —4° to 0° C. The excess quantity of iodine was then removed at the same temperature by adding dropwise, within about 20 minutes, a 10% solution of sodium hydroxide in water. After the addition of 13 ml. the solution still had a bright yellow color. This mixture was poured out into 150 ml. of water and extracted three times with 40 ml. of ether. The ether extracts were washed with water to neutral reaction. After drying on $Na_2SO_4$ the ether was distilled off in vacuo almost to dryness, after which 3 g. of dry potassium acetate and 50 ml. of acetone were rapidly added to the resultant concentrated solution of 21-iodo-17α-hydroxy-retro-progesterone. This heterogeneous mixture was then refluxed for 16 hours. After cooling the potassium salts were filtered off and washed with acetone. The filtrate was evaporated in vacuo almost to dryness, poured out into water and extracted from methylene chloride and ether. The extracts were washed with water to neutral reaction, dried on $Na_2SO_4$ and inspissated in vacuo. Yield 772 mg. of crude 17α,21-dihydroxy-retro-pregesterone 21-acetate, $E^{1\%}_{1cm.}$ (242.5 m$\mu$)=395

Crystallization from acetone and subsequently from alcohol-hexane produced a melting point of 218 (s)→238° C. (dec.);

$E^{1\%}_{1cm.}$ (242.5 m$\mu$)=4.16; $\epsilon$(242.5 m$\mu$)=16,160

Calculated for $C_{23}H_{30}O_5$ (338.51): C, 71.10; H, 8.30; O, 20.60. Found: C, 70.63; H, 8.35; O, 19.72.

In the infrared spectrum bands were found inter alia at 3465, 1755, 1728, 1653, 1612, 1419, 1231, 1098, 1085, 1061 and 1034 cm.⁻¹.

*Example 26*

To a solution of 1.0 g. of 17α-hydroxy-6-dehydro-retro-progesterone in 15 ml. of tetrahydrofurane and 2.5 ml. of methanol there were added while stirring at —4° C. to 0° C., 1.5 g. of powdered iodine. The brown solution obtained was discolored at the same temperature by dropwise addition within about 10 minutes, of 10 ml. of 10% sodium hydroxide solution. The reaction mixture was poured out into 150 ml. of water and extracted from ether and methylene chloride. The extract was washed to neutral reaction with water, dried on $Na_2SO_4$ and evaporated to dryness in vacuo, directly after which a mixture of 3 g. of dry potassium acetate and 50 ml. of acetone was added to the resultant crude 21-iodo-6-dehydro-17α-hydroxy-retro-progesterone. This reaction mixture was refluxed for 16 hours. After cooling the salts were filtered off and washed with acetone. The filtrate was evaporated to dryness, absorbed in methylene chloride and ether and washed to neutral reaction with water. After drying on $Na_2SO_4$ the solvent was distilled off in vacuo, after which 915 mg. of residue was obtained. After two recrystallizations from a mixture of acetone and methylene chloride 6-dehydro-17α,21-dihydroxy-retro-progesterone 21-acetate was obtained. The sample had the following analytical values: a melting point of 238.5–244 (s)—257–259° C. (dec.) (Tottoli) or 270° C. (Kofler).

$E_{1cm}^{1\%}$ (286.5 mμ)=650; ε(286.5 mμ)=25,200.

Calculated for $C_{23}H_{30}O_5$ (386.49): C. 71.74; H, 7.82; O, 20.44. Found: C, 70.90, 70.89; H, 7.91, 8.06; O, 20.59, 20.47.

In the infrared spectrum bands were found inter alia at 3340, 1751, 1726, 1645, 1619, 1584, 1425, 1235, 1085, 1067, 1046 and 1036 cm.⁻¹.

By this process thus are produced 6-dehydro-11,17α,21-trihydroxy-retro-progesterone 21-acetate from 6-dehydro-11,17α-dihydroxy-retro-progesterone; 6-dehydro-6-methyl-17α,21-dihydroxy-retro-progesterone 21-acetate from 6-dehydro-6-methyl-17α-hydroxy-retro-progesterone retro-prednisolone 21-acetate from 1-dehydro-11,17α-dihydroxy-retro-progesterone; 2-fluoro-6-dehydro-17α,21-dihydroxy-retro-progesterone 21-acetate from 2-fluoro-6-dehydro-17α-hydroxy-retro-progesterone; 16-methyl-6-dehydro-17α,21-dihydroxy-retro-progesterone 21-acetate from 16-methyl-6-dehydro-17α-dihydroxy-retro-progesterone; 9-fluoro-retro-hydrocortisone 21-acetate from 9-fluoro-17α,11-dihydroxy-retro-progesterone and 2-methyl-17α,21-dihydroxy-retro-progesterone 21-propionate from 2-methyl-17α-hydroxy-retro-progesterone.

*Example 27*

A solution of 216 mg. of $K_2CO_3$ in 6 ml. of water was added to a suspension of 1.2 g. of 17α,21-dihyroxy-retro-progesterone 21-acetate in 30 ml. of methanol at 24° C. The mixture was then stirred at 24° C. for 2 hours. After half an hour the solid substance apparently began dissolving and after one hour the whole quantity was practically dissolved. Then neutralization was carried out with 1N acetic acid and the solution obtained was filtered off. The filtrate was collected in a constantly stirred solution of 9 g. of NaCl in 200 ml. of water. Then stirring was continued for half an hour at 0° C. After drying in a dessiccator on $CaCl_2$ 897.5 mg. of a substance was obtained, having a melting point of 201–208 (s)→220–221° C. (dec.) (Tottoli) or 240° C. (Kofler);

$E_{1cm}^{1\%}$ (241.5 mμ)=480; ε(241.5 mμ)=16,600

The filtrate yielded after extraction from methylene chloride a second fraction of 115 mg., so that the yield was substantially quantitative. Crystallization of 246 mg. of the 17α,21-dihydroxy-retro-progesterone thus obtained from methanol yielded 107 mg. having the following analytical values:

Melting point of 196.5(s)→203.5–217° C. (dec.) (Tottoli) or 240° C. (Kofler).

$E_{1cm}^{1\%}$ (242.5 mμ)=471; ε(242.5 mμ)=16,300

Calculated for $C_{21}H_{30}O_4$ (346.47): C, 72.80; H, 8.73; O, 18.47. Found: C, 72.63; H, 8.62; O, 18.78.

In the infrared spectrum inter alia bands were found at 3490, 3368, 1706, 1649, 1614, 1416, 1086, 1074, 1061, 1040 and 1006 cm.⁻¹.

All solvents were rendered free of oxygen as far as possible prior to use by evacuation and subsequent washing with nitrogen.

By this process thus are produced retro-hydrocortisone from retro-hydrocortisone 21-acetate; 9-fluoro-retro-prednisolone from 9-fluoro-retro-prednisolone 21-acetate; 9-fluoro-16-hydroxy-retro-prednisolone from 9-fluoro-16-hydroxy-retro-prednisolone 21-acetate; 9-fluoro-16-methyl-retro-prednisolone from 9-fluoro-16-methyl-retro-prednisolone 21-butyrate and 6-methyl-9-fluoro-retro-hydrocortisone from 6-methyl-9-fluoro-retro-hydrocortisone 21-trimethylacetate.

*Example 28*

5 g. of palladium on calcium carbonate (processed in accordance with Vogel's method, page 891) was prehydrated to saturation in 100 ml. of dioxane. The solvent was purified and dried as described by Fieser in "Experiments in Organic Chemistry," page 369.

After the addition of a solution of 3.12 g. of 17α-ethinyl-retro-testosterone in 250 ml. of dioxane (+50 ml. of dioxane for subsequent rinsing) hydration took place at room temperature under a slight excess pressure. The hydrogen (800 ml.) absorption stopped after shaking for 55 minutes.

The catalyst was then filtered off and washed with methylene-chloride. The filtrate was extracted, subsequent to dilution with water, from a mixture of methylene chloride and petroleum ether (1+1) and the collected extracts were washed with water. Drying on sodium sulphate, filtering and evaporating of the solvent yielded 3.37 g. of a resinous residue, which did not exhibit absorption between 220 and 350 mμ. This substance, dissolved in benzene, was arranged on a column of 100 g. of silica gel.

| Fraction | Eluant, 500 ml. | Weight, g. | M.P. after test-crystallization from ether+p.e. |
|---|---|---|---|
| 1 | Benzene | 0.02 | |
| 2 | id | 0.02 | |
| 3 | id | | |
| 4 | Benzene+½% ether | | |
| 5 | id | | |
| 6 | id | 0.02 | ⎫ ⎧123–125–126° C.¹ |
| 7 | id | 0.24 | A ⎨124–125° C. |
| 8 | Benzene+1% ether | 0.38 | ⎭ ⎩118–122–124.5° C. |
| 9 | id | 0.28 | 100–122–124.5° C. |
| 10 | id | 0.37 | 100–1123–125° C. |
| 11 | id | 0.29 | ⎫ 112–122–125° C. |
| 12 | id | 0.22 | ⎪ |
| 13 | id | 0.17 | ⎬ 108–120–125° C. |
| 14 | id | 0.14 | ⎪ |
| 15 | Benzene+3% ether | 0.17 | B ⎩ 115–125–127° C. |
| 16 | id | 0.20 | |
| 17 | id | 0.12 | 116–126–127° C. |
| 18 | id | 0.08 | 118–123–126° C. |
| 19 | Benzene+5% ether | 0.05 | 108–115–120° C. |
| 20 | id | 0.03 | |
| 21 | id | 0.03 | |

¹ In crude substance.

The fractions 6, 7 and 8 were combined, evaporated to dryness and the residue was crystallized at room temperature from a mixture of ether and petroleum-ether. Thus were produced 300 mg. of 17α-ethyl-5-retro-androstane-17-ol-3-one (A-isomer) having a melting point of 121 (s)—124–125° C. After crystallization to a constant melting point the following analytical values were found:

Melting point, 125–126.5° C.

The infrared absorption spectrum showed inter alia maxima at 3430, 1704, 1417, 1378, 1152, 1002 and 867 cm.⁻¹.

The substance does not exhibit absorption between 220 and 350 mμ.

Found: C, 78.78, 79.14; H, 10.64, 10.61. Calc. for $C_{21}H_{34}O_2$ (318.50): C, 79.19; H, 10.76.

In a similar manner the fractions 11 to 18 yielded by crystallization 828 mg. of the B-isomer having a melting point of 119 (s)—123.5–125° C.

After crystallization to obtain a constant melting point, the following analytical values were found:

Melting point, 125–126.5° C.

The infrared absorption spectrum showed inter alia maxima at 3465, 1708, 1383, 1275, 1145 and 995 cm.⁻¹.

The substance does not show absorption between 220 mμ and 350 mμ.

Found: C, 78.93, 79.21; H, 10.58, 10.62. Calc. for $C_{21}H_{34}O_2$ (318.50): C, 79.19; H, 10.76.

After mixing of the A- and B-isomers a distinct drop in melting point occurred.

By this process thus are produced the 5α- and 5β-isomers of 17α-propyl-retro-androstan-17-ol-3-one from 17α-propinyl-retro-testosterone, 2-methyl-17α-ethyl-retro-androstan-17-ol-3-one from 2-methyl-17α-vinyl-retro-testosterone and 11-hydroxy-17α-butyl-retro-androstan-17-ol-3-one from 11-hydroxy-17α-butinyl-retro-testosterone.

Example 29

About 15 ml. of the benzene of a solution of 12.5 g. of retro-progesterone and 1.25 g. of p-toluene-sulphonic acid in 300 mls. of absolute thiophene-free benzene was distilled off in a slow nitrogen flow until the distilled benzene became clear. Then 20 ml. of benzene was added and about 5 ml. was distilled off again. To the reaction mixture was then added 15 ml. of isopropenyl acetate and the assembly was subjected to slow distillation. To this end the test bulb was provided with a Vigreux column (length about 30 cm.). After heating for about 30 minutes the first drops of distillate came over by the first drops, after which in about 140 minutes 240 ml. of solvent was distilled off. By removing the test bulb from the heating mantle the reaction mixture cooled to room temperature within 30 to 45 minutes under a slow flow of nitrogen. The mixture was then poured out on about 250 ml. of ice, diluted with 250 ml. of ether and the organic liquid layers were subsequently washed three times with 250 ml. of ice cold saturated bicarbonate solution and five times with 200 ml. of ice water to neutral reaction. After drying on sodium sulphate the mixture was filtered and to the filtrate there was added 1% of the total volume of dry pyridine. Then the ether was distilled off under normal pressure, the benzene for the major part in the water-jet-pump vacuo and the last quantity of solvent was finally distilled off with the aid of an oil pump. Distillation was always carried out from a water bath of which the temperature was <60° C.

The resinous residue (15.3 g.) was crystallized from 15 ml. of methanol, to which previously 1% of dry pyridine was added, at −5° C., and finally at −25° C. Filtering and washing with cold methanol (−25° C.) yielded 9.61 g. of 3-enolacetate of retro-progesterone having a melting point of 74 (s)—82–87.5° C. (open tube) and 85 (s)—87–89° C. (vacuo). A few recrystallizations to a constant melting point yielded a product having the following analytical values:

Melting point, 90–92° C. (in vacuo).

The infrared absorption spectrum showed maximum at 1750, 1698, 1654, 1640, 1617 (the last three very weak), 1356, 1198, 1012, 919 and 879 cm.$^{-1}$.

$E_{1cm}^{1\%}$ ($\lambda$ max.=236 m$\mu$)=530 and 530 (methanol); ($\epsilon$ 236 m$\mu$)=18,900.

Found: C, 77.44, 77.42; H, 9.25, 9.23. Calc. for $C_{23}H_{32}O_3$ (356.51): C, 77.48; H, 9.05.

By this process thus are produced 3-enolacetates of 17α,21-dihydroxy-retro-progesterone 21-acetate, of 6-methyl-21-acetoxy-retro-progesterone, of 16-methyl-9α-fluoro-hydrocortisone 21-acetate, of 2-methyl-17α-acetoxy-retro-progesterone, of 1-dehydro-2-fluoro-17α-acetoxy-retro-progesterone, of 21-fluoro-retro-progesterone and 21-fluoro-17α-acetoxy-retro-progesterone.

Example 30

1.28 g. of potassium was dissolved at −80° C. in 50 ml. of dry, liquid ammonia, after which dry, pure acetylene was passed into the solution until discoloring occurred. Then a solution of 2.35 g. of retro-androsta-4,6-diene-3,17-dione in 70 ml. of a mixture of benzene and ether (2+1) was added in a nitrogen atmosphere. Then the mixture was stirred at −80° C. for 30 minutes. After the evaporation of the ammonia, decomposition and further processing were carried out with water. The 6-dehydro-17αethinyl-retro-testosterone thus obtained was chromatographed on silica gel and then recrystallized from acetonehexane.

This product had the following analytical values:
Melting point, 205–207° C.

$\epsilon$ ($\lambda$ max.=287 m$\mu$)=25,400

Found: C, 80.78, 80.94; H, 8.44, 8.56. Calc. for $C_{21}H_{28}O_2$: C, 81.24; H, 8.44.

The infrared spectrum showed inter alia bands at 3355, 3230, 1660, 1628, 1585, 1466, 1354, 1276, 1233, 1202, 1060, 1013 and 877 cm.$^{-1}$.

By this process there are produced 6-dehydro-7α-propinyl-retro-testosterone from retro-androsta-4,6-diene-3,17-dione; 6-dehydro-17α-butinyl-retro-testosterone from retro-androsta-4,6-diene-3,17-dione; 6-dehydro-6-methyl-17α-ethinyl-retro-testosterone from 6-methyl-retro-androsta-4,6-diene-3,17-dione and 2-fluoro-6-dehydro-17α-ethinyl-retro-testosterone from 2-fluoro-retro-androsta-4,6-diene-3,17-dione.

Example 31

A mixture of 6.6 g. of 21-iodo-retro-progesterone in 200 ml. of acetonitrile and 5.72 g. of silver fluoride precipitated on calcium fluoride was stirred for 25 hours at 45° C. in a nitrogen atmosphere. The reaction mixture was then filtered with sodium sulfate and washed with methylene chloride. The filtrate which was thoroughly washed with water was 21-fluoro-retro-progesterone.

The 21-fluoro-retro-progesterone was chromatographed on silica gel and then crystallized from ethanol and acetone.

This product had the following analytical values:
Melting point, 173–175° C.

$\epsilon$ ($\lambda$ max.=243 m$\mu$)=16,500

Found: C, 76.15, 75.94; H, 8.74, 8.83; F, 4.95, 4.91. Calc. for $C_{21}H_{29}O_2F$: C, 75.78; H, 8.79; F, 5.71.

The infrared spectrum showed inter alia bands at 1723, 1659, 1614, 1414, 1232, 996 and 860 cm.$^{-1}$.

This product also was produced by introducing perchlorylfluoride into a solution of the sodium enolate of 21-ethoxyoxalyl-retro-progesterone in dry methanol until a neutral solution was obtained. Then potassium acetate was added to the solution and boiling was carried out for 85 minutes, after which the substance was finally processed. The 21-fluoro-retro-progesterone thus obtained was identical to the preparation described above. By these processes the following 21-fluoro-derivatives are produced from their 21-iodo-or sodium enolates of their 21-ethoxy-oxalyl-derivatives:

6-dehydro-21-fluoro-retro-progesterone,
17α-acetoxy-21-fluoro-retro-progesterone,
6-dehydro-17α-acetoxy-21-fluoro-retro-progesterone,
6,21-difluoro-6-dehydro-retro-progesterone,
6,21-difluoro-6-dehydro-17α-acetoxy-retro-progresterone,
2,21-difluoro-6-dehydro-retro-progesterone,
2,21-difluoro-6-dehydro-17α-acetoxy-retro-progesterone,
6-methyl-6-dehydro-17α-acetoxy-21-fluoro-retro-progesterone,
2-methyl-6-dehydro-21-fluoro-retro-progesterone, and
11,17α-dihydroxy-21-fluoro-retro-progesterone 17-acetate.

Example 32

A mixture of 10.5 ml. of a 3.45 N sodium methylate solution in dry methanol, 70 ml. of anhydrous benzene and 3.2 ml. of dry ethanol was concentrated by evaporation under nitrogen to a volume of 30 ml. Then, while stirring, first 8.5 ml. of diethyl oxalate and then a solution of 10 g. of 6-dehydro-retro-progesterone in 70 ml. of benzene were added and the mixture was stirred for 90 minutes. After the addition of 400 ml. of anhydrous ether, stirring was continued for 45 minutes and finally filtering of the resultant sodium-enolate of 21-ethoxy-oxalyl-6-dehydro-retro-progesterone was carried out. After drying the weight of this compound was 12.2 g.

This sodium enolate was dissolved at −25° C. in 170 ml. of dry methanol, with stirring, in a nitrogen atmosphere. Then, while still stirring at said temperature, a solution of 7.2 g. of iodine in 170 ml. of methanol was added dropwise. After stirring for another 90 minutes 8.2 ml. of a 3.45 N sodium methylate solution in methanol was added and stirring was carried out at 0° C. for one hour. Within 45 minutes 1070 ml. of water was added in drops at 0° C. and 150 g. of NaCl was added and stirring was continued at 0° C. for 15 minutes. Filtering and drying yielded the 21-iodo-6-dehydro-retro-progesterone.

The 21-iodo-derivative thus obtained was washed with 540 ml. of acetone in a solution of 11.6 g. of potassium acetate in 130 ml. of water and 6 ml. of acetic acid. After boiling for 5 hours the acetone was distilled off in vacuo and extracted from methylene chloride. The 6-dehydro-21-acetoxy-retro-progesterone thus obtained was recrystallised in order of succession from ethanol, ethylacetate and acetone.

The analytical values of this compound were as follows:

Melting point, 194.5–197.5° C. $\epsilon$ ($\lambda$ max.$=286$ m$\mu$) $=25,500$.

Found: C, 74.08, 74.16; H, 8.15, 8.14. Calc. for $C_{23}H_{30}O_4$: C, 74.56; H, 8.16.

The infrared spectrum showed inter alia bands at 1747, 1723, 1654, 1617, 1578, 1414, 1235, 1072, 891, and 844 cm.$^{-1}$.

By this process there are produced 6-dehydro-retro-hydrocortisone 21 - acetate from 6 - dehydro-11,17$\alpha$-dihydroxy-retro-progesterone, 1,6 - bisdehydro-retro-hydrocortisone 21-acetate from 1,6-bisdehydro-11,17$\alpha$-dihydroxy-retro-progesterone, 6 - dehydro-16-methyl-retro-hydrocortisone 21-acetate from 6-dehydro-11,17$\alpha$-hydroxy-16-methyl-retro-progesterone and 6-methyl-6-dehydro-retro-hydrocortisone 21-acetate from 6-methyl-6-dehydro-11,17$\alpha$-dihydroxy-retro-progesterone.

*Example 33*

A solution of 500 mg. of bromine in 10 ml. of carbon tetrachloride was added dropwise into a solution of 937 mg. of 6-dehydro-retro-progesterone in 125 ml. of carbon tetrahydrochloride cooled to $-10°$ C. The addition took about 50 minutes. After the addition of 6 ml. of collidine the carbon tetrachloride was distilled off in vacuo and the residue was heated for 10 minutes at 140° C., in a nitrogen atmosphere. After processing the resultant 4-bromo - 6 - dehydro-retro-progesterone was crystallized from methanol.

The analytical values of this compound were:

Melting point, 121–122° C. (dec. in vacuo). $\epsilon$ ($\lambda$ max. $=301$ m$\mu$) $=21,500$.

Found: C, 63.95, 64.31; H, 7.13, 6.96; Br, 19.71, 19.30. Calc. for $C_{21}H_{27}O_2Br$: C, 64.45; H, 6.96; Br, 20.42.

The infrared spectrum showed inter alia bands at 1690, 1675, 1619, 1538, 1279, 1183, 961, and 793 cm.$^{-1}$.

If chlorine was used instead of bromine in this process, the 4-chloro-6-dehydro-retro-progesterone was obtained.

The analytical values of this compound were:

Melting point, 183° C. (s)—185–188° C. (vacuo). $\epsilon$ ($\lambda$ max.$=298$ m$\mu$)$=22,500$.

Found: C, 72.66, 72.39; H, 7.94, 7.96; Cl, 10.25, 10.25. Calc. for $C_{21}H_{27}O_2Cl$: C, 72.71; H, 7.84; Cl, 10.23.

The infrared spectrum showed inter alia bands at 1689, 1681, 1626, 1547, 1417, 1208, 939, 811 and 793 cm.$^{-1}$.

By this process there is produced: 4-chloro- and 4-bromo-6-dehydro-17$\alpha$-acetoxy-retro-progesterone from 6-dehydro-17$\alpha$-acetoxy-retro-progesterone, 4-chloro- and 4-bromo-6-dehydro-17$\alpha$-ethyl-retro-testosterone from 6-dehydro - 17$\alpha$ - ethyl-retro-testosterone, 4-chloro- and 4-bromo-6-dehydro-21-fluoro-retro-progesterone from 6-dehydro - 21 - fluoro-retro-progesterone, 4-chloro- and 4-bromo-6-dehydro-retro-hydrocortisone 21-acetate from 6-dehydro-retro-hydrocortisone 21-acetate.

*Example 34*

700 mg. of 6-chloro-retro-progesterone and 1 g. of chloranyl were boiled in 100 ml. of tert. butanol in a nitrogen atmosphere while stirring, for 30 hours. The resultant reaction mixture was poured into a solution of sodium dithionate and then extracted with ether. After crystallization of the resultant 6-chloro-6-dehydro-retro-progesterone from ethanol, crystals were obtained having the following analytical values:

Melting point, 165–166° C. $\epsilon$ ($\lambda$ max.$=288$ m$\mu$) $=19,500$.

Found: C, 72.73; H, 7.90; Cl, 10.32. Calc. for $C_{21}H_{27}O_2Cl$: C, 72.71; H, 7.84; Cl, 10.23.

The infrared absorption spectrum showed inter alia bands at 1704, 1658, 1613, 1584, 1415, 1230 and 885 cm.$^{-1}$.

By this process there is produced 6-chloro-t-dehydro-17$\alpha$-acetoxy-retro-progesterone from 6-chloro-17$\alpha$-acetoxy-retro-progesterone,
6-fluoro-6-dehydro-retro-progesterone from 6-fluoro-retro-progesterone,
6-fluoro-6-dehydro-17$\alpha$-acetoxy-retro-progesterone from 6-fluoro-17$\alpha$-acetoxy-retro-progesterone,
6-chloro-6-dehydro-17$\alpha$-ethyl-retro-testosterone from 6-chloro-17$\alpha$-ethyl-retro-testosterone,
6-chloro-6-dehydro-retro-hydrocortisone from 6-chloro-retro-hydrocortisone and 6-chloro-6-dehydro-9-fluoro-retro-prednisolone from 6-chloro-9-fluoro-retro-prednisolone.

*Example 35*

1.85 g. of 3-acetoxy-retro-pregna-3,5-diene-20-one were dissolved in 30 ml. of ether and a solution of 4 g. of potassium acetate in 60 ml. of 85% acetic acid was added. Then at 0° C., while stirring, a solution of 375 mg. of chlorine in 9.4 ml. of acetic acid was added in drops. After stirring for some time, 6-chloro-retro-progesterone was obtained, which was recrystallized from ethylacetate.

This compound had the following analytical values:

Melting point, 197–198.5° C. (vacuo). $\epsilon$($\lambda$ max$=236$ m$\mu$)$=15,000$.

Found: C, 72.51, 72.30; H, 8.53, 8.42; Cl, 9.86, 10.02. Calc. for $C_{21}H_{29}O_2Cl$: C, 72.29; H, 8.38; Cl, 10.16.

The infrared spectrum exhibits inter alia bands at 1700, 1668, 1620, 1415, 1362, 1232, 945, 879, 866 and 783 cm.$^{-1}$.

From the mother liquor was crystallized a substance which will probably be the 3,6,20-triketo-retro-pregnane.

Melting point, 201–203° C.

Found: C, 76.22, 76.22; H, 9.05, 9.07; O, 14.84, 14.98. Calc. for $C_{21}H_{30}O_3$: C, 76.32; H, 9.15; O, 14.53.

The infrared spectrum showed inter alia bands at 1720, 1703, 1357, 1423, 1265, 1227, 1218, 1192, 1155 and 1105 cm.$^{-1}$.

If bromine instead of chlorine was used in the foregoing process the 6-bromo-retro-progesterone was obtained.

The compound had the following analytical values:

Melting point, 138–140° C. (dec.). $\epsilon$($\lambda$ max$=238$ m$\mu$)$=12,450$.

Found: C, 64.00, 64.21; H, 7.51, 7.46; Br, 21.04, 21.01. Calc. for $C_{21}H_{29}O_2Br$: C, 64.12; H, 7.43; Br, 20.32.

The infrared spectrum showed inter alia bands at 1704, 1676, 1622, 1416, 1209, 944 and 873 cm.$^{-1}$.

By this process there is produced the 6-chloro or 6-bromo-derivatives of 17$\alpha$-acetoxy-retro-progesterone, of 17,21-dihydroxy-retro-progesterone 21-acetate, of retro-hydrocortisone 21-acetate, of 21-fluoro-retro-progesterone, of 9-fluoro-16-methyl-retro-hydrocortisone 21-acetate by reacting the 3-enolacetates of the compounds mentioned above with chlorine or bromine.

*Example 36*

5 g. of sodium boric hydride were dissolved in a solution of 3.8 ml. of 2 N caustic soda lye in 35 ml. of water. To this solution there were added 190 ml. of ethanol. The hydride solution thus obtained was added dropwise for 15 minutes, into a solution of 5 g. 6-dehydro-retro-progesterone in a nitrogen atmosphere at room temperature. After stirring for two hours more the reaction mixture was decomposed with ~8 ml. of acetic acid, which was added in drops until the pH value was about 5. Then the solution was diluted with 1.5 l. of water and the reduction product was absorbed in methylene chloride. Further processing yielded the retro-pregna-4,6-diene-3,20-diol- $$E_{1\,cm.}^{1\%} \ (239.5 \ m\mu) = 639$$

The diol was dissolved in 500 ml. of dry, thiophene-free benzene and the solution was boiled, after the addition of 50 gs. of brownstone, for 12 hours, while stirring. After filtering through sodium sulfate, the product was thoroughly washed with warm benzene and methylene chloride. After the evaporation of the solvent, the residue was crystallized from acetone 3.27 g. of retro-pregna-4,6-diene-20-ol-3-one was thus obtained.

Recrystallization of a small quantity of this product to obtain a constant melting point yielded a pure compound having the following analytical values:

$$E_{1\,cm.}^{1\%} \ (287 \ m\mu) 830 \ (methanol)$$

Melting point, 198–199.5° C.
Found: C, 80.18, 80.18; H, 9.83, 9.74; O, 10.55, 10.49. Calc. for $C_{21}H_{30}O_2$: C, 80.20; H, 9.62; O, 10.18.

The infrared spectrum showed inter alia bands at 3425, 1649, 1620, 1581, 1417, 1275, 1231, 1153, 1020 and 882 cm.$^{-1}$.

From the mother liquor there was obtained by crystallization from methanol the second $C_{20}$-isomer. After recrystallization this substance had the following analytical values:

Melting point, 173–175° C.

$$E_{1\,cm.}^{1\%} \ (287 \ m\mu) = 830 \ (methanol)$$

Found: C, 80.11, 80.26; H, 9.66, 9.73; O, 10.55, 10.67. Calc. for $C_{21}H_{30}O_2$: C, 80.20; H, 9.62; O, 10.18.

By this process there is produced: 6-methyl-retro-pregna-4,6-diene-20-ol-3-one from 6-methyl-6-dehydro-retro-progesterone, 6-fluoro-retro-pregna-4,6-diene-20-ol-2-one from 6-fluoro-6-dehydro-retro-progesterone, retro-pregna-4,6-diene-17,20-diol-3-one from 6-dehydro-17α-hydroxy-retro-progesterone, 16-methyl-retro-pregna-4,6-diene-20-ol-3-one from 6-dehydro-16-methyl-retro-progesterone.

*Example 37*

455 ml. of ethyl formate and 1.37 g. of sodium-hydride were added to a solution of 5 gs. of retro-pregna-4-ene-20-ol-3-one in 100 ml. of dry benzene. After three days at room temperature in a nitrogen atmosphere the sodium salt of the hydroxymethylene compound was filtered off and washed thoroughly with acetone and ether.

The sodium salt was dissolved in water, the aqueous solution was thoroughly extracted with ether and after evaporation of the ether in the water layer in vacuo the reaction mixture was acidified with 5% of hydrochloric acid. The precipitate was filtered off, washed thoroughly with water and dried in vacuo. Recrystallization of this precipitate from ether at —25° C. yielded the 2-hydroxymethylene-retro-pregn-4-ene-20-ol-3-one having the following analytical values:

Melting point, 94–99° C. $[\alpha]_D^{21} = -155°$ C. (EtOH).

| λ | ε |
|---|---|
| Weak acid: | |
| 302 mμ | 8,250 |
| 254 mμ | 13,750 |
| Weak alkaline: 242 mμ | 19,500 |

The infrared absorption spectrum showed inter alia maxima at 3520, 3210, 1675, 1645, 1626, 1205, 1104, 1003 and 885 cm.$^{-1}$. By this process there is produced: the 2-hydroxymethylene-derivatives of 17α-acetoxy-retro-pregn-4-ene-20-ol-3-one, of retro-pregna-4,6-diene-20-ol-3-one, of 17α-acetoxy-retro-pregna-4,6-diene-20-ol-3-one, of 17α-acetoxy-6-methyl-retro-pregna-4,6-diene-20-ol-3-one, of 17α-acetoxy-6-fluoro-retro-pregna-4,6-diene-20-ol-3-one and of 17α-acetoxy-6-chloro-retro-pregna-4,6-diene-20-ol-3-one.

*Example 38*

A solution of 2 g. of retro-progesterone in 40 ml. of tetra-hydrofurane was added dropwise while stirring, into a solution of 500 mg. of lithium-aluminum hydride in 50 ml. of tetrahydrofurane in a nitrogen atmosphere. The mixture was then boiled for one hour. Then the reaction mixture was carefully decomposed under cooling with ice by adding 5 ml. of ethyl acetate, followed by a saturated sodium sulphate solution and finally solid sodium sulphate. After filtering, the filtrate was evaporated to dryness, and 1.91 g. of a colorless resin was obtained. The resin retro-pregn-4-ene-3,20-diol did not show ultraviolet absorption and was dissolved without purification in 500 ml. of benzene. To the resultant solution was then added 20 g. of brownstone and the mixture was boiled overnight. Filtering with sodium sulphate and washing with boiling benzene yielded 1.69 g. of retro-pregn-4-ene-20-ol-3-one. Repeated crystallization from acetone+hexane yielded finally a pure preparation having the following analytical values:

Melting point, 174–176° C.

$$E_{1\,cm.}^{1\%} \ (242.5 \ m\mu) = 508$$

Found: C, 79.34, 79.26; H, 10.15, 10.19; O, 10.39, 10.35. Calc. for $C_{21}H_{32}O_2$: C, 79.69; H, 10.20; O, 10.11.

The infrared spectrum showed inter alia bands at 3408, 1659, 1613, 1416, 1240, 1170, 1110, 1003, 923, 880 and 862 cm.$^{-1}$.

By this process there is produced: retro-pregn-4-ene-17,20-diol-3-one from 17α-hydroxy-retro-progesterone, 6-methyl-retro-pregn-4-ene-20-ol-3-one from 6-methyl-retro-progesterone, 9-fluoro-retro-pregn-4-ene-11,20-diol-3-one from 9-fluoro-11-hydroxy-retro-progesterone and retro-pregn-4-ene-16,20-diol-3-one from 16-hydroxy-retro-progesterone.

*Example 39*

1 g. of 6-dehydro-retro-progesterone was dissolved in 10 ml. of dry methylene chloride and the solution, after cooling to 0° C. was added to 15 ml. of ethanolic hydrochloric acid of 0° C. (52 g. of hydrochloric acid gas dissolved in 100 ml. of dry ethanol). The reaction mixture was kept for 30 minutes at 0° C. and was diluted with 15 ml. of dry ethanol of —25° C. and was again kept at 0° C. for 30 minutes. After pouring out into ice water the substance was further processed and the resultant 3-ethoxy-retro-pregna-3,5,7-triene-20-one was crystallized from methanol. The analytical values of this compound were:

Melting point, 115–116° C. (vacuo).
(320 mμ)=20,000. Shoulders at 310 and 335 mμ. (215 mμ)=9,000.
Found: C, 80.73, 80.71; H, 9.54, 9.66. Calc. for $C_{23}H_{32}O_2$: C, 81.13; H, 9.48.

The infrared absorption spectrum showed inter alia bands at 1710, 1646, 1619, 1565, 1236, 1174 and 846 cm.$^{-1}$.

This process may be used to produce 3-ethoxy-17α-acetoxy-retro-pregna-3,5,7-triene-20-one from 17α-acetoxy-6-dehydro-retro-progesterone, 3-ethoxy-17,21-dihydroxy-retro-pregna-3,5,7-triene-20-one from 17,21-dihydroxy-6-dehydro-retro-progesterone or 3-cyclopentyloxy-17α-acetoxy-retro-pregna-3,5,7-triene-20-one from 17α-acetoxy-6-dehydro-retro-progesterone, 3-cyclohexyloxy-11,17,21-trihydroxy-retro-pregna-3,5,7-triene-20-one from 6-dehydro-retro-hydrocortisone and 3-benzyloxy-17α-ethyl-retro-androsta-3,5,7-triene-17-ol from 6-dehydro-17α-ethyl-retro-testosterone.

Example 40

7.5 g. of 6-chloro-retro-progesterone was then dissolved in 200 ml. of acetic acid and to the solution there were added 21 g. of freshly melted potassium acetate. The mixture was then boiled for 4½ hours in a nitrogen atmosphere. The mixture was then cooled and poured out on 1 l. ice. The resultant 2-acetoxy-retro-progesterone was separated out by extraction with ether. By chromatography on 100 g. of silica gel, elution being carried out with benzene+increasing quantities of ether, the compound was obtained in a substantially pure state. Crystallization from ethanol yielded the pure substance having the following analytical values:

Melting point, 195.5–197° C. $\epsilon$ ($\lambda$ max=242.5 m$\mu$)=15,800.

Found: C, 74.09; H, 8.54. Calc. for $C_{23}H_{32}O_4$: C, 74.16; H, 8.66.

The infrared spectrum showed bands inter alia at 1746, 1695, 1622, 1237, 1218, 1047 and 879 cm.$^{-1}$.

By this process there is produced 2,17-diacetoxy-retro-progesterone from 6-bromo-17α-acetoxy-retro-progesterone, 2,17α,21-trihydroxy-retro-progesterone 2,21-diacetate from 6-chloro-17α,21-dihydroxy-retro-progesterone 21-acetate, 2-acetoxy-retro-hydrocortisone from 6-bromo-retro-hydrocortisone, 2-acetoxy-21-fluoro-retro-progesterone from 6-bromo-21-fluoro-retro-progesterone and 2-acetoxy-16-methyl-retro-hydrocortisone from 6-chloro-16-methyl-retro-hydrocortisone.

Example 41

1.5 g. of 3-acetoxy-retro-pregna-3,5-diene-20-one was dissolved in 66 ml. of ethyl acetate, containing 14.4 mg. of monoperphthalic acid per millilitre. After standing 17 hours at +5° C. in darkness the solution was diluted with ether and washed with sodium bicarbonate and water. 6-hydroxy-retro-progesterone was thus produced which was dissolved in dry pyridine and esterified with acetic acid anhydride by keeping the mixture at room temperature for one hour. Further processing yielded the 6-acetoxy-retro-progesterone, which was crystallized from ethanol.

The analytical values of this substance were:

Melting point, 177–178.5° C. $\epsilon$($\lambda$ max=238 m$\mu$)=15,600.

Found: C, 73.79, 73.36; H, 8.56, 8.56. Calc. for $C_{23}H_{32}O_4$: C, 74.16; H, 8.66.

The infrared absorption spectrum showed bands inter alia at 1741, 1693, 1666, 1620, 1419, 1234, 1060, 1040 and 870 cm.$^{-1}$.

By this process there is produced 6,17α-diacetoxy-retro-progesterone from 3,17α-diacetoxy-retro-pregna-3,5-diene-20-one, 6,17α,21-trihydroxy-retro-progesterone 6,21-diacetate from 3,17α,21-trihydroxy-retro-pregna-2,5-diene-20-one 3,21-diacetate and 6-butyroxy-17α-ethyl-retro-testosterone from 3-acetoxy-17α-ethyl-retro-androsta-3,5-diene-17-ol.

Example 42

A mixture of 4.27 g. of 6-dehydro-17α-hydroxy-retro-progesterone, 95 ml. of capronic acid anhydride and 5.225 g. of p-toluene-sulphonic acid was shaken at room temperature in a nitrogen atmosphere for 15 hours. Then 95 ml. of dry ethanol and 1.42 ml. of concentrated hydrochloric acid were added and the mixture was boiled in nitrogen for one hour. After cooling, 95 ml. of pyridine was added and the product was evaporated to dryness. Extraction from methylene chloride yielded the 6-dehydro-17α-hydroxy-retro-progesterone 17-caproate, which was chromatographed on silica gel and crystallized from ether+hexane.

The analytical values of this compound were:

Melting point, 110–112.5° C.

$E_{1\,cm.}^{1\%}$ ($\lambda$ max.=284.5 m$\mu$)=566

The infrared spectrum showed bands inter alia at 1732, 1714, 1660, 1630, 1588, 1413, 1355, 1245, 1095, 1070, 1048 and 879 cm.$^{-1}$.

Example 43

Into a solution of 13.2 g. of 3,17-diacetoxy-retro-pregna-3,5-dien-20-one in 950 ml. of dioxane and 40 ml. of water perchlorylfluoride gas was introduced at room temperature for about one hour. Working up was performed by pouring out into ice water and extraction with methylene chloride. The crude fluorinated product was crystallised from acetone-hexane at —5° C. yielding 6α-fluoro-17α-acetoxy-retro-progesterone with melting point 177–179° C. $\epsilon$($\lambda$ max=234 m$\mu$)=12,700.

Found: C, 70.77, 71.01; H, 8.12, 8.08; F, 5.39, 4.99. Calc. for $C_{23}H_{31}FO_4$ (390.48): C, 70.75; H, 8.00; F, 4.86.

The infrared absorption spectrum showed bands inter alia at 1731, 1719, 1684, 1416, 1262, 1053, 1015, 967 and 882 cm.$^{-1}$.

From the mother liquor 6β-fluoro-17α-acetoxy-retro-progesterone was crystallized, which compound also could be prepared by acid isomerisation of the 6α-compound.

The melting point after recrystallization from acetone was 197.5–198.5° C. $\epsilon$($\lambda$ max=235 m$\mu$)=15,900.

Found: C, 71.25; H, 8.12. Calc. for $C_{23}H_{31}FO_4$ (390.48): C, 70.75; H, 8.00.

The infrared absorption spectrum showed inter alia bands at 1737, 1713, 1668, 1620, 1421, 1253 and 887 cm.$^{-1}$.

The remaining resin was chromatographed through a column of silica gel. Eluation with a mixture of petroleum ether-benzene (1:1) containing from 9–15% of acetone yielded 3,6,20-trioxo-retro-pregnane-17α-ol 17-acetate.

Melting point, 239 (s)—241–244° C. No absorption in the ultraviolet region was observed.

Found: C, 70.36, 70.51; H, 8.64, 8.51. Calc. for $C_{23}H_{32}O_5$ (388.5): C, 71.10; H, 8.30.

The infrared absorption spectrum showed bands inter alia at 1734, 1712, 1416, 1256 and 965 cm.$^{-1}$.

Example 44

25 g. of 6-dehydro-retro-progesterone were dissolved at 0° C. into 1100 ml. of a solution of perbenzoic acid in chloroform (44 mg./mol). After standing at room temperature for 45 hours the reaction mixture was worked up. Weight: 18.9 g. Chromatography over a column of silica gel and elution with mixtures of petroleum ether and methylene dichloride (from 1 to 0.75–0.85) gave a fraction which yielded after several recrystallizations from ethylacetate 6,7-oxido-retro-progesterone with a melting point of 186 (s)—187–190° C.

$\epsilon$($\lambda$ max=241 m$\mu$)=14,000.

Found: C, 76.54 76.83; H, 8.69, 8.80; O, 15.23, 14.93. Calc. for $C_{21}H_{28}O_3$ (328.45): C, 76.79; H, 8.59; O, 14.61.

The infrared absorption spectrum showed bands inter alia at 1703, 1677, 1627, 1354, 1233, 953, 881 and 808 cm.$^{-1}$.

Elution with methylene dichloride containing 7.5% of acetone gave a compound melting at 194–197° C. (dec.). According to the analytical data 6-chloro-7-hydroxy-retro-progesterone has been obtained, formed by splitting up the 6,7-epoxido bond during chromatography (silica gel+methylene dichloride→hydrochloric acid). $\epsilon$($\lambda$ max=237.5 m$\mu$)=13,800.

Found: C, 69.25, 69.29; H, 8.05, 8.23; O, 13.50, 13.46. Calc. for $C_{21}H_{29}O_3Cl$ (364.9): C, 69.12; H, 8.01; O, 13.16.

The infrared absorption spectrum showed bands inter alia at 3335, 1697, 1653, 1619, 1417, 1233, 1060, 895, 882, 792 and 772 cm.$^{-1}$.

Reacting the 6-chloro-7-hydroxy compound with hydrochloric acid in a mixture of chloroform and acetic acid at room temperature for 3 hours yielded 6-chloro-6- dehydro-retro-progesterone. The same compound was obtained when the same reaction was applied to 6,7-oxido-retro-progesterone.

*Example 45*

A solution of 4 g. of 6β-fluoro-retro-progesterone and 4 g. of dichlorodicyanobenzoquinone in 100 ml. of dry benzene was refluxed in a nitrogen atmosphere in the presence of 0.4 g. of p-nitrophenol as a catalyst for 7½ hours. Working up yielded 2.0 g. of 1-dehydro-6β-fluoro-retro-progesterone which was recrystallised from ethylacetate. The crystals melted at 204 (s)—208–211° C. $\epsilon$($\lambda$ max=242 m$\mu$)=16,500.

Found: C, 76.11, 75.99; H, 8.37, 8.42; F, 6.26. Calc. for $C_{21}H_{27}O_2F$ (330.43): C, 76.32; H, 8.24; F, 5.75.

The infrared spectrum yielded bands inter alia at 1699, 1660, 1628, 1606, 1413, 1199, 1158, 1032, 892, 819 and 697 cm.$^{-1}$.

*Example 46*

2.5 g. of 17α-acetoxy-retro-progesterone was dissolved into 125 ml. of dry methanol at 0° C., after which 6 g. of cupric bromide were added to the solution. After standing at the same temperature for 6 days the precipitate was filtered off and the organic material dissolved into a mixture of benzene and ethylacetate. This solution was filtered through 30 g. of silica gel and the filtrate evaporated to dryness. Recrystallization from ethanol yielded 6-dehydro-6-methoxy-17α-acetoxy-retro-progesterone with a melting point of ~275–280° C.

$E_{1cm.}^{1\%}$ ($\lambda$ max.=247 m$\mu$)=184

$E_{1cm.}^{1\%}$ ($\lambda$ max.=305 m$\mu$)=387

Found: C, 72.01; H, 8.22. Calc. for $C_{24}H_{32}O_5$ (400.5): C, 71.97; H, 8.05.

The infrared absorption spectrum showed bands inter alia at 1738, 1715, 1658, 1635, 1583, 1418, 1362, 1250, 1219, 1077, 877 and 707 cm.$^{-1}$.

*Example 47*

A solution of 3 g. of 6-dehydro-retro-progesterone in 3 ml. of thio acetic acid was refluxed in a nitrogen atmosphere for 2½ hours. Then the solvent was evaporated in vacuo and the residue recrystallized from methanol and from acetone-hexane at −5° C. The 7-acetyl-thio-retro-progesterone obtained melted at 133–135° C. $\epsilon$($\lambda$ max=240 m$\mu$)=18,400.

Found: C, 71.08, 70.85; H, 8.50, 8.40; S, 8.32, 8.36. Calc. for $C_{23}H_{32}O_3S$ (388.55): C, 71.10; H, 8.30; S, 8.25.

The infrared absorption spectrum showed bands inter alia at 1690, 1663, 1612, 1415, 1356, 1235, 1137, 1110, 952 and 879 cm.$^{-1}$.

*Example 48*

To a solution of 3 g. of retro-progesterone in 125 ml. of dry methanol at 0° C. was added 8.5 g. of cupric bromide. After standing at 0° C. for 10 days the precipitate was filtered off. Purification by recrystallization yielded 6-dehydro-6-methoxy-retro-progesterone with a melting point of 206–208° C. $\epsilon$($\lambda$ max=247 m$\mu$)=7,600. $\epsilon$($\lambda$ max=307 m$\mu$)=15,500.

Found: C, 76.72, 76.87; H, 8.89, 9.02; O, 14.75, 14.41. Calc. for $C_{22}H_{34}O_3$ (342.46): C, 77.15; H, 8.85; O, 14.02.

The infrared absorption spectrum showed bands inter alia at 1706, 1660, 1636, 1587, 1421, 1218, 1081, 886 and 846 cm.$^{-1}$.

*Example 49*

(a) To a boiling solution of 3 g. of retro-androst-4-ene-3,17-dione in 30 ml. of dry methanol 1.6 ml. of freshly distilled pyrrolidine was added, after which boiling was continued for 10 minutes. A slow stream of nitrogen was passed over the solution during the process. The enamine had been allowed to crystallize, also in a nitrogen atmosphere, at room temperature for one hour and finally at −25° C. for about 16 hours. Suction was followed by washing with methanol of −25° C. and drying in a high vacuo. Yield 3.31 g. of 3-(N-pyrrolidino)-retro-androsta-3,5-dien-17-one with $E_{1cm.}^{1\%}$ ($\lambda$ max.=275 m$\mu$)=543

The substance could be stored at −25° C. in a nitrogen atmosphere and with exclosure of light without decomposition for a rather long time. It was used without further purification for the preparation of 17α-alkyl-retro-testosterones by means of Grignard reactions.

(b) A mixture of 1.0 g. of magnesium and 10 ml. of diethyl ether was cooled to 0° C. in a nitrogen atmosphere. The ether used as a solvent for the reaction was dried and purified by boiling with sodium and benzophenone according to the process described by Kharasch and Reinmuth, Grignard Reactions of Nonmetallic Substances, page 25.

Then, while stirring, a solution of 3.7 g. of freshly distilled 2-methallylchloride in 10 ml. diethyl ether was dropped into the mixture in the course of 10 minutes. The dropping funnel was washed with 5 ml. of diethylether.

After stirring at 0° C. for 2 hours a suspension of 3.3 g. of powdered 3-(N-pyrrolidino)-retro-androsta-3,5-dien-17-one in 100 ml. of diethyl ether was gradually added to the reaction mixture. Stirring was continued at room temperature for one hour and at the boiling temperature for 5 hours, respectively.

Then the reaction mixture was allowed to stand overnight, without stirring, under nitrogen, after which 50 ml. of a saturated solution of ammonium chloride were added. Stirring for one hour and distilling off the diethyl ether in vacuo gave a residue, which was washed with 100 ml. of a 2 N potassium hydroxide solution. The residue was then taken up in 200 ml. of methanol. To this solution were added 20 ml. of a 2 N potassium hydroxide solution, after which the mixture was stirred at 50° C. for 45 minutes. Thereupon the reaction mixture was neutralized by the addition of 40 ml. of acetic acid, after which the methanol was distilled off in vacuo. To the residue 1 l. of water was added and the organic material was taken up in a mixture of methylene dichloride and petroleum ether. The combined organic layers were washed with water (twice), 2 N potassium hydroxide (three times) and finally with water until neutral. The solution was dried over sodium suphate and filtered, after which the solvents were removed by distillation (finally in vacuo).

The residue (3.01 g.) was recrystallized from methanol at −25° C., which procedure gave 2.52 g. of 17α-(2′-methallyl)-retro-testosterone with a melting trajectory of 85—91–93°. Repeated recrystallization gave 1.66 g. with an unchanged melting point. Development of gas during the melting indicated that crystal solvent was present in the substance. Thin-layer chromatography indicated that the first crystallizate was already a fairly pure substance.

A small quantity was heated in a high vacuo at 55° C. in the presence of phosphorus pentoxide for several hours and then recrystallized from diethyl ether.

Melting point, 106–108° C.

$E_{1cm.}^{1\%}$ ($\lambda$ max.=242.5 m$\mu$)=483

Found: C, 80.80, 80.45; H, 10.10, 9.83. Calc. for $C_{23}H_{34}O_2$ (342.52): C, 80.65; H, 10.00.

The infrared absorption spectrum showed bands, inter alia, at 3490, 3068, 1671, 1616, 1418, 1074, 1002, 884 and 863 cm.$^{-1}$.

*Example 50*

(a) A mixture of 100 g. of methyl bromide and 100 ml. of tetrahydrofuran was added slowly to a stirred mixture of 25 g. of magnesium and 100 ml. of tetrahydrofuran in a nitrogen atmosphere. The reaction mixture boiled gently during the addition of the bromide. Boiling was then continued by heating for half an hour, after which the "Grignard"-solution was added to a solution of 5 g. of cuprous chloride (CuCl) in 500 ml. of tetrahydrofuran.

The thus obtained reaction mixture was then added, while stirring and cooling with ice-water, to a solution of 60 g. of isolumisterone (lumista-4,6,22-trien-3-one) and 6 g. of cuprous chloride in 500 ml. of tetrahydrofuran in the course of 20 minutes.

After stirring was continued at room temperature for 3½ hours, the reaction mixture was poured out into a mixture of diluted hydrochloric acid and ice. The organic material was taken up in methylene dichloride and the combined extracts were washed consecutively with 2 N hydrochloric acid, water, 2 N sodium hydroxide solution and water until a neutral washing was obtained. The methylene dichloride solution was dried over sodium sulphate, filtered and the solvent evaporated. Recrystallization from petroleum ether (B.P. 40–60° C.) at −5° C. yielded 29 g. of 7-methyl-lumista-4,22-trien-3-one with a melting point of 92–94° C. Concentration of the mother liquor gave a second crop of 12 g. melting at 89–91° C.

The analytically pure compound showed the following data:

Melting point, 94.5–95.5° C.

$\epsilon(\lambda \max = 243\ m\mu) = 17,400.$ $[\alpha]_D^{22} = -150.5°$ C. (CHCl$_3$).

Found: C, 84.44, 84.44; H, 11.10, 11.23. Calc. for C$_{29}$H$_{46}$O (410.69): C, 84.81; H, 11.29.

The infrared spectrum showed bands inter alia at 1663, 1612, 1415, 1227, 969 and 881 cm.$^{-1}$.

(b) A solution of 10 g. of 7-methyl-lumista-4,22-dien-3-one in 250 ml. of methylene dichloride and 25 ml. of pyridine was ozonised at −80° C. for 66 minutes (0.57 mmol of ozone/minute). The ozonide was decomposed with zinc and acetic acid. Working up yielded 3-keto-7-methyl-retro-bisnorchol-4-en-22-al with a melting point of 161.5–162° C. (in vacuo). $[\alpha]_D^{23} = -148°$ C. $\epsilon(\lambda \max = 243\ m\mu) = 17,100.$ Found: C, 81.05, 80.94; H, 10.14, 9.97. Calc. for C$_{23}$H$_{34}$O$_2$ (342.42): C, 80.68; H, 10.01.

The infrared absorption spectrum showed bands inter alia at 1724, 1671, 1615, 1415, 1230 and 875 cm.$^{-1}$.

(c) A solution of 4.65 g. of 3-keto-7-methyl-retro-bisnorchol-4-en-22-al in 100 ml. of dry benzene was boiled in the presence of 2 ml. of piperidine and 2 mg. of p-toluene suphonic acid for 5 hours. The refluxing benzene was dried by means of barium oxide. Evaporation of the solvent in vacuo and recrystallization from dry ethanol yielded 7 - methyl - 22 - (N - piperidyl)-retro-bis-norchola-4,20(22)-dien-3-one with a melting point of 152 (s)—153.5–154.5° C. (in vacuo). $[\alpha]_D^{23} = -120°$ C. $\epsilon(\lambda \max = 242\ m\mu) = 20,100.$ Found: C, 81.63, 81.87; H, 10.50, 10.69; N, 3.35, 3.42. Calc. for C$_{28}$H$_{43}$NO (409.65): C, 82.10; H, 10.58; N, 3.42.

The infrared absorption spectrum showed bands inter alia at 1671, 1616, 1415, 1224, and 872 cm.$^{-1}$.

(d) A solution of 1.96 g. of 7-methyl-22-(N-piperidyl)-retro-bisnorchola-4,20(22)-dien-3-one in 32 ml. of dry benzene was added, while stirring, to a solution of 3.2 g. of sodium dichromate in 32 ml. of acetic acid and 20 ml. of dry benzene at −5° C. in the course of 20 minutes. Stirring was continued at the same temperature for 2 hours and worked up. The 7-methyl-retro-progesterone obtained melted at 206–208° C. $[\alpha]_D^{25} = -57°$ C. (CHCl$_3$). $\epsilon(\lambda \max = 243\ m\mu) = 16,400.$ Found: C, 80.08, 80.07; H, 9.85, 9.86. Calc. for C$_{22}$H$_{32}$O$_2$ (328.50): C, 80.43; H, 9.82.

The infrared absorption spectrum showed bands inter alia at 1698, 1667, 1614, 1417, 1230 and 878 cm.$^{-1}$.

*Example 51*

6.4 g. of powdered 3-(N-pyrrolidino)-retro-androsta-3,5-dien-17-one in 100 ml. of dry diethyl ether were added to a "Grignard" mixture obtained by reacting 2.0 g. of magnesium in diethyl ether with 6.2 g. of allylchloride at 0° C. The reaction and working up were performed as described in Example 49 for the preparation of the corresponding 17α-(2′-methallyl) compound.

The 17α-allyl-retro-testosterone obtained melted at 74–78° C.

$E_{1\ cm.}^{1\%}\ (\lambda \max = 242.5\ m\mu) = 500$

Found: C, 79.10, 17.11; H, 9.88, 10.05; O, 11.37, 11.25. Calc. for C$_{22}$H$_{32}$O$_2$ (328.50): C, 80.43; H, 9.82; O, 9.75.

The compound contained crystal-solvent (probably water).

The infrared absorption spectrum showed bands inter alia at 3400, 1660, 1616, 1418, 1231, 1065, 1023, 991, 908 and 895 cm.$^{-1}$.

*Example 52*

To a mixture of 3.3 g. of trimethylacetic acid and 1 ml. of trifluoroacetic anhydride at 80° C. was added 1 g. of 6 - dehydro - 17α - hydroxy - retro-progesterone. While stirring in a nitrogen atmosphere, heating at that temperature was continued for 45 minutes. Working up gave a dark-colored resin of 6-dehydro-17α-hydroxy-retro-progesterone 17-pinalate, which was purified by means of chromatography through silica gel. The pure compound melted at 210 (s)—214–216° C.

$E_{1\ cm.}^{1\%}\ (\lambda \max = 286\ m\mu) = 621$

Found: C, 75.37, 75.13; H, 9.50, 9.25. Calc. for C$_{26}$H$_{36}$O$_4$ (412.58): C, 75.69; H, 8.80.

The infrared absorption spectrum showed bands inter alia at 1723, 1664, 1628, 1585, 1415, 1153 and 888 cm.$^{-1}$.

*Example 53*

A solution of 4.0 g. of 17α-acetoxy-retro-progesterone and 2.7 g. of dichlorodicyano benzoquinone in 200 ml. of dry benzene was refluxed in a nitrogen atmosphere for 15 hours. After cooling to room temperature the mixture, after dilution with 1 l. of benzene, was poured out into 3 l. of water. Working up and chromatography through silica gel gave the pure 1-dehydro-17α-acetoxy-retro-progesterone which melted at 183–184.5° C.

$E_{1\ cm.}^{1\%}\ (\lambda \max = 242.5\ m\mu) = 409$

Found: C, 74.65, 74.53; H, 8.54, 8.47. Calc. for C$_{23}$H$_{30}$O$_4$ (370.49); C, 744.56; H, 8.16.

The infrared absorption spectrum showed bands inter alia at 1731, 1714, 1661, 1625, 1605, 1256 and 894 cm.$^{-1}$.

*Example 54*

To a suspension of 0.8 g. of 17α-ethinyl-retro-testosterone in 8 ml. of acetic anhydride was added, while stirring and cooling, in a nitrogen atmosphere a solution of 0.5 g. of p-toluene sulphonic acid in 5 ml. of acetic anhydride in the course of 10 minutes. Stirring was continued at room temperature for 5 hours, after which the excess of anhydride was decomposed by stirring the reaction mixture with water. The resin obtained, presumably containing a certain amount of 3-enolacetate, was heated at boiling temperature after dissolving it in 2 ml. of methanol and 0.2 ml. concentrated hydrochloric acid solution.

Working up and recrystallization from acetone gave 17α-ethinyl-retro-testosterone 17-acetae with a melting point of 180 (s)—183–184° C.

$\epsilon(\lambda \max = 242\ m\mu) = 16,500.$

Found: C, 78.12, 77.79; H, 8.78, 8.74; O, 13.47, 13.50. Calc. for C$_{23}$H$_{30}$O$_3$ (354.49): C, 79.92; H, 8.53; O, 13.54.

The infrared absorption spectrum showed bands inter alia at 3242, 1751, 1663, 1616, 1418, 1246, 1221, 1020 and 869 cm.$^{-1}$.

Example 55

Microbiological hydroxyation of retro-progesterone yielded 16α-hydroxy-retro-progesterone with a melting point of 172.5–174.5° C. $[\alpha]_D = -92.3°$ C. (CHCl$_3$). $\epsilon$ ($\lambda$ max = 242 m$\mu$) = 16,100.

Found: C, 76.2; H, 9.2. Calc. for C$_{21}$H$_{30}$O$_3$: C, 76.32; H, 9.15.

The infrared absorption spectrum showed bands inter alia at 3450, 1698, 1665, 1614, 1417, 1086, 1049, 1013 and 896 cm.$^{-1}$.

Example 56

Dehydration of 16α-hydroxy-retro-progesterone in boiling benzene in the presence of a trace of p-toluene sulphonic acid gave 16-dehydro-retro-progesterone with a melting point of 157 (s)—165–167° C.

$\epsilon$($\lambda$ max = 241 m$\mu$) = 25,400.

The infrared absorption spectrum showed bands inter alia at 1663, 1616, 1579, 1233, 1021, 862 and 824 cm.$^{-1}$.

Example 57

Microbiological hydroxylation of retro-progesterone yielded 15α-hydroxy-retro-progesterone with a melting point of 203–205° C. $[\alpha]_D = -23°$ (CHCl$_3$).

Found: C, 76.31, 76.42; H, 9.09, 9.14. Calc. for C$_{21}$H$_{30}$O$_3$: C, 76.32; H, 9.15.

The infrared absorption spectrum showed inter alia bands at 3502, 1689, 1650, 1617, 1420, 1085, 1057, 1020, 864 and 771 cm.$^{-1}$.

Example 58

Oxidation of 11,17α,21-trihydroxy-retro-progesterone 21-acetate with chromic acid in acetone containing 7 N sulphuric acid yielded retro-cortisone 21-acetate with a melting point of 275° C. (dec.).

The infrared absorption spectrum showed bands inter alia at 1736, 1731, 1697, 1644, 1609, 1416, 1229, 1106, 1088, 1063, 1036 and 859 cm.$^{-1}$.

Example 59

Microbiological hydroxylation of 6-dehydro-retro-progesterone yielded 6-dehydro-16α-hydroxy-retro-progesterone with a melting point of 198 (s)—200–203.

$E_{1cm}^{1\%}$ ($\lambda$ max. = 285 m$\mu$) = 800.

$[\alpha]_D = -526°$ C. (CHCl$_3$)

Found: C, 77.15, 77.14; H, 8.40, 8.42. Calc. for C$_{21}$H$_{28}$O$_3$: C, 76.8; H, 8.59.

The infrared absorption spectrum showed bands inter alia at 3380, 1703, 1643, 1618, 1580, 1418, 1084, 1051, 1038, 1006 and 876 cm.$^{-1}$.

Example 60

Dehydration of 6-dehydro-16α-hydroxy-retro-progesterone in boiling benzene in the presence of p-toluene sulphonic acid afforded 6,16-bis-dehydro-retro-progesterone with a melting point of 163–165° C.

$E_{1cm}^{1\%}$ ($\lambda$ max. = 239 m$\mu$) = 355. $E_{1cm}^{1\%}$ ($\lambda$ max. = 285 m$\mu$) = 820

Example 61

Microbiological hydroxylation of retro-progesterone yielded 11-hydroxy-retro-progesterone.

$E_{1cm}^{1\%}$ ($\lambda$ max. = 242 m$\mu$) = 483

The infrared absorption spectrum showed inter alia bands at 3385, 1705, 1642, 1604, 1103, 1076, 1057, 1042 and 868 cm.$^{-1}$.

Oxidation of this compound with chromic acid in acetone containing 7 N sulphuric acid gave 11-oxo-retro-progesterone with a melting point of 158—160° C.

$E_{1cm}^{1\%}$ ($\lambda$ max. = 239 m$\mu$) = 497

The infrared absorption spectrum showed bands inter alia at 1698, 1667, 1616, 1418, 1231, and 862 cm.$^{-1}$.

Example 62

(a) Microbiological hydroxylation of 17α-hydroxy-retro-progesterone yielded 11, 17a-dihydroxy-retro-progesterone with a melting point of 202–206.5° C. (dec.).

$E_{1cm}^{1\%}$ ($\lambda$ max. = 242 m$\mu$) = 470. $[\alpha]_D = -118°$ (CHCl$_3$)

Found: C, 72.73, 72.73; H, 8.60, 8.64. Calc. for C$_{21}$H$_{30}$O$_4$: C, 72.80; H, 8.73.

The infrared absorption spectrum showed bands inter alia at 3425, 1711, 1643, 1612, 1415, 1130, 1111, 1066, 1044, 1038, 1014 and 860 cm.$^{-1}$.

(b) Oxidation of this compound with chromic acid in acetone containing 7 N sulphuric acid yielded 11-oxo-17α-hydroxy-retro-progesterone with a melting point of 240–245° C. $\epsilon$($\lambda$ max = 240 m$\mu$) = 14,400.

The infrared absorption spectrum showed bands inter alia at 3416, 1700, 1693, 1656, 1621, 1414, 1120, 1045 and 865 cm.$^{-1}$.

Example 63

According to the processes described in Examples 5 and 6 hereinbefore 2-fluoro-isolumisterone was converted into 2-fluoro-6-dehydro-17α-acetoxy-retro-progesterone which compound melted at 204–205° C.

$E_{1cm}^{1\%}$ ($\lambda$ max. = 287 m$\mu$) = 673

Found: C, 70.79; H, 7.70. Calc. for C$_{23}$H$_{29}$O$_4$F: C, 71.10; H, 7.52.

The infrared absorption spectrum showed bands inter alia at 1732, 1713, 1687, 1627, 1582, 1265 and 871 cm.$^{-1}$.

Example 64

When the side-chain of 2-fluoro-dihydroisolumisterone was degradated as described in Example 1, 2-fluoro-retro-progesterone was obtained with a melting point of 162–164° C.

Example 65

Dihydroisolumisterone (lumista-4,22-diene-3-one) was reacted with diethyloxalate to produce 2-(ethoxyoxalyl)-lumista-4,22-dien-3-one and this latter compound was converted into 2-methyl-lumista-4,22-dien-3-one as described in Example 79a, b. The side chain of this compound was subjected to ozonisation to produce 2-methyl-retro-bisnorchol-4-en-3-on-22-al, according to the process as described in Example 1b, whereafter this compound was reacted with acetic acid anhydride to produce 2-methyl-22-acetoxy-retro-bisnorchola-4,20(22)-dien-3-one according to the process as described in Example 1h; whereafter this latter compound was oxidised according to the process as described in Example 1h to produce 2-methyl-reto-progesterone.

This compound has a melting point of 126–127° C.

The infrared absorption spectrum showed bands inter alia at 1697, 1675, 1624, 1360 and 880 cm.$^{-1}$.

Example 66

When the side chain of 2-methyl-lumista-4,6,22-trien-3-one was degradated as described in Examples 5 and 65 2-methyl-6-dehydro-retro-progesterone was obtained. The compound melted at 168.5–170° C. $\epsilon$($\lambda$ max = 283.5 m$\mu$) = 25,700.

The infrared absorption spectrum showed bands inter alia at 1698, 1657, 1623, 1590, 1360, 1234 and 879 cm.$^{-1}$.

Example 67

Reaction of retro-androst-4-en-17-one with allyl-magnesium chloride in diethyl ether yielded 17α-allyl-retro-androst-4-en-17-ol with a melting point of 79–86° C. (containing crystal solvent).

The infrared absorption spectrum showed bands inter alia at 3450, 1661, 1642, 1007, 909 and 809 cm.$^{-1}$.

Example 68

Reaction of retro-androst-4-en-17-one with potassium acetylide in isopropanol yielded 17α-ethinyl-retro-androst- 4-en-17-ol with a melting point of 74–75° C. containing crystal solvent.

The infrared absorption spectrum showed bands inter alia at 3380, 3250, 1057 and 806 cm.$^{-1}$.

Example 69

Reaction of the sodium enolate of the 21-ethoxy oxalate of 1,6-bisdehydro-retro-progesterone with perchloryl fluoride in methanol in the presence of sodium methoxide, followed by refluxing with potassium acetate yielded 21-fluoro-1,6-bisdehydro - retro - progesterone with a melting point of 154–155° C.

The infrared spectrum showed bands inter alia at 1726, 1650, 1605, 1584, 1058, 997 and 887 cm.$^{-1}$.

$E_{1\,cm.}^{1\%}$ ($\lambda$ max.=223 m$\mu$) =364

$E_{1\,cm.}^{1\%}$ ($\lambda$ max.=255 m$\mu$) =282

$E_{1\,cm.}^{1\%}$ ($\lambda$ max.=300 m$\mu$) =395

Example 70

A solution of 550 mg. of LiAlH$_4$ in 55 ml. of tetrahydrofuran was added dropwise to a solution of 1.13 g. of retro-androst-4-ene-3,17-dione in 20 ml. of dry tetrahydrofuran and the solution was cooled with ice. The thick paste obtained was then refluxed for one hour and, after cooling, the excess quantity of LiAlH$_4$ was decomposed carefully with ethyl acetate. After dilution with diethyl ether, the reaction mixture was washed with water three times, dried on Na$_2$SO$_4$ and evaporated to dryness.

The reduction product obtained was crystallized from a mixture of acetone-hexane at −5° C. The yield was 0.6 g. of a substance (retroandrost-4-ene-3,17 $\beta$-diol) with a melting point 108–112° C. During the melting, gas was evolved probably due to the presence of the crystallization solvent. After two recrystallizations with dry petroleum ether at −5° C. the melting point rose to 117–118° C., while no gas was evolved during the melting. Repeated recrystallization did not change the melting point any longer. In the ultraviolet region this substance did not exhibit absorption.

Calculated for C$_{19}$H$_{30}$O$_2$: C, 78.57%; H, 10.41%. Found C, 78.60%, 78.78%; H, 10.93%, 11.17%.

The infrared spectrum showed more or less strong bands at 863, 1048, 1059, 1077, 1236, 1421, 1468, 1663 and 3230 cm.$^{-1}$.

According to the method described in this example there are prepared retro-androstane-3,17-diol from retro-androstane-3,17-dione; 1-methyl-retro-androst-4-ene-3,17-diol from 1-methyl-retro-androst-4-ene-3,17-dione; 2-methyl-retro-androst-4-ene-3,17-diol from 2-methyl-retro-androst-4-ene-3,17-dione; retro-androst-4-ene-2,3,17-triol from 2-hydroxy-retro-androst-4-ene-3,17-dione; 6-methyl-retro-androst-4-ene-3,17-diol from 6-methyl-retro-androst-4-ene-3,17-dione; retro-androst-4-ene-3,6,17-triol from 6-hydroxy-retro-androst-4-ene-3,17-dione; 9-fluoro-retro-androst-4-ene-3,11,16,17-tetraol from 9-fluoro-11,16-dihydroxy-retro-androst-4-ene 3,17-dione; and 16-methyl-retro-androst-4-ene-3,17-diol from 16-methyl-androst-4-ene-3,17-dione.

Example 71

In the manner described in Example 70, 1.13 g. of retro-androst-4-en-3,17-dione was reduced to crude retro-androst-4-ene-3,17-diol. The product thus obtained was a colorless resin with practically no absorption in the ultraviolet region.

$E_{1\,cm.}^{1\%}$ ($\lambda$ max. 240 m$\mu$) =5

This resin was then dissolved in 60 ml. of chloroform and shaken for 17 hours with 6 g. of freshly produced manganese dioxide (brownstone). This mixture was filtered through Na$_2$SO$_4$ and the filtrate obtained was evaporated to dryness and yielded 1.2 g. of crystalline residue with $E_{1\,cm.}^{1\%}$ ($\lambda$ max. 241 m$\mu$) of 620 and melting point of 147–152° C.

Recrystallization with 30 ml. of diethylether at −25° C. yielded 780 mg., melting point 154.5–155.5° C. Evaporation and processing of the filtrate yielded another 105 mg., melting point 152–153.5° (at 151° C. sintering).

A small quantity of this retro-testosterone was purified by recrystallizations from diethylether, at −25° C., to a constant melting point at 155–156° C. and the following other analytical values:

$E_{1\,cm.}^{1\%}$ ($\lambda$ max. 242 m$\mu$) =575.  [$\alpha$]$_D^{23}$ = −154  (CHCl$^{23}$)

Calculated for C$_{19}$H$_{28}$O$_2$: C, 79.12%; H, 9.79%. Found: C, 79.07%, 79.23%; H, 9.97%, 9.78%.

The infrared spectrum of retro-testosterone exhibited strong bands at 1055, 1063, 1660 and 3420 cm.$^{-1}$ and a wearker band at 1612 cm.−1.

According to the method described in this example there are prepared retro-androstan-17$\beta$-ol-3-one from retro-androstane - 3,17 - dione; 1-methyl-retro-androst-4-en-17$\beta$-ol-3-one from 1-methyl-retro-androst-4-ene-3,17-dione; 2-methyl-androst-4-en-17$\beta$-ol-3-one from 2-methyl-retro-androst-4-ene-3,17-dione; retro-androst-4-ene-2,17$\beta$-diol-3-one from 2-hydroxy-retro-androst-4-ene-3,17-dione; 6-methyl-androst-4-en-17$\beta$-ol-3-one from 6-methyl-retro-androst-4-ene-3,17-dione; retro-androst-4-ene-6,17$\beta$-diol-3-one from 6-hydroxy-retro-andros-4-ene-3,17-dione; 9-fluoro-retro-androst-4-ene-11,16,17$\beta$-triol-3-one from 9-fluoro-11,16-dihydroxy-retro-androst - 4 - ene-3,17-dione; 16-methyl-retro-androst-4-en-17$\beta$-ol-3-one from 16-methyl-retro-androst-4-ene-3,17-dione.

Example 72

A solution of 0.5 ml. of $\beta$-phenyl-propionylchloride in 5 ml. of dry anhydrous benzene was added to a solution of 500 mg. of retro-testosterone, obtained as described in Example 71, in 10 ml. of dry, freshly distilled pyridine, at 0° C., while stirring, after which the reaction mixture was stirred at room temperature for 16 hours.

The reaction mixture was then poured onto a mixture of 80 g. of ice and 20 ml. of concentrated hydrochloric acid thus decomposing the excess quantity of the acid chloride. The ester formed was extracted three times with 20 ml. of benzene and the combined extracts were washed in succession with a sodium carbonate solution (10%) and water to neutral reaction. Drying on sodium sulphate, filtered and evaporation to dryness yielded 700 mg. of an oily product, from which, after filtering in benzene through a column containing 10 g. of neutralized alumina, 590 mg. of a resin was obtained. This resin was crystallized with petroleum ether and the crystals produced, after two recrystallizations with methanol, yielded at −5° C., 197 mg. of $\beta$-phenylpropionate of retro-testosterone. Melting point 73–74° C. Recrystallization did not change the melting point.

The additional analytical values of this material were as follows:

$E_{1\,cm.}^{1\%}$ ($\lambda$ max. 242 m$\mu$) =421; $\epsilon$ =17,700

Calculated for C$_{28}$H$_{26}$O$_3$ (420.6): C, 79.96%; H, 8.63%. Found: C, 80.00%, 79.52%; H, 8.58%, 8.38%.

The infrared spectrum exhibited inter alia bands at 1726 cm.$^{-1}$ (strong), 1664 cm.$^{-1}$ (strong), 1610 cm.$^{-1}$ (moderately strong) and 1173 cm.$^{-1}$.

According to the method described in this example there are prepared the corresponding esters of the compounds listed in Example 71.

Example 73

In the manner as described in Example 72, the 17-hydroxy group may be esterified with another ester radical for example of a saturated or unsaturated, mono, di or tri carboxylic, aliphatic acid, alicyclic acid or aromatic acid or mixed aromatic-aliphatic acid or with an amino aliphatic carboxylic acid or with phosphoric acid or with o, m, p-toluene sulphonic acid.

Suitable ester radicals are those of formic acid, acetic acid, propionic acid, butyric acid, $\alpha$-methyl propionic acid, valeric acid, α-methyl butyric acid, β-methyl butyric acid, caproic acid, t-butyl acetic acid, trimethyl acetic acid, palmitic acid, stearic acid, diglycolic acid, glyolic acid, β-methyl glutaric acid, succinic acid, adipic acid, arylic acid, crotonic acid, undecylenic acid, oleic acid, cyclopentyl carboxylic acid, cyclo hexane carboxylic acid, benzoic acid, o-, m- or p-methyl benzoic acid, phenyl acetic acid, phenyl propionic acid, phenyl butyric acid, amino acetic acid, α-amino propionic acid, N-dimethyl amino acetic acid.

The esters may be prepared by reacting an acid halide preferably the acid chloride of one of the hereabove mentioned acids with a 17-hydroxy retro-steroid as mentioned in Example 72, in the presence of an acid binder for example pyridine or collidine, and a solvent, for example benzene or petroleum ether. The reaction temperature is preferably between 0° and 100° C., in particular between 15° and 35° C. At a reaction temperature of 70° C. to 100° C. the reaction period lasts normally from 30 minutes to 2 hours. At a reaction temperature of 15–35° C. the reaction period lasts normally from 10 to 25 hours.

Thus may be produced retro-testosterone-17-formate,
retro-androsta-1,4-dien-17β-ol-3-one 17-acetate,
1-methyl-retro-androst-4-en-17β-ol-3-one 17-propionate,
2-methyl-retro-androst-4-en-17β-ol-3-one-17-butyrate,
retro-androst-4-ene-2,17β-diol-3-one - 17 - (α - methyl-propionate),
retro-androsta-1,4,6-trien-17β-ol-3-one-17-valerate,
6-methyl-retro-androst-4-en-17β-ol-3 - one - 17 - (α-methyl butyrate),
retro-androst-4-en-17β-ol-3-one-17-(β-methyl butyrate),
retro-androst-4-en-6,17β-diol-3-one-17-caproate,
9-fluoro-retro-androsta-1,4-dien-11,17β-diol-3-one-17-(t-butyl-acetate),
9-fluoro-retro-androstane-11,16,17β - triol - 3 - one-17-trimethyl acetate,
16-methyl-retro-androst-4-en-17β-ol-3-one-17-palmitate,
retro-androsta-1,4-dien-17β-ol-3-one-17-stearate,
retro-androsta-17β-ol-3-one-17-hemidiglycolate,
1-methyl-retro-androst-4-en-17β-ol-3-one-17-glycolate,
2-methyl-retro-androst-4-en-17β-ol-3-one-17(hemi β-methyl glutarate),
retro-androst-4-ene-2,17β-diol-3-one-17-hemi succinate,
retro-androst-4-en-17β-ol-3-one 17-acrylate,
6-methyl-retro-androst-4-en 17β-ol-3-one-17-crotonate,
retro-androsta-1,4,6-trien-17β-ol-3-one-17 - undecylenate,
retro-androst-4-ene-2,17β-diol-3-one-17-oleate,
retro-androst-4-ene-6,17β-diol-3-one-17 - cyclopentyl carboxylate,
9-fluoro-retro-androsta-1,4-diene-11,17β-diol - 3 - one-17-cyclohexane carboxylate,
9-fluoro-retro-androst-4-ene - 11,16,17β - triol-3-one-17-benzoate,
16-methyl-retro-androst-4-en-17β-ol-3-one-17-o, m or p-methyl benzoate,
9-fluoro-retro-androst-4-ene-11,16-17β-triol - 3 - one-17-phenyl-acetate,
1-methyl-retro-androst-4-en-17β-ol-3-one-17 - phenyl propionate,
retro-androst-4-en-17β-ol-3-one-17 (phenyl butyrate),
2-methyl-retro-androst-4-en-17β-ol-3-one 17-amino acetate,
6-methyl-retro-androst-4-en-17β-ol-3 - one-17 (α-amino-propionate),
retro-androst-4-en-17β-ol-3-one-17-mono or di-N-methyl-amino acetate.

Example 74

A solution of 5 g. of retro-testosterone in 330 ml. of freshly distilled, tertiary butanol and 8.5 g. of chloranil was refluxed in a nitrogen atmosphere, while stirring, for 5 hours. After cooling, the reaction mixture was diluted with 2 liters of water and extracted twice with 200 ml. of methylene chloride. The extract, after dilution with 750 ml. of petroleum ether (40 to 60° C.) was washed with 100 ml. of a 5% $Na_2SO_4$ solution, and four times with 50 ml. of 1 N NaOH and water to a neutral reaction. After drying on $Na_2SO_4$, filtering with a small quantity of aluminum silicate and evaporation to dryness, 2.3 g. of a brown crystalline residue was obtained. This residue was placed in benzene and filtered through 25 g. of alumina (Brockmann method II). Eluation with 300 ml. of benzene yielded 2.0 g. of crystalline substance $E_{1cm}^{1\%}$ (λ max. 284 mμ=815)

Recrystallization thereof with a mixture of acetone and hexane at —5° C., yielded 1.43 g., melting point 170 to 172° C. Recrystallization yielded 1.05 g. of 6-dehydro-retro-testosterone, melting point 173–174.5° C. From the filtrates another 240 mg. with a melting point of 167–170° C. were obtained.

For the production of the analytically pure substance recrystallization with diethyl ether was finally carried out. The resultant substance had the following analytical values:

Melting point, 174–175° C.

$E_{1cm}^{1\%}$ (γ max. 284 mμ)=903, 893; ε 284 mμ=25,700.

Calculated for $C_{19}H_{26}O_2$ (286.4): C, 79.68%; H, 9.15%. Found: C, 79.86%, 79.58%; H, 9.27%, 9.09%.

In the infrared spectrum are found characteristic bands at 3441 cm.$^{-1}$ (strong, OH-frequency), 1641 cm.$^{-1}$ (strong, conjugated keto-group), 1615 cm.$^{-1}$ (strong, double-bond) and 1571 cm.$^{-1}$ (weak, double-bond).

According to the method described in this example there are prepared retro-androst-1,4,6-trien-17β-ol-3-one from 1 - dehydro - retro - testosterone; 1 - methyl - 6 - dehydro-retro-testosterone from 1 - methyl - retro - testosterone; 2-methyl-16-hydroxy-6-dehydro-retro-testosterone from 2-methyl-16-hydroxy-retro-testosterone; 4-chloro-6-dehydro-retro-testosterone from 4-chloro-retro-testosterone; 9-fluoro-11-hydroxy-6-dehydro-retro-testosterone from 9-fluoro-11-hydroxy-retro-testosterone; 16-hydroxy-6-dehydro-retro-testosterone from 16-hydroxy-retro-testosterone; 16-methyl-6-dehydro-retro-testosterone from 16-methyl-retro-testosterone; and 9-fluoro-11-hydroxy-16-methyl-6-dehydro-retro-testosterone from 9-fluoro-11-hydroxy-16-methyl-retro-testosterone.

Example 75

A solution of 360 mg. of 6-dehydro-retro-testosterone, obtained as described in Example 74, in 8 ml. of dry, freshly distilled pyridine, was added at 0° C., to a solution of 0.14 ml. of distilled propionylchloride in 4 ml. of dry thiophene-free benzene. After stirring for 20 hours at room temperature the substance was poured out on a mixture of 50 g. of ice and 16 ml. of concentrated sulphuric acid. The ester solution, obtained by extraction three times with 15 ml. of benzene was washed in order of seccession with a sodium carbonate solution (10%) and water to a neutral reaction. Drying, filtering, and evaporation to dryness yielded 435 g. of residue which was crystallized with methanol at —5° C. Recrystallization with the same solvent yielded 233 mg. of propionate of 6-dehydro-retro-testosterone with a melting point of 113 (light sintering)—115–117° C. Recrystallization of a portion thereof for analysis produced a pure substance having the following analytical values:

Melting point 114—115–117° C.

$E_{1cm}^{1\%}$ (λ max. 286 mμ)=739; ε=25,400.

Calculated for $C_{22}H_{32}O_3$ (344.5): C, 77.14%; H, 8.83%. Found: C, 77.27%, 77.27%; H, 8.82%, 8.68%.

The infrared spectrum exhibited bands: inter alia, at 1731 cm.$^{-1}$ (strong), 1650 cm.$^{-1}$ (strong), 1618 cm.$^{-1}$ (strong) and 1571 cm.$^{-1}$ (rather strong).

Example 76

In the manner as described in Example 75, 17-hydroxy group may be esterified with another ester radical for example of a saturated or unsaturated, mono, di or tri carboxylic, aliphatic acid, mono-, di- or tricarboxylic alicyclic acid or mono-, di- or tricarboxylic aromatic acid or mixed aromatic aliphatic acid or with an amino aliphatic carboxylic acid or with phosphoric or with o, m, p-toulene sulphonic acid.

Suitable ester radicals are those of formic acid, acetic acid, propionic acid, butyric acid, α-methyl propionic acid, valeric acid, α-methyl butyric acid, β-methyl-butyric acid, caproic acid, t-butyl acetic acid, trimethyl acetic acid, palmitic acid, stearic acid, diglycolic acid, glycolic acid, β-methyl gultaric acid, succinic acid, adipic acid, acrylic acid, crotonic acid, undecylenic acid, oleic acid, cyclopentyl carboxlic acid, cyclo hexane carboxylic acid, benzoic acid, o, m, or p-benzoic acid, phenyl acetic acid, phenyl propionic acid, phenyl butyric acid, amino acetic acid, α-aminopropionic acid, N-dimethyl amino acetic acid.

The esters may be prepared by reacting an acid halide preferably the acid chloride of one of the hereabove mentioned acids with a 17-hydroxy retro-steroid as mentioned in Example 74, in the presence of an acid binder for example pyridine or collidine, and a solvent, for example benzene or petroleum ether. The reaction temperature is preferably to be chosen between 0° and 100° C., in particular between 15° and 35° C. At a reaction temperature of 70° to 100° C. the reaction period lasts normally from 30 minutes to 2 hours. At a reaction temperature of 15–35° C. the reaction period lasts normally from 10 to 25 hours.

Thus are produced retro-androsta-1,4,6-trien-17β-ol-3-one-17-formate,
1-methyl-6-dehydro-retro-testosterone-17-acetate,
2-methyl-16-hydroxy-6-dehydro-retro-testosterone-17-propionate,
4-chloro-6-dehydro-retro-testosterone-17-valerate,
9-chloro-11-hydroxy-6-dehydro-retro-testosterone-17-butyrate,
16-methyl-6-dehydro-retro-testosterone-17-(t-butyl
2-methyl-16-hydroxy-6-dehydro-retro-testosterone-17-(α-methyl butyric acid),
16-methyl-6-dehydro-rentro-testosterone-17-(t-butyl acetate),
9-fluoro-11-hydroxy-16-methyl-6-dehydro-retro-testosterone-17-palmitate,
retro-androsta-1,4,6-trien-17β-ol-3-one-17-stearate,
1-methyl-retro-testosterone-17-hemi-diglycolate,
2-methyl-16-hydroxy-6-dehydro-retro-testosterone-17-glycolate,
4-chloro-6-dehydro-retro-testosterone-17-hemi-β-methyl glutarate,
9-chloro-11-hydroxy-6-dehydro-retro-testosterone-17-hemi glutarate,
16-hydroxy-6-dehydro-retro-testosterone-17-hemi adipate,
16-methyl-6-dehydro-retro-testosterone-17-acrylate,
9-chloro-11-hydroxy-16-methyl-6-dehydro-retro-testosterone-17-crotonate,
retro-androsta-1,4,6-trien-17β-ol-3-one-17-undecylate,
2-ethyl-16-hydroxy-6-dehydro-retro-testosterone-17-oleate,
4-fluoro-6-dehydro-retro-testosterone-17-cyclopentylcarboxylate,
16-methyl-6-dehydro-retro-testosterone-17-o,m- or p-methylbenzoate,
2-ethyl-16-hydroxy-6-dehydro-retro-testosterone-17-benzoate,
6-dehydro-retro-testosterone phenylacetate,
6-dehydro-retro-testosterone-17-phenylpropionate,
16-hydroxy-6-dehydro-retro-testosterone-17-phenyl butyrate,
1-methyl-6-dehydro-retro-testosterone-17-amino acetate,
4-chloro-6-dehydro-retro-testosterone-17(α-amino propionate),
16-methyl-6-dehydro-retro-testosterone-17(N-mono- and dimethyl amino acetate).

Example 77

A solution of 500 mg. of lithium in 75 ml. of liquid ammonia was added dropwise to a boiling solution of 0.5 g. of retro-testosterone, obtained as described in Example 71, in 50 ml. of dry diethylether and 75 ml. of dry, liquid ammonia, while moisture was kept out and the solution was stirred. The resultant dark-blue solution was added dropwise and then decomposed by the dropwise addition of 15 ml. of anhydrous ethanol in 30 minutes. After stirring for another half hour, the mixture was diluted with water, the ether layer was separated off and washed to a neutral reaction. The resin obtained by drying the ether extract on sodium sulfate, by filtering it and evaporating it to dryness, could not be caused to crystallize. Since also chromatography via alumina did not cause crystallization, the united fractions, subsequent to evaporation to dryness, were dissolved in 5 ml. of dry thiophene-free benzene and 1 ml. of dry pyridine and then esterified by adding a solution of 650 mg. of 3,5-dinitrobenzoylchloride in 5 ml. of benzene.

After standing half an hour at room temperature the solution was decomposed by shaking it for 10 minutes with a small quantity of water, after which the ester fraction was dissolved in diethyl ether. The extract obtained was then washed with water, 2 N hydrochloric acid, water, aqueous sodium bicarbonate solution and water. Drying on sodium sulfate, filtering and evaporating to dryness yielded 600 mg. of a light-yellow resin, which could be caused to crystallize from a mixture of methylene dichloride and acetone.

The final yield was 270 mg. of bis-(3,5-dinitrobenzoate) of retro-5-androstane-3,17β-diol with a melting point of 237–242° C. The other analytical values of this substance were as follows:

Calculated for $C_{33}H_{36}O_{12}N_4$ (680.65): C, 58.23%; H, 5.33%; N, 8.23%. Found: C, 58.34%, 58.31%; H, 5.49%, 5.68%; N, 7.85%, 7.88%.

Example 78

1 g. of selenium dioxide and 0.6 ml. of water was added to a solution of 1 g. of retro-testosterone, produced as described in Example 4, in 35 ml. of benzene after which the mixture was refluxed in a nitrogen atmosphere for 48 hours.

After filtering and washing the solid constituents with benzene the filtrate was washed successively with a sodium bicarbonate solution and water. The dried and filtered solution was evaporated to dryness in vacuo, after which 625 mg. of a resin was obtained with $$E_{1\,cm.}^{1\%} \ (\lambda\,max.\ 243\ m\mu) = 358$$

From an additional treatment of the solid constituents, after the reaction (selenium dioxide and so on) with carbon tetrachloride and after processing another 50 mg. of the resin was obtained. The total quantity of resin was then dissolved in benzene, chromatographed on 40 g. of alumina.

| Fraction | Eluate | Volume, ml. | Weight, mg. |
|---|---|---|---|
| 1 | Benzene | 150 | <10 |
| 2 | Benzene + ether, 2:1 | 200 | 20 |
| 3 | Benzene + ether, 1:2 | 300 | [1] 130 |
| 4 | Ether, 1:2 | 250 | [1] 50 |
| | Ether | 300 | [1] 240 |
| 5 | Acetone | 100 | |

[1] Partly crystalline.

Fractions 3 and 4 were crystallized twice with n-hexane, after which 150 mg. of a substance with a melting point of 164 (slight sintering)—172–173° C. was obtained. Recrystallization with a mixture of n-hexane and methylenechloride yielded 98 mg. of 1-dehydro-retro-testosterone having the following analytical values:

Melting point, 171—175–177° C.

$E_{1cm}^{1\%}$ ($\lambda$ max. 243.5 m$\mu$) = 538; $\epsilon$ = 15,300

Calculated for $C_{19}H_{26}O_2$ (286.4): C, 79.68%; H, 9.15%. Found: C, 79.44%, 79.07%; H, 9.07%, 9.15%.

The infrared spectrum exhibited inter alia bands at 3364 cm.$^{-1}$ (strong), 1650 cm.$^{-1}$ (strong), 1609 cm.$^{-1}$ (fairly strong), 1592 cm.$^{-1}$ (weak) and 884 cm.$^{-1}$.

According to the method described in this example there are produced 1-dehydro-6-methyl-retro-testosterone from 6-methyl-retro-testosterone; 1-dehydro-16-methyl-retro-testosterone from 16-methyl-retro-testosterone; and 1-dehydro-9-fluoro-11-hydroxy-16-methyl-retro-testosterone from 9-fluoro-11-hydroxy-16-methyl-retro-testosterone.

Example 79

(a) 0.6 ml. of diethyl oxalate and then 200 mg. of sodium hydride were added to a solution of 1.14 g. of retro-testosterone, produced as described in Example 71, in 10 ml. of dry thiophene-free benzene in a nitrogen atmosphere. Then the reaction mixture was stirred in a nitrogen atmosphere for 72 hours at room temperature, the color changing from brown to yellow and a voluminous deposit being formed.

After the addition of 5 ml. of methanol and dilution with water, the solution was extracted with diethyl ether to remove substances insoluble in water. The aqueous layer was acidified with 2 N hydrochloric acid and the precipitate was dissolved in diethylether. The diethyl-ether solution was then washed free of hydrochloric acid with a saturated sodium chloride solution, dried on sodium sulfate, filtered and evaporated to dryness, a light-yellow resin of the enol of 2-(ethoxyoxalyl)-retro-testosterone thus being obtained.

(b) A solution of 1.3 g. of 2-(ethoxyoxalyl)-retro-testosterone in 25 ml. of dry, purified acetone was refluxed with 2 ml. of methyl-iodide for 18 hours in the presence of 1 g. of dry potassium carbonate. After cooling the solution was diluted with water and dissolved in diethyl ether, after which the extract was washed with 1 N caustic soda lye and water to neutral reaction, dried on sodium sulfate and, after filtering, evaporated to dryness.

The 1.05 g. of residue were boiled with a solution obtained by reacting 0.5 g. of sodium in 10 ml. of anhydrous ethanol. After cooling the mixture was poured out in water and the separated substance was dissolved in diethyl ether, washed with water, dried on sodium sulphate, filtered and evaporated to dryness, after which 0.515 g. of a resinous substance was obtained, which could not be caused to crystallize without the need for further measures. Chromatography on 25 g. of alumina in benzene yielded the following fractions:

| Fraction | Eluate | Volume, ml. | Weight, mg. |
| --- | --- | --- | --- |
| 1 | Benzene | 50 | 12 |
| 2 | do | 100 | 150 |
| 3 | do | 100 | 111 |
| 4 | do | 250 | 112 |

Two recrystallizations with a mixture of diethyl ether and n-hexane of the fractions 2 to 4 yielded 207 mg. of 2-methyl-retro-testosterone with a melting point of 175–179° C. For analysis a portion was recrystallized again. The analytical values of this pure material were as follows:

Melting point, 177–179.5° C.

$E_{1cm}^{1\%}$ ($\lambda$ max. = 241.5 m$\mu$) = 508 = 15,400.

Calculated for $C_{20}H_{30}O_2$ (302.46): C, 79.42%; H, 10.00%. Found: C, 79.50%, 79.81%; H, 9.98%, 9.84%.

The infrared showed bands inter alia at 876, 1072, 1221, 1613, 1650 and 3390 cm.$^{-1}$.

According to the method described in this example there are prepared 2,6-dimethyl-retro-testosterone from 6-methyl-retro-testosterone; 2,16-dimethyl-retro-testosterone from 16-methyl-retro-testosterone; 2-methyl-16-hydroxy-retro-testosterone from 16-hydroxy-retro-testosterone; 2-methyl-9-fluoro-11-hydroxy-retro-testosterone from 9-fluoro-11-hydroxy-retro-testosterone and 2,17-dimethyl-retro-testosterone from 17-methyl-retro-testosterone.

Example 80

A solution of 5.00 g. of retro-androsta-4,6-dien-3,17-dione in 90 ml. of dry tetrahydrofurane was added by drops into a well-stirred suspension of 2.5 g. of lithium aluminum hydride in 250 ml. of dry tetrahydrofurane. The reaction mixture was then boiled for half an hour. After cooling, 10 ml. of ethyl acetate were added to the reaction mixture and afterwards 40 ml. of a saturated sodium sulphate solution were added. The tetrahydrofurane solution was separated off and filtered from finely dispersed solids formed after the addition of sodium sulphate. The solvent was distilled off in vacuo and 5.12 g. of a resinous residue were obtained, $E_{1cm}^{1\%}$ (239.6 m$\mu$) = 740

Crystallization and recrystallization from a mixture of diethyl ether and methylene dichloride gave retro-androsta-4,6-diene-3,17$\beta$-diol with a melting point of 125 (s)—140–144° C. (dec.) and the following additional analytical values:

($\lambda$ max. = 239.5 m$\mu$) = 21.900 (methanol).

Found: C, 78.70, 78.79; H, 9.66, 9.71. Calc. for $C_{19}H_{28}O_2$ (288.43): C, 79.12; H, 9.79.

The infrared absorption spectrum exhibited bands inter alia at 3430, 1652, 1620, 1059, 1026 and 859 cm.$^{-1}$.

According to this process there are prepared 2-fluoro-retro-androsta-4,6-diene-3,17$\beta$-diol from 2-fluoro-retro-androsta-4,6-diene-3,17-dione; 6-methyl-retro-androsta-4,6-diene-3,17$\beta$-diol from 6-methyl-retro-androsta-4,6-diene-3,17-dione, retro-androsta-4,6-diene-3,17$\beta$-diol from retro-androsta-4,6-diene-3,17-dione and 3,17$\beta$, 11-trihydroxy-retro-androsta-4,6-diene from 11-hydroxy-retro-androsta-4,6-diene-3,17-dione.

Example 81

5.00 g. of retro-androsta-4,6-dien-3,17-dione were reduced with lithium aluminum hydride as described in Example 80 yielding a resionous residue consisting of retro-androsta-4,6-dien-3,17$\beta$-ol. This residue was dissolved in 500 ml. of dry benzene and 25 g. of precipitated manganese dioxide were added. This mixture was boiled for 30 hours. After filtration from manganese dioxide, the solvent was evaporated to obtain 4.38 g. of semi-solid product. Crystallization and recrystallization from acetone furnished 3.0 g. of 6-dehydro-retro-testosterone with a melting point of 173–174° C.

According to this process there are prepared 2-fluoro-6-dehydro-retro-testosterone from 2-fluoro-retro-androsta-4,6-diene-3,17$\beta$-diol; 6-methyl-6-dehydro-retro-testosterone from 6-methyl-retro-androsta-4,6-diene-3,17$\beta$-diol, 6-dehydro-retro-testosterone from retro-androsta-4,6-diene-3,17$\beta$-diol and 16-methyl-6-dehydro-retro-testosterone from 16-methyl-retro-androsta-4,6-diene-3,17$\beta$-diol.

Example 82

A solution of 5.22 g. of 6-bromo-retro-testosterone 17-acetate in 25 ml. of dry pyridine was heated in a nitrogen atmosphere at 70° C. to 80° C. for 1 hour and subsequently to 90° C. for another hour. The reaction mixture was worked up by pouring it into water, absorbing it in diethyl ether and washing the ether layers with 2 N sulphuric acid, water, sodium bicarbonate solution and water. Filtration and subsequent removal of the solvent by distillation yielded a resin which was crystallized from acetone-hexane at room temperature. Yield: 1.73 g. of 6-dehydro-retro-testosterone 17-acetate with a melting point of 131°–133° C. and the following additional analytical values:

The infrared absorption spectrum shows bands at 1735, 1661, 1632, 1582, 1417, 1255, 1036 and 883 cm.$^{-1}$.

$E_{1cm.}^{1\%}$ ($\lambda$ max.$=285$ m$\mu$) $=753$ and 759 (methanol); $\epsilon$ (285 m$\mu$) $=24,800$.

Found: C, 76.67, 76.26; H, 8.69, 8.46. Calculated for $C_{21}H_{28}O_3$ (328.45): C, 76.79; H, 8.59.

According to this process there are prepared 2-methyl-6-dehydro-retro-testosterone 17-phenylpropionate from 2-methyl-6-bromo-retro-testosterone 17 - phenylpropionate; 2-fluoro-6-dehydro-retro-testosterone 17-butyrate from 2-fluoro - 6 - bromo-retro-testosterone 17 - butyrate; 11-hydroxy-6-dehydro-retro-testosterone 17-acetate from 11-hydroxy-6-bromo-retro-testosterone 17-acetate and 2,16-dimethyl-1,6-bis dehydro-retro-testosterone 17-palmitate from 2,16-dimethyl-1-dehydro-6-bromo-retro-testosterone 17-palmitate.

Example 83

A solution of 1 g. of retro-testosterone and 0.005 ml. of concentrated sulphuric acid in 5 ml. of isopropenyl acetate was refluxed in a nitrogen atmosphere for 3 hours. The reaction mixture was then concentrated by evaporation under the vacuum of a water jet pump and the residue poured onto ice. The ester was then extracted with diethyl ether and the combined extracts were washed with water, 10% aqueous solution of caustic soda and water, and then dried over sodium sulphate. The filtered solution was dried by evaporation, 1.38 g. of a crystalline residue being obtained, $E_{1cm.}^{1\%}$ (236 m$\mu$) $=472$ (methanol)

Crystallization from methanol yielded 0.9 g. of 3,17$\beta$-diacetoxy-retro-androsta-3,5-diene having a melting point of 115—177–118° C. (vacuum).

Recrystallization from the same solvent caused the melting point to rise to 117—118–119° C. (vacuum).

The other analytical values of this substance were as follows:

The infrared absorption spectrum shows maximum values at 1759, 1737, 1667, 1635, 1215, 1022 and 917 cm.$^{-1}$.

$E_{1cm.}^{1\%}$ ($\lambda$ max.$=236$ m$\mu$) $=495$ and 496 (methanol); $\epsilon$ (236 m$\mu$) $=18,400$.

Found: C, 74.54, 74.44; H, 8.68, 8.67. Calc. for $C_{23}H_{32}O_4$ (372.51): C, 74.16; H, 8.66.

According to this process there are prepared 3,17$\beta$-diacetoxy-6-methyl-retro-androsta-3,5-diene from 6-methyl-retro-testosterone; 3,17$\beta$-diacetoxy - 2 - methyl-retro-androsta - 3,5 - diene from 2-methyl-retro-testosterone; 3,17$\beta$ - butyroxy-16-methyl-retro-androsta-3,5-diene from 16-methyl-retro-testosterone and 2-fluoro-3,17$\beta$-dipropionoxy-retro-androsta-1,3,5-triene from 1-dehydro-2-fluoro-retro-testosterone.

Example 84

0.4 g. of potassium was dissolved in 20 ml. of tertiary butanol in a nitrogen atmosphere. To this solution there was added 1 g. of retro-testosterone, the mixture being stirred until solution was complete. 1.3 ml. of methyl iodide were then added with stirring, a white precipitate being produced. The reaction mixture was allowed to stand in a nitrogen atmosphere for 3½ hours at room temperature and subsequently overnight at −25° C. After the addition of 15 ml. of water, the tertiary butanol was removed by vacuum distillation, the remainder being extracted with diethyl ether. The ethereal solution was washed in succession with water, 0.5 N hydrochloric acid, a sodium bicarbonate solution and finally carefully with water. The solution was dried over sodium sulphate and, after filtration, the solvent was removed by evaporation. The residue (1.03 g.) was crystallized from acetone, the crystals obtained being recrystallized several times. The resultant 4,4-dimethyl-retro-androst-5-en-17$\beta$-ol-3-one had the following analytical values:

Melting point, 149 (s)—152.5–153.5° C.

Found: C, 79.87, 79.83; H, 10.20, 10.19; O, 10.26, 10.24. Calculated for $C_{21}H_{32}O_2$: C, 79.68; H, 10.19; O, 10.10.

The infrared spectrum showed inter alia bands at 3470, 1695, 1666, 1416, 1077 and 1013 cm.$^{-1}$.

According to this process there are prepared 2,4,4-trimethyl-retro-androst - 5 - en-17$\beta$-ol-3-one from 2-methyl-retro-testosterone; 2 - fluoro-4,4-dimethyl-retro-androst-5-en-17$\beta$-ol-3-one from 2-fluoro-retro-testosterone; 4,4-dimethyl-9-fluoro - 11-hydroxy - retro - androst-5-en-17$\beta$-ol-3-one from 9-fluoro-11-hydroxy-retro-testosterone and 4,4,16-trimethyl-retro-androst - 5 - en - 17$\beta$-ol-3-one from 16-methyl-retro-testosterone.

Example 85

A solution of 2.5 g. of p-hexyloxyphenyl propionyl chloride in 10 ml. of dry distilled chloroform free of alcohol was added dropwise with stirring in the course of 5 minutes to a solution of 2 g. of retro-testosterone in 10 ml. of dry newly distilled pyridine at 0° C. After standing for 18 hours at room temperature, the orange-colored esterification mixture was decomposed by pouring onto ice and subsequently extracted with one batch of 50 ml. and two batches of 25 ml. of a mixture of ethyl acetate and diethyl ether (1+1). The combined extracts were washed twice with 50 ml. of ice-cold N hydrochloric acid, with water, twice with 50 ml. of ice, 10% solution of caustic soda and finally with water to a neutral reaction. Drying over sodium sulphate, filtration and subsequent removal of the solvent by distillation yielded a residue of 3.9 g.

$E_{1cm.}^{1\%}$ (229 m$\mu$) $=396$ and $E_{1cm.}^{1\%}$ (242 m$\mu$) $=295$

The residue was then subjected to the following chromatographic analysis. It was dissolved in a mixture of petroleum ether and diethyl ether (17:3), 100 g. of silica gel being used as the absorbent and elution being effected with the same mixture of solvents. Fractions of 1 l. were collected.

The infrared absorption spectrum shows bands at 1735, 1676, 1618, 1535, 1514, 1418, 1243, 1175, 1024, 863 and 822 cm.$^{-1}$.

$E_{1cm.}^{1\%}$ ($\lambda$ maximum$=229$ m$\mu$) $=408$ and 411 (methanol)

$E_{1cm.}^{1\%}$ (241 m$\mu$) $=325$. $E_{1cm.}^{1\%}$ (280 m$\mu$) $=67$; $\epsilon$ (229 m$\mu$) $=21,400$. $\epsilon$ (241 m$\mu$) $=16,900$ Found: C, 77.92, 78.31; H, 9.15, 9.29. Calc. for $C_{34}H_{48}O_4$ (520.75): C, 78.42; H, 9.29.

Example 86

A solution of 690 mg. of propionylchloride in 15 ml. of dry benzene was added dropwise at 0° C. in 10 minutes to a solution of 1.73 g. of retro-testosterone in 30 ml. of dry pyridine. After standing overnight, the mixture was poured on a mixture of 65 ml. of concentrated sulphuric acid and 200 g. of ice. Extraction with benzene yielded the retro-testosterone 17-propionate. Recrystallization from hexane gave crystals having a melting point of 107–108° C. and the following other analytical values: $\epsilon$($\lambda$ max$=242$ m$\mu$) $=16,000$.

Found: C, 76.63, 76.48; H, 9.32, 9.07. Calc. for $C_{22}H_{32}O_3$: C, 76.70; H, 9.37.

The infrared spectrum shows bands at 1730, 1672, 1618, 1421, 1190, 1080, 1020 and 855 cm.$^{-1}$.

Example 87

Acetylation of retro-testosterone 17-propionate with isopropenylacetate in the presence of a catalytic amount of concentrated sulphuric acid gave the 3-acetoxy-retroandrosta - 3,5-dien-17β-ol-17 - propionate. The analytical values of this material were as follows:

Melting point, 101 (s)—102–104° C. $\epsilon(\lambda$ max=236 m$\mu$)=17,900.

Found: C, 74.53, 74.22; H, 8.79, 8.85. Calc. for $C_{24}H_{34}O_4$: C, 74.57; H, 8.87.

The infrared absorption spectrum shows bands at 1755, 1730, 1664, 1630, 1211, 1194, 1064, 916 and 870 cm.$^{-1}$.

Example 88

A solution of 410 mg. of 6-bromo-retro-testosterone 17-acetate and 1.3 g. of potassium acetate in 10 ml. of acetic acid was boiled in a nitrogen atmosphere for 4 hours. The product was then cooled to room temperature and poured into ice water. Extraction with diethyl ether gave the 2-hydroxy-retro-testosterone 2,17-diacetate, which was crystallized from methanol.

The analytical values of the pure substance were as follows:

Melting point, 184–186° C. $\epsilon(\lambda$ max=242 m$\mu$)=15,700.

Found: C, 70.90, 71.05; H, 8.12, 8.23. Calc. for $C_{23}H_{32}O_5$: C, 71.10; H, 8.30.

The infrared spectrum shows bands at 1744, 1721, 1683, 1618, 1235, 1236, 1216, 1047 and 878 cm.$^{-1}$.

According to this process there are prepared 2-acetoxy-retro-androst-4-ene-3,17-dione from
  6-bromo-retro-androst-4-ene-3,17-dione;
2-acetoxy-9-fluoro-11-hydroxy-retro-testosterone from
  6-chloro-9-fluoro-11-hydroxy-retro-testosterone and
2-propionoxy-retro-testosterone from
  6-bromo-retro-testosterone.

Example 89

A solution of 3.2 g. of potassium acetate in 60 ml. of 85% acetic acid was added to a solution of 1.5 g. of 3,17-diacetoxy-retro-androsta-3,5-diene in 30 ml. of diethyl ether. A solution of 650 mg. of bromine in 21.4 ml. of acetic acid was then added dropwise with stirring at 0° C. The reaction mixture was poured into 500 ml. of ice water and then extracted with diethyl ether. The ether was evaporated and the residue obtained after evaporation of the solvent was recrystallized from ether.

The resultant 6-bromo-retro-testosterone 17 had the following analytical values:

Melting point ~130° C. (with decomposition, value highly dependent upon the heating rate). $\epsilon(\lambda$ max=237.5 m$\mu$)=13,100.

Found: C, 61.61, 61.94; H, 7.07, 7.18; Br, 19.51. Calc. for $C_{21}H_{29}O_3Br$: C, 61.61; H, 7.14; Br, 19.52.

The infrared absorption spectrum shows bands at 1732, 1720, 1674, 1622, 1417, 1245, 1023 and 870 cm.$^{-1}$.

Example 90

(a) 4 g. of 3,17β-diacetoxy-retro-androsta-3,5-diene were dissolved in 178 ml. of ethyl acetate containing 14.3 mg. of monoperphthalic acid per ml. After standing overnight at 5° C., the solution was diluted with diethyl ether and washed successively with water, three times with saturated bicarbonate solution and three times with water. After evaporation to dryness, 4.4 g. of a residue were obtained. Crystallization from acetone at −5° C. gave 1.27 g. having a melting point of 156 (s)—158–162° C. Repeated crystallizations from acetone-hexane caused the melting point to rise to 166—167–170° C. The crude reaction product and the final product both consisted of a mixture of 6α- and 6β-hydroxy-retro-testosterone 17-acetate. The analytical values of this substance were:

Melting point, 166—167–170° C. $\epsilon(240$ m$\mu)=13,100$.
Found: C, 72.62, 72.78; H, 8.76, 8.89. Calc. for $C_{21}H_{30}O_4$: C, 72.80; H, 8.73.

The infrared spectrum showed bands at 3500, 1741, 1680, 1618, 1415, 1254, 1047, 1026 and 881 cm.$^{-1}$.

(b) 10 ml. of acetic acid anhydride were added to a solution of 2.6 g. of 6-hydroxy-retro-testosterone 17-acetate (melting point 166–170° C.) in 10 ml. of pyridine, the esterification mixture being allowed to stand at room temperature for 20 hours. After the addition of ice, the mixture was worked up in the usual manner. The crystalline crude 6,17-diacetoxy-retro-testosterone was recrystallized from ethanol.

The analytical values of this substance were as follows:
Melting point, 178–180° C. $\epsilon(237$ m$\mu)=15,450$.
Found: C, 71.10, 71.12; H, 8.20, 8.13. Calc. for $C_{23}H_{32}O_5$: C, 71.10; H, 8.30.

The infrared spectrum showed bands at 1750, 1737, 1681, 1628, 1249, 1237, 1027 and 876 cm.$^{-1}$.

From the mother liquor, the other C6-acetoxy isomer was obtained after concentration and recrystallization.

The analytical values of this substance were as follows:
Melting point, 116–117° C. $\epsilon(236$ m$\mu)=13,200$.
Found: C, 71.07, 71.16; H, 8.29, 8.17. Calc. for $C_{23}H_{32}O_5$: C, 71.10; H, 8.30.

The infrared spectrum showed bands at 1739, 1685, 1618, 1237, 1026 and 880 cm.$^{-1}$.

The occurrence of the two C6-acetoxy isomers in the esterification mixture also points to the presence of the two C6-hydroxy isomers in the starting product.

According to this process there are prepared 2-methyl-6-hydroxy-retro-testosterone 17-acetate from 2-methyl-3,17 - diacetoxy-retro-androsta - 3,5 - diene, 2-fluoro-6-hydroxy-retro-testosterone 17-acetate from 2-fluoro-3,17-diacetoxy-retro-androsta-3,5-diene, 6-hydroxy-16-methyl-retro-testosterone 17-propionate from 3,17-diproprionyloxy - 16 - methyl-retro-androsta-3,5-diene and 6,11-dihydroxy - retro - testosterone 17 - butyrate from 6,17 - dibutyronyloxy-11-hydroxy-retro-androsta-3,5-diene.

Example 91

A mixture of 1.52 g. of palmitoylchloride and 7.7 ml. of benzene was added with vigorous stirring to a solution of 1.575 g. of 6-dehydro-retro-testosterone in a mixture of 8 ml. of benzene and 0.66 ml. of pyridine. The reaction mixture was boiled for 1 hour and cooled to 50° C., after which 4.1 ml. of methanol were added and the mixture was boiled for another 30 minutes.

The reaction mixture was cooled to 20° C. and poured into 10 ml. of N sulphuric acid. After working up, the resultant 6-dehydro-retro-testosterone 17-palmitate was crystallized from a mixture of diethyl ether and methanol.

The analytical values of this substance were as follows:

Melting point, 56.5 (s)—58.5–59° C.

$\epsilon$ (285 m$\mu$)=25,700

Found: C, 80.48, 80.06; H, 10.72, 10.59; O, 9.43, 9.45. Calc. for $C_{35}H_{56}O_3$ (524.84): C, 80.10; H, 10.76; O, 9.15.

The infrared spectrum showed bands at 1737, 1671, 1633, 1589, 1421, 1245, 1175 and 886 cm.$^{-1}$.

Example 92

10 ml. of newly distilled ethyl formate and 3 g. of sodium hydride were added to a solution of 10 g. of retro-testosterone in 200 ml. of dry benzene. After standing at room temperature in a nitrogen atmosphere for three days, the resultant sodium salt of 2-hydroxy-methylene-retro-testosterone was drawn off and washed with benzene, petroleum ether, acetone and diethyl ether.

The salt was then dissolved in water and the solution was extracted with diethyl ether. The aqueous solution was freed from ether in vacuo and the resultant 2-hydroxymethylene-retro-testosterone was precipitated with 5% hydrochloric acid.

The weight after drying was 7.6 g. Recrystallization from aqueous ethanol gave a substance having a melting point of 98 (s)—120° C. The lack of sharpness of the melting point is due to the presence of water in the crystals.

Other analytical values of this substance were as follows:

| | λ | ε |
|---|---|---|
| Weakly acid | 305 mμ | 7,700. |
| | 252 mμ | 14,850 $[\alpha]_D^{23} = -134°$ (EtOH). |
| Weakly alkaline | 242 mμ | 21,100. |

The infrared absorption spectrum shows bands at 3430, 1675, 1645, 1620, 1205, 1050 and 883 cm.$^{-1}$.

According to this process there are prepared the 2-hydroxy-methylene derivatives of 6-methyl-retro-testosterone, of 11-hydroxy-retro-testosterone, of 9-fluoro-11-hydroxy-retro-testosterone, of 16-methyl-retro-testosterone, of 6-dehydro-retro-testosterone and 6-methyl-6-dehydro-retro-testosterone.

Example 93

A solution of 5 g. of 2-hydroxymethylene-retro-testosterone in 13 ml. of anhydrous ethanol was added to a solution of 2.5 ml. of hydrazine hydrate (98%) in 40 ml. of anhydrous alcohol. The resulting mixture was boiled for three hours, and after standing overnight at room temperature, the crystallized pyrazole was drawn off. Yield: 3.5 g. of 17β-hydroxy-retro-androst-4-eno-[3,2-c] pyrazole, melting point 259–263° C. Recrystallization from a mixture of methylene dichloride and ethanol caused the melting point to rise to 216–262° C. (uncorrected).

The other analytical values of this substance were as follows:

$\varepsilon$ ($\lambda$ max.$=261$ m$\mu$)$=10,300$. $[\alpha]_D^{24} = -149°$ (EtOH).

The infrared absorption spectrum shows bands at 3250, 1633, 1574, 1512, 1052, 954 and 805 cm.$^{-1}$.

According to this process there are prepared 17β-hydroxy-retro-androsta-4,6-dieno[3,2-c] pyrazole from 2-hydroxymethylene-6-dehydro-retro-testosterone; 17β-hydroxy-6-methyl-retro-androst-4-eno [3,2-c] pyrazole from 2-hydroxymethylene-6-methyl-retro-testosterone and 17β-hydroxy-6-methyl-retro-androsta-4,6-dieno[3,2-c] pyrazole from 2-hydroxy-methylene-6-methyl-6-dehydro-retro-testosterone.

Example 94

A solution of 2.5 g. of p-hexyloxyphenyl propionyl chloride in 10 ml. of dry distilled chloroform free of ethanol was added dropwise at 0° C. with stirring within 5 minutes to a solution of 2 g. of 6-dehydro-retro-testosterone in 10 ml. of dry pyridine. After standing for 18 hours at room temperature, the mixture was poured onto ice and the mixture thus obtained extracted with a mixture of diethyl ether and ethyl acetate. After washing etc. of the organic layer, 3.9 g. of resinous 6-dehydro-retro-testosterone 17-(p-hexyloxyphenylpropionate) were obtained.

This substance was chromatographed in petroleum ether and 15% diethyl ether over 40 g. of silica gel and eluted with a similar mixture containing increasing amounts of diethyl ether. The collected fractions of the pure ester could not be made to crystallize.

The analytical values found were: $\varepsilon(284$ m$\mu)=26,900$. $\varepsilon(226$ m$\mu)=13,200$.

Found: C, 78.40, 77.99; H, 9.01, 8.89. Calc. for $C_{34}H_{46}O_4$: C, 78.72; H, 8.94.

The infrared spectrum showed bands at 1732, 1663, 1630, 1587, 1418, 1244, 1177, 1027, 875 and 828 cm.$^{-1}$.

Example 95

3 g. of succinic acid anhydride were added to a solution of 3 g. of 6-dehydro-retro-testosterone in 30 ml. of dry pyridine, the mixture being heated to 60° C. in a nitrogen atmosphere for 16 hours. The pyridine was then substantially distilled off in vacuo, and 70 ml. of benzene were added to the residue. After standing for 2 hours, the crystallized succinic acid was drawn off and the benzene layer was washed with water. Evaporation to dryness of the benzene layer gave the 6-dehydro-retro-testosterone 17-hemisuccinate, which was crystallized from methanol.

The analytical values of this substance were:

Melting point, 178 – 193.5 – 201.5 – 203.5° C. $\varepsilon(285$ m$\mu)=26,050$.

Found: C, 71.11, 70.90; H, 7.72, 7.81; O, 21.05, 21.02. Calc. for $C_{23}H_{30}O_5$: C, 71.48; H, 7.82; O, 20.70.

The infrared spectrum showed bands at 1742, 1685, 1660, 1623, 1582, 1418, 1168, 1031 and 875 cm$^{-1}$.

Example 96

2.86 g. of 6-dehydro-retro-testosterone were dissolved in 15 ml. of benzene, and 1.2 ml. of pyridine were added. A solution of 1.70 g. of phenyl propionyl chloride in 14 ml. of benzene was then added and the mixture was boiled for one hour. After the addition of 7.5 ml. of methanol, the mixture was boiled for another half an hour and, after cooling to room temperature, worked up by the method of Example 95. Crystallization of the resultant 6-dehydro-retro-testosterone 17-phenylpropionate from methanol gave crystals having a melting point of 92.5 (s)–93–94° C. and following additional analytical values: ($\lambda$ max.$=286$ m$\mu$)$=25,600$.

Found: C, 80.21; H, 8.26; O, 11.12. Calc. for $C_{20}H_{34}O_3$: C, 80.35; H, 8.19; O, 11.47.

The infrared spectrum shows bands at 1735, 1662, 1630, 1587, 1418, 1174, 1004 and 873 cm$^{-1}$.

Example 97

A solution of bromine in carbon tetrachloride was mol of steroid in the absence of light). After the addition retro-androsta-4,6-dien-3,17-dione (1 mol. of bromine per mol of steroid in the absence of light). After the addition of collidine (5 ml. per gram of starting steroid), the carbon tetrachloride was distilled off and the residue was heated to 140° C. in a nitrogen atmosphere for 10 minutes. After separation from the reaction mixture the resultant 4-bromo-retro-androsta-4,6-dien-3,17-dione was crystallized from acetone.

The analytical values of this substance were as follows:

Melting point, 109–115° C. (with strong decomposition, the melting point being greatly dependent upon the heating rate, while the Kofler method gives a melting range of from 130° to 150° C.).

$\varepsilon(\lambda$ max$=300$ m$\mu)=21,600$.

Found: C, 62.81, 63.02; H, 6.52, 6.43; O, 9.21, 9.18; Br, 21.50. Calc. for $C_{19}H_{23}O_2Br$: C, 62.81; H, 6.38; O, 8.81; Br, 22.00.

The infrared spectrum shows bands at 1738, 1677, 1620, 1545, 1410, 1279, 1187 and 795 cm$^{-1}$.

According to this process there are prepared 4-chloro- and 4-bromo-6-dehydro-retro-testosterone 17-acetate from 6-dehydro-retro-testosterone 17-acetate; 4-chloro- and 4-bromo-6-dehydro-11-hydroxy-retro-testosterone from 6-dehydro-11-hydroxy-retro-testosterone; 4-chloro- and 4-bromo-2-methyl-6-dehydro-retro-testosterone from 2-methyl-6-dehydro-retro-testosterone and 4-chloro- and 4-bromo-2-fluoro-6-dehydro-retro-testosterone from 2-fluoro-6-dehydro-retro-testosterone.

Example 98

A solution of 1.2 g. of retro-testosterone 17-propionate in 150 ml. of anhydrous benzene and 9 ml. of ethylene glycol was subjected to a slow distillation. After 30 ml. of the solvent had been distilled off, 35 mg. of p-toluene sulphonic acid were added, boiling being continued for 5 hours in a nitrogen atmosphere. After cooling, the product was poured into a saturated sodium bicarbonate solution and the benzene layer was thoroughly washed with water. The resultant resin was crystallized at −25° C. from methanol containing 0.5% of pyridine. Recrystallization finally yielded pure 3-ethylenedioxy-retro-androsta-3,5-dien-17β-ol 17 propionate with a melting point of 66–68° C. and the following additional analytical values:
Found: C, 74.17, 73.98; H, 9.38, 9.43. Calc. for $C_{24}H_{36}O_4$: C, 74.19; H, 9.34.

The infrared spectrum showed bands at 1738, 1660 (weak), 1201, 1103, 1082, 1062, 1009 and 1002 cm.$^{-1}$.

According to this process there are prepared 3-ethylenedioxy-retro-androstra-3,5-dien-17-one from retro-androst-4-ene-3,17-dione; 3-ethylenedioxy-retro-androsta-3,5-diene-11,17-dione from retro-androst-4-ene-3,11,17-trione and 3-ethylenedioxy-2-methyl-retro-androsta-3,5-diene-17β-ol from 2-methyl-retro-testosterone.

Example 99

A solution of 3 g. of 3-(N-pyrrolidino)-retro-androsta-3,5-dien-17-one in 250 ml. of a mixture of dry benzene and dry diethyl ether (1:1) was added to a "Grignard" solution, prepared by reacting 1.0 g. of magnesium in dry diethyl ether with excess of methyl bromide. Then the solvent was distilled off until the boiling point of 70° C. was reached. The reaction mixture was then refluxed for 4 hours, after which working up was performed by the addition of 50 ml. of a saturated solution of ammonium chloride; concentration in vacuo to a smaller volume and the addition of a mixture of 20 ml. of 2 N sodium hydroxide and 200 ml. of methanol, respectively. Stirring at 40° C. for 30 minutes hydrolysed the 3-en amine. Working up yielded, after chromatography through silica gel, pure 17α-methyl-retro-testosterone with a melting point of 133–134° C.

$E_{1cm}^{1\%}$ (λ maximum=242.5 mμ)=548

Found: C, 79.58, 79.74; H, 10.13, 9.88. Calc. for $C_{20}H_{30}O_2$ (302.46): C, 79.41; H, 10.00.

The infrared spectrum showed bands inter alia at 3418, 1656, 1621, 1153, 1097, 946 and 875 cm.$^{-1}$.

Example 100

By the same process as described for the preparation of the corresponding 3-methoxy compound retro-androst-4,6-diene-3,17-dione was converted into 3-ethoxy-retro-androsta-3,5,7-triene-17-one. The compound obtained melted at 118–119.5° C.

$E_{1cm}^{1\%}$ (λ max.=320 mμ)=623

Found: C, 80.33, 80.48; H, 9.13, 9.20; O, 11.16, 10.85. Calc. for $C_{21}H_{28}O_2$ (312.45): C, 80.72; H, 9.03; O, 10.25.

The infrared absorption spectrum showed bands inter alia at 3043, 1731, 1654, 1622, 1573, 1179 and 855 cm.$^{-1}$.

Example 101

Dry hydrochloric acid gas was passed into 22 g. (28 ml.) of dry methanol at 0° C. until the concentration was about 57 g. of HCl per 100 g. of methanol. Then, while stirring, a solution of 1.0 g. of retro-androsta-4,6-diene-3,17-dione in 15 ml. of methylene chloride was added. The reaction mixture was allowed to stand at 0° C. for 30 minutes and was subsequently diluted with 28 ml. of methanol of −25° C.

After standing at 0° C. for another 30 minutes the mixture was poured out onto a well-stirred mixture of about 50 g. of sodium bicarbonate and 200 ml. of water at 0° C. The reaction product was taken up in a mixture of methylene chloride and petroleum ether and the combined extracts were washed with ice water until neutral. The solution was dried over sodium sulphate, filtered and after the addition of a few drops of pyridine evaporated to dryness in a vacuum (t≤20° C.). The residue (1.12 g.) showed an $E_{1cm}^{1\%}$ (λ maximum=325 mμ)=332 and was crystallized from methanol containing 1% of pyridine at −5° C. yielding 404 mg. of crystals having a melting point of 129–135° C. (in vacuo). Two recrystallizations of a sample from the same solvent finally gave 3-methoxy-retro-androsta-3,5,7-trien-17-one with a melting point of 136 (s)—139–140° C. (in vacuo).

$E_{1cm}^{1\%}$ (λ maximum=317.5 mμ)=619 and 621.

Found: C, 80.69, 80.66; H, 8.91, 8.87; O, 11.18, 11.11. Calc. for $C_{20}H_{26}O_2$ (298.43): C, 80.48; H, 8.78; O, 10.72.

The infrared absorption spectrum showed bands inter alia at 1738, 1652, 1625, 1573, 1248, 1189, 1168, 1031, 991, 875 and 848 cm.$^{-1}$.

Example 102

2.5 g. of retro-testosterone were dissolved into 40 ml. of dry pyridine. To this solution, while stirring, was added a solution of 1.6 g. of hexahydrobenzoylchloride in 20 ml. of dry benzene at a temperature of 0° C. in the course of 20 minutes. After standing at room temperature for 24 hours the reaction mixture was worked up. Recrystallization from petroleum ether at −25° C. yielded the 17-hexahydrobenzoate of retro-testosterone with a melting point of 70 (s)—71–73° C.

ε (λ max.=241 mμ)=16,700.

Found: C, 77.83, 77.99; H, 9.77, 9.70; O, 12.26. Calc. for $C_{26}H_{38}O_3$ (398.56): C, 78.35; H, 9.61; O, 12.04.

Example 103

A solution of 2.0 g. of 17α-methyl-retro-testosterone and 1–7 g. of dichlorodicyanobenzoquinone in 100 ml. of dry benzene was refluxed in a nitrogen atmosphere for 7 hours. Working up yielded 1.36 g. of rather pure 1-dehydro-17α-methyl-retro-testosterone which was chromatographed through a column of silica gel. The pure compound melted at 160 (s)—163–164° C.

$E_{1cm}^{1\%}$ (λ max.=243 mμ)=483.

Found: C, 79.27, 79.31; H, 9.33, 9.42. Calc. for $C_{20}H_{28}O_2$ (300.44): C, 79.95; H, 9.40.

The infrared absorption spectrum showed bands inter alia at 3382, 1660, 1619, 1602, 1077, 952, 930, 887 and 807 cm.$^{-1}$.

Example 104

From a solution of 3.0 g. of retro-androst-4-ene-3,17-dione and 0.3 g. of p-toluenesulphonic acid in 70 ml. of benzene and 3.6 ml. of isopropenylacetate about 60 ml. of solvent was distilled off in the course of 2 hours, after which boiling was continued for 1 hour. Working up and recrystallization gave 3-acetoxy-retro-androsta-3,5-dien-17-one with a melting point of 140 (s)—142–143° C.
ε(λ maximum=237 mμ)=18,700.

Found. C, 76.17, 76.46; H, 8.45, 8.16. Calc. for $C_{21}H_{28}O_3$: C, 76.78; H, 8.59.

The infrared absorption spectrum showed bands inter alia at 1753, 1727, 1670, 1643, 1369, 1214, 1013, 876 and 826 cm.$^{-1}$.

Example 105

(a) To a solution of 1.564 g. of retro-testosterone in 6.25 ml. of dry pyridine was added 1.56 g. of p-toluene sulpho-chloride. The mixture was allowed to stand at room temperature in the dark in a nitrogen atmosphere for 24 hours. Working up and recrystallization from ethylacetate yielded retro-testosterone 17-tolylate with a melting point of 163.5 (s)—164.5-165.5° C.

$E_{1cm}^{1\%}$ (λ max.=220 mμ)=506

Found: C, 70.65, 70.89; H, 7.90, 7.88; S, 7.29, 7.29. Calc. for $C_{26}H_{34}O_4S$ (442.62): C, 70.55; H, 7.74; S, 7.24.

The infrared absorption spectrum showed bands inter alia at 1668, 1618, 1603, 1496, 1418, 1175, 1098, 964, 887 and 815 cm.$^{-1}$.

(b) 750 mg. of freshly molten potassium acetate and 0.5 ml. of water was added to a solution of 1.5 g. of retro-testosterone 17-tolylate in 12 ml. of freshly distilled dimethyl formamide. The solution obtained was heated in a nitrogen atmosphere at reflux temperature for 7 hours. Working up gave a resin which was hydrolyzed by dissolving it in 10 ml. of ethanol and boiling this solution after 1 ml. of 50% potassium hydroxide solution had been added. Working up gave a resin which was chromatographed through a column of silica gel.

A less polar fraction consisted of the retro-androsta-4,16-dien-3-one. The infrared absorption spectrum of this compound showed bands inter alia at 1671, 1618, 1443, 1230, 1172, 949, 859 and 709 cm.$^{-1}$. From a more polar fraction was obtained the pure 17α-retro-testosterone (retro-androst-4-en-17α-ol-3-one) which melted at 153 (s)—153.5–154.5° C.

$E_{1\,cm.}^{1\%}$ (λ max.=241 mμ) =565.

Found: C, 78.32, 78.78; H, 9.84, 9.77; O, 11.79, 11.48. Calc. for $C_{19}H_{28}O_2$ (288.41): C, 79.12; H, 9.79; O, 11.09.

The infrared absorption spectrum showed bands inter alia at 3416, 1649, 1609, 1413, 1245, 1164, 1110, 1024, 1071, 1040, 994, 975, 936 and 868 cm.$^{-1}$.

(c) 430 mg. of 17α-retro-testosterone was dissolved in 7.25 ml. of dry benzene and 7.5 ml. of pyridine and to this solution was gradually added at a temperature of 0° C. 2.8 ml. of a solution of 1.33 ml. of acetyl chloride in 26.6 ml. of dry benzene.

After standing at room temperature for 24 hours the mixture was worked up. The 17α-retro-testosterone 17-acetate was recrystallized from hexane.

Melting point 128.5–130° C.

$E_{1\,cm.}^{1\%}$ (λ max.=241 mμ) =500

Found: C, 76.47; H, 9.25; O, 14.72, 14.88. Calc. for $C_{21}H_{30}O_3$ (330.45): C, 76.32; H, 9.16; O, 14.52.

The infrared absorption spectrum showed bands inter alia at 1726, 1679, 1618, 1237, 1172, 1029, 968 and 875 cm.$^{-1}$.

*Example 106*

Perchlorylfluoride gas was introduced while stirring into a solution of 10.3 g. of 3,17β-diacetoxy-retro-androsta-3,5-diene in 500 ml. of freshly distilled dioxane and 300 ml. of water for one hour (N=about 51/hour). After working up a crystalline residue was obtained containing 4.01% fluorine $[E_{1\,cm.}^{1\%}$ (235 mμ) = 352]

Chromatography through a column of silica gel was performed having the following results.

The less polar fraction consisted of 6α-fluoro-retro-testosterone 17-acetate. The melting point of this compound was 129.5–130.5° C. ε (λ max.=234 mμ)=12,700.

Found: C, 72.56, 72.28, 72.45, 72.39; H, 8.30, 8.32, 8.28, 8.50; F, 4.77, 6.80, 4.65. Calc. for $C_{21}H_{29}FO_3$ (348.46); C, 72.38; H, 8.39; F, 5.45.

The infrared absorption spectrum showed bands inter alia at 1723, 1682, 1625, 1430, 1255, 1028, 2884 cm$^{-1}$.

*Example 107*

Microbiological hydroxylation of retro-testosterone yielded 16α-hydroxy-retro-testosterone with a melting point of 210–212° C. The infrared absorption spectrum of this compound showed bands inter alia at 3445, 3348, 1661, 1614, 1414, 1090, 1072, 1058, 1050, 1023, 1008 and 862 cm.$^{-1}$.

[α]$_D$=−167° (CHCl$_3$).

Found: C, 74.79, 74.84; H, 9.20, 9.21. Calc. for $C_{19}H_{28}O_3$: C, 74.96; H, 9.27.

*Example 108*

2 - fluoro-isolumisterone (2-fluoro-lumista-4,6,22-trien-3-one) was prepared as described in Example 20. Following the process as described in Example 1b this compound was converted into 2-fluoro-retro bis-norchol-3-on-4-en-22-al. Following the process of Example 3b this latter compound was converted into 2-fluoro-retrobis-norchol-3-on-4,17(20)-dien-22-al. Following the process of Example 3c this latter compound was converted into 2 - fluoro - retroandrost-4-en-3,17-dione. Following the process of Example 70 this latter compound was converted into 2-fluoro-retroandrost-4-en-3,17-diol. Following the process of Example 71 this latter compound was converted into 2-fluoro-retro-testosterone. Following the process of Example 5 this latter compound was converted into 2-fluoro-6-dehydro-retro-testosterone. The latter compound has a melting point of 80–82° C. At 90–95° C. the melt solidified and melted again at 137.5–141° C. Another preparation melted only at 142–143.5° C. The infrared absorption spectrum showed bands inter alia at 3433, 1685, 1629, 1584, 1053, 1043 and 878 cm.$^{-1}$.

*Example 109*

(a) When retro-androst-4-ene-3,17-dione was reduced with sodium borohydride in ethanol-water containing sodium hydroxide besides the 3,17β-hydroxy-retro-5-androst-4-ene there was obtained the ring A saturated 8,17β-dihydroxy-retro-androstane with a melting point of 156–158° C.

Found: C, 77.86, 77.97; H, 10.89, 10.85. Calc. for $C_{19}H_{32}O_2$: C, 78.04; H, 11.03.

(b) Oxidation of this latter compound with chromic acid in acetone containing sulphuric acid yielded retro-5-androstane-3,17-dione with a melting point of 114–115.5° C. The infrared absorption spectrum showed bands inter alia at 1733, 1709, 1270 and 810 cm.$^{-1}$.

*Example 110*

The reaction of retro-androst-4-en-17-one with methylmagnesium iodide in diethyl ether yielded 17α-methyl-retro-androst-4-en-17-ol. The pure compound did not crystallize.

The infrared absorption spectrum showed bands inter alia at 3400, 1663, 1372, 1075 and 808 cm.$^{-1}$.

*Example 111*

(a) 2 g. of retro-testosterone was dissolved in 3 ml. of diethyl ether and 6.5 ml. of acetic acid. To this solution there was added 0.72 ml. of 1,2-ethanedithiol and 0.85 ml. of bor trifluoride-etherate. This mixture was stirred for an hour and then poured out into water. Working up yielded 3-ethylene dithio ketal of retro-testosterone with a melting point of 166–167.5° C. The infrared spectrum showed bands inter alia at 3375, 1645, 1057, 860, 845 and 825 cm$^{-1}$.

(b) 0.5 g. of 3-ethylenedithioketal of retro-testosterone was dissolved in 2.5 ml. of tetrahydrofurane. This solution was added to a mixture of 15 ml. of liquid ammonia and 5 ml. of tetrahydrofuran. Then 0.4 g. of lithium was added to the reaction mixture. After stirring for 15 minutes the excess of lithium was decomposed by adding ethanol. Working up yielded a resin of 3-desoxy-retro-testosterone which did not crystallize after purification. The infrared spectrum showed bands inter alia at 3335, 1661, 1074, 1057, 1043 and 807 cm.$^{-1}$.

(c) Oxidation of 3-desoxy-retro-testosterone with chromic acid in acetone containing sulphuric acid yielded retro-androst-4-en-17-one with a melting point of 89–90.5° C.

Found: C, 83.58, 83.80; H, 10:44, 10.47; O, 6.24, 6.29. Calc. for $C_{19}H_{28}O$: C, 83.77; H, 10.36; O, 5.87. 2.02.

The infrared absorption spectrum showed bands inter alia at 1741, 1659, and 807 cm.$^{-1}$.

*Example 112*

When retro-testosterone was reacted with acetyl chloride in pyridinebenzene at room temperature for 24 hours retro-testosterone 17-acetate was obtained.

The compound melted at 113–114.5° C.

(241.5 mμ)=17,000

The infrared absorption spectrum showed bands inter alia at 1732, 1668, 1616, 1418, 1250, 1049, 1029 and 875 cm.$^{-1}$.

*Example 113*

(a) To a solution of 1 g. of 22-(N-piperydyl)-7-methyl-retro-bisnorchola-4,20(22)-dien-3-one (prepared as described in Example 50) in 50 ml. of methylene chloride there was added at −55° C., while stirring, a solution of 0.15 ml. of bromine in 6 ml. of methylene dichloride in the course of 20 minutes. Then the solution was heated to 0°, after which 6.5 ml. of water was added. Stirring was continued at room temperature for two hours and worked up by washing with water. To the dried solution there was added 1.5 ml. of pyridine and the solvent evaporated. After the addition of 5 ml. of pyridine the reaction mixture was heated in a nitrogen atmosphere at 70° C. for one hour and at 100° C. for half an hour.

Working up yielded 7-methyl-retro-bisnorchola-4,17-(20)-dien-3-one-22-al with a melting point of 182–183.5° C. $\epsilon(\lambda\ max = 248\ m\mu) = 29,800$.

Found: C, 80.26, 80.48; H, 9.21, 9.42. Calc. for $C_{23}H_{32}O_2$: C, 81.12; H, 9.48.

The infrared spectrum showed bands inter alia at 1664, 1615, 1417 and 883 cm.$^{-1}$.

(b) To a suspension of 7-methyl-retro-bisnorchola-4,17(20)-dien-3-on-22-al in 30 ml. of methanol was added, while stirring, 4.8 g. of sodium cyanide. Then the mixture was cooled to −20° C., after which 4.8 ml. of acetic acid and 50 ml. of methanol were added, respectively. In the course of two hours the temperature was raised to +5° C. and the mixture kept at that temperature for 40 hours. Then the reaction mixture was poured out into 90 ml. of methylene dichloride, thoroughly washed with ice-water and finally dried on sodium sulphate at −5° C.

After cooling to −80° C. 2 ml. of dry pyridine was added to the methylene dichloride solution/200 ml. Then 10.3 mmol of osone was passed into the solution after which the osonized mixture was stirred at room temperature with 3 g. of zinc and 9 ml. of acetic acid. Working up yielded 7-methyl-retro-androst-4-ene-3,17-dione with a melting point of 196–197° C.

$E_{1\ cm.}^{1\%}$ ($\lambda\ max. = 242.5\ m\mu$) = 542

Found: C, 79.68, 79.70; H, 9.32, 9.38. Calc. for $C_{20}H_{28}O_2$: C, 79.93; H, 9.40.

The infrared spectrum showed bands inter alia at 1734, 1664, 1613, 1417, 892 and 866 cm.$^{-1}$.

(c) 7-methyl-retro-androst-4-ene-3,17-dione was reduced according to the process described in Example 70 to produce 7-methyl-retro-androst-4-ene-3,17β-diol with a melting point of 80–95° C. (containing crystal solvent).

Found (after drying): C, 77.27, 77.46; H, 11.00, 10.83. Calc. for $C_{20}H_{32}O_2$: C, 78.90; H, 10.59.

The infrared spectrum showed bands inter alia at 3310, 1658, 1079, 1047 and 1010 cm.$^{-1}$.

(d) 7-methyl-retro-androst-4-ene-3,17β-diol was oxidized as in Example 71 to 7-methyl-retro-testosterone. The compound melted at 146.5–150° C.

$\epsilon(\lambda\ max = 243\ m\mu) = 18,750$

Found: C, 78.87, 78.70; H, 10.22, 9.91. Calc. for $C_{20}H_{30}O_2$: C, 79.42; H, 10.00.

The infrared spectrum showed bands inter alia at 3230, 1665, 1610, 1416, 1228, 1172, 1088, 1071, 1056 and 1009 cm.$^{-1}$.

*Example 114*

To a solution of 3 g. of 3,17β-diacetoxy-retro-androsta-3,5-diene in 60 ml. of diethyl ether there was added a solution of 6.4 g. potassium acetate in 120 ml. of 85% acetic acid. While stirring, a solution of 0.57 g. of chlorine in 42.7 ml. of acetic acid was added to the solution at 0° in the course of 5–10 minutes. Working up yielded 6-chloro-retro-testosterone 17-acetate with a melting point of 173 (Δ)—176–178° C. $\epsilon(\lambda\ max = 237 m\mu) = 14,200$.

Found: C, 69.31, 69.33; H, 8.14, 8.16; Cl, 9.41, 9.69. Calc. for $C_{21}H_{29}O_3Cl$: C, 69.12; H, 8.01; Cl, 9.71.

The infrared absorption spectrum showed bands inter alia at 1733, 1676, 1622, 1415, 1240, 1024, 874 and 784 cm.$^{-1}$.

*Example 115*

(a) To a solution of 51 g. of dihydroisolumisterone in a mixture of 1350 ml. of dry benzene and 120 ml. of dry ethanol were added 5.1 g. of pyridine. HCl and 120 ml. of freshly distilled ethyl orthoformate. After 80 ml. of solvent had been distilled off in a slow rate, the reaction mixture was boiled for 3½ hours. Then again 80 ml. of solvent were distilled off, after which 120 ml. of ethyl orthoformate were added to the reaction mixture. Boiling was continued for 2½ hours and the solvents evaporated in vacuo until a volume of about 300 ml. was reached. The concentrate was poured onto ice and the organic material was taken up in diethyl ether by several extractions. The combined ether layers were washed successively twice with 200 ml. portions of water, with 200 ml. of a saturated sodium bicarbonate solution and with water. From the dried and filtered solution the solvents were distilled off in vacuo and the resinous residue (60 g.) crystallized from 60 ml. of acetone at −5° C. for 60 hours. Recrystallization from a mixture of 40 ml. of acetone and 10 ml. of dry ethanol, containing 1% of dry pyridine, at −5° C. yielded 44.25 g. of 3-ethoxy-lumista-3,5,22-triene with a melting point of 74 (s)—75–77° C.

Two recrystallizations of a small part of this product from dry ethanol containing 1% of dry pyridine finally raised the melting point to 76–77.5° C.

$E_{1\ cm.}^{1\%}$ ($\lambda\ maximum = 244\ m\mu$) = 430. $\epsilon(244\ m\mu) = 18,300$.

Found: C, 84.14, 84.36; H, 11.44, 11.54. Calc. for $C_{30}H_{48}O$ (424.71): C, 84.84; H, 11.39.

The infrared absorption spectrum exhibited bands among others at 1648, 1622, 1224, 1175, 1046, 970 and 849 cm.$^{-1}$.

(b) To a solution of 12.7 g. of 3-ethoxy-lumista-3,5,22-triene in a mixture of 60 ml. of dry dioxane and 4.8 ml. of dry pyridine were added 20 g. of tetrabromomethane. The resulting solution was allowed to stand at room temperature for 45 hours, after which the precipitate consisting of collidine hydrobromide. CBr$_4$ was filtered off and washed with 15 ml. of dioxane. The filtrate was poured into 1 liter of N hydrochloric acid at 0° C. and the 6-tribromo methyl compound taken up in petroleum ether by several extractions (total volume 500 ml.). The combined extracts were thoroughly washed with water, dried over sodium sulphate and filtered. The filtrate was evaporated in vacuo ($t<50°$) to dryness and the resinous residue (20 g.) crystallized at −5° C. from a mixture of 20 ml. of acetone and 50 ml. of ethanol. By suction 7.46 g. of 6-tribromomethyl-dihydroisolumisterone with melting point 127–128° C. (dec.) were obtained, $E_{1\ cm.}^{1\%}$ (241 m$\mu$) = 222

Several recrystallizations from acetone-methanol raised the melting point to 132–133.5° C. (dec.). For the determination of the melting point the capillary was introduced into the melting apparatus (Tottoli) at a temperature of 125° C., after which the melting bath was warmed up at a rate of 3° C. per minute.

$E_{1\ cm.}^{1\%}$ ($\lambda\ max. = 242\ m\mu$) = 220. $\epsilon(142\ m\mu) = 14,200$.

Found: C, 53.80, 53.64; H, 6.62, 6.42; Br, 37.01, 36.68. Calc. for $C_{29}H_{43}OBr_3$ (647.41): C, 53.80; H, 6.69; Br, 37.03.

The infrared absorption spectrum exhibited bands among others at 1682, 1617, 1461, 1420, 1266, 1235, 980, 970, 876, 749, 720 and 705 cm.$^{-1}$.

(c) A solution of 100 mg. of 6-tribromomethyl-dihydroisolumisterone in 15 ml. of ethanol was heated while stirring, in the presence of 15 ml. of a strong anion exchange resin (strongly basic cross-linked polystyrene resin type 2). Working up yielded 6-dibromomethylene-dihydroisolumisterone. Melting 105–109° C.

$\epsilon(\lambda 249\ m\mu) = 10,200$.
$\epsilon(\lambda 206\ m\mu) = 5,900$.

The infrared spectrum showed bands inter alia at 1670, 1610, 1575, 1420, 965, 930, 875, 815, 795 and 680 cm.$^{-1}$.

(d) Hydrogenation of 6-dibromomethylene-dihydroisolumisterone in 2-methoxy ethanol with palladium or strontium carbonate afforded 6-methyl-dihydroisolumisterone with a melting point of 100–102.5° C.

$[\alpha]_D^{23} = +10°$ C. (CHCl$_3$). $\epsilon(245\ m\mu) = 15,200$.

The infrared spectrum showed bands inter alia at 1665, 1608, 1293, 1265, 1227, 966 and 850 cm.$^{-1}$.

(e) According to the processes described in Example 1, 6-methyl-dihydroisolumisterone was converted into 6-methyl-retro-progesterone.

According to Examples 3 and 6, 6-methyl-dihydroisolumisterone was converted into 6-methyl-17α-hydroxy-retro-progesterone.

Example 116

(a) To a boiling solution of 3 g. of retro-androst-4-ene-3,17-dione in 30 ml. of dry methanol 1.6 ml. of freshly distilled pyrrolidine was added, after which boiling was continued for 10 minutes. A slow stream of nitrogen was passed over the solution during the process.

The 3-(1′-pyrrolidino)-retro-androsta-3,5-dien-17-one had been allowed to crystallize, also in a nitrogen atmosphere, at room temperature for one hour and finally at −25° C. for about 16 hours. Suction was followed by washing with methanol of −25° C. and drying in a high vacuo. Yield 3.31 g. of enamine with $E_{1\ cm.}^{1\%}$ ($\lambda$ max. $= 275\ m\mu) = 543$ The substance could be stored at −25° C. in a nitrogen atmosphere and with exclosure of light without decomposition for a rather long time. It was used without further purification for the preparation of 17α-alkenyl-retro-steroids by means of Grignard reactions.

(b) A mixture of 1.0 g. of magnesium and 10 ml. of diethyl ether was cooled to 0° C. in a nitrogen atmosphere. The ether used as a solvent for the reaction was dried and purified by boiling with sodium and benzophenone according to the process described by Kharasch and Reinmuth, Grignard Reactions of Nonmetallic Substances, page 25. Then, while stirring, a solution of 3.7 g. of freshly distilled 2-methallylchloride in 10 ml. ether was dropped into the mixture in the course of 10 minutes. The dropping funnel was washed with 5 ml. of ether.

After stirring at 0° C. for 2 hours a suspension of 3.3 g. of powdered 3-(1′-pyrrolidino)-retro-androsta-3,5-dien-17-one in 100 ml. of ether was gradually added to the reaction mixture. Stirring was continued at room temperature for one hour and at the boiling temperature for 5 hours, respectively.

Then the reaction mixture was allowed to stand overnight, without stirring, under nitrogen, after which 50 ml. of a saturated solution of ammonium chloride were added. Stirring for one hour and distilling off the ether in vacuo gave a residue, which was washed with 100 ml. of a 2 N potassium hydroxide solution. The residue was then taken up in 200 ml. of methanol. To this solution were added 20 ml. of a 2 N potassium hydroxide solution, after which the mixture was stirred at 50° C. for 45 minutes. Thereupon the reaction mixture was neutralized by the addition of 40 ml. of acetic acid, after which the methanol was distilled off in vacuo. To the residue 1 l. of water was added and the organic material was taken up in a mixture of methylene chloride and petroleum ether. The combined organic layers were washed with water (twice), 2 N potassium hydroxide (three times) and finally with water until neutral. The solution was dried over sodium sulphate and filtered, after which the solvents were removed by distillation (finally in vacuo).

The residue (3.01 g.) was recrystallized from methanol at −25° C., which procedure gave 2.52 g. of 17α-(2′-methallyl-retro-testosterone with a melting range of 85–91–93° C. Repeated recrystallization gave 1.66 g. with unchanged melting range. Development of gas during the melting indicated that crystal solvent was present in the substance. Thin-layer chromatography indicated that the first crystallizate was already a fairly pure substance.

A small quantity was heated in a high vacuo at 55° C. in the presence of phosphorous pentoxide for several hours and recrystallized from ether.

Melting point 106–108°.

$E_{1\ cm.}^{1\%}$ ($\lambda$ max. $= 242.5\ m\mu) = 483$

Found: C, 80.80, 80.45; H, 10.10, 9.83. Calc. for $C_{23}H_{34}O_2$ (342.52): C, 80.65; H, 10.00.

The infrared absorption spectrum showed bands, inter alia, at 3490, 3068, 1671, 1616, 1418, 1074, 1002, 884 and 863 cm.$^{-1}$ (taken up in KBr-tablets).

Example 117

According to the processes described in the Examples 116a and 116b retro-androst-4-ene-3,17-dione was reacted with allylmagnesiumchloride to produce 17α-allyl-retro-testosterone. The compound showed the following physical properties: melting point, 74 (s)—76–78° C. $\epsilon(\lambda$ max. $=242.5\ m\mu) = 16,400$. The infrared absorption spectrum showed bands inter alia at 3636, 3415, 3070, 1669, 1658, 1617, 1418, 1231, 1018, 1000, 920, 907, 897 and 860 cm.$^{-1}$.

The compound has a tendency to hold crystal solvent, such as water and methanol.

Example 118

According to the process described in the Example 116a retro-androsta-4,6-diene-3,17-dione was converted into 3,7-di-(1′-pyrrolidino)-retro-androsta-3,5-dien-17-one, which compound was alkylated with 2-methallyl-magnesium chloride according to the process described in Example 116b to produce 6-dehydro-17α-(2′-methallyl)-retro-testosterone. $\epsilon(\lambda\ 286\ m\mu) = 23,200$.

The infrared absorption spectrum of the compound showed inter alia bands at 3420, 3054, 1657, 1624, 1582, 1416, 1004 and 879 cm.$^{-1}$.

According to Examples 3, 70 and 71, 6-methyl-dihydroisolumisterone was converted into 6-methyl-retro-testosterone.

The compounds of the invention may be compounded in the form of pills, capsules, tablets and in liquid form for oral administration and in liquid form for parenteral administration.

Suitable tablets of 6-dehydro-retro-progesterone may be obtained, for example, by preparing tablets from a mixture of the following composition:

|  | Mg. |
|---|---|
| 6-dehydro-retro-progesterone | 1.0 |
| Gelatine | 2.5 |
| Lactose | 220.0 |
| Talcum | 24.5 |
| Magnesium stearate | 2.0 |
| Total | 250.0 |

In order to determine the hormonal activity of the novel retrosteroids of our invention the following tests were carried out.

QUALITATIVE DETERMINATION OF PROGESTATIONAL ACTIVITY PRODUCTS BY THE CLAUBERG TEST (PROCEDURE 300)

Principle of test:

The uterus of an infantile female rabbit changes by subcutaneous administration of estrone in the same manner as it is changed by the action of heat. Owing to cell division, cell enlargement, enhanced vasculariztion and accumulation of liquid in tissues all layers are thickened, but apart from the larger volume there is little difference between the state termed "proliferation phase" by Clauberg and the infant or castrate uterus in regard to the histological form.

Conspicuous variations in shape occur under the action of the corpus luteum hormone, particularly in the mucosa (transformation phase or progestative phase or secretion phase).

The mucous membrane epithelium, which initially was limited to a simple four- or five-armed lumen, starts growing strongly and emits numerous strongly ramified intussusceptions in depth. The stroma is thus urged back by the epithelium and finally reduced to a minimum.

In the tests infantile female rabbits aged 6 weeks, with a weight between 500 and 1000 gms. are used. During the test the animals are fed normal fodder.

Method of test:

(a) Dilute 0.1 ml. of β-estradiol solution with arachidic oil to 10 ml. of a graduated bulb. Dilute 4 ml. of this solution to 250 ml. with arachidic oil (8 units/ml.).

(b) Administer daily for 8 days subcutaneously 0.5 ml. of β-estradiol solution to the rabbits.

(c) Parenteral test: Weigh 80 ml. of the steroid to be tested in a mortar of 25 ml. Dissolve in about 1 ml. of methylene chloride and add 8 ml. of arachidic oil. Evaporate subsequently the methylene chloride in vacuo (maximum temperature 40° C.) until the concentration of the resultant solution is 10 mg./ml. (solution C).

(d) Dilute 1 ml. of solution C to 10 ml. with arachidic oil resulting in solution B, concentration 1 mg./ml.

(e) Dilute 1 ml. of solution B to 10 ml. with arachidic oil resulting in solution A concentration 0.1 mg./kg.

(f) Oral test: Weigh 60 mg. of the steroid in a small stoppered bottle and dissolve the steroid in 3 ml. of methylene chloride. Add dropwise 0.1 ml. of the resultant solution on twenty-five blank tablets. Evaporate the methylene chloride so that each tablet contains about 2 mg. of the substance.

(g) If the substance to be tested is poorly soluble in methylene chloride a suspension of the steroid is made in 1% of sodium carboxymethyl cellulose in a concentration of 10 mg./ml. In order to do this the substance is powdered in a small mortar and 60 mg. is weighed. Then 60 mg. of sodium carboxymethyl cellulose is added and 6 ml. of distilled water is added slowly, with stirring continuously.

(h) Prepare a standard solution of progesterone by weighing 7.5 mg. of progesterone and by adding methylene chloride and 10 ml. of arachidic oil. Evaporate the methylene chloride in vacuo.

(i) The animals pretreated with estradiol are divided into six groups by random allocations.

(j) For five days the animals are treated according to the following procedure: Group (1) Arachidic oil—0.2 ml. a day by subcutaneous administration; (2) progesterone 750 mg./ml.–0.2 ml. a day by subcutaneous administration; (3) steroid in solution A=0.1 mg./ml.=0.2 ml. a day by subcutaneous administration; (4) steroid in solution B=1 mg./ml.=0.2 ml. a day by subcutaneous administration; (5) steroid in solution C=10 mg./ml. =0.2 ml. a day by subcutaneous administration; (6) oral, 1 tablet or 0.2 ml. of the suspension 10 mg./ml.

(k) For these five days the animals are treated, in addition, with estradiol and have subcutaneous injections of 0.1 ml. of β-estradiol (8 units/ml.).

On the fourteenth day (or at the end of the thirteenth day) the animals are killed by a deathblow and the blood is extracted. The uterus is prepared and fixed in formaline (4%). The uterus is macroscopically examined. Paraffin sections of 5μ are made and colored with H.E.

MAINTAINING OF THE PREGNANCY AFTER OVARIECTOMY WITH THE AID OF A PROGESTATIVE STEROID IN THE RAT (PROCEDURE 306)

Principle of test:

One of the most important criteria for a progestative substance is, apart from the direct effect of the uterus endometrium (Clauberg test), the requirement of maintaining the pregnancy after the ovaria have been removed.

The ovaria must be removed between the tenth and the thirteenth day of pregnancy. If the ovariectomy is performed at a later date of the pregnancy, the mother rat is capable, even without the injection of progestatives with or without the addition of estrogenic hormones, of normally terminating the pregnancy. The placenta has then developed to an extent such that it provides itself the required hormones. This test is therefore based on the fact that a pregnant rat, subsequent to ovariectomy within the given time, is not capable of achieving the pregnancy and usually ejects the embryos or resorbs them.

Test animals: A large number of adult female rats which have littered once and a number of adult male rats are used. The ratio of the number of female to male rats used in the test is 3:1.

Method of test: (a) The female rats are caged in groups of three. To three female rats there is added one male rat.

(b) The next morning vaginal smears are made, which are fixed in methyl alcohol and colored with methylene blue.

(c) The smears are then examined for the presence of spermatozoa.

(d) When the vaginal smear of a rat is sperma-positive, the animal is caged separately and weighed (the 0th day of the pregnancy).

(e) At the tenth, eleventh or twelfth day of the pregnancy the animals are first injected or fed orally with blank arachidic oil or with the steroid to be tested.

(f) At the eleventh, twelfth or thirteenth day ovariectomy is carried out under ether anaesthesia; at the same time the weight is determined. Directly after the ovariectomy the preparation is administered for the second time.

(g) All injections are carried out subcutaneously twice a day. The active steroid is dissolved in 0.2 ml. of arachidic oil. Oral feeding is carried out twice a day, also 0.2 ml. each time. In this case the active steroid is suspended in a carboxymethylcellulose solution consisting of:

| | Percent |
|---|---|
| Carboxymethylcellulose | 1.0 |
| Sodium chloride | 0.9 |
| Benzyl alcohol | 1.5 |
| Tween 60 | 1.0 |
| Distilled water to make | 100 |

(h) The animals are treated up to the twenty-first day of pregnancy.

(i) It is noted when a vaginal bleeding is observed or when fetus remains are found in the cage.

(j) At the 22nd day the rats are killed by chloroform and by means of a caesarian section the number of living young, the number of fetus remains and the number of resorbed fetus (affixtures) per rat are determined.

(k) Each mother rat is examined on the presence of ovarium remains.

(l) It is desirable to arrange this test so that each treated group has its separate statistic data. Therefore there is a considerable difference of time between the start of the test for rat 1 and the end of the test for the rat 6 of a treated group. The desirable number of rats per group is 6 to 7 mother rats.

Literature:

Stucki, J. C., Proc. Soc. Exp. Biol. (N.Y.), 99 (1958), 500.

Stucki, J. C., and Forbes, A. D., Acta Endocr., 33 (1960), 73–80.

MASCULINISATION EFFECT OF A STEROID ON THE FEMALE RAT FETUS (RAT), IF ANY (PROCEDURE 307)

Principle of the test:

After the administration of testosterone and different progestative substances during the pregnancy important external and internal changes of the tractus genitalis of the female fetus are produced.

The genital differentiation of the rat takes place between the 14th and the 17th day of pregnancy. The administration of the substance to be tested must therefore start in said period if variations in the ano-genital distance, enlarged clitoris, no modifications of vagina and no internal deviations are to be assessed.

For a progestatively acting hormone it is necessary to have no direct androgenic effect on the patient, while indirectly no masculinating effect on the female fetus should be found.

Test animals:

A great number of adult female rats which have littered once. A number of adult male rats. Ratio 3:1.

Method:

(a) The female rats are caged in groups of three. To three females one male is added.

(b) Each morning vaginal smears are made. The smears are fixed in methyl alcohol and colored with methylene blue.

(c) The smears are examined on the presence of spermatozoa.

(d) When the vaginal smear of the rat is positive, the rat is separated and weighed (0th day of pregnancy).

(e) At the 15th day the rat is weighed again; increase in weight is a second indication of pregnancy.

(f) The steroids are administered once a day from the 15th day up to the 21st day of pregnancy included in a quantity of 0.2 ml., subcutaneously or orally.

(g) In subcutaneous administration the steroid is dissolved in methylene chloride in arachidic oil. With oral administration the active steroid is suspended in a carboxymethylcellulose solution, i.e.,

| | Percent |
|---|---|
| Carboxymethylcellulose | 1.0 |
| Sodium chloride | 0.9 |
| Benzylalcohol | 1.5 |
| Tween 60 | 1.0 |
| Distilled water, to | 100 |

(h) At the 22nd–23rd day the young are born spontaneously after the administration of small doses of the steroid. With high doses the young must be removed from the uterus by operation.

(i) Directly after birth the young are examined by measuring the ano-genital distance by means of sliding calipers.

The criteria are: distance (ano-genital), 1–2 mm., female; 2–3 mm., intersex; 3 mm., male.

The average weight of the young is determined.

(j) Each young is fixed in formaline (4%) and the externally examined sex is indicated. It is indicated, moreover, whether the clitoris is enlarged.

(k) After fixation the animals are cut open and the presence of testicles or ovaria is indicated.

(l) The testical, the ovarium is histologically worked and the region from the tail root to the kidneys is cut in sections.

(m) The final examination of masculinisation is based on histological phenomena. Internal deviations, for example connections between ureter and vagina, blind vaginae, "penis-like" clitoris can then be shown clearly.

(n) A few animals of each group are kept alive to the age of three weeks. When the young have been obtained by operation, they are placed with a different mother rat having littered the same day (the mother rat must be anaesthetized).

(o) After 21 days a section is carried out, the sexual organs are prepared and the tractus genitalis is accurately examined histologically.

(p) The test must be arranged so that the mother rats are distributed at random and each group must comprise 6 to 7 mother rats.

Literature:

Revesz, C., et al., Endocrinology, 66 (1960) 140.

Scholer, H. F. L. and De Wachter, A. M., Acta Endocrinologica, 38 (1961) 128.136.

DETERMINATION OF ESTROGENIC AND ANTI-ESTROGENIC EFFECT OF A STEROID (OPENING OF THE VAGINA) (PROCEDURE 308)

Principle of the test:

Under the action of "estrogenics" (estradiol) the vagina of female infantile rats is prematurely opened, since the animal gets heat. Normally the vagina of the female rat opens, when the animal has reached puberty (about 7 weeks).

By means of $\beta$-estradiol or an estrogenically active steroid the time of opening of the vagina is shifted to an earlier date. When the steroid is injected in conjunction with $\beta$-estradiol, there is an estrogeno-inhibiting action of the steroid, if the instant of opening of the vagina is later than with the $\beta$-estradiol group.

Test animals:

In the test 32 female, infantile rats, weight 35 to 45 g.; age 21 to 23 days are used for each steroid tested. During the test the animals are freely fed water and fodder.

Method of test:

(a) The rats are divided into weight groups separated by a one gram progression.

(b) From these groups 8 replications of 4 animals.

(c) Separate out therefrom 4 groups of 8 animals by means of a random allocation.

(d) The rats are marked and their body weights are recorded.

(e) A standard solution of $\beta$-estradiol (4 units/ml.) is made.

(f) A steroid solution in oil is made by weighing 300 mg. in a round-bottom bulb; add a few mls. of methylene chloride and 30 ml. of arachidic oil and evaporate the methylene chloride.

(g) The animals in each of the four groups (1, 2, 3 and 4) are injected subcautaneously every 48 hours with the materials and amounts designated as follows: Group (1) blank arachidic oil: 0.2 ml.; (2) $\beta$-estradiol standard 4 units/ml.: 0.2 ml.; (3) steriod 10 mg./ml.: 0.2 ml.; (4) steroid +$\beta$-estradiol standard (0.2+0.2) ml.

(h) The rat is checked daily for the opening of the vagina. When the vagina is open, the body weight and the date are noted down.

(i) The criterion for terminating the test is the day, when 7 of the 8 animals in the check group have an opened vagina.

(j) By section the uterus and the two ovaria are prepared and weighed. The ovaria are tested histologically.

Literature:

Curtis, H., and Doisy, E. A., Journal Biol. Chem., 41, 647, 1931.

Long, J. A., and Evans, H. M., Mem. Univ. California, 6, 84, 1932.

DETERMINATION OF THE UTEROTROPHIC AND ANTI-UTEROTROPHIC ACTION OF A STEROID (PROCEDURE 309)

Principle of the test:

Under the action of the female hormone "estradiol" (also estrone and estriol) the uterus of the female, infantile animal exhibits quantitative changes. The uterus of the female infantile mouse is particularly sensitive to estrogenics and is enlarged under the action of very small quantities owing to cell division and liquid accumulation.

In this test also the anti-uterotrophic action of a steroid is assessed by injecting a group of animals with a combination of β-estradiol and the steriod to be tested. If the growth of the uterus, caused by β-estradiol only:

(a) Is counteracted, the steriod has an inhibiting effect, which is dependent on the inclination of the progestative activity, (b) is antagonated, the steriod has an anti-estrogenic effect.

Test animals:

For testing one steriod there are required 32 female, infantile mice, age 21 to 23 days, weight 9 to 13 g. Water and fodder is freely available for the animals during the test period.

Method of test:

(a) The animals are divided into four groups separated by not more than about 0.5 g. by means of weight replications and random allocations.

(b) A standard solution of β-estradiol in arachidic oil 10 units/ml.) is prepared.

(c) The steriod to be tested is dissolved as follows: 60 mg. of the steriod is weighed in a round-bottom bulb, a few mls. of methylene chloride and 6 mls. of arachidic oil are added. The methylene chloride is evaporated in vacuo by slightly heating (solution=10 mg./ml.).

(d) The mice are marked and the individual body weights are recorded.

(e) The rats in each of the four groups are injected subcutaneously once a day for three days with the following materials: Group (1) blank arachidic oil, 0.1 ml.; (2) β-estradiol dimenformon 10 units/ml.; 0.1 ml.; (3) steriod 10 mg./ml., 0.1 ml.; (4) steriod 10 mg./ml. + β-estradiol 10 units/ml.: 0.1 +0.1 ml.

(f) On the 4th day the mice were weighed and killed by chloroform. The uterus, ovaria and thymus are prepared.

(g) After cleaning (if necessary with the aid of a magnifying glass, moist filter paper) the weight of the uterus, the left-hand and the right-hand overium and the thymus is noted down, while in addition, the dry weight of the uterus, after a stay of one night in a dry cell, is determined.

Literature:

Rubin, Bettyl L., and Dorfman, A. S., Journal of Endocrinology, 49, 4, 429.

DETERMINATION OF ANDROGENIC, ANABOLIC AND ANTI-ANDROGENIC ACTION OF STEROIDS ON CASTRATED MALE RATS (PROCEDURE 311)

Principle of the test:

By the removal of the testicles of a male, infantile rat the (small) testosterone production is stopped. A few weeks after castration the level of the weight of testicle and prostate will be lower than that of the intact infantile animal of the same age.

These castrates are very sensitive to exogenous administration of testosterone and this test is based on the growth of the testicle and the ventral prostrate. In order to assess an anabolic action the musculus levator ani is prepared. Moreover, a combination group is used to show anti-androgenic activity.

Animals employed in test:

Male, infantile rats of 3 weeks are used in this test. These rats weighting about 35 to 45 g. are castrated under ether anaesthesia. Three weeks after the castration the test is started. During the preliminary treatment and the test the animals have water and fodder freely at their disposal.

Method:

This test is carried out completely in accordance with the Procedure 310; only the concentration of the standard testosterone solution is lower, i.e., 250 mg./ml. instead of 500 mg./ml. For making 30 ml. of a standard solution 7.5 mg. of testosterone instead of 15 mg. is weighted.

DETERMINATION OF THE ANTI-INFLAMMATORY ACTION OF STEROID (ASBESTOS PELLET TEST)

Principle of the test:

The implantation of a foreign body produces inflammatory reactions which becomes manifest in the formation of tissue around the foreign body with exudation. These reactions are suppressed or occur to a minor extent when a substance having an anti-inflammatory action is administered.

Animals employed in test:

In the test adult female rats, weighing about 130 g. are used. The animals are fed fodder and water freely during the test.

Method of test:

(a) 36 asbestos pellets weighing from 29.0 to 31.0 mg. are formed.

(b) 18 rats are divided at random into three groups.

(c) The rates are anaesthesized with ether.

(d) The hair is cut away with a scissors from the two flanks of the animals.

(e) A small incision is made in the skin below the last rib, parallel thereto starting from the long dorsal muscle.

(f) The skin is detacted from the underlying tissue with the aid of the rear side of the tweezers and the asbestos pellet is slipped as far as possible under the skin forwardly towards the front leg.

(g) The skin is closed by one or two wound clips.

(h) In the same manner the second pellet is placed on the other side of the animal.

(i) Solutions of 10 mg./ml. of the steroid to be tested and of 10 mg./ml. of hydrocortisone are prepared by dissolving 130 mg. of these substances in a mixture of a few ml. of methylene chloride and 13.0 ml. of arachidic oil and evaporating the methylene chloride in vacuo.

(j) A blank arachidic oil solution is prepared in the following manner: A few ml. of methylene chloride are introduced into a round-bottom bulb. Add 13.0 ml. of arachidic oil and evaporate the methylene chloride in vacuo.

(k) The animals in one group are injected subcutaneously twice a day for 5 days starting one hour after the implantation of the asbestos pellet with 0.2 ml. of the oil solution of the steroid tested and the second group in the same manner is injected with the hydrocortisone solution.

(l) On the sixth day the animals are killed by chloroform. The pellets, having a granulation tissue grown around them, are prepared and weighed (wet weight).

(m) The pellets are dried overnight at 60° C. and weighed again (dry weight).

Literature:

Dorfman, R. J., and Oleson, J. J., Triamcinolone Diacetate, April 1957.

Meier, R., and Schuler, W., Experienta, 6, 469 (1950).

GLUCOCORTICOIDAL ACTION OF STEROIDS (PROCEDURE 313)

Principle of test:

Animals without adrenal glands are not capable of storing glycogen in the liver.

After the administration of a steroid with glucocorticoidal action the power of glycogen accumulation is restored.

Animals employed in test:

In this test adult male or female rats of 130 to 160 g. are used. After the adrenalectomy the animals have fodder and water with an addition of 1% of NaCl freely at their disposal.

On the morning of the 4th day after the adrenalectomy the fodder is removed; on the morning of the 5th day (=the test day) the water is also removed.

Pretreatment to adrenalectomy:

Under ether anaesthesia the adrenal glands are removed on both sides. The incision in the muscular tissue is closed by yarn; the skin incision is closed by a wound clip. The test proper starts on the 5th day after this operation.

Method of test:

(a) The rats are divided by means of a random allocation into three cages, 6 animals per cage.

(b) A standard solution of glucose is made by weighing 10 mg. and filling up with distilled water to 10 ml. (concentration 1 mg./ml.).

(c) A standard solution of hydrocortisone in arachidic oil is made according to the following procedure. Weigh 20 mg. of hydrocortisone in a round-bottom bulb. Dissolve it in a few mls. of methylene chloride, add by the pipet 10 ml. of arachidic oil and evaporate the methylene chloride (concentration 2 mg./ml.).

(d) A solution of the steroid to be tested is prepared by dissolving 70 mg. in a few ml. of methylene chloride and 7 ml. of arachidic oil and evaporating the methylene chloride in a vacuo thus yielding a concentration of 10 mg./ml.

(e) The animals are injected at once subcutaneously so that a waiting time of 10 minutes is left between the various test groups according to the following procedure: cage 1—arachidic oil, 1 ml. divided over two injection spots; cage 2—hydrocortisone, 1 ml. divided over two injection spots; cage 3—steroid, 1 ml. divided over two injection spots.

(f) The animals tested are injected after 5 hours with nembutal (40 mg./kg. body weight) with a 10-minute interval also being left between the groups.

(g) When the animals sleep the liver is prepared. As much blood as possible is removed with filter paper. The weight of the liver is determined and the liver is put, as a whole, in a glass stoppered tube containing 10 ml. of KOH 30%. The preparation of the liver (opening of ventral cavity to liver in lye) must not take more than half a minute. Deep anaesthesia and quick operation is required to prevent changes in the glycogen content of the liver (Pabst).

(h) The liver is destroyed by leaving it overnight in the lye or by heating for 30 minutes on a vapor bath.

Literature:

Pabst et al., Endocrinology, 1947, vol. 41.
Seifter, Arch. of Bioch., 1950, vol. 25.
W. M. Allen, J. Chin. Endocrinology, 10, 1950, 71.

ANABOLIC ACTION OF STEROIDS (RENOTROPHIC TEST) (PROCEDURE 314)

Principle of the test:

The anabolic activity becomes manifest in the organism by:

(1) Positive N-balance,
(2) Muscular growth (musculus levator ani test),
(3) Increase in kidney weight.

The renotropic test is based on the latter item. Since all endogenic male hormones have this renotropic activity, castrated animals are taken as a a basis.

Animals employed in the test:

Adult, castrated, male mice, weight 22 to 28 g. are used. The animals are used a fortnight after castration. During the test fodder and water is freely available.

Method:

(a) The mice are divided into weight groups with a progression of 1 g.

(b) 4 replications of 6 animals from the weight groups of mice are formed.

(c) The animals of each replication are marked in the same manner.

(d) 6 test groups of 4 animals are formed by random allocation.

The individual weights of the mice in each test group are noted.

The actual test is carried out in accordance with Procedure 311.

Literature:

Kochakian, C. D., Am. J. Physiol., 142: 315, 1944.
Kochakian, C. D., and Stettner, C. E. Am. J. Phys., 155: 255, 1948.

The results of these tests for representative novel retrosteroids of our invention are shown in the following Table I.

TABLE I

| Compound number | Activities | | | | | | | | | | | | | |
|---|---|---|---|---|---|---|---|---|---|---|---|---|---|---|
| | Par. progestational | Or. progestational | Uterotrophic | Anti-uterotrophic | Estrogenic | Anti-estrogenic | Androgenic | Androgenic in ♀ fetus | Anabolic | Renotrophic | Anti-androgenic | Glycogen storage adrenalectomized | Anti-inflam. | |
| 1 | − | − | − | − | − | − | − | | − | + | − | − | − | <thymus, <testes. |
| 2 | − | − | − | − | − | − | − | | − | + | − | − | − | <testes, >adrenals. |
| 3 | + | | | | | | + | | + | + | | | | anti-pituitary. |
| 3A | | | | | | | + | | + | + | | | | Ca. retention positive phosphate balance. |
| 4 | | − | + | + | − | − | + | | | − | − | | − | |
| 4A | + | − | + | + | − | − | + | | | − | − | | − | Increases libido in male caviae. |
| 5 | + | + | − | + | − | − | + | | | − | − | | − | |
| 5A | + | + | − | + | − | − | + | | | − | − | | − | Increases libido in male caviae. |
| 6 | − | − | + | − | − | − | − | | | | | | | |
| 7 | − | − | + | − | − | − | − | | | − | | | | |
| 8 | | | − | − | − | − | − | | + | + | + | | − | anti-endrogenic estrogenic, <adrenals. |
| 9 | | | | | | | | | + | + | + | | − | |
| 10 | − | − | + | + | − | − | − | | + | + | + | − | | <thymus, <ovaries. |
| 11 | | | | | | | | | + | + | + | − | | <testes (anti-pituitary). in comb. with testosterone produces a stronger antipituitary action. |
| 12 | | | − | − | | | − | | + | − | + | − | − | <testes. |
| 12.5 | | | | | | | | | + | − | + | − | − | <testes. |
| 13 | − | + | + | + | | | − | | − | − | − | − | − | |
| 13A | + | + | + | + | | | + | | + | + | | − | − | |
| 14 | + | + | − | − | − | − | + | | − | − | | − | − | |
| 14A | + | + | − | − | − | − | + | | | − | | − | − | |
| 15 | + | + | | | | | | | | | | − | + | }diuretic Na/K, diuretic Na↑. |
| 15A | + | + | | | | | | | | | | − | + | |
| 16 | + | + | + | + | − | − | − | | − | − | | − | − | |
| 16A | + | + | + | + | − | − | − | | − | − | | − | − | |
| 17 | + | + | + | + | − | − | + | | − | − | | − | − | |
| 18 | | | | | | | | | | | | | | prolonged progestational activity after s.c. inj. |
| 19 | − | − | − | − | | | − | | − | − | − | − | − | <testes. |
| 20 | + | + | − | + | | | − | | − | − | − | − | − | <prostate. |
| 21 | | | | | | | | | − | − | | − | | |
| 22 | − | − | − | − | − | − | − | | − | − | − | − | − | |
| 23 | | | | | | | | | | | | | − | stimulates formation of corpora lutea, antipituitary. |
| 23A | | | | | | | | | | | | + | − | |

TABLE I—Continued

| Compound number | Par. progestational | Or. progestational | Uterotrophic | Anti-uterotrophic | Estrogenic | Anti-estrogenic | Androgenic | Androgenic in ♀ fetus | Anabolic | Renotrophic | Anti-androgenic | Glycogen storage adrenalectomized | Anti-inflam. | |
|---|---|---|---|---|---|---|---|---|---|---|---|---|---|---|
| 24 | − | | − | − | − | − | + | | + | + | − | − | − | } ov. inhibition, pit. inhibition. |
| 24A | + | | − | − | − | − | + | | + | + | − | − | − | |
| 25 | + | + | + | + | | | − | | − | − | − | − | − | |
| 26 | + | − | + | − | | | − | | − | − | − | − | | > testes, pit. stimulating. |
| 27 | − | | − | − | | | + | | + | + | + | − | − | |
| 28 | | | | | | | + | | + | + | + | | | |
| 28A | | | + | + | | | | | | | | | | |
| 29 | | | + | − | | + | − | | − | − | − | − | − | no effect in lymph organs. |
| 30 | − | | | | | | + | | + | + | − | − | | < lymph organs. |
| 30A | | | + | − | | | + | | + | + | − | | | no sterility effect on new born rats. |
| 31 | | | − | − | | | + | | + | + | − | − | | in new born rats produces permanent sterility. |
| 31A | | | − | − | | | + | | + | + | − | | | |
| 32 | − | | + | + | | | + | | + | + | − | | | |
| 32A | + | + | + | + | | | − | | − | − | − | − | | |
| 33 | + | − | + | + | | | + | | + | + | − | | | |
| 33A | + | + | + | + | | | + | | + | + | + | | | |
| 33B | + | + | + | + | + | | + | | + | + | + | + | | pit. inhibition. |
| 34 | + | + | + | + | − | + | + | + | + | + | + | − | | pit. inhib. ov. inhibition. |
| 34A | + | + | + | + | − | + | + | + | + | + | + | − | | pit. inhib. ov. inhibition. |
| 34B | + | + | + | + | − | | + | | + | + | + | + | | deciduoma form; ov. inhib. |
| 35 | + | + | + | + | − | + | + | | + | + | + | − | | no deciduoma effect. |
| 35A | + | + | + | + | + | | + | + | + | + | + | − | | deciduoma form; ov. inhib. |
| 35B | + | + | + | + | + | | − | | + | + | − | + | | } deciduoma form. |
| 36 | + | + | + | + | | | − | + | − | − | − | | | |
| 36B | + | − | + | + | | | + | | + | + | − | − | − | { anti-fertile+Normal steroid −. |
| 37 | + | + | + | + | | | − | | − | − | − | − | − | { pregnancy maint.+Normal steroid +. |
| 37A | + | − | + | + | | | + | | + | + | − | − | | { deciduoma form−Normal steroid +. |
| 38 | | | + | + | | | − | | | − | | − | − | not mineralo corticoid. |
| 39 | + | − | + | + | | | − | | | | | − | − | mineralo corticoid. |
| 39A | + | | + | + | | | | | | | | + | − | } prolonged activity. |
| 40 | + | + | + | + | − | − | − | | − | − | − | − | − | |
| 40A | + | − | + | + | − | − | − | | − | − | + | − | − | not thymolytic not catabolic even in tact animal. |
| 41 | | | | | | | − | | − | − | | + | + | thymolytic, catabolic. |
| 41A | + | | + | + | | | − | | | | − | − | − | |
| 42 | − | − | − | | | | + | | | | − | | | pit stimulating <thymus. |
| 42A | | | | | | | | | | | − | | | |
| 43 | + | + | + | + | | | − | | − | − | − | | | increases libido in male caviae. |
| 44 | + | − | | | | | | | | | | | | |
| 44A | − | | + | | | | − | | − | − | | | | anti-endogenic estrogenic. |
| 45 | − | | − | + | − | | | | | | | | | |
| 46 | + | | − | + | | | | | | | | | | |
| 47 | − | | | | | | − | | + | | | | | |
| 48 | − | | | | | | + | | | | | | | |
| 49 | + | + | | | | | | | | | | | | |
| 50 | − | − | + | + | | | − | | − | − | − | | | increase in size of prostate in combination with testosterone. |
| 51 | + | + | | | − | | − | | − | | | | | |
| 52 | + | + | | | − | | − | | − | | | | | |
| 53 | − | + | − | + | | | − | − | | | | | | |
| 54 | − | + | | | | | + | | | | | | | |
| 55 | + | − | + | + | | | | | | | | | | pit. inhibition. |
| 55A | + | + | + | + | | | − | | − | − | | | | |
| 56 | | | | | | | − | | | + | | | | |
| 57 | + | + | + | − | | | + | | + | + | + | − | − | |
| 58 | | | | | | | + | | + | + | | | | |
| 59 | | | | | | | + | | + | + | | − | − | |
| 60 | + | + | + | + | − | | − | | | | | | | increases libido in caviae. |
| 60A | + | − | + | + | | | + | | | | | | | increases libido in caviae. |
| 61 | + | − | | | | | + | | | | | | | > testes pit. stimulating. |
| 61A | − | + | + | − | | | − | | − | − | | − | | < testes. |
| 62 | + | + | + | + | | | − | | | + | | | − | |
| 62A | + | − | | | | | − | | | | | | | |
| 63 | | | + | + | | | − | | | | | − | | |
| 64 | | | + | + | | | | | | | | | | |
| 65 | | | | | | | | | | | | | | |
| 66 | + | + | + | + | − | − | − | | − | − | − | − | − | |

The terms employed in Table I which are not clearly obvious have the following definitions:
Par. Progestational=parenteral progestational;
Or. Progestational=oral progestational;
♀ fetus=female fetus;
Glycogen storage in Adrenalectomized=corticoid activity by glycogin storage in liver of adrenalectomized rats;
Anti-inflam.=anti-inflammatory;
<thymus=decreases weight of thymus;
<testes=decreases weight of testes;
>testes=increases weight of testes;
>adrenals=increases weight of adrenals;
anti-pituitary=decreases weight of target glands;
anti-endogenic estrogenic=antagonizes production or the effect of estrogens produced by the body but does not antagonize estrogens which are introduced from the outside, for example by injection;
<ovaries=decreases weight of ovaries;
in comb. with testosterone produces a stronger anti-pituitary action=the compound shows a stronger anti-pituitary action if combined with testosterone;
diuretic—Na↑=diuretic with an increase of the Na/K ratio;

diuretic Na/K=diuretic with no increase in the Na/K ratio;

<prostate=decreases weight of prostate;

pit. inhibition=target organs (testes, ovaries, etc.) of the trophic hormones are significantly smaller than non-treated animals;

pit. stimulating=effect on pituitary opposite to that of pituitary inhibition;

ov. inhibition=inhibits activities of ovaries;

>testes=increases weight of testes;

<lymph organs=decreases weight of lymph organs;

deciduoma form=deciduoma formation;

anti-fertile in rats=has an anti-fertility effect in rats;

pregnancy maint.=tends to maintain pregnancy when given to pregnant rats;

increase in prostate in comb. with testosterone=increases weight of the prostate gland when combined with testosterone;

+=significantly positive activity;

−=no activity.

The chemical names of the compounds whose activities are shown in Table I are listed in the following Table II.

TABLE II

[Names of compounds in Table I]

| Compound No. | Name of Compound |
|---|---|
| 1 | 9β, 10α-androst-4-ene-3ξ, 17β-diol. |
| 2 | 9β, 10α-androsta-1,4-dien-17β-ol-3-one. |
| 3 | 17α-methyl-9β,10α-androsta-1, 4-dien-17-ol-3-one. |
| 4 | 9β, 10α-pregna-1,4-diene-3,20-dione. |
| 5 | 17α-acetoxy-9β,10α-pregna-1,4-diene-3,20-dione. |
| 6 | 9β, 10α-androsta-4,6-diene-3,17-dione. |
| 7 | 9β, 10α-androsta-4,6-dien-17β-ol-3-one. |
| 8 | 9β, 10α-androsta-4,6-dien-17β-ol-3-one 17-acetate. |
| 9 | 9β, 10α-androsta-4,6-dien-17β-ol-3-one 17-phenylpropionate. |
| 10 | 9β, 10α-androsta-4,6-dien-17β-ol-3-one 17-propionate. |
| 11 | 9β, 10α-androsta-4,6-dien-17β-ol-3-one 17-hexyloxyphenylpropionate. |
| 12 | 9β, 10α-androsta-4,6-dien-17β-ol-3-one 17-hemisuccinate. |
| 12.5 | 9β, 10α-androsta-4,6-dien-17β-ol-3-one 17-hemisuccinate Na-salt. |
| 13 | 17α-ethynyl-9β,10α-androsta-4,6-dien-17-ol-3-one. |
| 14 | 9β, 10α-pregna-4,6-diene-3,20-dione. |
| 15 | 21-acetoxy-9β,10α-pregna-4,6-diene-3,20-dione. |
| 16 | 17α-acetoxy-9β,10α-pregna-4,6-diene-3,20-dione. |
| 17 | 17α-hydroxy-9β,10α-pregna-4,6-diene-3,20-dione 17-caproate. |
| 18 | 17α, 21-dihydroxy-9β,10α-pregna-4,6-diene-3,20-dione 21-acetate. |
| 19 | 9β, 10α-bisnorchola-4,6-dien-3-on-22-al. |
| 20 | 9β, 10α-pregna-4,6-dien-20ξ-ol-3-one (A-isomer). |
| 21 | 9β, 10α-pregna-4,6-dien-20ξ-ol-3-one (B-isomer). |
| 22 | 9β, 10α-pregna-1,4,6-triene-3,20-dione. |
| 23 | 11α, 17α,21-trihydroxy-9β,10α-pregn-4-ene-3,20-dione. |
| 24 | 3, 17β-diacetoxy-9β,10α-androsta-3,5-diene. |
| 25 | 3-acetoxy-9β, 10α-pregna-3,5-dien-20-one. |
| 26 | 3,17α-diacetoxy-9β, 10α-pregna-3,5-dien-20-one. |
| 27 | 9β, 10α-pregna-5,7-dien-3β-ol-20-one. |
| 28 | 2β-methyl-9β, 10α-androst-4-en-17β-ol-3-one. |
| 29 | 2β-methyl-9β, 10α-pregn-4-ene-3,20-dione. |
| 30 | 9β, 10α-androst-4-ene-3,17-dione. |
| 31 | 9β, 10α-androst-4-en-17β-ol-3-one 17-propionate. |
| 32 | 9β, 10α-androst-4-en-17β-ol-3-one 17-p-hexyloxyphenylpropionate. |
| 33 | 17α-vinyl-9β, 10α-androst-4-en-17β-ol-3-one. |
| 34 | 17α-ethynyl-9β, 10α-androst-4-en-17-ol-3-one. |
| 35 | 17α-(2'-methallyl)-9β, 10α-androst-4-en-17-ol-3-one. |
| 36 | 17α-allyl-9β, 10α-androst-4-en-17-ol-3-one. |
| 37 | 9β, 10α-pregn-4-ene-3,20-dione. |
| 38 | 21-fluoro-9β, 10α-pregn-4-ene-3,20-dione. |
| 39 | 21-acetoxy-9β, 10α-pregn-4-ene-3,20-dione. |
| 40 | 9β, 10α-pregn-4-en-17α-ol-3,20-dione 17-caproate. |
| 41 | 17α, 21-dihydroxy-9β, 10α-pregn-4-ene-3,20-dione 21-acetate. |
| 42 | 9β, 10α-pregn-4-en-20 ξ-ol-3-one. |
| 43 | 17α-ethyl-5ξ,9β,10α-androstan-17-ol-3-one (B-isomer). |
| 44 | 6α-fluoro-17α-hydroxy-9β,10α-pregn-4-ene-3,20-dione 17-acetate. |
| 45 | 7ξ-methyl-9β,10α-androst-4-ene-3,17-dione. |
| 46 | 7ξ-methyl-9β,10α-androst-4-en-17β-ol-3-one. |
| 47 | 7ξ-methyl-9β,10α-pregn-4-ene-3,20-dione. |
| 48 | 9β,10α-androsta-4,6-diene-3ξ,17β-diol. |
| 49 | 5ξ,9β,10α-androstane-3ξ,17β-diol. |
| 50 | 6-methoxy-9β,10αpregna-4,6-dien-17α-ol-3,20-dione 17-acetate. |
| 51 | 3-ethoxy-9β,10αpregna-3,5,7-trien-20-one. |
| 52 | 3,17α-diacetoxy-9β,10αpregna-3,5,7-trien-20-one. |
| 53 | 4-bromo-9β,10α-pregna-4,6-diene-3,20-dione. |
| 54 | 6ξ-bromo-9β,10α-pregn-4-ene-3,20-dione. |
| 55 | 6ξ-chloro-9β,10α-pregn-4-ene-3,20-dione. |
| 56 | 7ξ-methyl-9β,10α-androst-4-ene-3ξ,17β-diol. |
| 57 | 6-chloro-9β,10α-pregna-4,6-diene-3,20-dione. |
| 58 | 6β-acetoxy-9β,10α-androst-4-en-17β-ol-3-one 17-acetate. |
| 59 | 2β-fluoro-9β,10α-pregna-4,6-dien-17α-ol-3,20-dione 17-acetate. |

| Compound No. | Name of Compound |
|---|---|
| 60 | 6β-fluoro-9β,10α-androst-4-en-17β-ol-3-one 17-acetate. |
| 61 | 6β-fluoro-9β, 10α-pregna-4-ene-3,20-dione. |
| 62 | 6β-fluoro-9β,10α-pregn-4-en-17α-ol-3,20-dione 17-acetate. |
| 63 | 4,4-dimethyl-9β,10α-androst-5-en-17β-ol-3-one. |
| 64 | 2ξ-methyl-9β,10α-pregna-4,6-dien-3,20-dione. |
| 65 | 9β,10α-pregna-4,16-dien-3,20-dione. |
| 66 | 2-hydroxy methylene-9β,10α-androst-4-en-17β-ol-3-one. |
| 67 | 9β,10α-androst-4-en-17β-ol |
| 68 | 17α-methyl-9β,10α-androst-4-en-17-ol. |
| 69 | 17α-ethynyl-9β,10α-androst-4-en-17-ol. |
| 70 | 6β-fluoro-9β, 10α-pregna-1,4-diene-3,20-dione. |
| 71 | 17α-acetoxy-9β10α-pregn-4-ene-3,20-dione. |

Compounds 3A, 4A, 5A, 13A, 14A, 15A, 16A, 23A, 24A, 28A, 30A, 31A, 32A, 33A, 34A, 35A, 37A, 39A, 40A, 41A, 42A, 44A, 55A, 60A, 61A, 62A and 71A are the corresponding normal, i.e., 10β,9α steroids. Compounds designated as 33B, 34B, 35B and 36B are the corresponding 19 nor normal steroids.

While we have described our invention in connection with specific embodiments and applications, other modifications thereof will be readily apparent to those skilled in this art without department from the spirit and scope of the invention as defined in the appended claims.

What we claim is:

1. A steroid of the formula:

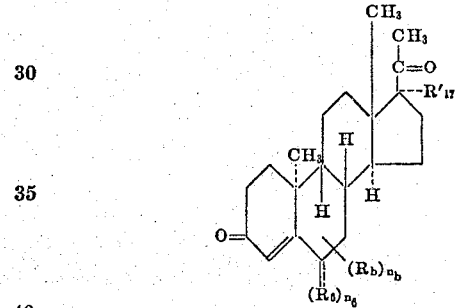

wherein $R_b$ is an olefinic double bond at carbon atom 6, $n_b$ is an integer of 0–1, $R_6$ is a member selected from the group consisting of hydrogen, F, Cl and Br, $n_6$ is an integer of 1–2 with the proviso that when $n_6$ is 2, $R_6$ comprises substituents other than two halogen radicals and $R'_{17}$ is a member of the group consisting of hydrogen and acyloxy.

2. A steroid of the formula:

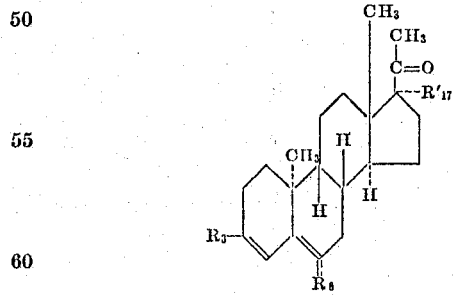

wherein $R_3$ is a member selected from the group consisting of alkoxy and acyloxy, $R_6$ is a member selected from the group consisting of hydrogen, F and Cl and $R'_{17}$ is a member selected from the group consisting of hydrogen and acyloxy.

3. Retro-pregna-4,6-diene-3,20-dione.

4. 17α - hydroxy-retro-pregna-4,6-diene-3,20-dione-17-caproate.

5. Retro-pregna-1,4,6-triene-3,20-dione.

6. 3,17α-diacetoxy-retro-pregna-3,5-diene-20-one.

7. 6-fluoro - 17α - hydroxy-retro-pregn-4-ene-3,20-dione-17-acetate.

8. 6-chloro-retro-pregna-4,6-diene-3,20-dione.

9. 6β-fluoro-17α-hydroxy-retro-pregn-4-ene-3,20-dione-17-acetate.
10. Retro-pregn-4-ene-3,20-dione.
11. 17α-acetoxy-retro-pregn-4-ene-3,20-dione.
12. 17α-hydroxy-retro-pregn-4-ene-3,20-dione-17-caproate.
13. 6-methoxy-17α-acetoxy-retro-pregna-4,6-diene-3,20-dione.
14. 6,16-bis-dehydro-retro-progesterone.
15. 6-dehydro-6-fluoro-retro-progesterone.
16. 6-dehydro-6-fluoro-17α-acetoxy-retro-progesterone.
17. A 10α-methyl,9β,13β,14α hormonal steroid of the pregnane series having more than 19 carbon atoms in the molecule, a halogen free $C_3$ position on the steroid nucleus and wherein the substituent attached to the $C_{17}$ carbon atom of the steroid nucleus in the β position is a member selected from the group consisting of alkyl of 2 to 6 carbon atoms, alkenyl of 2 to 6 carbon atoms, alkynyl of 2 to 6 carbon atoms and the oxo, amino, F, Cl and Br substitution products of said alkyl, alkenyl and alkynyl groups.
18. A 10α-methyl,9β,13β,14α hormonal steroid of the pregnane series having more than 19 carbon atoms in the molecule, and wherein the substituent attached to the $C_{17}$ carbon atom of the steroid nucleus in the β position in the group

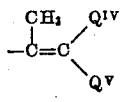

wherein $Q^{IV}$ is a member selected from the group consisting of phenyl and the cylic group

wherein R″ and R‴ form together a bivalent hydrocarbon radical and $Q^V$ is a member selected from the group consisting of phenyl, hydrogen and alkyl of 1–3 carbon atoms with the proviso that $Q^V$ is hydrogen when $Q^{IV}$ contains nitrogen and the substituent attached to the $C_{17}$ carbon atom of the steroid nucleus in the α position is hydrogen.
19. A 10α-methyl,9β,8β,13β,14α hormonal steroid of the pregnane series having more than 19 carbon atoms in the molecule, wherein the $C_{17}$ carbon atom of the steroid nucleus together with its substituents forms the group

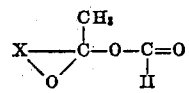

wherein X is the $C_{17}$ carbon atom.
20. The steroid of claim 17 wherein the substituent attached to the $C_{17}$ carbon atom of the steroid nucleus in the β position is

and the substituent attached to the $C_{17}$ carbon atom of the steroid nucleus in the α position is H.
21. The steroid of claim 17 wherein the substituent attached to the $C_{17}$ carbon atom of the steroid nucleus in the β position is

and the substituent attached to the $C_{17}$ carbon atom of the steroid nucleus in the α position is O-acyl.

References Cited by the Examiner

UNITED STATES PATENTS

| | | | |
|---|---|---|---|
| 2,880,214 | 3/59 | Moffett et al. | 260—397 |
| 2,883,379 | 4/59 | Moreland et al. | 260—239.5 |
| 2,900,382 | 8/59 | Sondheimer et al. | 260—239.55 |
| 2,916,486 | 12/59 | Babcock et al. | 260—239.55 |
| 2,962,510 | 11/60 | Hiersemann et al. | 260—397.4 |
| 2,992,216 | 7/61 | Agnello et al. | 260—239.55 |
| 3,036,096 | 5/62 | Ringold et al. | 260—397.4 |

FOREIGN PATENTS 794,392   4/58   Great Britain.

OTHER REFERENCES

Bowers: "J.A.C.S." (1959), pages 4107–4108.
Dodson: "Journal Amer. Chem. Soc" (1959), pages 1224–7.
Fieser et al.: "Natural Product Related to Phenanthreme," page 301 relied on. Reinhold Publishing Corp. (1949), New York.

LEWIS GOTTS, *Primary Examiner.*

IRVING MARCUS, *Examiner.*

UNITED STATES PATENT OFFICE
CERTIFICATE OF CORRECTION

Patent No. 3,198,792                          August 3, 1965

Engbert Harmen Reerink et al.

It is hereby certified that error appears in the above numbered patent requiring correction and that the said Letters Patent should read as corrected below.

In the heading to the printed specification, after line 7, insert -- Claims priority, application Netherlands, Apr. 12, 1958, 226,774; Oct. 15, 1958, 232,312; Mar. 7, 1959, 236,884 --; column 1, line 54, for "a" read -- at --; column 4, line 1, strike out "in"; column 6, line 1, for "hydromethyl" read -- hydroxymethyl --; line 7, after "to" insert -- the --; column 10, line 57, for "acycloxy" read -- acyloxy --; column 12, line 23, for "-(2,3-c)-isoxazole" read -- -(3,2-c)-pyrazole --; line 60, for "retrol5β-" read -- retro-5β- --; column 13, line 11, for "-diene-" read -- -dien- --; column 15, line 2, for "-(22'-" read -- -(2'- --; line 9, for "-oxy-" read -- -oxo- --; line 13, for "-ene-1-3,20-" read -- -ene-3,20- --; column 18, line 24, for "-dehyoro-" read -- -dehydro- --; column 21, line 14, for "-bisdehydre-" read -- -bisdehydro- --; column 22, lines 66 and 67, for "-chloro-", each occurrence, read -- -fluoro- --; column 23, line 58, for "$\Delta^{5.7}$" read -- $\Delta^{5,7}$ --; column 26, lines 1 to 3, strike out "After acid hydrolysis, this provides 11-methyl-11-hydroxy compound."; line 26, strike out "may be produced from retro-androstane-17β-ol-3-one"; column 27, line 41, for "Chef." read -- Chem. --; column 38, line 23, for "79" read -- 70 --; column 41, line 2, after "it" insert -- for --; line 7, after "water" insert a comma; same column 41, between lines 20 and 21, insert "Example 4", in italics, as a centered heading; column 42, line 1, beginning with "The following bands" strike out all to and including "is obtained." in line 7, column 43, and insert the same after "10.00%." in line 25, column 44; same column 42, line 67, before "9.1%" insert -- H, --; column 43, line 10, for "butly" read -- butyl --; line 29, for "metling" read -- melting --; same column 43, line 75, for "81" read -- 0.81 --; column 45, line 51, for "1.4-1." read -- 1.4 1. --; column 52, line 36, for "100" read -- 1008 --; line 40, after "(242 mμ)" insert an equal sign; same column 52, line 45, for "fololwing" read -- following --; column 55, line 43, for "76,40" read -- 76.40 --; column 56, line 23, for "dioxide" read -- dioxane --; column 62, in the table, fourth column, line 5 thereof, for "1123" read -- 123 --; column 64, line 6, for "-7α-" read -- -17α- --; column 67, line 20, for "mμ)830" read -- mμ)=830 --; column 71, line 30, for "184" read -- 194 --;

3,198,792 column 74, line 13, for "17.11" read -- 79.11 --; line 49, for "744.56" read -- 74.56 --; same column 74, line 67, for "17-acetae" read -- 17-acetate --; column 75, line 2, for "hydroxyation" read -- hydroxylation --; column 76, line 51, for "-reto-" read -- -retro- --; column 78, line 9, for "(CHCl$^{23}$)" read -- (CHCl$_3$) --; line 15, for "wearker" read -- weaker --; same column 78, line 25, for "-andros-" read -- -androst- --; column 79, line 4, for "arylic" read -- acrylic --; column 80, line 25, for "γ max." read -- λ max. --; column 81, line 17, for "carboxlic" read -- carboxylic --; line 18, for "p-benzoic" read -- p-methyl benzoic --; line 43, for "-methyl-" read -- -hydroxy- --; same line 43, for "-(t-butyl" read -- -caproate --; same column 81, line 46, for "-rentro-" read -- -retro- --; column 84, line 31, for "21.900" read -- 21,900 --; column 90, line 32, strike out "mol of steriod in the absence of light). After the addition" and insert instead -- added dropwise with stirring at -10° C. to a solution of --; column 96, line 65, for "142" read -- 242 --; column 103, line 64, for "weighting" read -- weighing --; line 75, for "weighted" read -- weighed --; column 104, line 23, for "detacted" read -- detached --; columns 105 and 106, Table I, fifteenth column, line 14 thereof, for "diruretic" read -- diuretic --.

Signed and sealed this 11th day of October 1966.

(SEAL)
Attest:

ERNEST W. SWIDER
Attesting Officer

EDWARD J. BRENNER
Commissioner of Patents